US012634951B2

(12) United States Patent
Yi et al.

(10) Patent No.: US 12,634,951 B2
(45) Date of Patent: May 19, 2026

(54) SCHEDULING WIRELESS COMMUNICATIONS

(71) Applicant: Comcast Cable Communications, LLC, Philadelphia, PA (US)

(72) Inventors: Yunjung Yi, Vienna, VA (US); Esmael Hejazi Dinan, McLean, VA (US); Hua Zhou, Vienna, VA (US); Ali Cagatay Cirik, Chantilly, VA (US); Bing Hui, Herndon, VA (US); Kai Xu, Herndon, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/421,572

(22) Filed: Jan. 24, 2024

(65) Prior Publication Data

US 2024/0224286 A1     Jul. 4, 2024

Related U.S. Application Data

(63) Continuation of application No. 18/175,155, filed on Feb. 27, 2023, now Pat. No. 11,956,801, which is a
(Continued)

(51) Int. Cl.
| *H04W 4/00* | (2018.01) |
| *H04L 5/00* | (2006.01) |
| *H04W 24/08* | (2009.01) |
| *H04W 48/12* | (2009.01) |
| *H04W 72/044* | (2023.01) |
| *H04W 72/0446* | (2023.01) |
| *H04W 72/0453* | (2023.01) |
(Continued)

(52) U.S. Cl.
CPC .......... *H04W 72/23* (2023.01); *H04L 5/0032* (2013.01); *H04W 24/08* (2013.01); *H04W 48/12* (2013.01); *H04W 72/0446* (2013.01); *H04W 72/0453* (2013.01); *H04W 72/0466* (2013.01); *H04W 72/535* (2023.01); *H04W 76/11* (2018.02); *H04W 76/27* (2018.02); *H04W 80/02* (2013.01)

(58) Field of Classification Search
None
See application file for complete search history.

(56) References Cited

U.S. PATENT DOCUMENTS

| 9,497,748 B2 * | 11/2016 | He | ........................ H04L 1/1812 |
| 2012/0257513 A1 | 10/2012 | Yamada | |
(Continued)

FOREIGN PATENT DOCUMENTS

| WO | 2018198822 A1 | 11/2018 |
| WO | 2020198972 A1 | 10/2020 |

OTHER PUBLICATIONS

International Search Report and Written Opinion—PCT/US2021/020027—mailing date Jun. 23, 2021.
(Continued)

*Primary Examiner* — Zewdu A Beyen
(74) *Attorney, Agent, or Firm* — Banner & Witcoff, Ltd.

(57) ABSTRACT

Control information may be used to schedule communications between a wireless device and a base station. The wireless device may monitor control channels associated with one or more cells to receive the control information.

26 Claims, 87 Drawing Sheets

Related U.S. Application Data continuation of application No. 17/186,572, filed on Feb. 26, 2021, now Pat. No. 11,627,600.

(60) Provisional application No. 62/982,846, filed on Feb. 28, 2020, provisional application No. 62/982,849, filed on Feb. 28, 2020, provisional application No. 62/982,909, filed on Feb. 28, 2020.

(51) Int. Cl.

| | | |
|---|---|---|
| *H04W 72/23* | (2023.01) | |
| *H04W 72/50* | (2023.01) | |
| *H04W 76/11* | (2018.01) | |
| *H04W 76/27* | (2018.01) | |
| *H04W 80/02* | (2009.01) | |

(56) References Cited

U.S. PATENT DOCUMENTS

| | | | |
|---|---|---|---|
| 2013/0083739 | A1 | 4/2013 | Yamada |
| 2014/0293893 | A1* | 10/2014 | Papasakellariou .... H04W 72/20 |
| | | | 370/329 |
| 2018/0041997 | A1 | 2/2018 | Babaei et al. |
| 2019/0349155 | A1 | 11/2019 | Xu et al. |
| 2019/0349806 | A1 | 11/2019 | Nam et al. |
| 2020/0059939 | A1 | 2/2020 | Lee et al. |
| 2020/0128565 | A1 | 4/2020 | Golitschek Edler Von Elbwart et al. |
| 2020/0314745 | A1 | 10/2020 | Yi et al. |
| 2020/0351841 | A1 | 11/2020 | Cirik et al. |
| 2021/0037551 | A1 | 2/2021 | Khoshnevisan et al. |
| 2021/0045147 | A1 | 2/2021 | Zhou et al. |
| 2021/0050968 | A1 | 2/2021 | Yi et al. |
| 2021/0099985 | A1* | 4/2021 | Ang ................... H04W 72/044 |
| 2021/0204309 | A1 | 7/2021 | Babaei |
| 2021/0227410 | A1 | 7/2021 | Xu et al. |

OTHER PUBLICATIONS

3GPP TS 38.212 V16.0.0 (Dec. 2019), 3rd Generation Partnership Project; Technical Specification Group Radio Access Network; NR; Multiplexing and channel coding (Release 16).

3GPP TS 38.213 V16.0.0 (Dec. 2019) 3rd Generation Partnership Project; Technical Specification Group Radio Access Network; NR; Physical layer procedures for control (Release 16).

3GPP TS 38.214 V16.0.0 (Dec. 2019) 3rd Generation Partnership Project; Technical Specification Group Radio Access Network; NR; Physical layer procedures for data (Release 16).

3GPP TS 38.331 V16.0.0 (Dec. 2019) 3rd Generation Partnership Project; Technical Specification Group Radio Access Network; NR; Radio Resorce Control (RRC) protocol specification (Release 16).

RP-192677 3GPP TSG-RAN Meeting #86, Sitges, Spain, Dec. 9-12, 2019, Source: Ericsson, Title: Summary of Rel-17 email discussion on NR dynamic spectrum sharing.

RP-193232 3GPP TSG-RAN Meeting #86, Sitges, Spain, Dec. 9-12, 2019, Source: Ericsson, Title: New WID on NR dynamic spectrum sharing (DSS).

* cited by examiner

Figure 3:
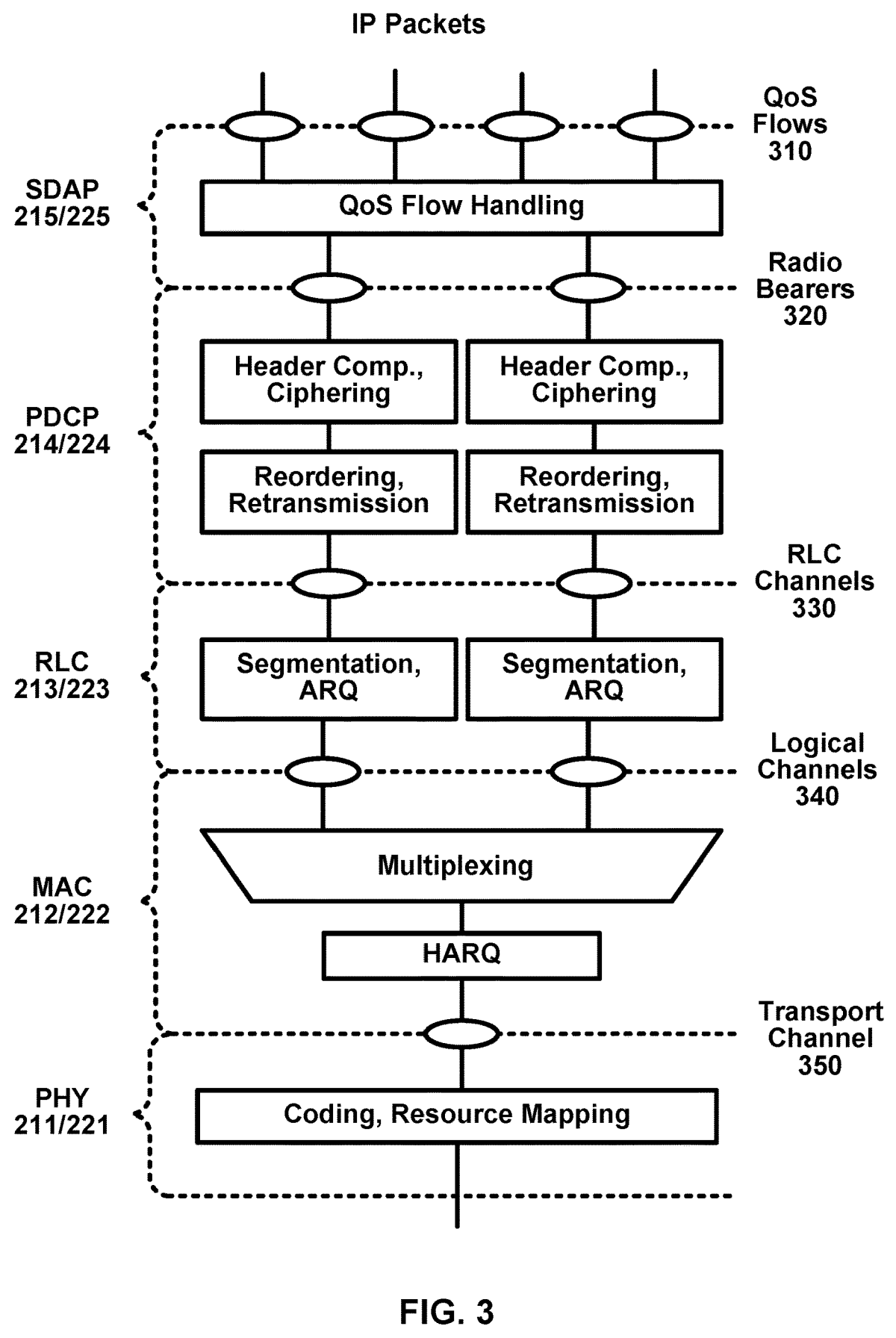

IP Packets

QoS
Flows
310

SDAP
215/225

QoS Flow Handling

Radio
Bearers
320

| Header Comp., Ciphering | Header Comp., Ciphering |
|---|---|
| Reordering, Retransmission | Reordering, Retransmission |

PDCP
214/224

RLC
Channels
330

RLC
213/223

| Segmentation, ARQ | Segmentation, ARQ |
|---|---|

Logical
Channels
340

Multiplexing

MAC
212/222

HARQ

Transport
Channel
350

PHY
211/221

Coding, Resource Mapping

Uplink

FIG. 5A

Downlink

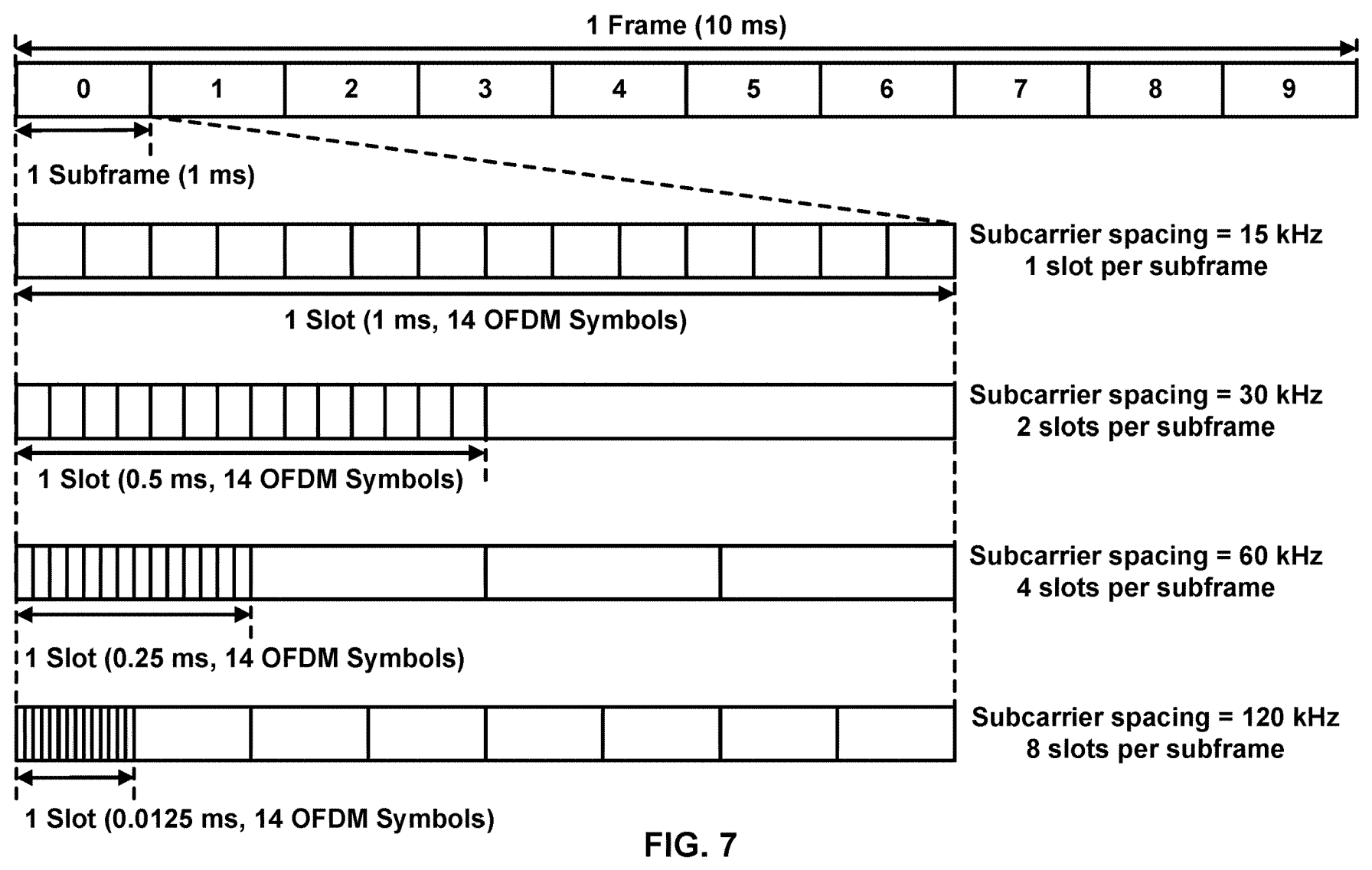

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

Component Carrier

Intraband, contiguous 1002

Freq. Band A          Freq. Band B

Intraband, non-contiguous 1004

Freq. Band A          Freq. Band B

Interband 1006

Freq. Band A          Freq. Band B

PUCCH Group 1010                    PUCCH Group 1050

Downlink Component Carriers

PCell 1011   SCell 1012   SCell 1013 ---- PSCell 1051   SCell 1052   SCell 1053 ----

UCI 1032
UCI 1031
UCI 1033
UCI 1072
UCI 1071
UCI 1073

Uplink Component Carriers

PCell 1021   SCell 1022   SCell 1023 ---- PSCell 1061   SCell 1062   SCell 1063 ----

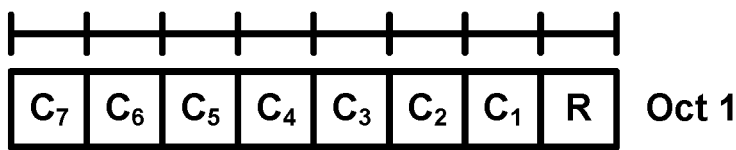
FIG. 18A
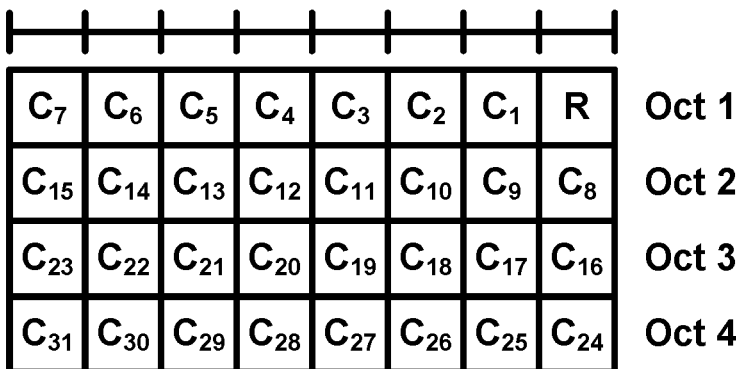
FIG. 18B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 18C

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
|  |  |  |  |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
|  |  |  |  |
| Special | 3, 3A | 45 | Power control commands |
|  | 5 |  | Sidelink operation |
|  | 6-2 |  | Paging/direct indication for eMTC devices |

Send configuration messages (e.g., parameters for a random access procedure) 2132

Receive, from a wireless device, a PRACH transmission 2134

Send, via a search space, DCI scheduling RAR 2136

Send, via the search space, the RAR 2138

Receive third message (e.g., Msg 3) 2140

Send fourth message (e.g., Msg 4) 2142

2150

Receive configuration messages (e.g., parameters for a random access procedure) 2152

Send, to a base station, a PRACH transmission 2154

Receive, via a search space, DCI scheduling RAR 2156

Receive, via the search space, the RAR 2158

Send third message (e.g., Msg 3) 2160

Receive fourth message (e.g., Msg 4) 2162

2170

<u>2188</u>

Send, to a base station, a PRACH transmission <u>2190</u>

Receive, via a search space, DCI scheduling RAR <u>2192</u>

Receive, via the search space, the RAR <u>2194</u>

Send third message (e.g., Msg 3) <u>2196</u>

Receive fourth message (e.g., Msg 4) <u>2198</u>

2230

2250

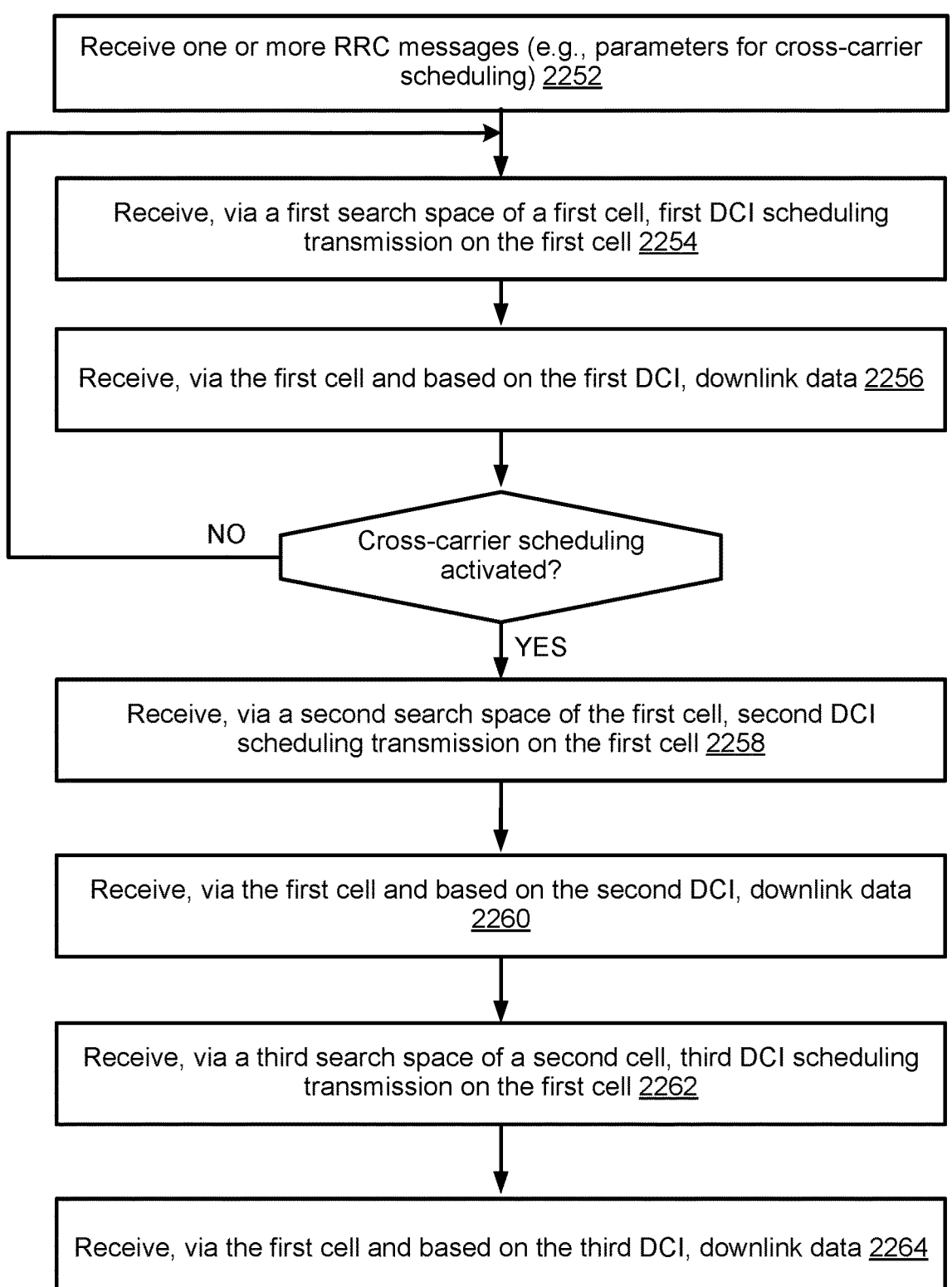

Receive one or more RRC messages (e.g., parameters for cross-carrier scheduling) 2252

Receive, via a first search space of a first cell, first DCI scheduling transmission on the first cell 2254

Receive, via the first cell and based on the first DCI, downlink data 2256

NO ← Cross-carrier scheduling activated?

YES

Receive, via a second search space of the first cell, second DCI scheduling transmission on the first cell 2258

Receive, via the first cell and based on the second DCI, downlink data 2260

Receive, via a third search space of a second cell, third DCI scheduling transmission on the first cell 2262

Receive, via the first cell and based on the third DCI, downlink data 2264

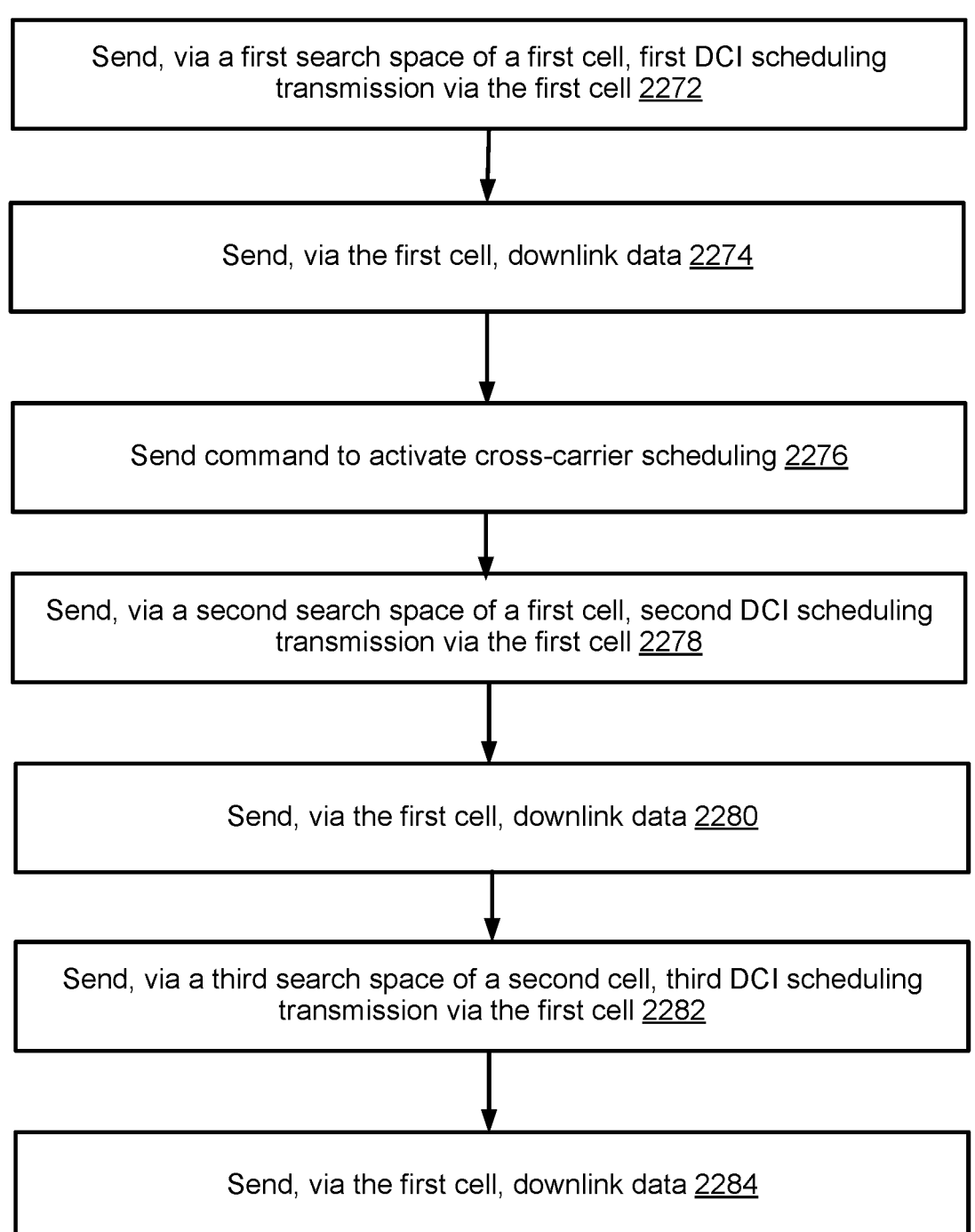

Send, via a first search space of a first cell, first DCI scheduling transmission via the first cell 2272

Send, via the first cell, downlink data 2274

Send command to activate cross-carrier scheduling 2276

Send, via a second search space of a first cell, second DCI scheduling transmission via the first cell 2278

Send, via the first cell, downlink data 2280

Send, via a third search space of a second cell, third DCI scheduling transmission via the first cell 2282

Send, via the first cell, downlink data 2284

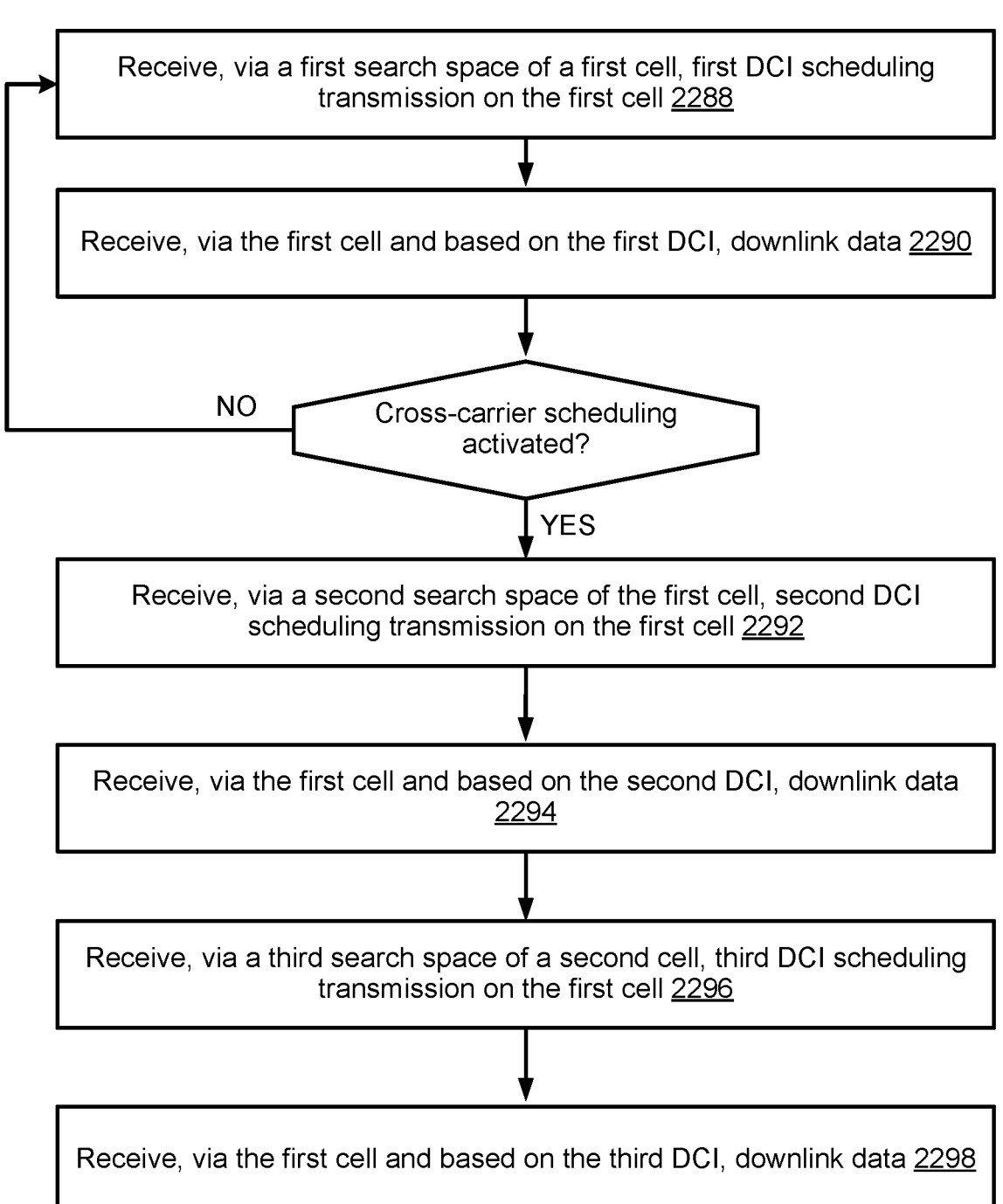

Receive, via a first search space of a first cell, first DCI scheduling transmission on the first cell 2288

Receive, via the first cell and based on the first DCI, downlink data 2290

Cross-carrier scheduling activated?

NO

YES

Receive, via a second search space of the first cell, second DCI scheduling transmission on the first cell 2292

Receive, via the first cell and based on the second DCI, downlink data 2294

Receive, via a third search space of a second cell, third DCI scheduling transmission on the first cell 2296

Receive, via the first cell and based on the third DCI, downlink data 2298

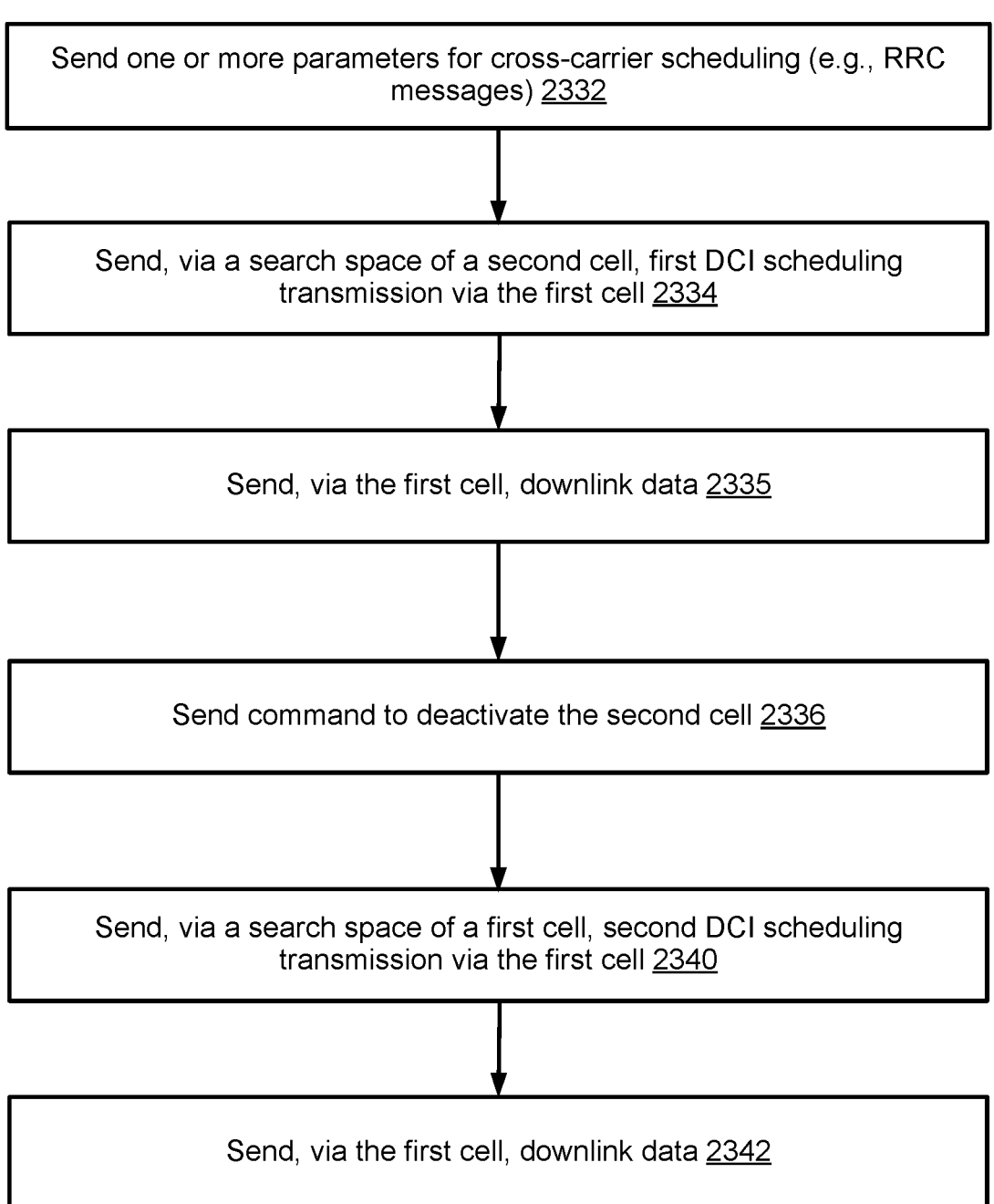

Send one or more parameters for cross-carrier scheduling (e.g., RRC messages) 2332

Send, via a search space of a second cell, first DCI scheduling transmission via the first cell 2334

Send, via the first cell, downlink data 2335

Send command to deactivate the second cell 2336

Send, via a search space of a first cell, second DCI scheduling transmission via the first cell 2340

Send, via the first cell, downlink data 2342

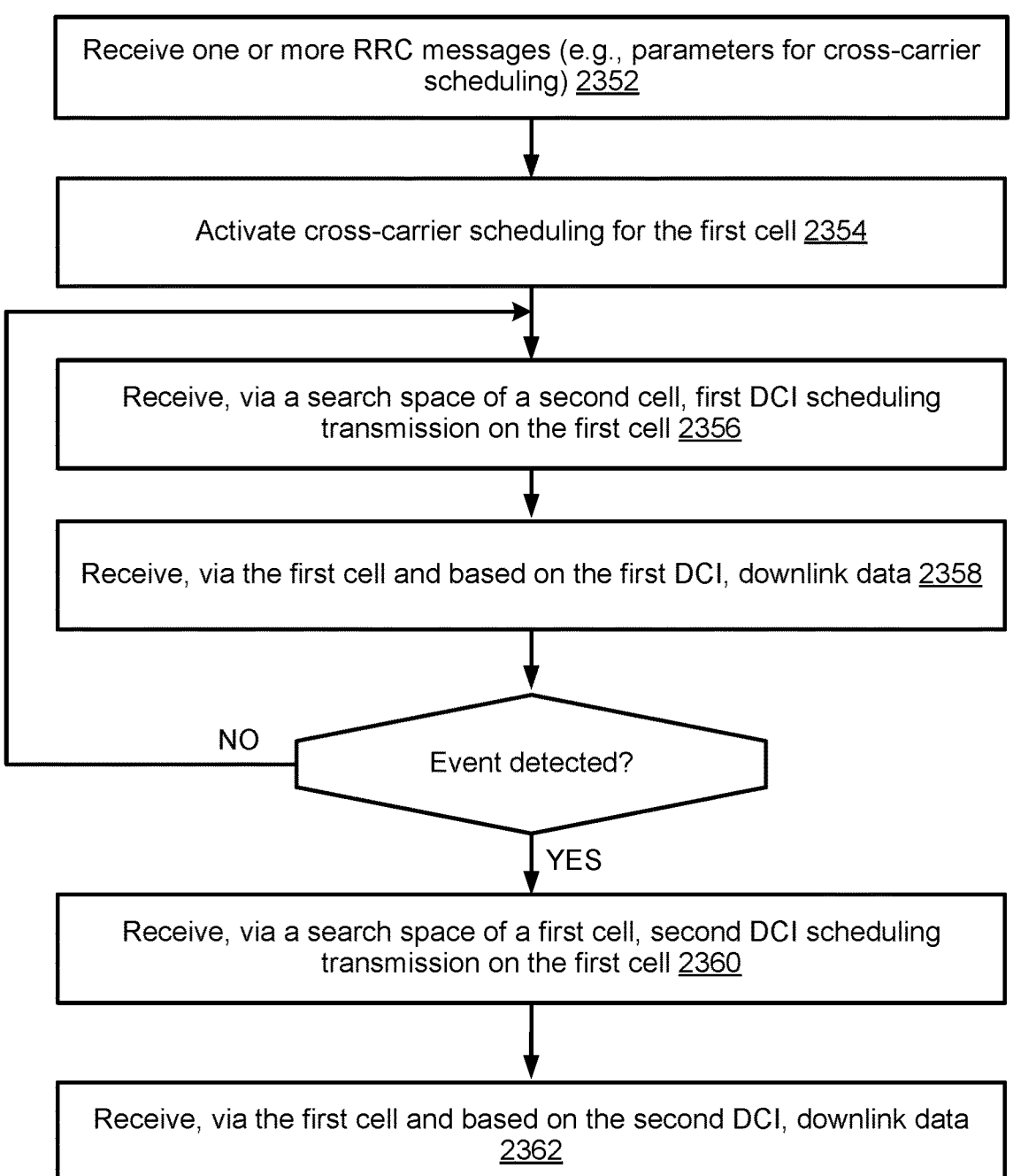

Receive one or more RRC messages (e.g., parameters for cross-carrier scheduling) 2352

Activate cross-carrier scheduling for the first cell 2354

Receive, via a search space of a second cell, first DCI scheduling transmission on the first cell 2356

Receive, via the first cell and based on the first DCI, downlink data 2358

NO          Event detected?

YES

Receive, via a search space of a first cell, second DCI scheduling transmission on the first cell 2360

Receive, via the first cell and based on the second DCI, downlink data 2362

Send, via a search space of a second cell, first DCI scheduling transmission via the first cell 2372

Send, via the first cell, downlink data 2374

Send command to deactivate the second cell 2376

Send, via a search space of a first cell, second DCI scheduling transmission via the first cell 2378

Send, via the first cell, downlink data 2380

2382

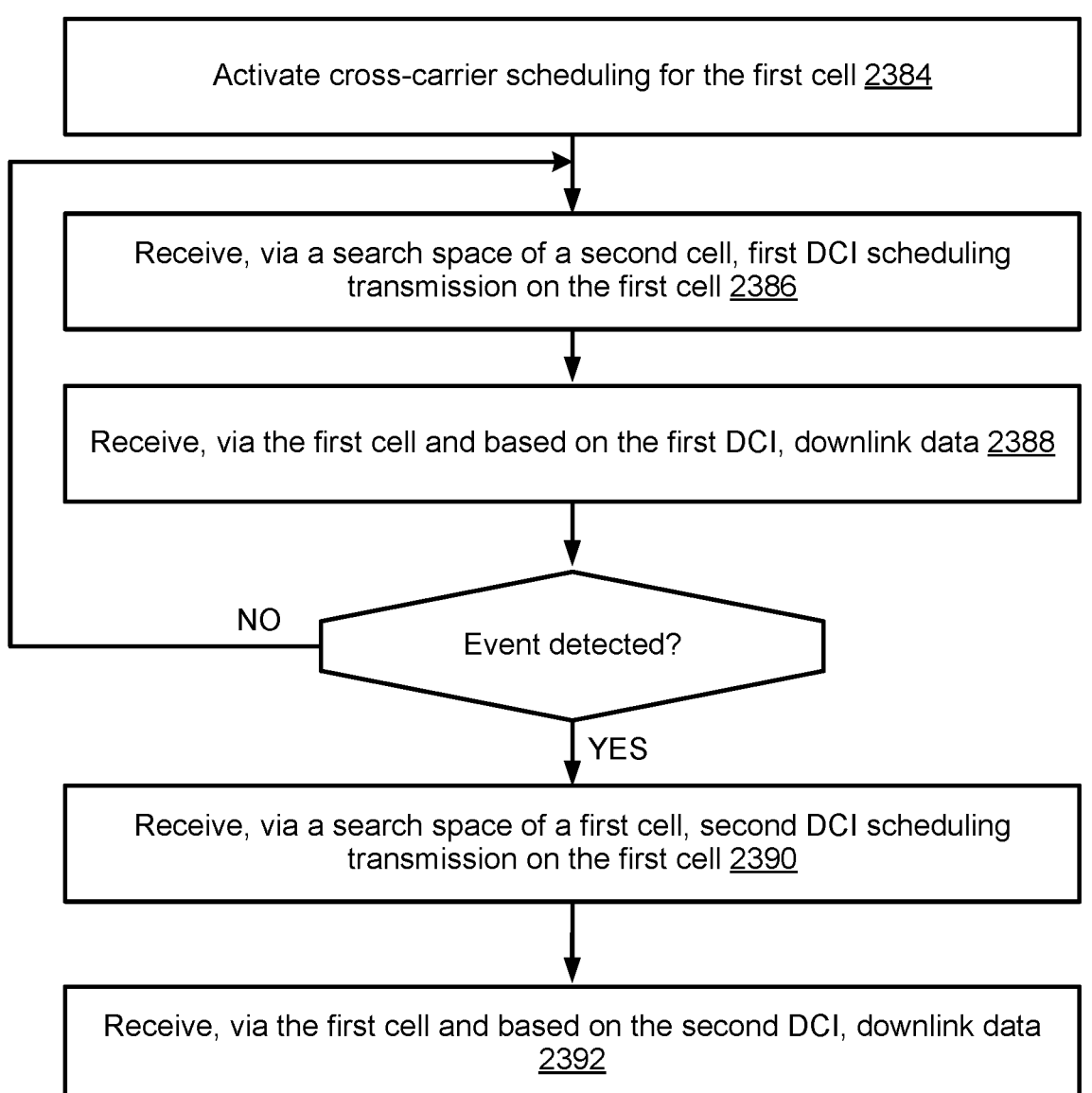

Activate cross-carrier scheduling for the first cell 2384

Receive, via a search space of a second cell, first DCI scheduling transmission on the first cell 2386

Receive, via the first cell and based on the first DCI, downlink data 2388

Event detected?

NO

YES

Receive, via a search space of a first cell, second DCI scheduling transmission on the first cell 2390

Receive, via the first cell and based on the second DCI, downlink data 2392

Receive RRC parameters (e.g., cross-carrier scheduling cell indicator/index for primary cell) 2404

Send PRACH transmission via primary cell 2408

Receive RAR via primary cell 2412

Is active BWP an initial DL BWP? 2416

Is scheduling cell active? 2420

Disable cross-carrier scheduling for primary cell 2424

Enable cross-carrier scheduling for primary cell 2428

2450

2500

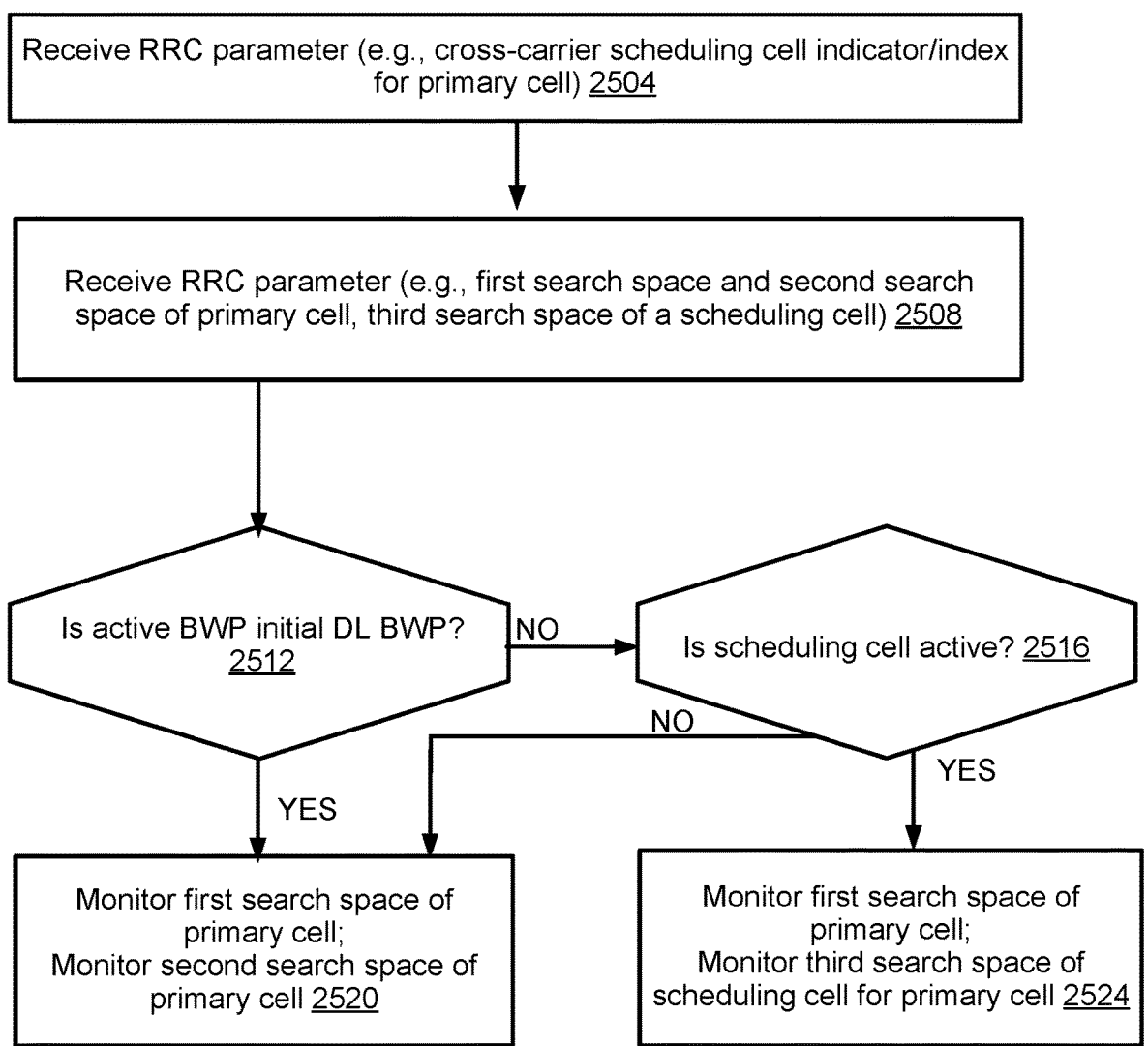

Receive RRC parameter (e.g., cross-carrier scheduling cell indicator/index for primary cell) 2504

Receive RRC parameter (e.g., first search space and second search space of primary cell, third search space of a scheduling cell) 2508

Is active BWP initial DL BWP? 2512

NO

Is scheduling cell active? 2516

NO

YES

YES

Monitor first search space of primary cell;
Monitor second search space of primary cell 2520

Monitor first search space of primary cell;
Monitor third search space of scheduling cell for primary cell 2524

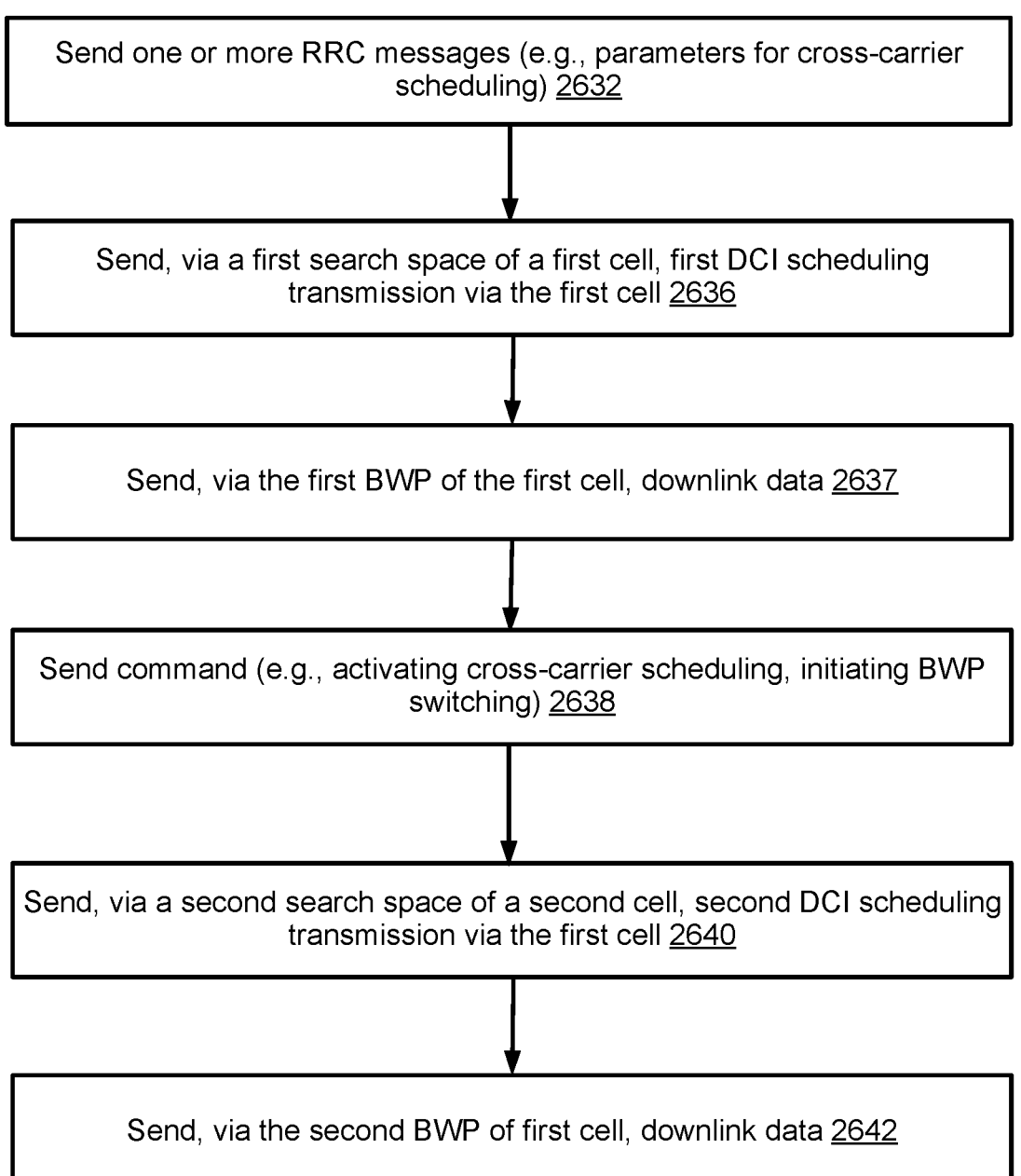

Send one or more RRC messages (e.g., parameters for cross-carrier scheduling) 2632

Send, via a first search space of a first cell, first DCI scheduling transmission via the first cell 2636

Send, via the first BWP of the first cell, downlink data 2637

Send command (e.g., activating cross-carrier scheduling, initiating BWP switching) 2638

Send, via a second search space of a second cell, second DCI scheduling transmission via the first cell 2640

Send, via the second BWP of first cell, downlink data 2642

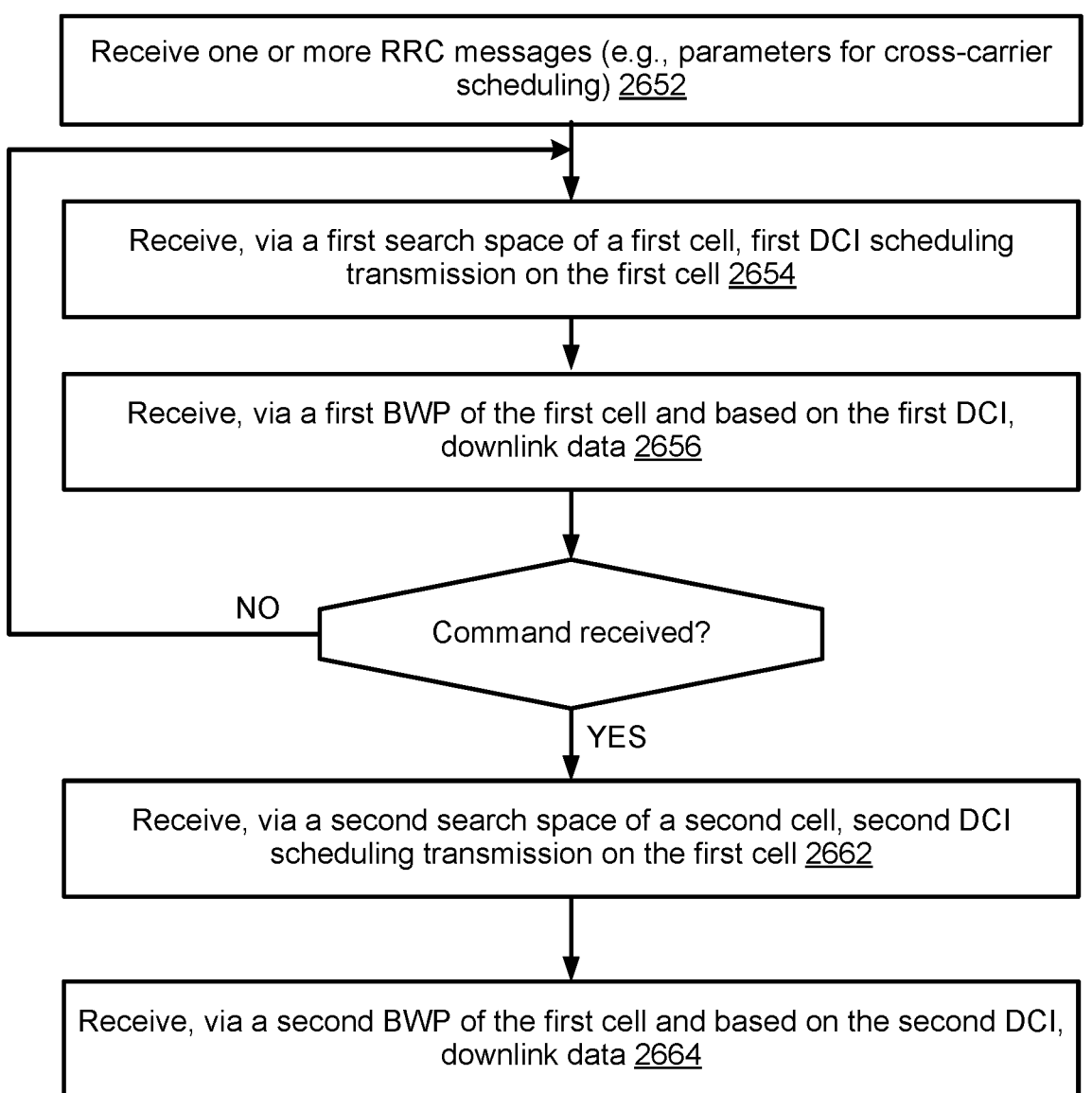

Receive one or more RRC messages (e.g., parameters for cross-carrier scheduling) 2652

Receive, via a first search space of a first cell, first DCI scheduling transmission on the first cell 2654

Receive, via a first BWP of the first cell and based on the first DCI, downlink data 2656

Command received?

NO

YES

Receive, via a second search space of a second cell, second DCI scheduling transmission on the first cell 2662

Receive, via a second BWP of the first cell and based on the second DCI, downlink data 2664

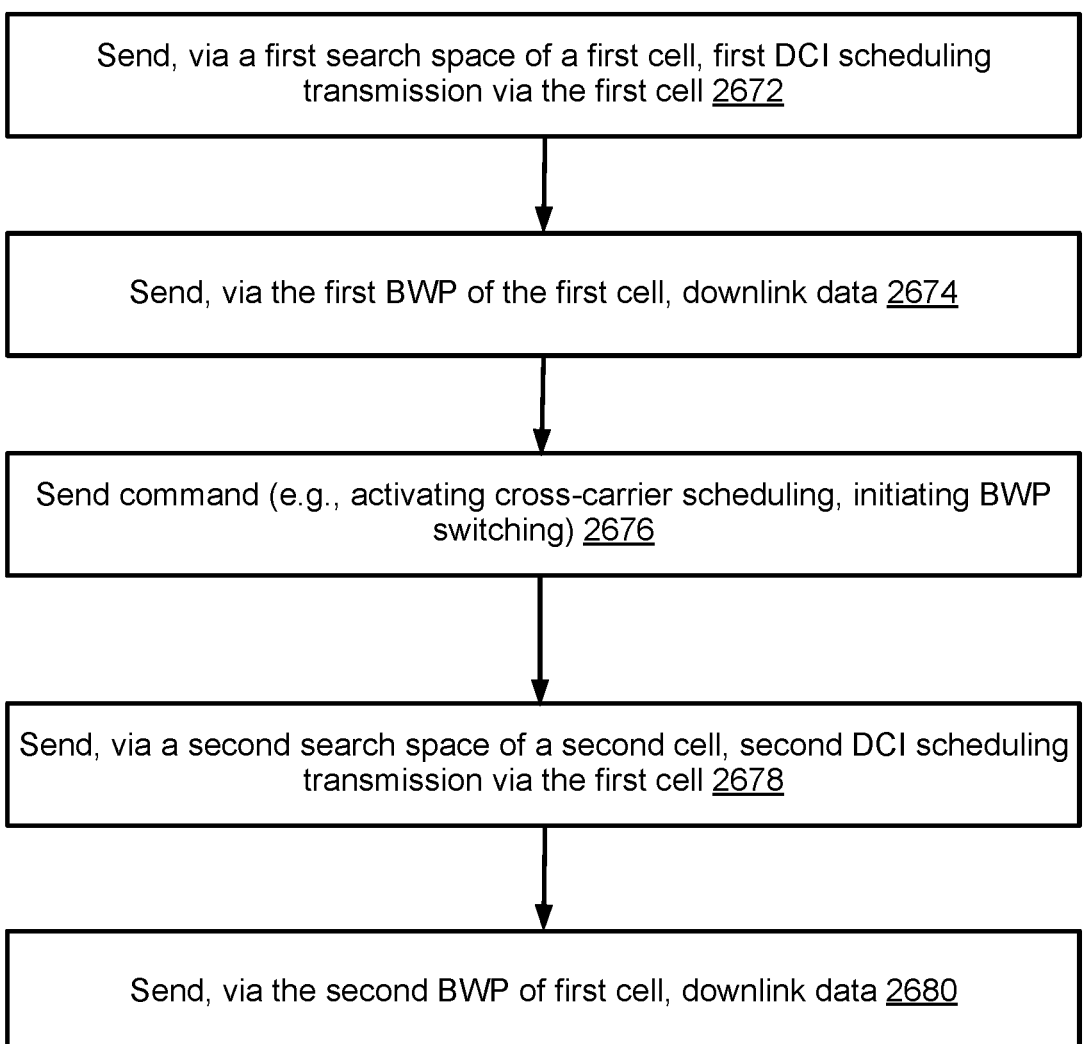

Send, via a first search space of a first cell, first DCI scheduling transmission via the first cell 2672

Send, via the first BWP of the first cell, downlink data 2674

Send command (e.g., activating cross-carrier scheduling, initiating BWP switching) 2676

Send, via a second search space of a second cell, second DCI scheduling transmission via the first cell 2678

Send, via the second BWP of first cell, downlink data 2680

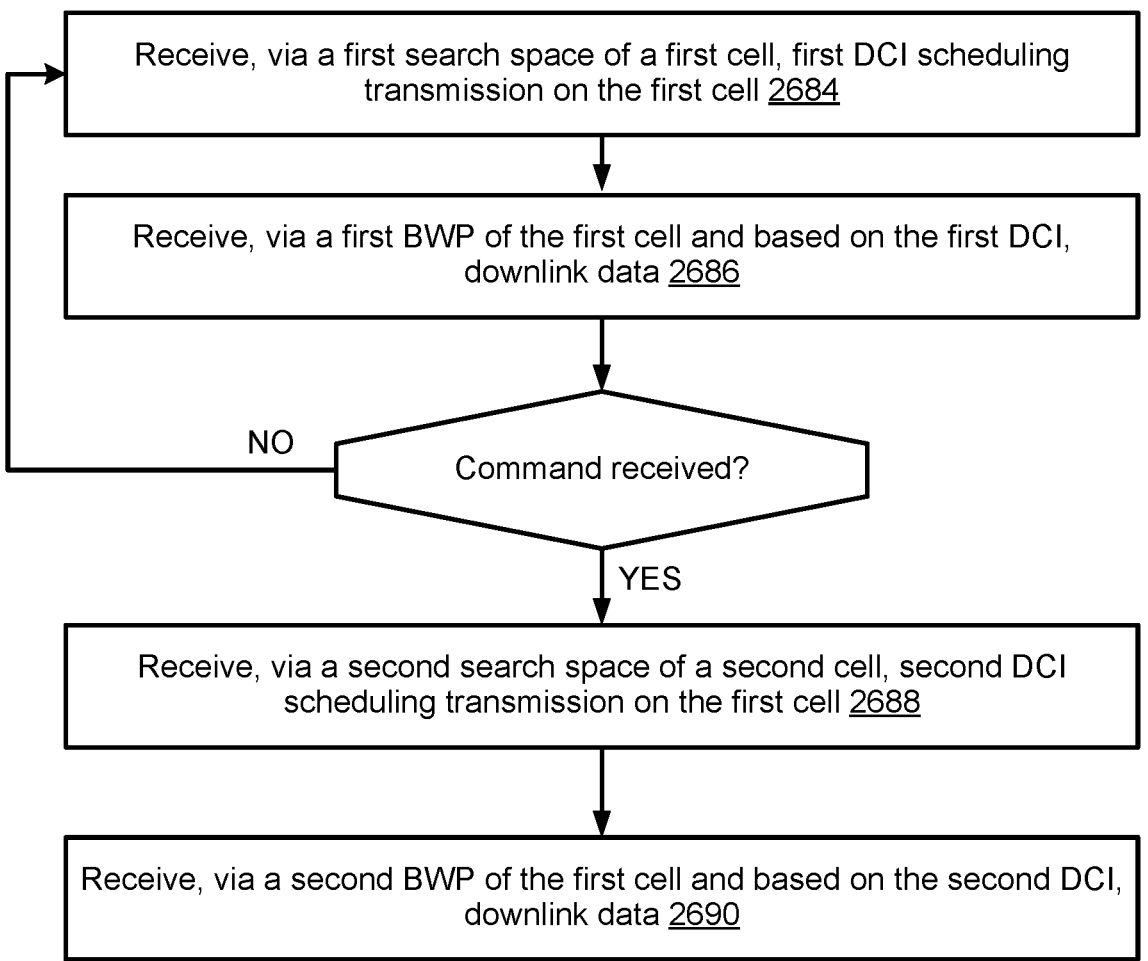

Receive, via a first search space of a first cell, first DCI scheduling transmission on the first cell 2684

Receive, via a first BWP of the first cell and based on the first DCI, downlink data 2686

Command received?

NO

YES

Receive, via a second search space of a second cell, second DCI scheduling transmission on the first cell 2688

Receive, via a second BWP of the first cell and based on the second DCI, downlink data 2690

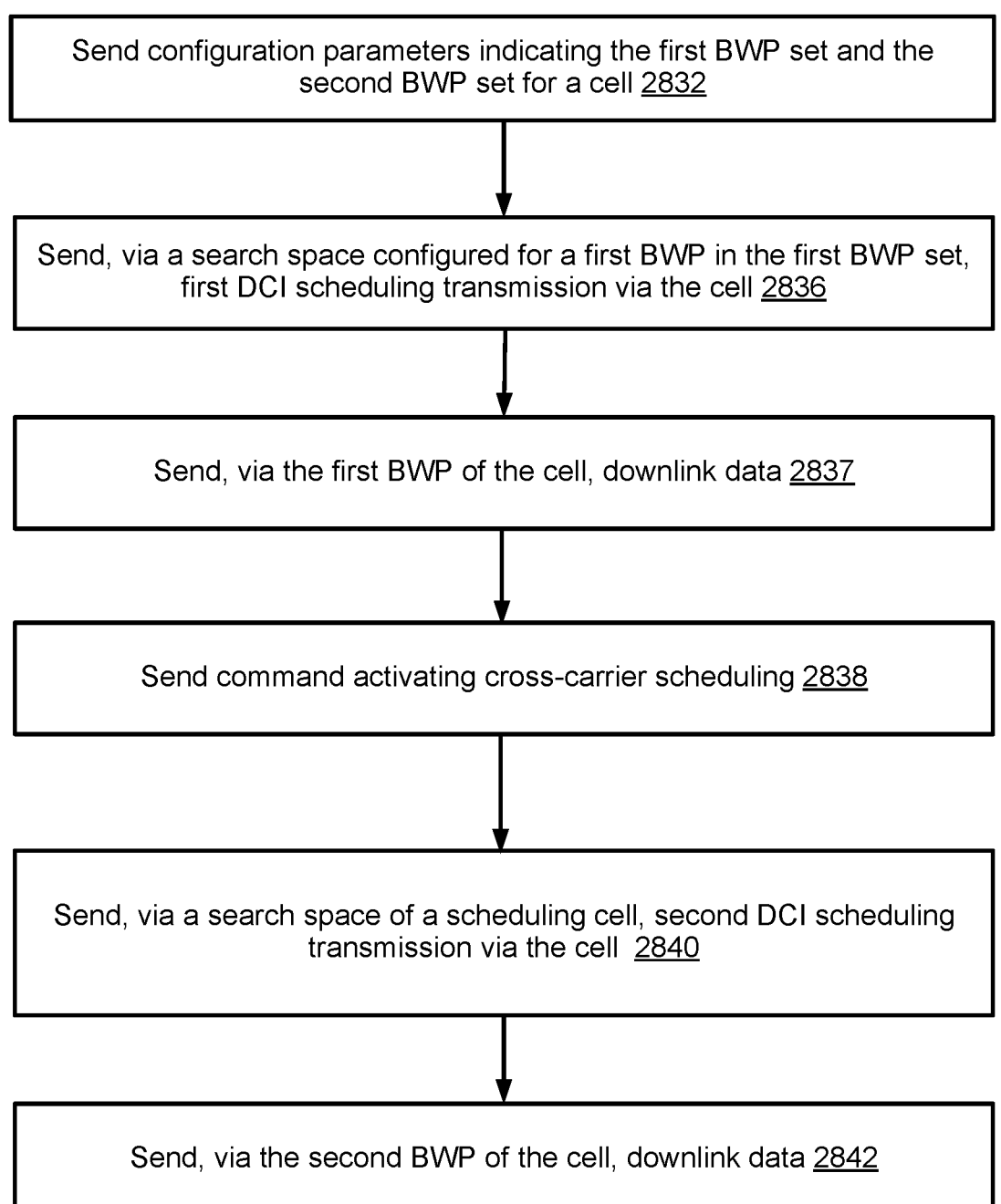

Send configuration parameters indicating the first BWP set and the second BWP set for a cell 2832

Send, via a search space configured for a first BWP in the first BWP set, first DCI scheduling transmission via the cell 2836

Send, via the first BWP of the cell, downlink data 2837

Send command activating cross-carrier scheduling 2838

Send, via a search space of a scheduling cell, second DCI scheduling transmission via the cell 2840

Send, via the second BWP of the cell, downlink data 2842

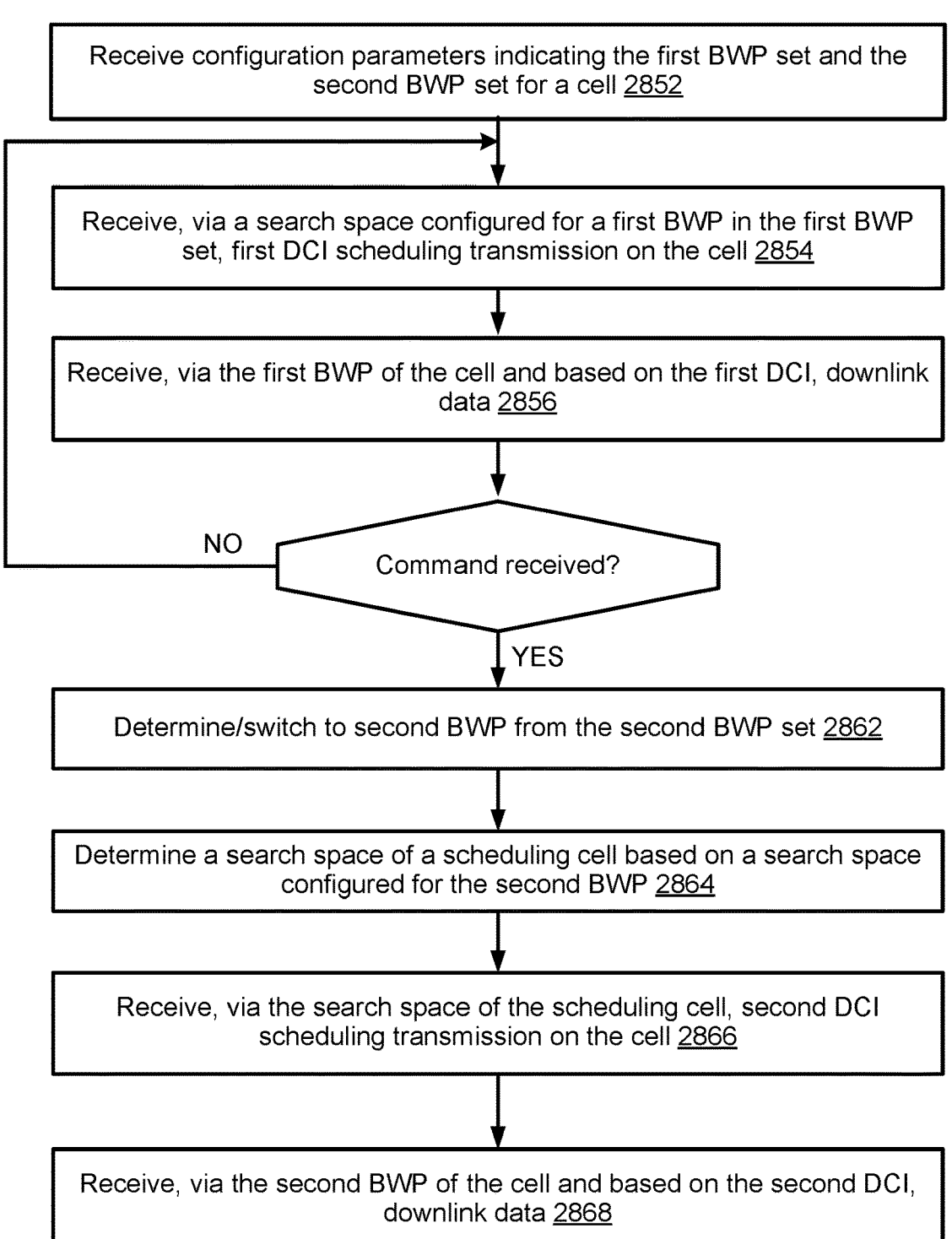

Receive configuration parameters indicating the first BWP set and the second BWP set for a cell 2852

Receive, via a search space configured for a first BWP in the first BWP set, first DCI scheduling transmission on the cell 2854

Receive, via the first BWP of the cell and based on the first DCI, downlink data 2856

Command received?

NO

YES

Determine/switch to second BWP from the second BWP set 2862

Determine a search space of a scheduling cell based on a search space configured for the second BWP 2864

Receive, via the search space of the scheduling cell, second DCI scheduling transmission on the cell 2866

Receive, via the second BWP of the cell and based on the second DCI, downlink data 2868

Send, via a search space configured for a first BWP in the first BWP set, first DCI scheduling transmission via the cell 2872

Send, via the first BWP of the cell, downlink data 2874

Send command activating cross-carrier scheduling 2876

Send, via a search space of a scheduling cell, second DCI scheduling transmission via the cell 2878

Send, via the second BWP of the cell, downlink data 2880

2882

```
SearchSpace ::=                    SEQUENCE {
    searchSpaceId                      SearchSpaceId,
    controlResourceSetId               ControlResourceSetId
OPTIONAL,    -- Cond SetupOnly
    CrossCarrierScheduled          CHOICE {TRUE, FALSE};
    monitoringSlotPeriodicityAndOffset    CHOICE {
    }
    duration                       INTEGER (2..2559)
    monitoringSymbolsWithinSlot     BIT STRING (SIZE (14))
    nrofCandidates                  SEQUENCE {
        aggregationLevel1              ENUMERATED {n0, n1, n2, n3, n4, n5, n6, n8},
        aggregationLevel2              ENUMERATED {n0, n1, n2, n3, n4, n5, n6, n8},
        aggregationLevel4              ENUMERATED {n0, n1, n2, n3, n4, n5, n6, n8},
        aggregationLevel8              ENUMERATED {n0, n1, n2, n3, n4, n5, n6, n8},
        aggregationLevel16             ENUMERATED {n0, n1, n2, n3, n4, n5, n6, n8}
    }
    searchSpaceType                 CHOICE {
        common                         SEQUENCE {
            ue-Specific                    SEQUENCE {
                dci-Formats                    ENUMERATED {formats0-0-And-1-0,
                                                           formats0-1-And-1-1},
            ...
        }
        ue-Specific-cross-carrier          SEQUENCE {
            dci-Formats                    ENUMERATED {formats0-1-And-1-0,
                                                       formats0-1-And-1-1},
            ...
        }
    }
}
```

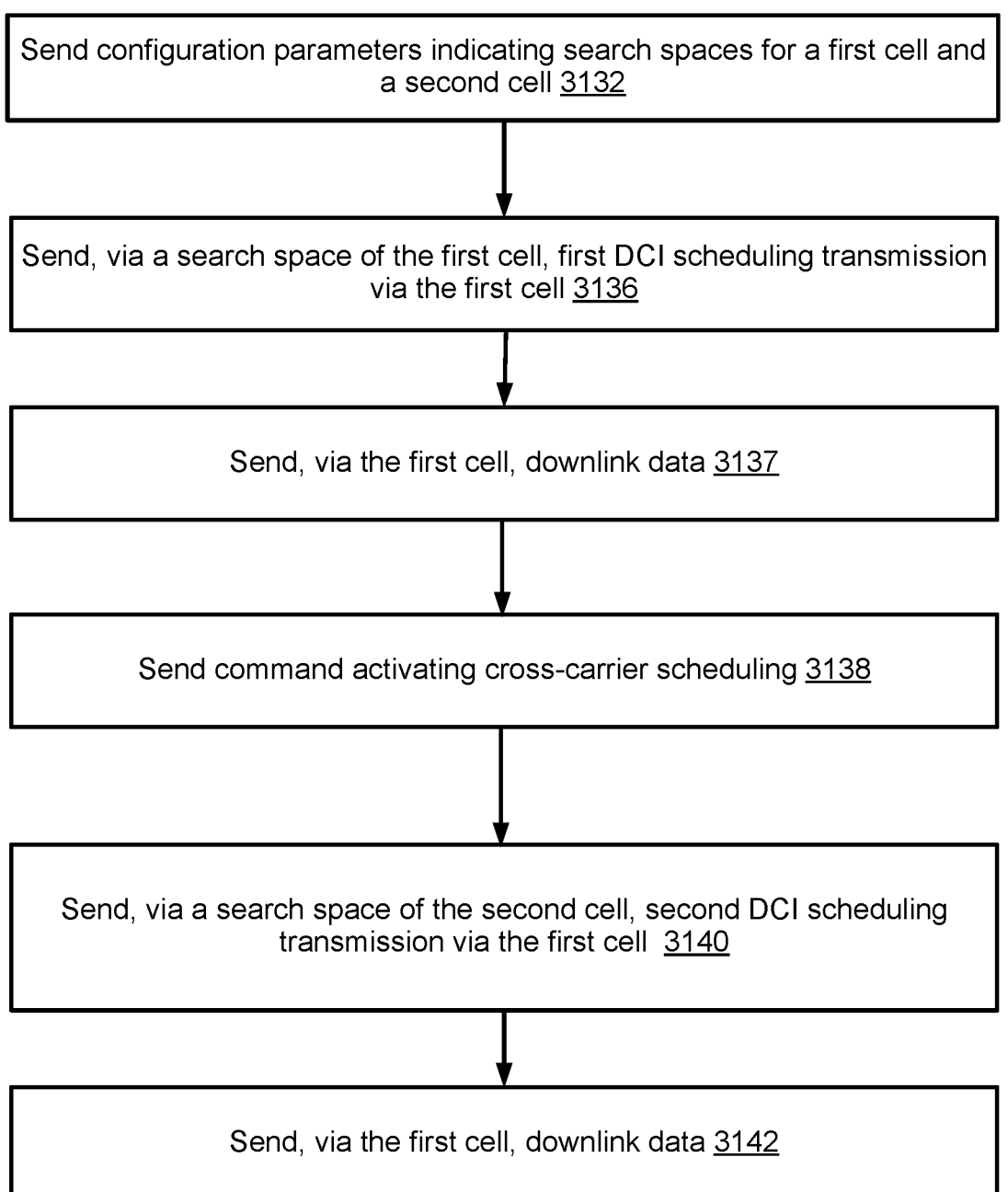

Send configuration parameters indicating search spaces for a first cell and a second cell 3132

Send, via a search space of the first cell, first DCI scheduling transmission via the first cell 3136

Send, via the first cell, downlink data 3137

Send command activating cross-carrier scheduling 3138

Send, via a search space of the second cell, second DCI scheduling transmission via the first cell  3140

Send, via the first cell, downlink data 3142

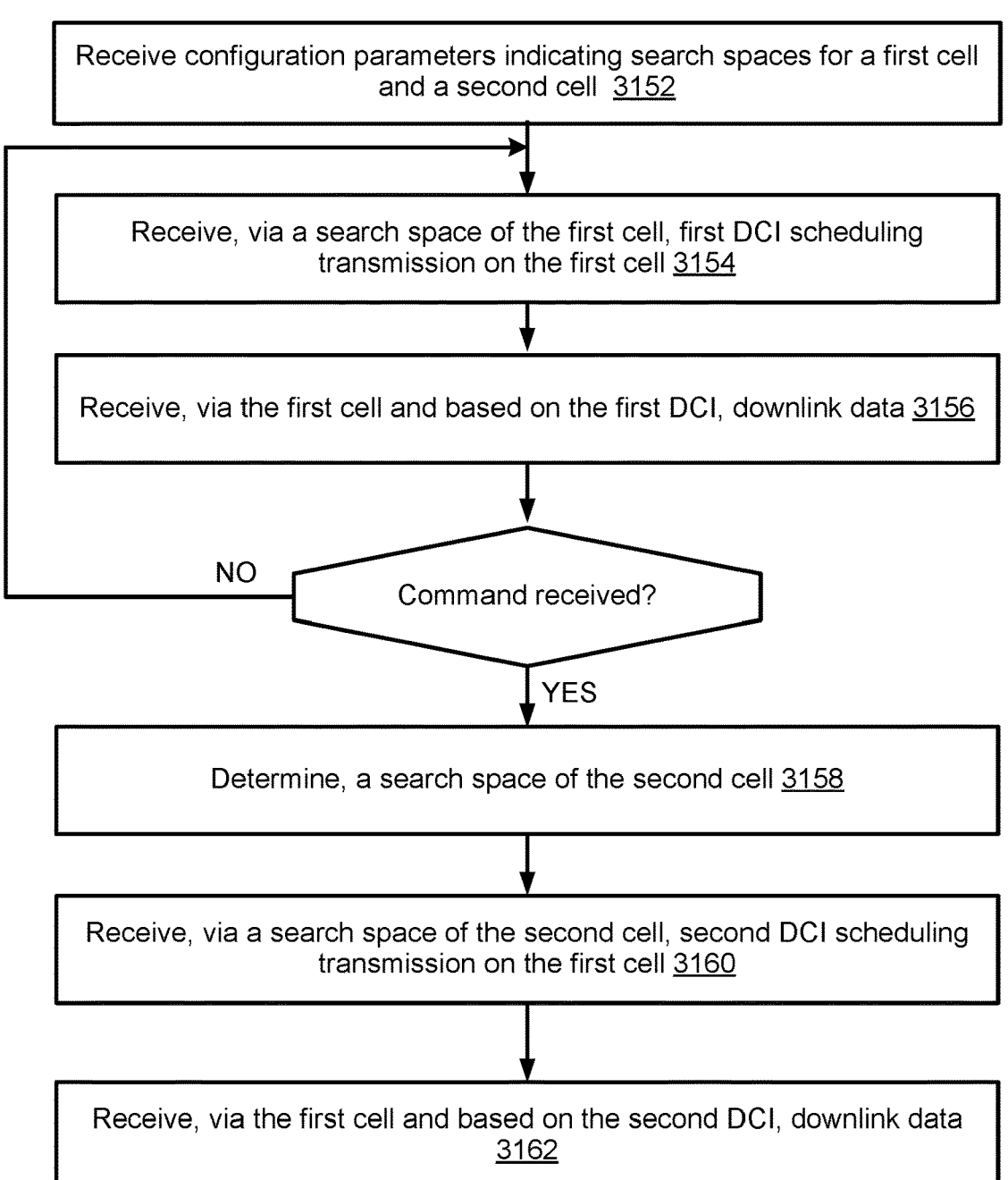

Receive configuration parameters indicating search spaces for a first cell and a second cell  3152

Receive, via a search space of the first cell, first DCI scheduling transmission on the first cell 3154

Receive, via the first cell and based on the first DCI, downlink data 3156

Command received?

NO

YES

Determine, a search space of the second cell 3158

Receive, via a search space of the second cell, second DCI scheduling transmission on the first cell 3160

Receive, via the first cell and based on the second DCI, downlink data 3162

Send, via a search space of the first cell, first DCI scheduling transmission via the first cell 3172

Send, via the first cell, downlink data 3174

Send command activating cross-carrier scheduling 3176

Send, via a search space of the second cell, second DCI scheduling transmission via the first cell  3178

Send, via the first cell, downlink data 3180

3182

3400

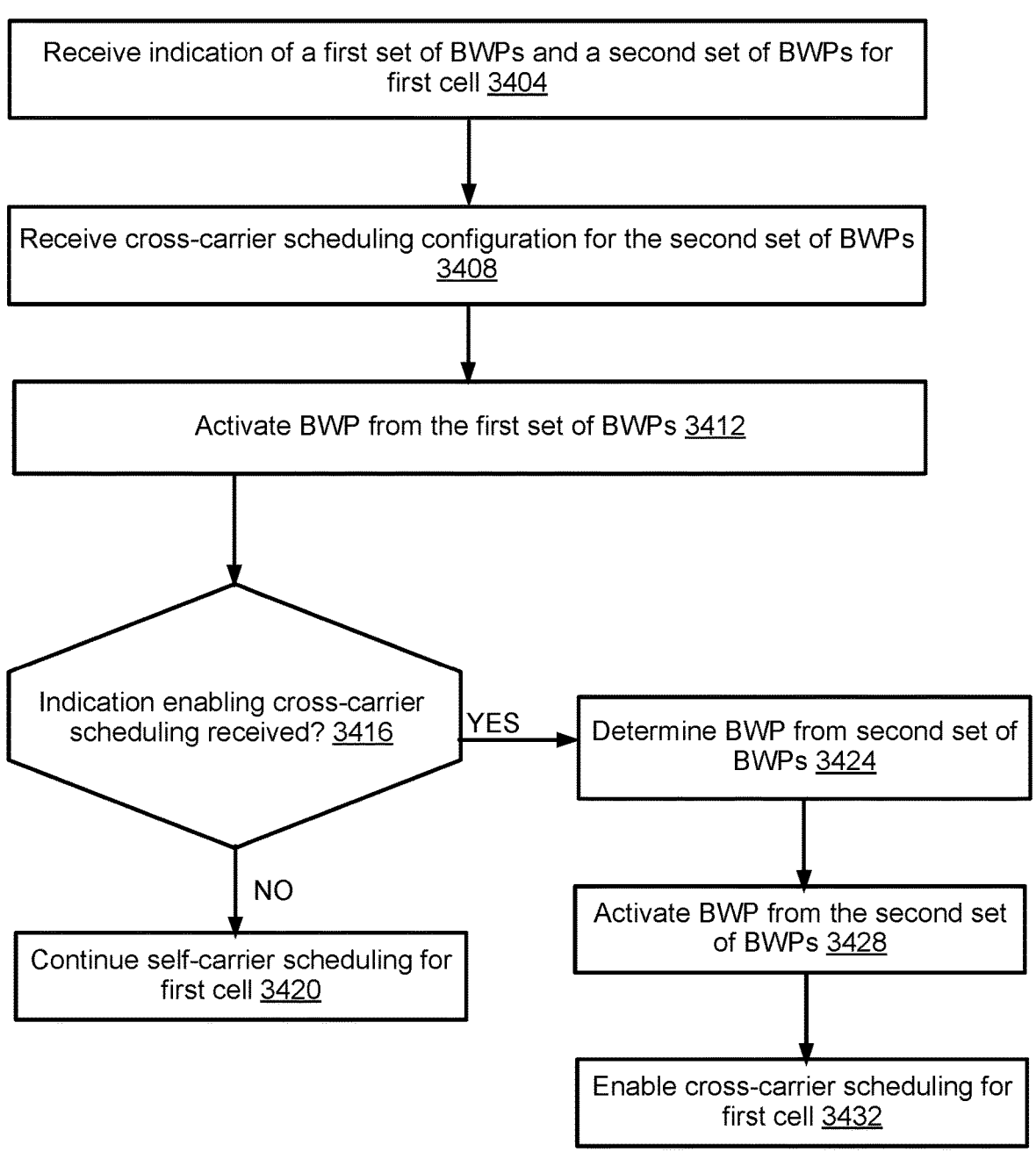

Receive indication of a first set of BWPs and a second set of BWPs for first cell 3404

Receive cross-carrier scheduling configuration for the second set of BWPs 3408

Activate BWP from the first set of BWPs 3412

Indication enabling cross-carrier scheduling received? 3416

YES

Determine BWP from second set of BWPs 3424

NO

Continue self-carrier scheduling for first cell 3420

Activate BWP from the second set of BWPs 3428

Enable cross-carrier scheduling for first cell 3432

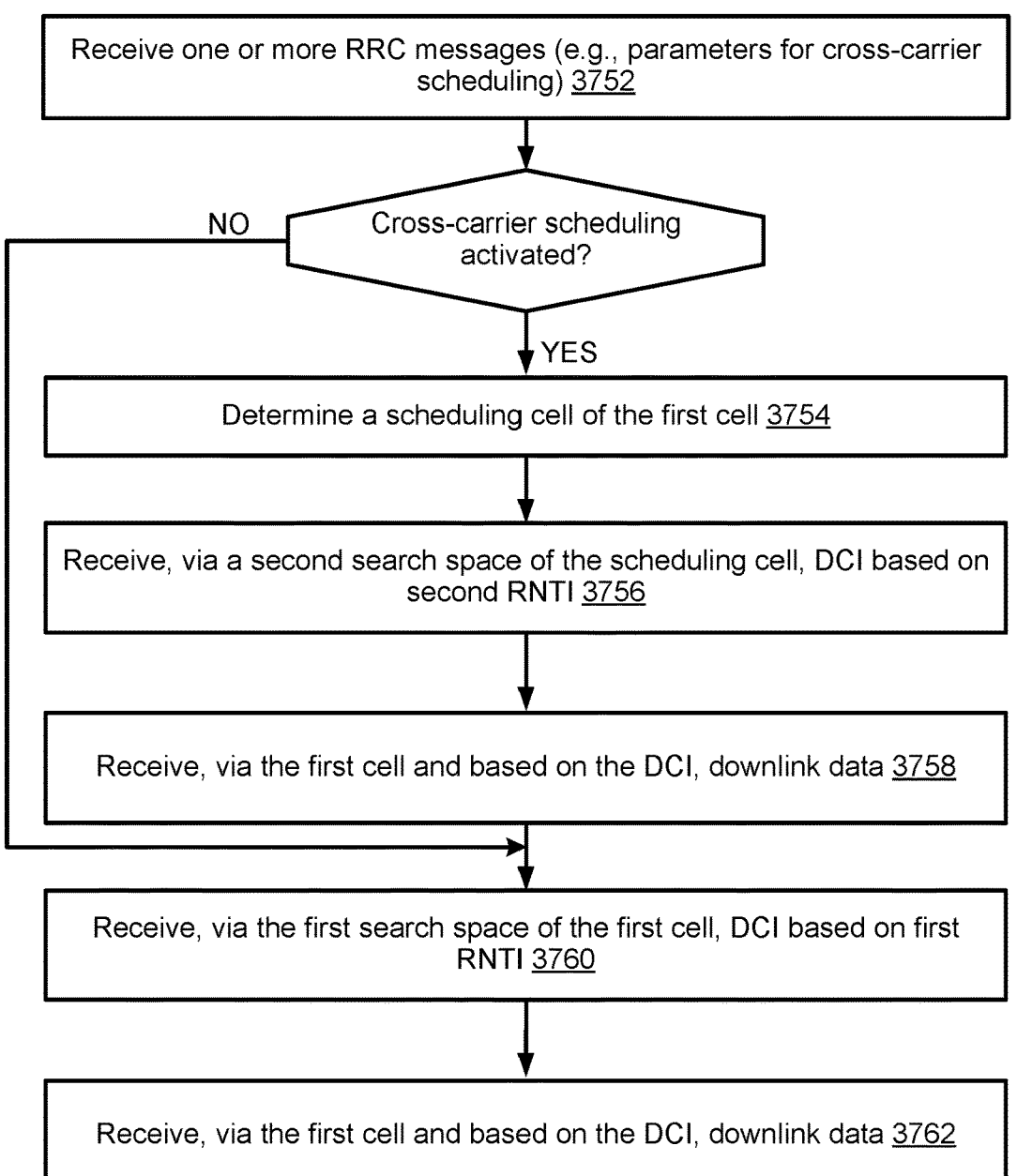

Receive one or more RRC messages (e.g., parameters for cross-carrier scheduling) 3752

Cross-carrier scheduling activated?

NO

YES

Determine a scheduling cell of the first cell 3754

Receive, via a second search space of the scheduling cell, DCI based on second RNTI 3756

Receive, via the first cell and based on the DCI, downlink data 3758

Receive, via the first search space of the first cell, DCI based on first RNTI 3760

Receive, via the first cell and based on the DCI, downlink data 3762

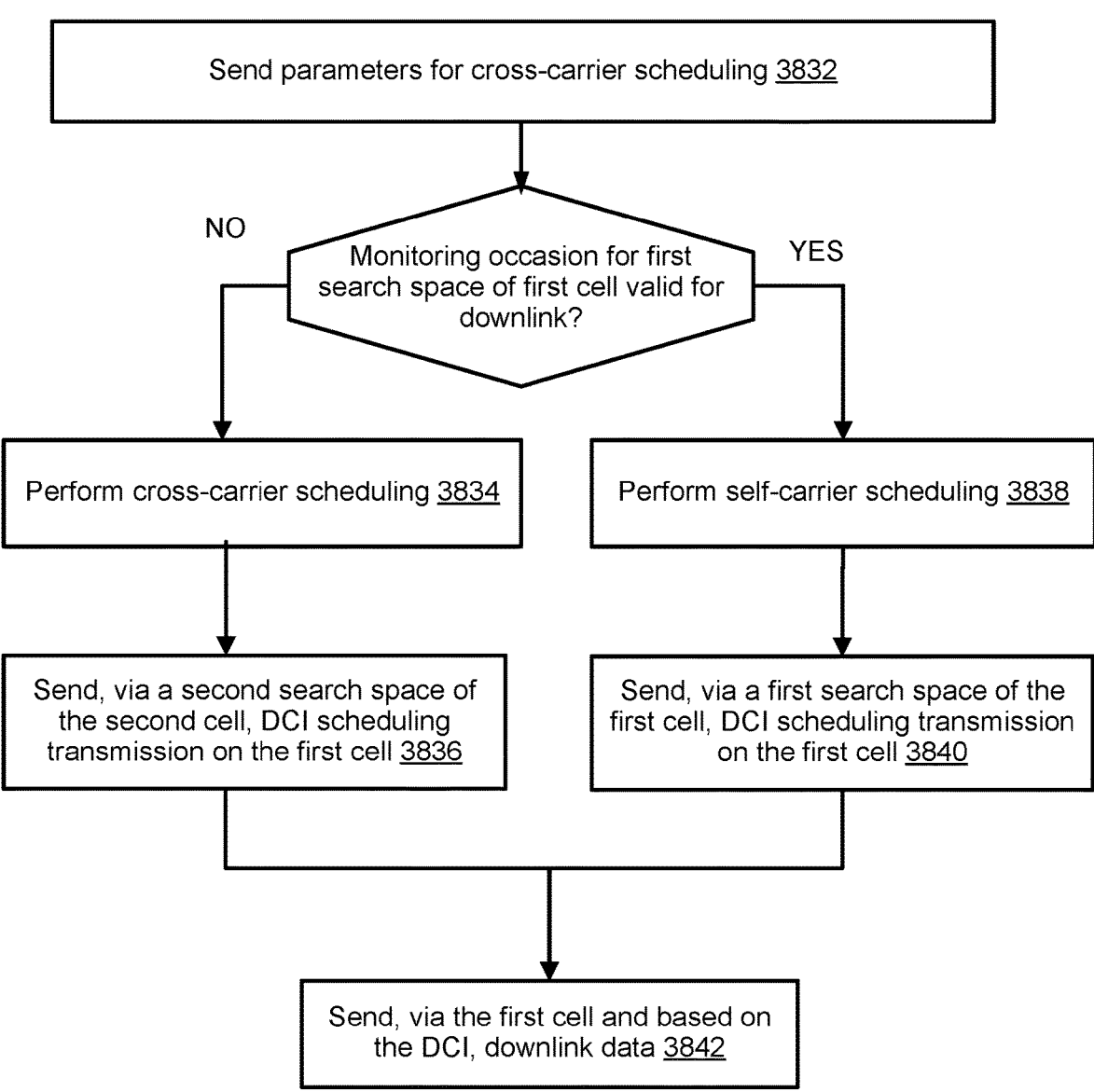

Send parameters for cross-carrier scheduling 3832

Monitoring occasion for first search space of first cell valid for downlink?

NO

YES

Perform cross-carrier scheduling 3834

Perform self-carrier scheduling 3838

Send, via a second search space of the second cell, DCI scheduling transmission on the first cell 3836

Send, via a first search space of the first cell, DCI scheduling transmission on the first cell 3840

Send, via the first cell and based on the DCI, downlink data 3842

```
CrossCarrierSchedulingConfig ::=    SEQUENCE {
    schedulingCellInfo                  CHOICE {
        own                                 SEQUENCE {
Cross carrier scheduling: scheduling cell
            cif-Presence                        BOOLEAN
            scheduledCellId                     ServCellIndex,
        },
        other                               SEQUENCE {
Cross carrier scheduling: scheduled cell
            cif-InSchedulingCell                INTEGER (1..7)
        }
    },
    ...
}
```

Figure 44A:
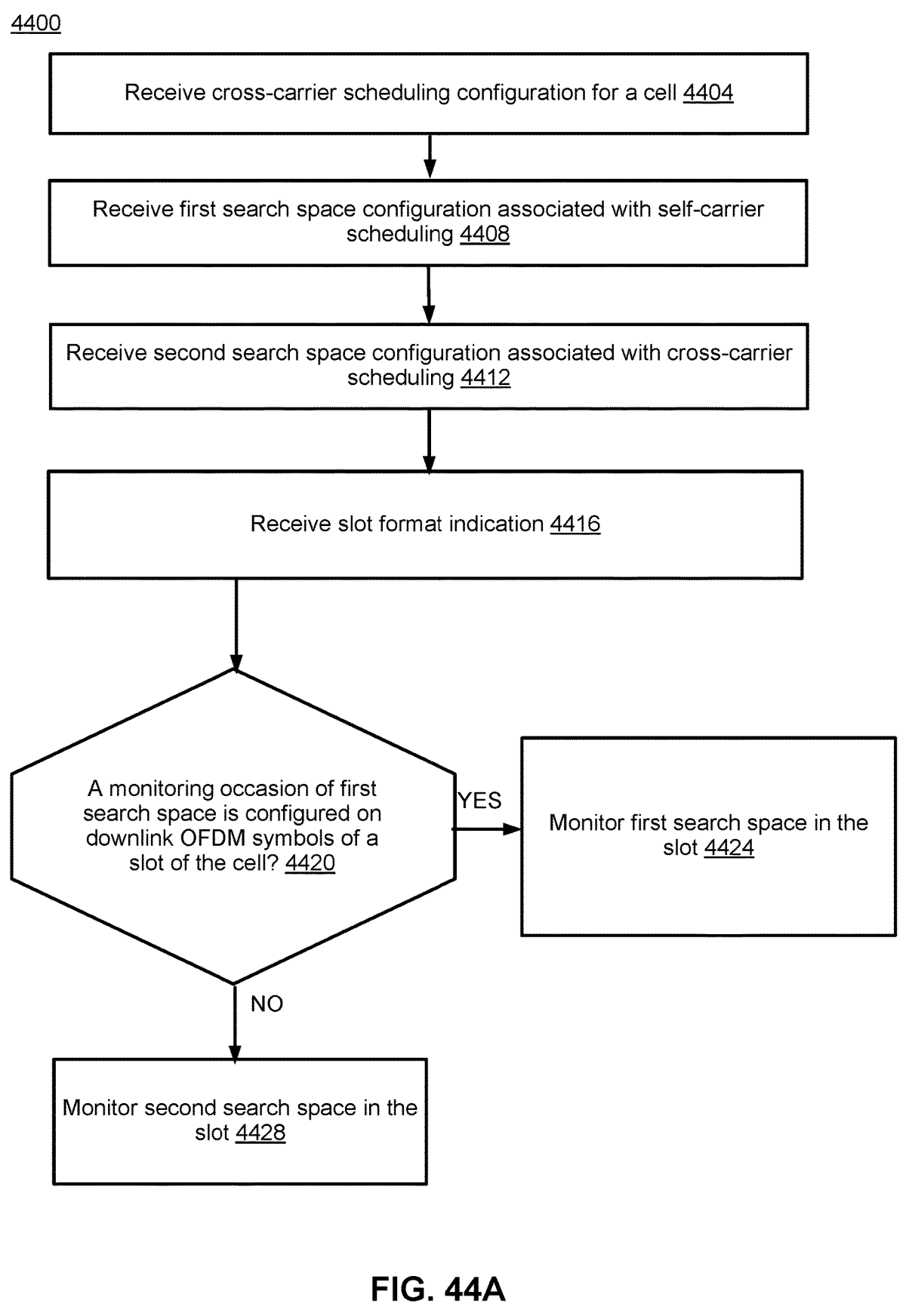

Receive cross-carrier scheduling configuration for a cell 4404

Receive first search space configuration associated with self-carrier scheduling 4408

Receive second search space configuration associated with cross-carrier scheduling 4412

Receive slot format indication 4416

A monitoring occasion of first search space is configured on downlink OFDM symbols of a slot of the cell? 4420

YES

Monitor first search space in the slot 4424

NO

Monitor second search space in the slot 4428

Receive slot format indication 4454

A monitoring occasion of first search space is configured on downlink OFDM symbols of a slot of the cell? 4456

YES

Monitor first search space in the slot 4460

NO

Monitor second search space in the slot 4464

SCHEDULING WIRELESS COMMUNICATIONS

CROSS-REFERENCE TO RELATED APPLICATIONS

This application is a continuation of U.S. patent application Ser. No. 18/175,155, filed on Feb. 27, 2023, which is a continuation of U.S. patent application Ser. No. 17/186,572 (now U.S. Pat. No. 11,627,600), filed on Feb. 26, 2021, which claims the benefit of U.S. Provisional Application Nos. 62/982,846, 62/982,849, and 62/982,909, each of which was filed on Feb. 28, 2020. Each of the above-referenced applications is hereby incorporated by reference in its entirety.

BACKGROUND

A base station sends control signals to schedule downlink/uplink transmissions. A wireless device sends/receives information based on the control signals.

SUMMARY

The following summary presents a simplified summary of certain features. The summary is not an extensive overview and is not intended to identify key or critical elements.

Control information may be used for scheduling wireless communications. The control information may be sent via resources (e.g., using search spaces) associated with self-carrier scheduling or via resources associated with cross-carrier scheduling. A wireless device may monitor specific search spaces associated with one or more cells (e.g., for self-carrier scheduling and/or for cross-carrier scheduling) to receive different types of control information. A base station may explicitly or implicitly indicate whether a search space and/or any other wireless resource (e.g., a bandwidth part (BWP)) of a cell is configured for cross-carrier scheduling or self-carrier scheduling. A base station may dynamically activate or deactivate cross-carrier scheduling (e.g., via control signaling). Search space monitoring and carrier scheduling, as described herein, may facilitate improved reliability facilitated by self-carrier scheduling and/or improved control signaling throughput facilitated by cross-carrier scheduling.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3 shows example of protocol layers.

FIG. 5A shows an example mapping for downlink channels.

FIG. 5B shows an example mapping for uplink channels.

FIG. 7 shows an example configuration of a frame.

FIG. 18A shows an example of an SCell hibernation MAC CE format.

FIG. 18B shows an example of an SCell hibernation MAC CE format.

FIG. 18C shows example MAC CEs for SCell state transitions.

FIG. 19 shows example downlink control information (DCI) formats.

FIG. 22C shows an example method for signal reception.

FIG. 22D shows an example method for signal transmission.

FIG. 22E shows an example method for signal reception.

FIG. 23B shows an example method for signal transmission.

FIG. 23C shows an example method for signal reception.

FIG. 23E shows an example method for signal reception.

FIG. 25A shows an example method for monitoring search spaces.

FIG. 26B shows an example method for signal transmission.

FIG. 26C shows an example method for signal reception.

FIG. 26D shows an example method for signal transmission.

FIG. 26E shows an example method for signal reception.

FIG. 27 shows an example configuration of a BWP.

FIG. 28B shows an example method for signal transmission.

FIG. 28C shows an example method for signal reception.

FIG. 30 shows an example search space configuration of a search space.

FIG. 31B shows an example method for signal transmission.

FIG. 31C shows an example method for signal reception.

FIG. 34A shows an example method for self-carrier scheduling and cross-carrier scheduling based on configuration of BWP sets.

FIG. 37C shows an example method for signal reception.

FIG. 38B shows an example method for signal transmission.

FIG. 40 shows an example cross-carrier scheduling configuration.

FIG. 44A and FIG. 44B shows example methods for monitoring search spaces based on a slot format indication.

DETAILED DESCRIPTION

Figures 1A, 1B:
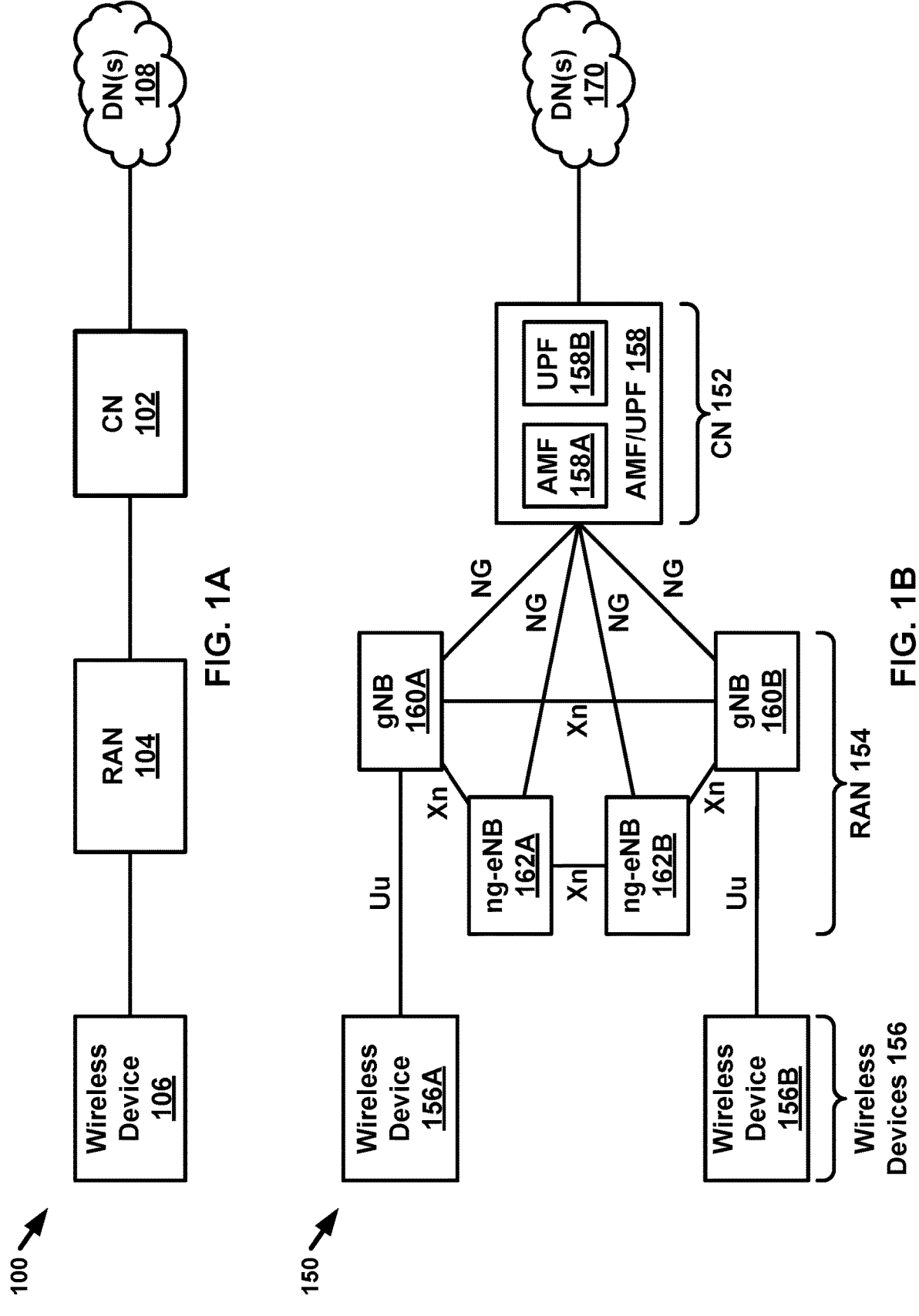
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to scheduling for wireless communications, such as self-carrier, cross-carrier scheduling, and the like.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IOT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNS (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNS 170, quality of service (QOS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNS, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/ perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface asso- ciated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng- cNB 162B) may provide E UTRA user plane and control plane protocol terminations towards the wireless device 156B via a Uu interface associated with a second protocol stack. The user plane and control plane protocol termina- tions may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non- standalone mode (e.g., non-standalone operation). In a non- standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng- eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IOT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other net- work referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
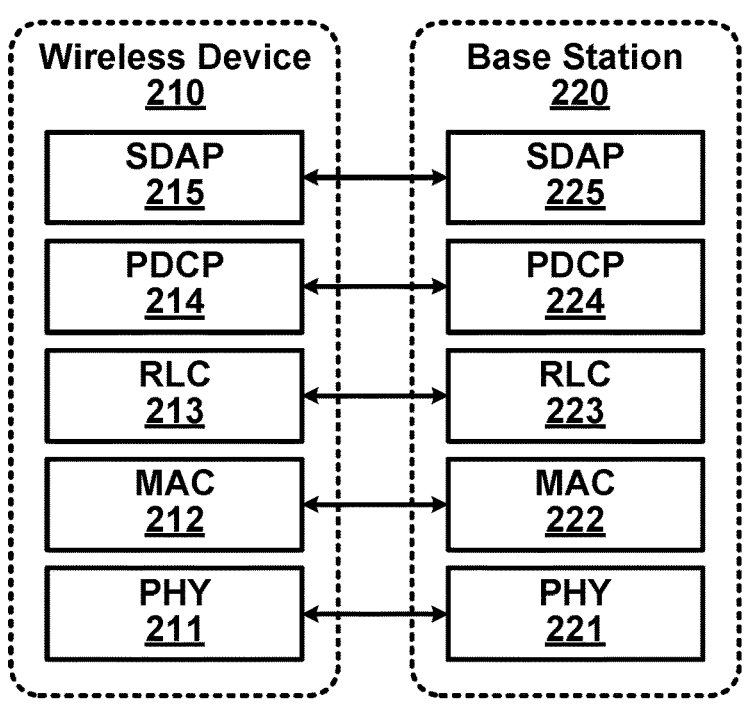
FIG. 2A shows an example user plane.
Figure 2B:
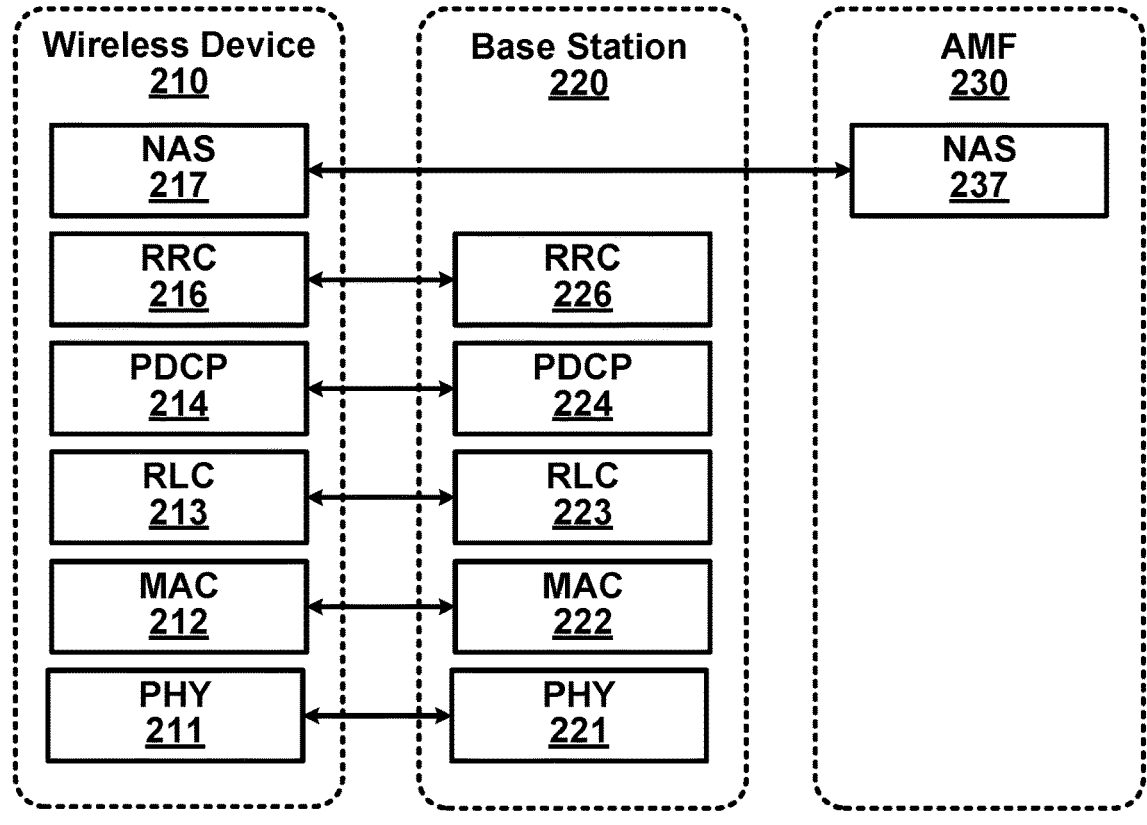
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane pro- tocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QOS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service require- ment). The SDAPs 215 and 225 may perform mapping/de- mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively). Various operations described herein with reference to communication devices (e.g., base stations, a wireless devices, etc.) may be performed by one or more entities in the communication device (e.g., a PHY layer entity, a MAC layer entity, and/or one or more other entities corresponding to any other layer in the communication device).

Figures 4A, 4B:
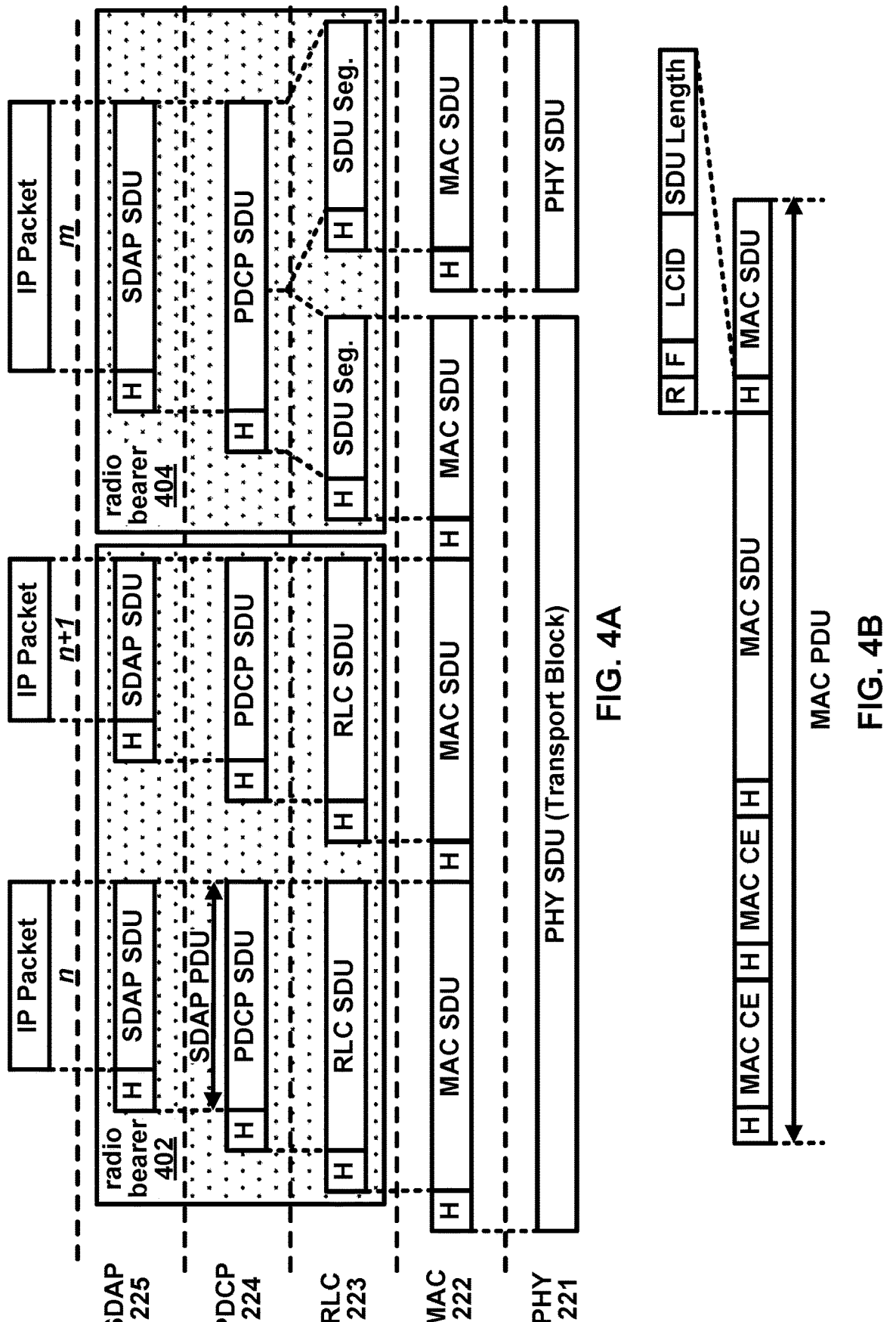
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
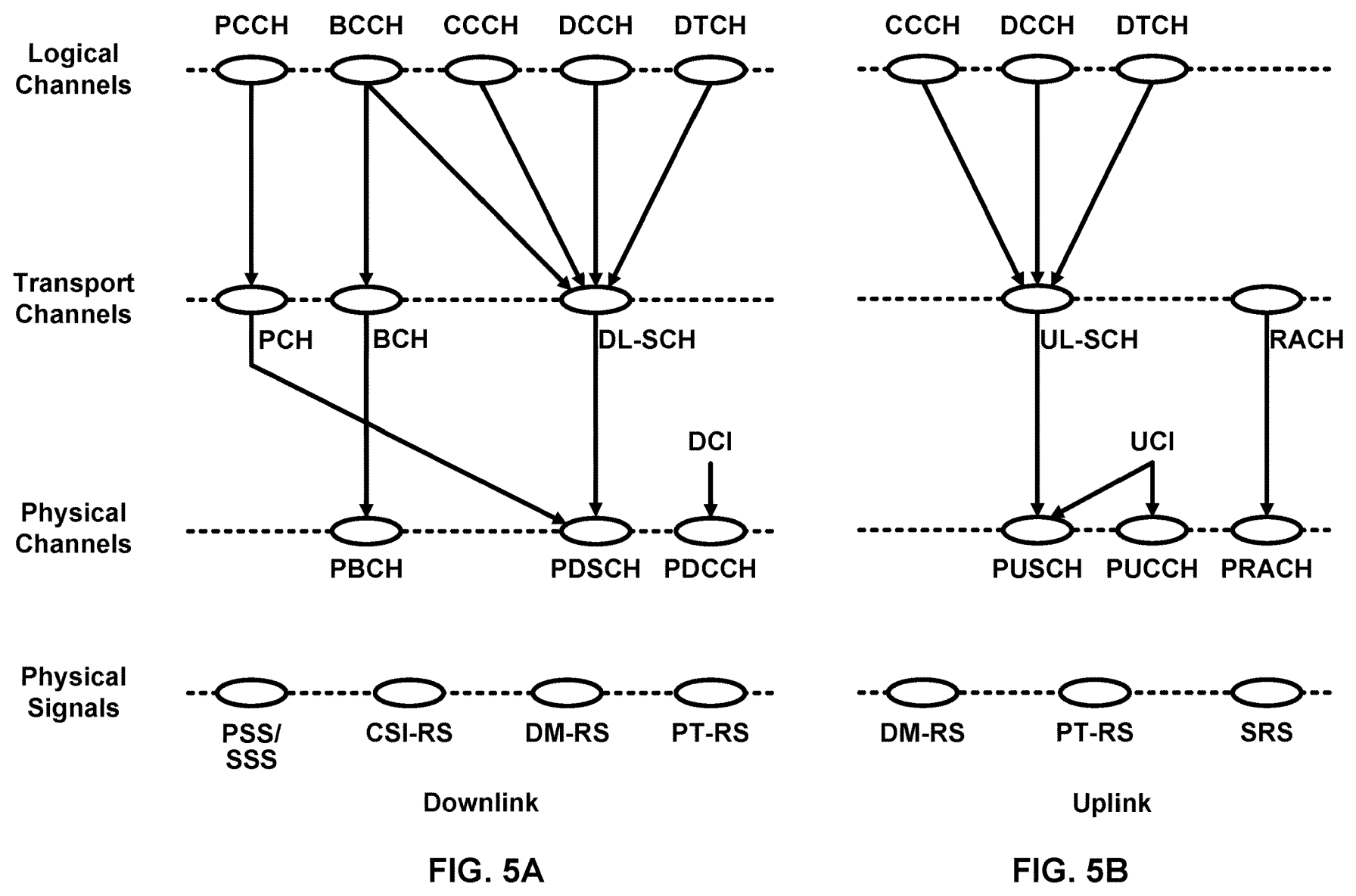

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
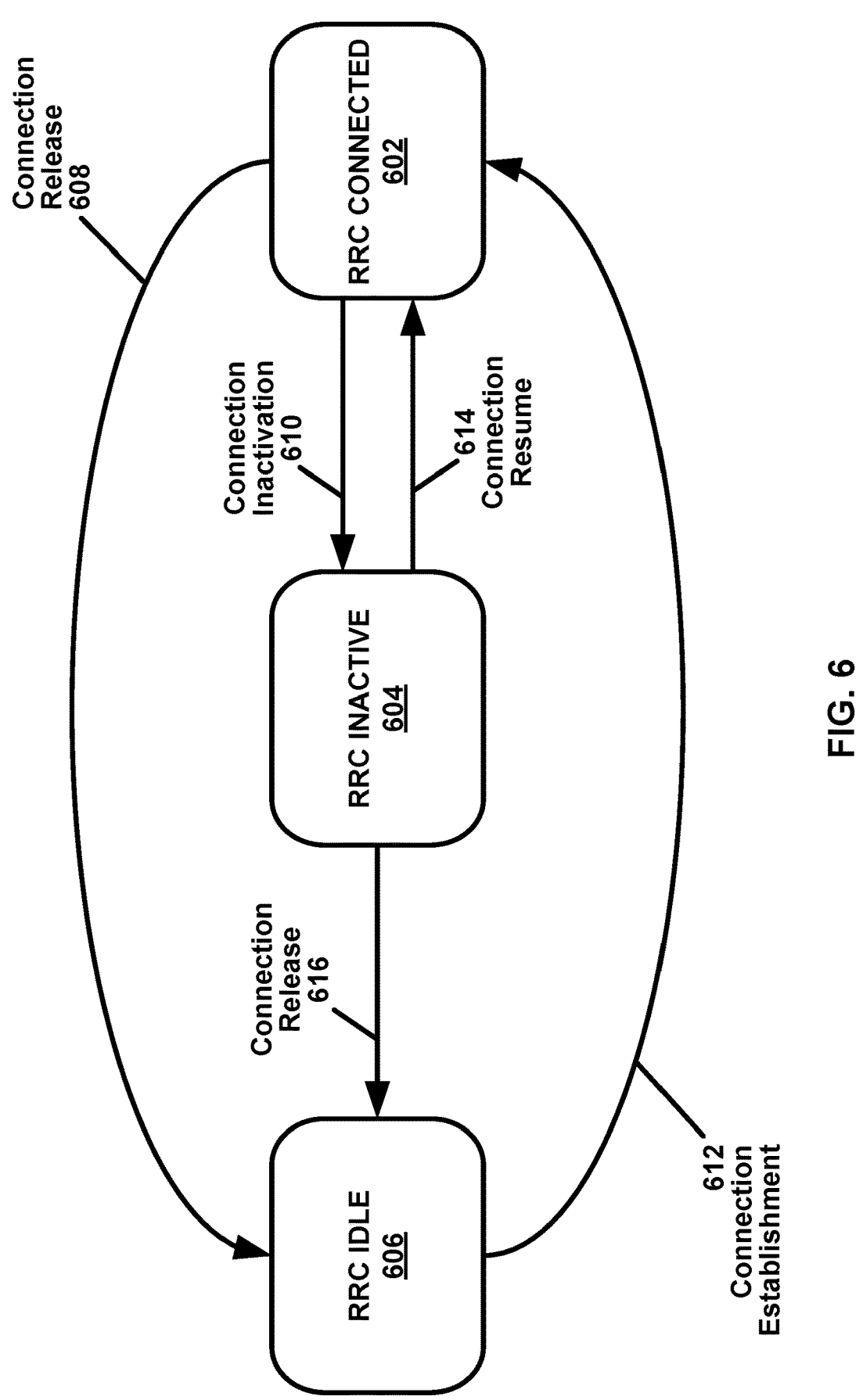
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 $\mu$s, for example, for a numerology in an NR configuration or any other radio configurations. Numerologies may be defined with the following subcarrier spacing/cyclic prefix duration combinations: 15 kHz/4.7 $\mu$s; 30 kHz/2.3 $\mu$s; 60 kHz/1.2 $\mu$s; 120 kHz/0.59 $\mu$s; 240 kHz/0.29 $\mu$s, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
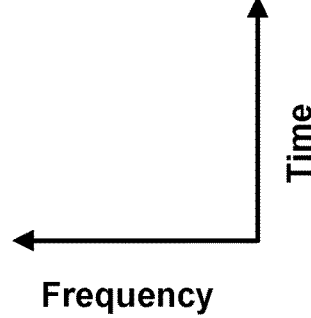
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHZ bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
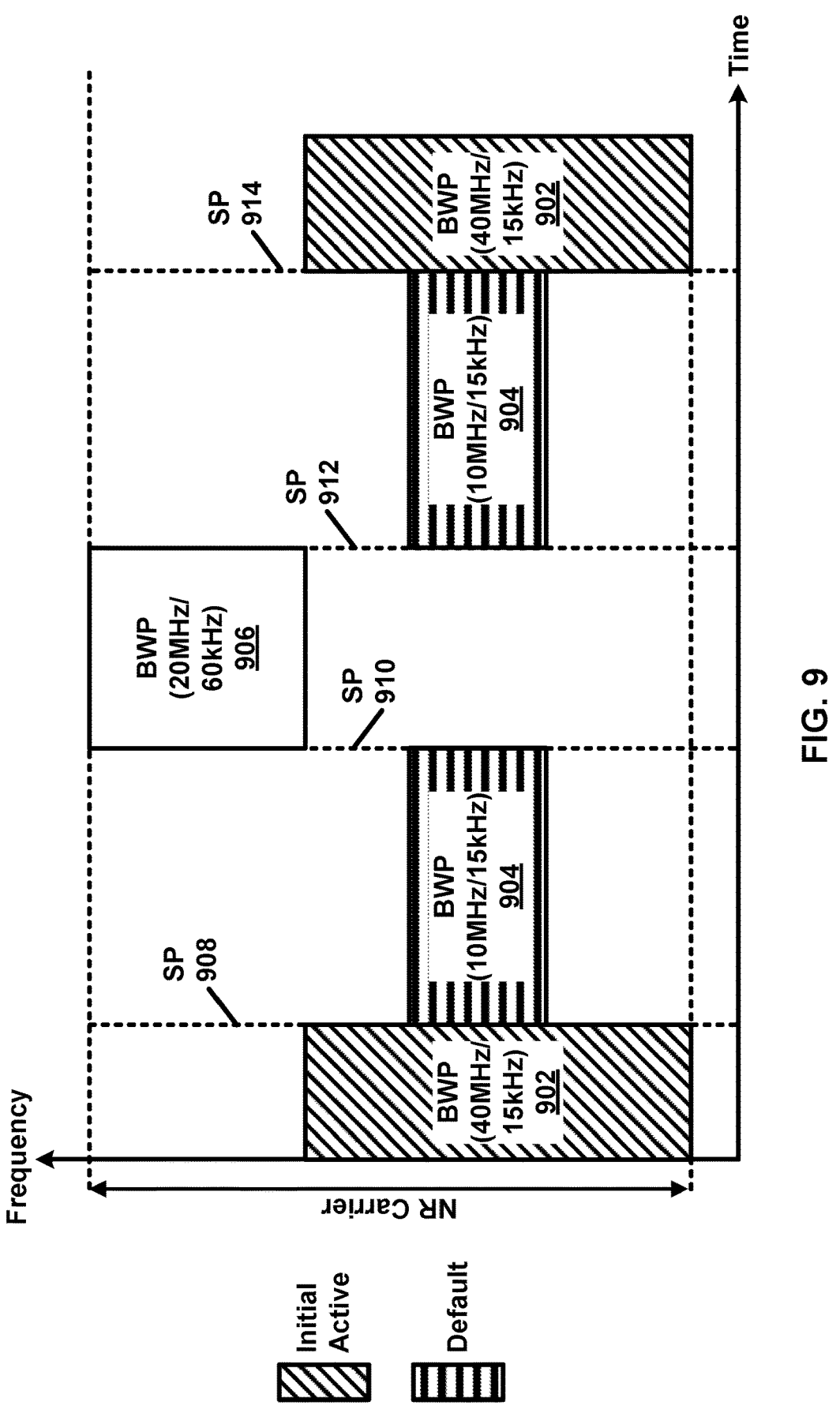
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
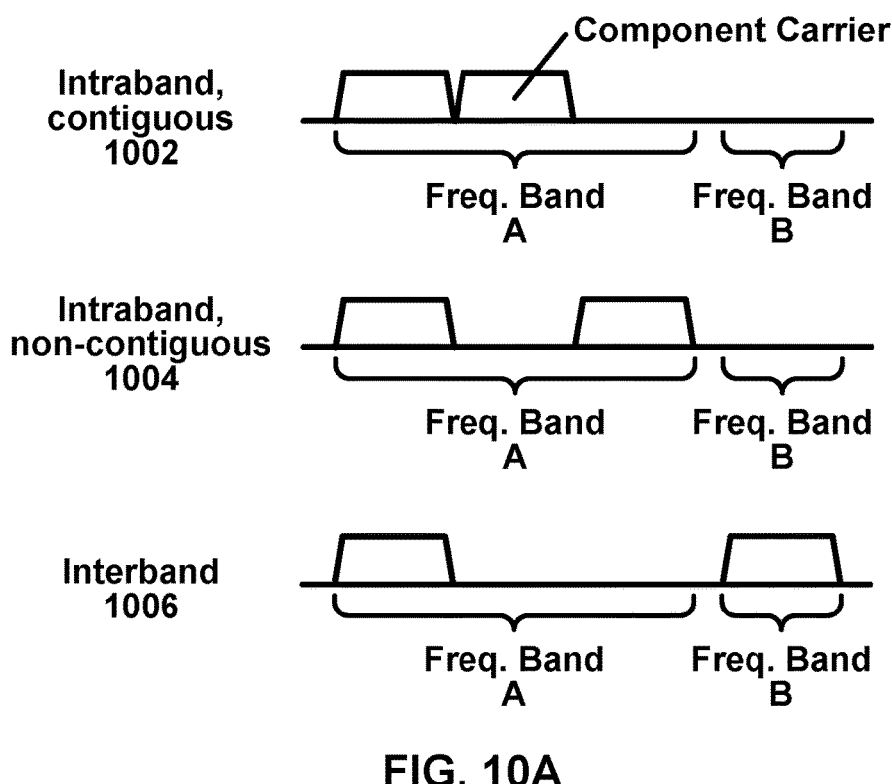
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
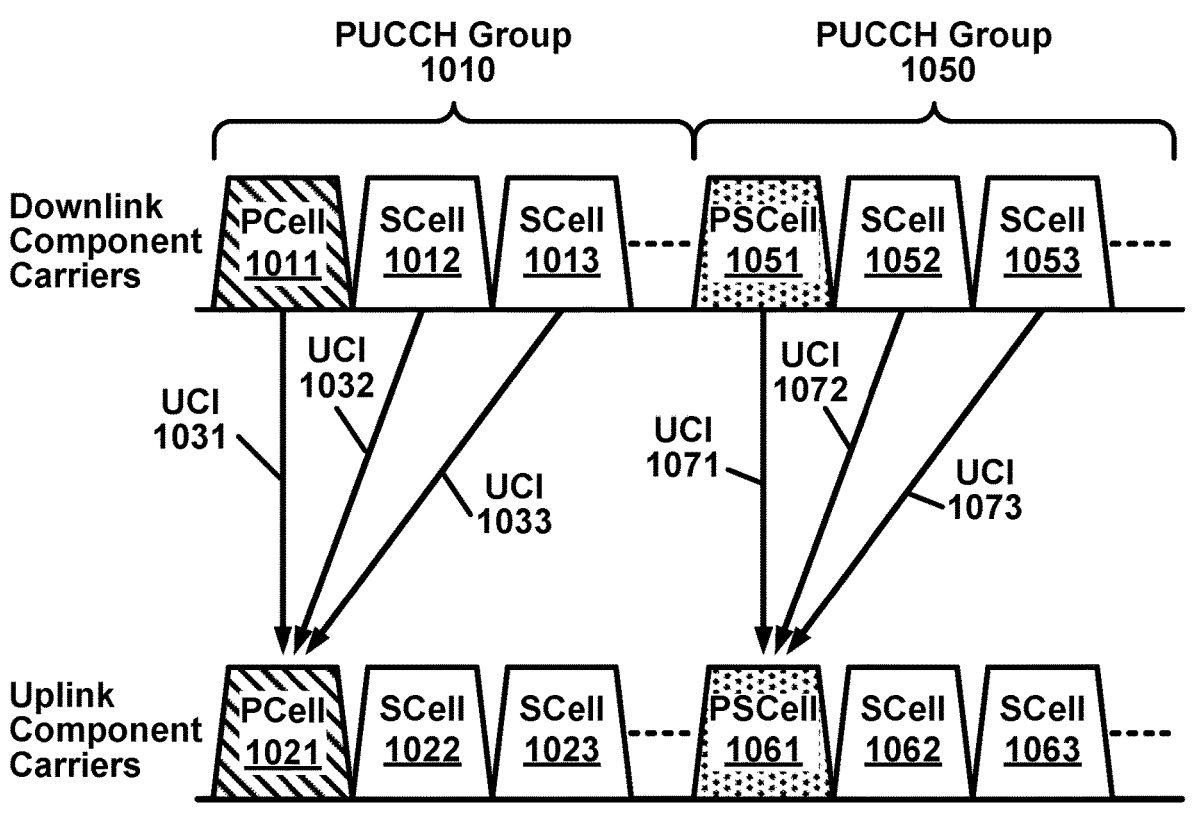
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
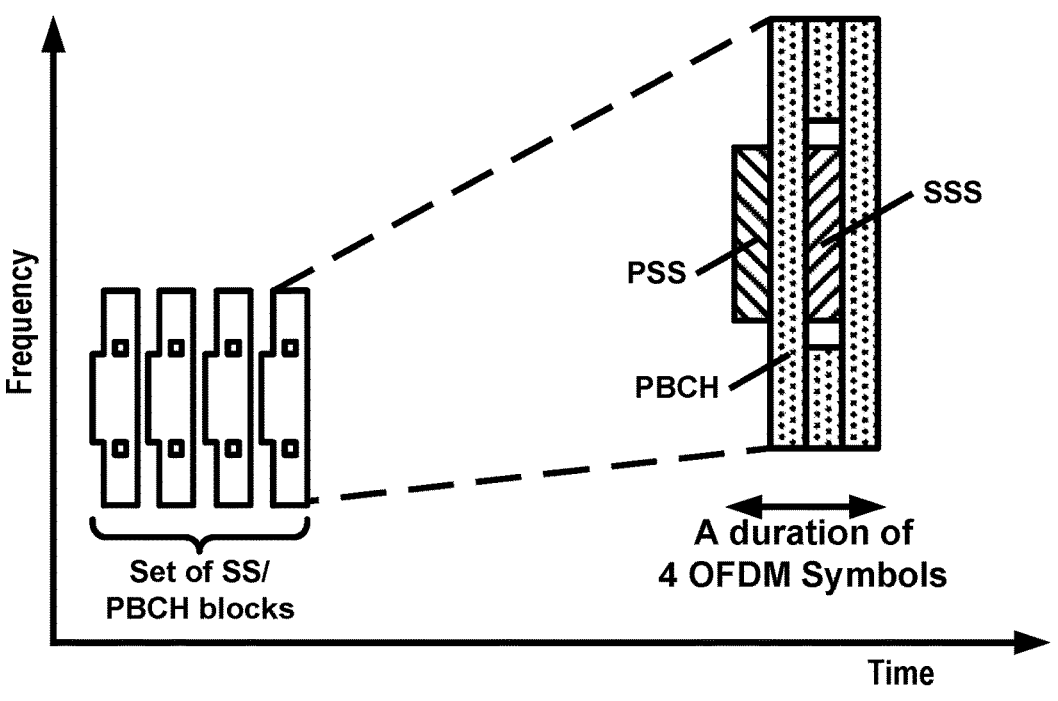
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell).

A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
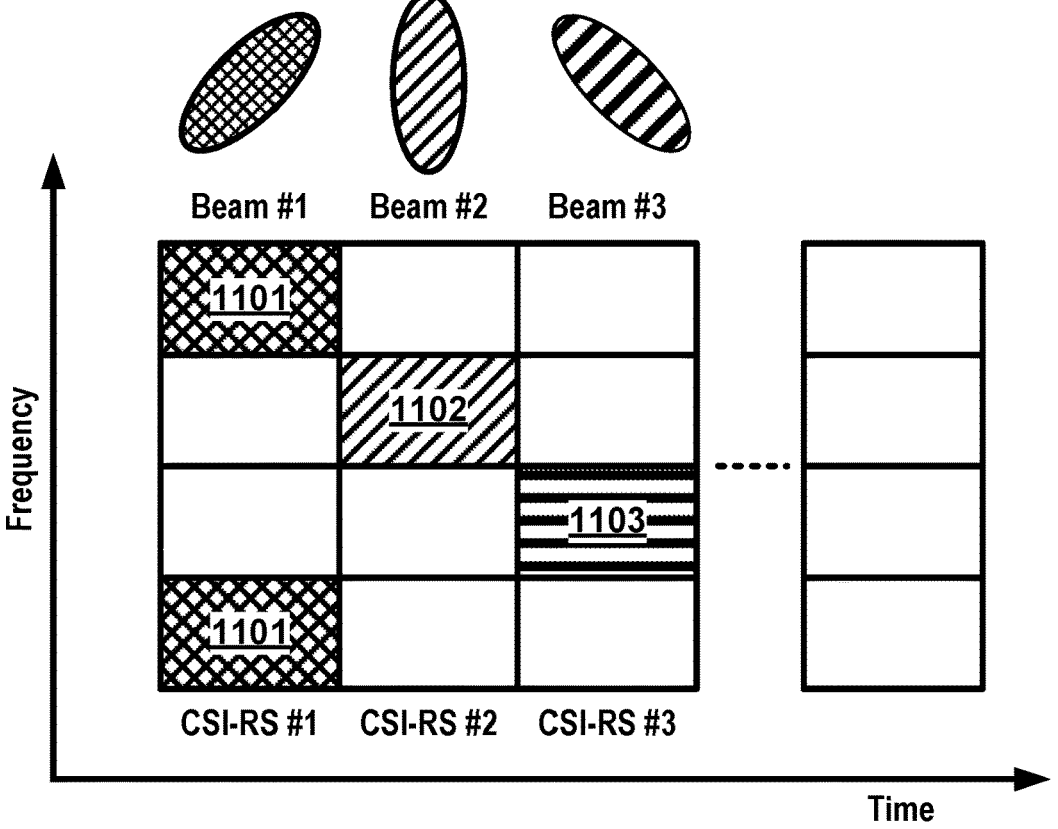
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG.

11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
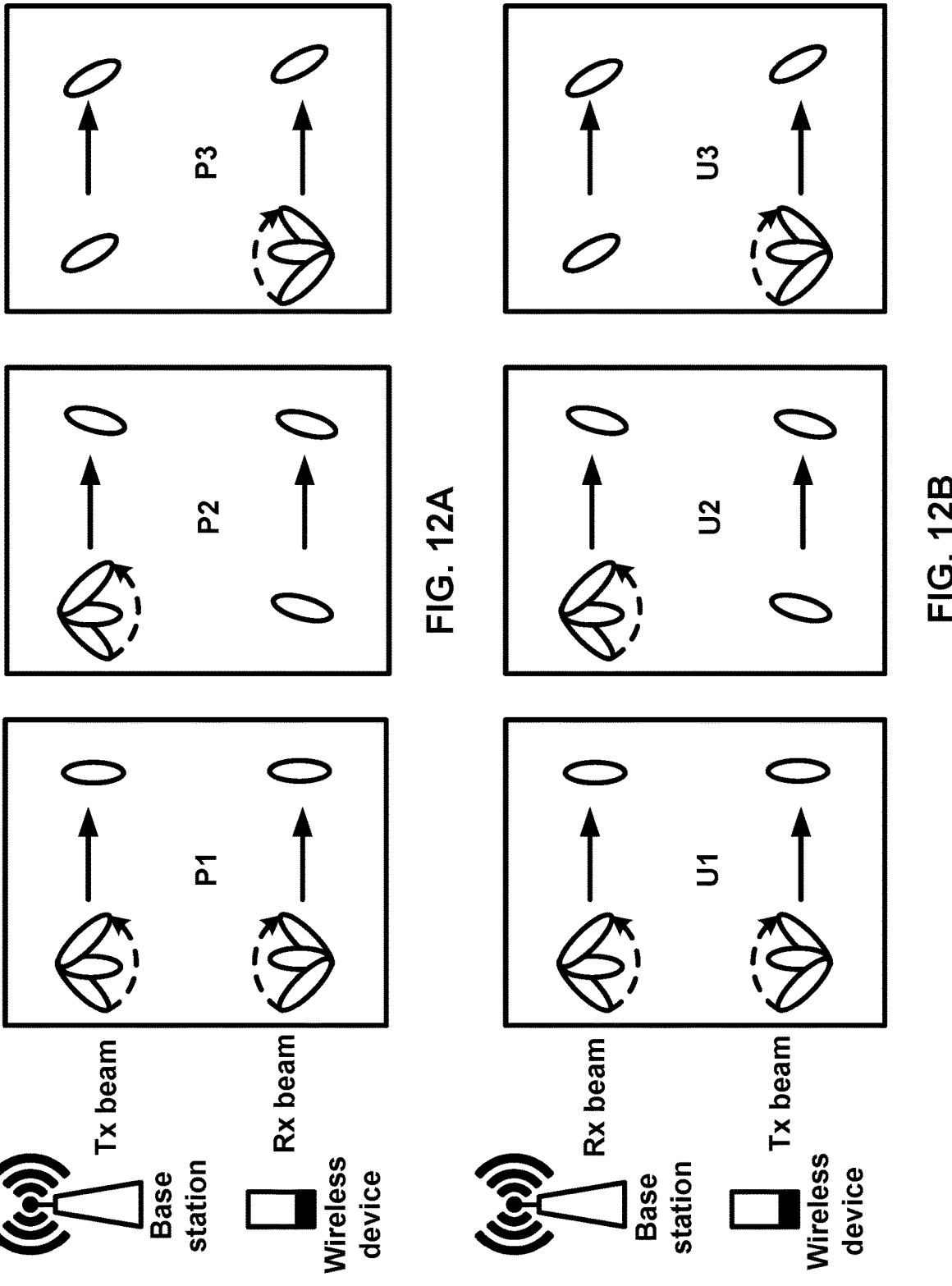
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
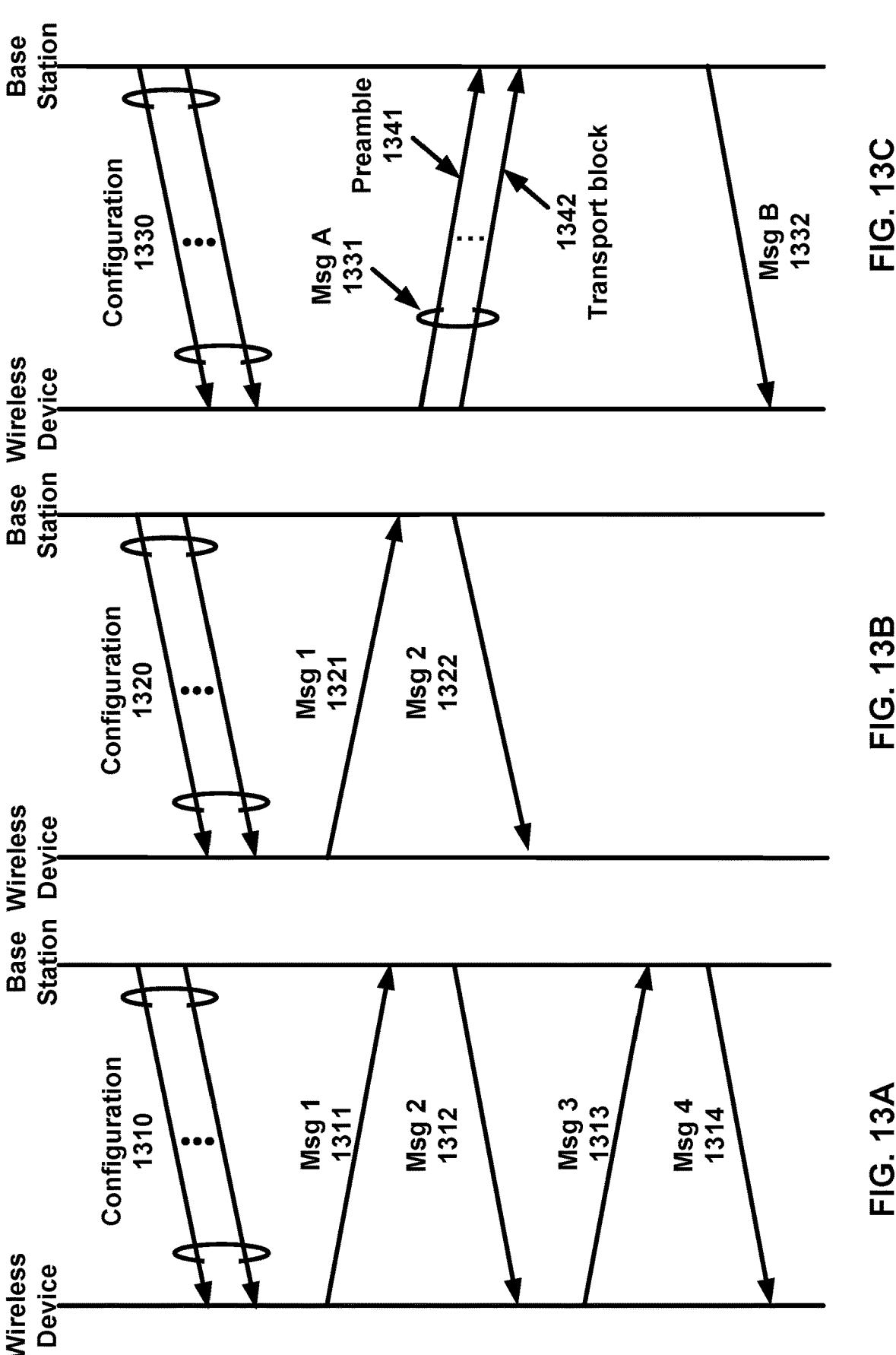
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI =$$

$$1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq$ s_id$<14$), t_id may be an index of a first slot of the PRACH occasion in a system frame (e.g., $0 \leq$ t_id$<80$), f_id may be an index of the PRACH occasion in the frequency domain (e.g., $0 \leq$ f_id$<8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-Response Window) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi- Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
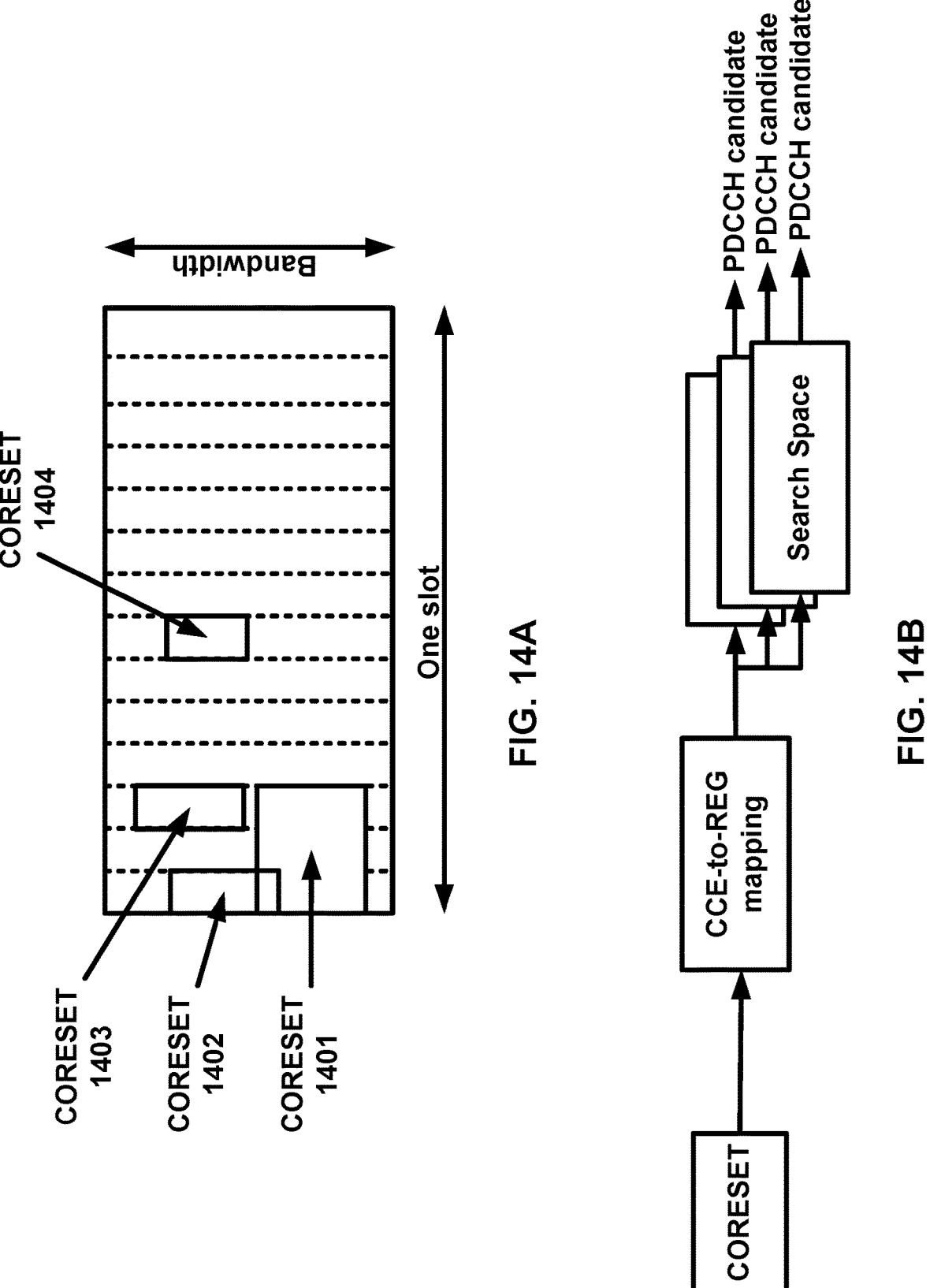
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel.

The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
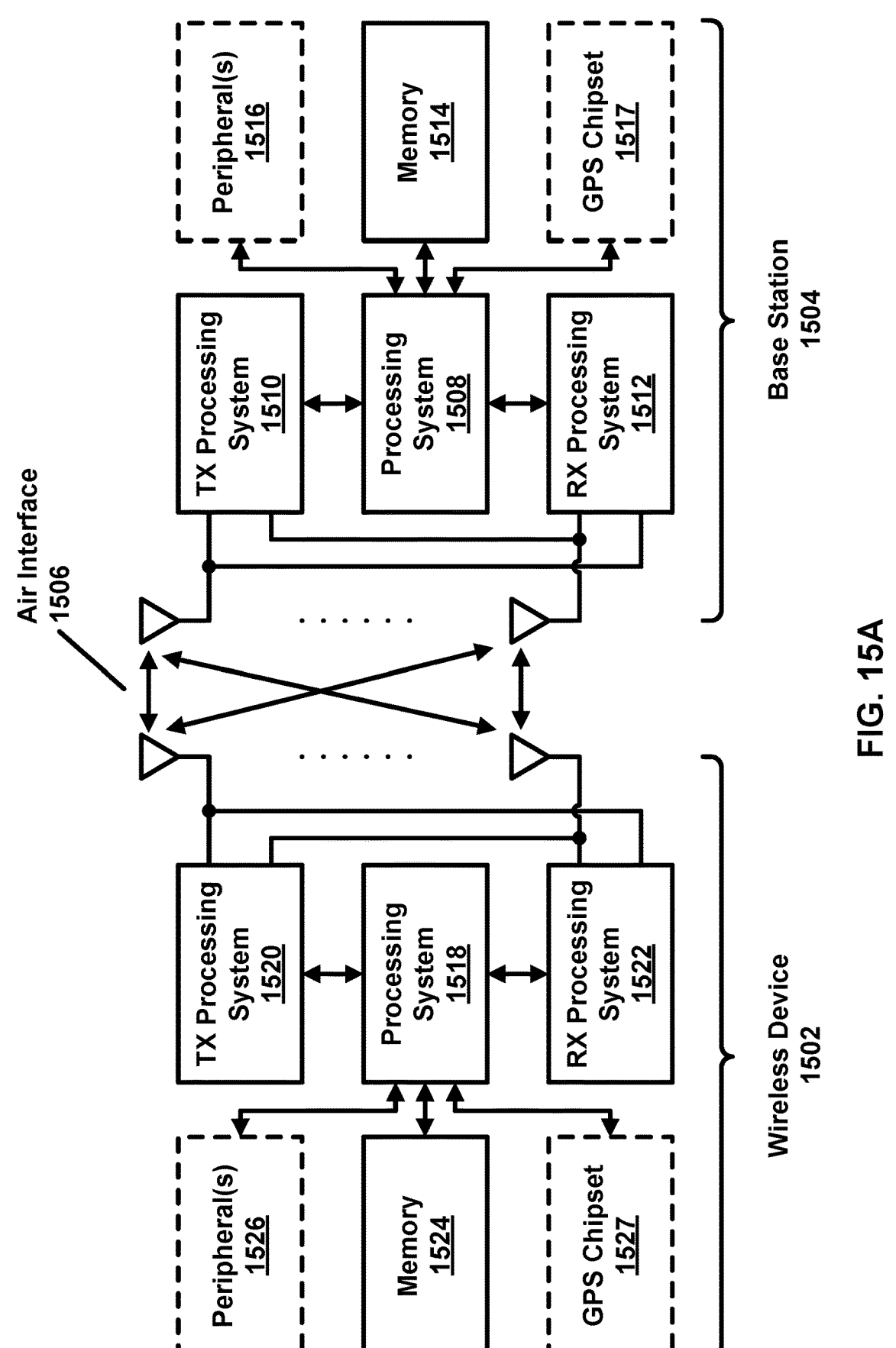
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
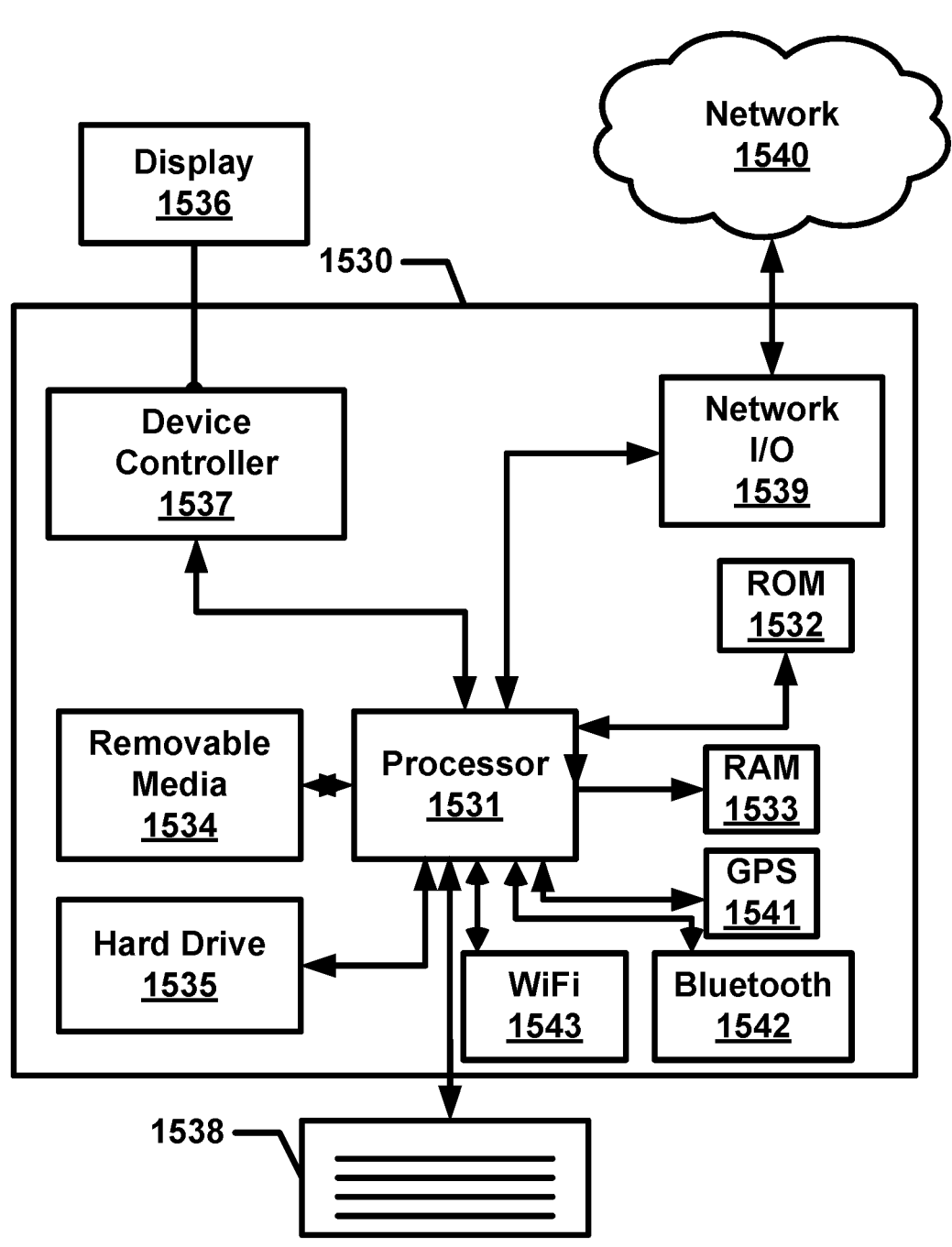
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
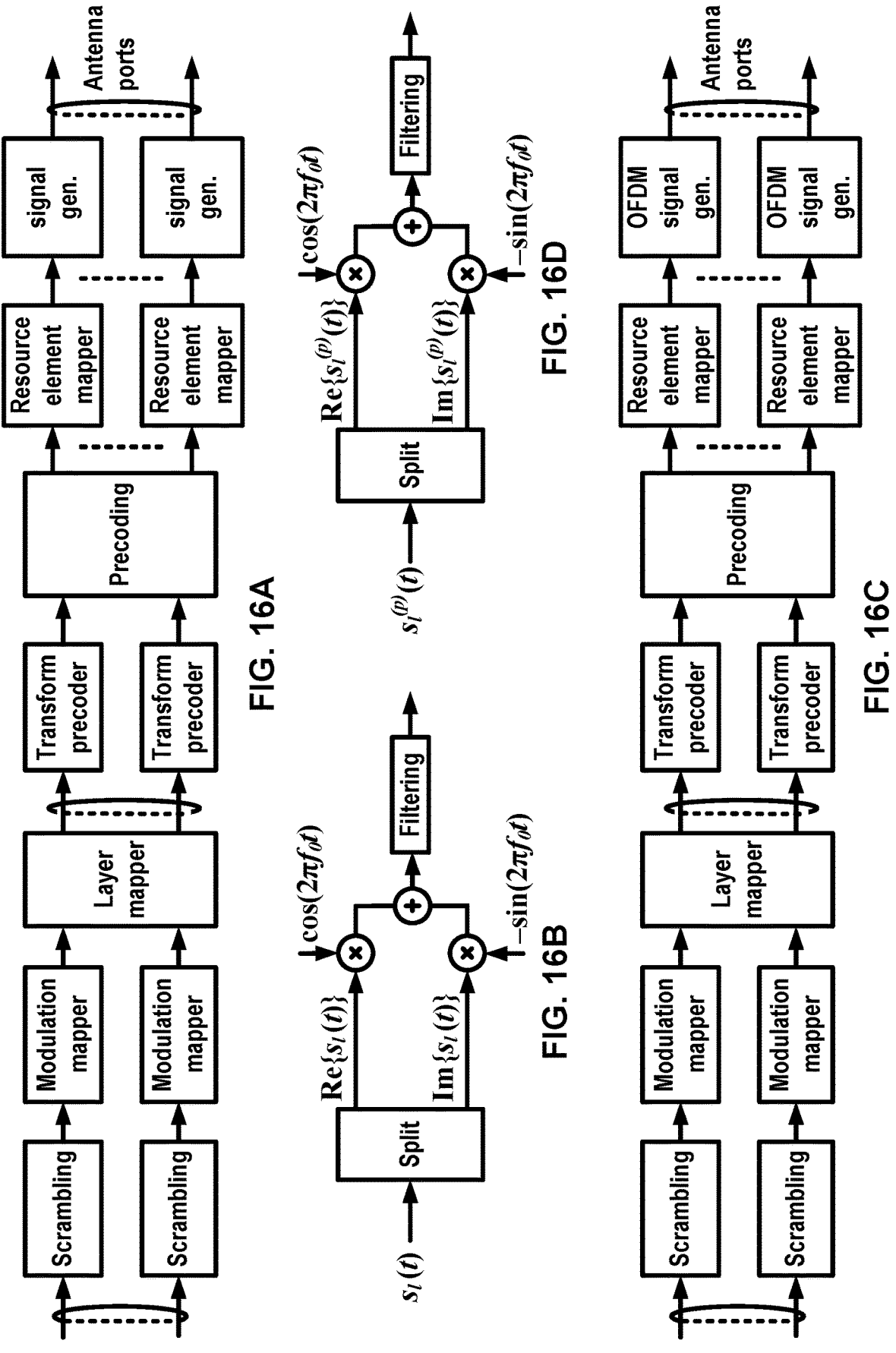
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an SCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an SCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an SCellDeactivationTimer timer) associated with an activated SCell expires. The wireless device may stop the timer (e.g., SCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, and/or flush HARQ buffers associated with the activated SCell, for example, after or in response to deactivating the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an SCellDeactivationTimer timer) associated with the activated SCell, for example, if at least one first PDCCH on an activated SCell indicates an uplink grant or a downlink assignment. A wireless device may restart a timer (e.g., an SCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 17A:
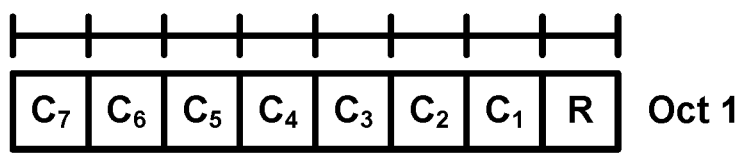
FIG. 17A and FIG. 17B show example secondary cell (SCell) activation/deactivation MAC control element (CE) formats.

FIG. 17A shows an example of an SCell activation/deactivation MAC CE that may comprise one octet. A first MAC PDU subheader comprising a first LCID (e.g., LCID 111010) may indicate/identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 17B:
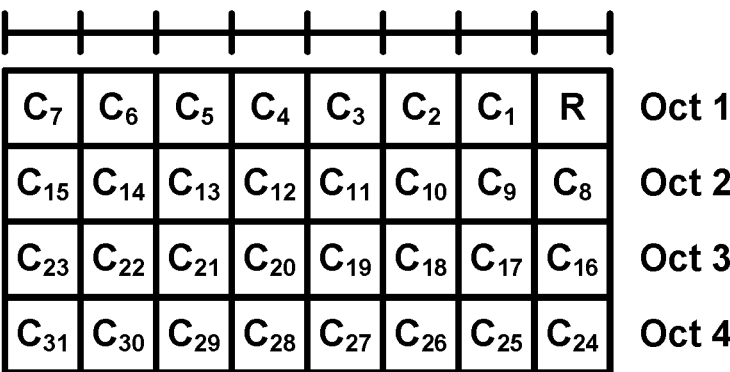

FIG. 17B shows an example of an SCell Activation/Deactivation MAC CE of four octets. A second MAC PDU subheader with a second LCID (e.g., LCID 111001) may indicate/identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station and/or a wireless device may use a power saving mechanism (e.g., hibernation mechanism) for an SCell, for example, if CA is configured. A power saving mechanism may improve battery performance (e.g., runtimes), reduce power consumption of the wireless device, and/or to improve latency of SCell activation and/or SCell addition. The SCell may be transitioned (e.g., switched and/or adjusted) to a dormant state if the wireless device initiates a power saving state for (e.g., hibernates) the SCell. The wireless device may, for example, if the SCell is transitioned to a dormant state: stop transmitting SRS on the SCell, report CQI/PMI/RI/PTI/CRI for the SCell according to or based on a periodicity configured for the SCell in a dormant state, not transmit on an UL-SCH on the SCell, not transmit on a RACH on the SCell, not monitor the PDCCH on the SCell, not monitor the PDCCH for the SCell, and/or not transmit PUCCH on the SCell. Not transmitting, not monitoring, not receiving, and/or not performing an action may comprise, for example, refraining from transmitting, refraining from monitoring, refraining from receiving, and/or refraining from performing an action, respectively. Reporting CSI for an SCell, that has been transitioned to a dormant state, and not monitoring the PDCCH on/for the SCell, may provide the base station an "always-updated" CSI for the SCell. The base station may use a quick and/or accurate channel adaptive scheduling on the SCell, based on the always-updated CSI, if the SCell is transitioned back to active state. Using the always-updated CSI may speed up an activation procedure of the SCell. Reporting CSI for the SCell and not monitoring the PDCCH on and/or for the SCell (e.g., that may have been transitioned to a dormant state), may provide advantages such as increased battery efficiency, reduced power consumption of the wireless device, and/or increased timeliness and/or accuracy of channel feedback information feedback. A PCell/PSCell and/or a PUCCH SCell, for example, may not be configured or transitioned to a dormant state.

A base station may activate, hibernate, or deactivate at least one of one or more configured SCells. A base station may send (e.g., transmit) to a wireless device, for example, one or more messages comprising parameters indicating at least one SCell being set to an active state, a dormant state, or an inactive state.

A base station may transmit, for example, one or more RRC messages comprising parameters indicating at least one SCell being set to an active state, a dormant state, or an inactive state. A base station may transmit, for example, one or more MAC control elements (CEs) comprising parameters indicating at least one SCell being set to an active state, a dormant state, or an inactive state.

The wireless device may perform (e.g., if the SCell is in an active state): SRS transmissions on the SCell, CQI/PMI/RI/CRI reporting for the SCell, PDCCH monitoring on the SCell, PDCCH monitoring for the SCell, and/or PUCCH/SPUCCH transmissions on the SCell. The wireless device may (e.g., if the SCell is in an inactive state): not transmit SRS on the SCell, not report CQI/PMI/RI/CRI for the SCell, not transmit on an UL-SCH on the SCell, not transmit on a RACH on the SCell, not monitor PDCCH on the SCell, not monitor a PDCCH for the SCell; and/or not transmit a PUCCH/SPUCCH on the SCell. The wireless device may (e.g., if the SCell is in a dormant state): not transmit SRS on the SCell, report CQI/PMI/RI/CRI for the SCell, not transmit on a UL-SCH on the SCell, not transmit on a RACH on the SCell, not monitor a PDCCH on the SCell, not monitor a PDCCH for the SCell, and/or not transmit a PUCCH/SPUCCH on the SCell.

A base station may send (e.g., transmit), for example, a first MAC CE (e.g., an activation/deactivation MAC CE as shown in FIGS. 17A and 17B). The first MAC CE may indicate, to a wireless device, activation or deactivation of at least one SCell. A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. A wireless device receiving a MAC CE may ignore the $C_i$ field, for example, if there is no SCell configured with SCell index i. An R field may indicate a reserved bit. The R field may be set to zero.

A base station may send (e.g., transmit) a MAC CE (e.g., a hibernation MAC CE) that may generally be referred to herein as a second MAC CE. The second MAC CE may be the same as or different from other MAC CEs described herein, but is generally referred to herein as the second MAC CE. The second MAC CE may indicate activation and/or hibernation of at least one SCell to a wireless device. The second MAC CE may be associated with, for example, a second LCID different from a first LCID of the first MAC CE (e.g., the activation/deactivation MAC CE). The second MAC CE may have a fixed size. The second MAC CE may comprise a single octet comprising seven C-fields and one R-field.

FIG. 18A shows an example of a MAC CE (e.g., the second MAC CE referenced above) comprising a single octet. The second MAC CE may comprise four octets comprising 31 C-fields and one R-field. FIG. 18B shows an example of the second MAC CE comprising four octets. A second MAC CE (e.g., comprising four octets) may be associated with a third LCID. The third LCID may be different from the second LCID for the second MAC CE and/or the first LCID for activation/deactivation MAC CE. The second MAC CE (e.g., comprising one octet) may be used, for example, if there is no SCell with a serving cell index greater than a value (e.g., 7 or any other value). The second MAC CE (e.g., comprising four octets) may be used, for example, if there is an SCell with a serving cell index greater than a value (e.g., 7 or any other value). A second MAC CE may indicate a dormant/activated status of an SCell, for example, if a second MAC CE is received and a first MAC CE is not received. The $C_i$ field of the second MAC CE may indicate a dormant/activated status of an SCell with SCell index i if there is an SCell configured with SCell index i, otherwise the MAC entity may ignore the $C_i$ field. A wireless device may transition an SCell associated with SCell index i into a dormant state, for example, if $C_i$ of the second MAC CE is set to "1". The wireless device may activate an SCell associated with SCell index i, for example, if $C_i$ of the second MAC CE is set to "0". The wireless device may activate the SCell with SCell index i, for example, if $C_i$ of the second MAC CE is set to "0" and the SCell with SCell index i is in a dormant state. The wireless device may ignore the $C_i$ field of the second MAC CE, for example, if the $C_i$ field is set to "0" and the SCell with SCell index i is not in a dormant state.

FIG. 18C shows example configurations of a field of the first MAC CE. The field may comprise, for example, a $C_i$ field of the first MAC CE (e.g., an activation/deactivation MAC CE), a $C_i$ field of the second MAC CE (e.g., a hibernation MAC CE), and corresponding resulting SCell status (e.g., activated/deactivated/dormant). The wireless device may deactivate an SCell associated with SCell index i, for example, if $C_i$ of hibernation MAC CE is set to 0, and $C_i$ of the activation/deactivation MAC CE is set to 0. The wireless device may activate an SCell associated with SCell index i, for example, if $C_i$ of hibernation MAC CE is set to 0, and $C_i$ of the activation/deactivation MAC CE is set to 1. The wireless device may ignore the hibernation MAC CE and the activation/deactivation MAC CE, for example, if $C_i$ of hibernation MAC CE is set to 1, and $C_i$ of the activation/deactivation MAC CE is set to 0. The wireless device may transition an SCell associated with SCell index I to a dormant state, for example, if $C_i$ of hibernation MAC CE is set to 1, and $C_i$ of the activation/deactivation MAC CE is set to 1.

A base station may activate, hibernate, and/or deactivate at least one of one or more SCells, for example, if the base station is configured with the one or more SCells. A base station and/or a wireless device may maintain an SCell deactivation timer (e.g., SCellDeactivationTimer), for example, per a configured SCell and/or except for an SCell configured with PUCCH/SPUCCH, if any. The base station and/or the wireless device may deactivate an associated SCell, for example, if an SCell deactivation timer expires. A base station and/or a wireless device may maintain dormant SCell deactivation timer (e.g., dormantSCellDeactivation-Timer), for example, per a configured SCell and/or except for an SCell configured with PUCCH/SPUCCH, if any. The base station and/or the wireless device may deactivate an associated SCell, for example, if the dormant SCell deactivation timer expires (e.g., if the SCell is in dormant state).

A base station and/or a wireless device may, for example, maintain an SCell hibernation timer (e.g., SCellHibernation-Timer), for example, per a configured SCell and/or except for an SCell configured with PUCCH/SPUCCH, if any. The base station (and/or the wireless device may hibernate an associated SCell, for example, if the SCell hibernation timer expires (e.g., if the SCell is in active state). The SCell hibernation timer may take priority over the SCell deactivation timer, for example, if both the SCell deactivation timer and the SCell hibernation timer are configured. A base station and/or a wireless device may ignore the SCell deactivation timer regardless of the SCell deactivation timer expiry, for example, if both the SCell deactivation timer and the SCell hibernation timer are configured.

A wireless device (e.g., MAC entity of a wireless device) may activate an SCell, for example, if the MAC entity is configured with an activated SCell at SCell configuration. A wireless device may activate an SCell, for example, if the wireless device receives a MAC CE(s) activating the SCell. The wireless device may start or restart an SCell deactivation timer associated with an SCell, for example, based on or in response to activating the SCell. The wireless device may start or restart an SCell hibernation timer (e.g., if configured) associated with an SCell, for example, based on or in response to activating the SCell. A wireless device may trigger a PHR procedure, for example, based on or in response to activating an SCell.

A wireless device may deactivate the SCell, for example, if the wireless device receives a MAC CE(s) indicating deactivation of an SCell. The wireless device may: deactivate the SCell; stop an SCell deactivation timer associated with the SCell; and/or flush all HARQ buffers associated with the SCell, for example, if the wireless device receives a MAC CE(s) indicating deactivation of an SCell. The wireless device may: deactivate the SCell; stop the SCell deactivation timer associated with the SCell; and/or flush all HARQ buffers associated with the SCell, for example, if an SCell deactivation timer associated with an activated SCell expires and an SCell hibernation timer is not configured.

A wireless device and/or a base station may (e.g., if a first PDCCH on an SCell indicates an uplink grant or downlink assignment, or a second PDCCH on a serving cell scheduling the SCell indicates an uplink grant or a downlink assignment for the SCell, or a MAC PDU is transmitted in a configured uplink grant or received in a configured downlink assignment) restart an SCell deactivation timer associated with an activated SCell and/or restart an SCell hibernation timer (e.g., if configured) associated with the SCell.

An ongoing random access (RA) procedure on an SCell may be aborted, for example, if, the SCell is deactivated.

A wireless device and/or a base station may (e.g., if configured with an SCell associated with an SCell state set to dormant state upon the SCell configuration, or if receiving MAC CE(s) and/or DCI(s) indicating transitioning the SCell to a dormant state): set (e.g., transition) the SCell to a dormant state, transmit one or more CSI reports for the SCell, stop an SCell deactivation timer associated with the SCell, stop an SCell hibernation timer (if configured) associated with the SCell, start or restart a dormant SCell deactivation timer associated with the SCell, and/or flush all HARQ buffers associated with the SCell. The wireless device and/or a base station may (e.g., if the SCell hibernation timer associated with the activated SCell expires): hibernate the SCell, stop the SCell deactivation timer associated with the SCell, stop the SCell hibernation timer associated with the SCell, and/or flush all HARQ buffers associated with the SCell. The wireless device and/or a base station may (e.g., if a dormant SCell deactivation timer associated with a dormant SCell expires): deactivate the SCell and/or stop the dormant SCell deactivation timer associated with the SCell. Ongoing RA procedure on an SCell may be aborted, for example, if the SCell is in dormant state. The wireless device may not monitor any downlink control channel for/of the SCell, for example, if the SCell is in the dormant state.

FIG. 19 shows example DCI formats. The example DCI formats may correspond to an operation such as an FDD operation (e.g., 20 MHz bandwidth, or any other bandwidth). The example DCI formats may correspond to transmissions involving two transmission antennas (or any other number of antennas) at the base station. The example DCI formats may correspond to transmissions utilizing CA or not utilizing carrier aggregation. The DCI formats may comprise at least one of: DCI format 0_0/0_1 indicating scheduling of PUSCH in a cell; DCI format 1_0/1_1 indicating scheduling of PDSCH in a cell; DCI format 2_0 indicating a slot format (e.g., to a group of wireless devices); DCI format 2_1 indicating PRB(s) and/or OFDM symbol(s) to a group of wireless devices (e.g., in a scenario where a wireless device may assume no transmission is intended for the wireless device); DCI format 2_2 indicating transmission of TPC commands for PUCCH and PUSCH; and/or DCI format 2_3 indicating transmission of a group of TPC commands for SRS transmission by one or more wireless devices. A base station may transmit DCI, via a PDCCH, for scheduling decisions and/or power-control commands. The DCI may comprise at least one of: downlink scheduling assignments, uplink scheduling grants, power-control commands. The downlink scheduling assignments may comprise at least one of: PDSCH resource indication, transport format, HARQ information, control information related to multiple antenna schemes, and/or a command for power control of the PUCCH used for transmission of ACK/NACK (e.g., based on downlink scheduling assignments). The uplink scheduling grants may comprise at least one of: PUSCH resource indication, transport format, and HARQ related information, and/or a power control command of the PUSCH.

The different types of control information correspond to different DCI message sizes. Supporting spatial multiplexing with non-contiguous allocation of RBs (e.g., in the frequency domain) may require a larger scheduling message, for example, in comparison with an uplink grant that allows only contiguous allocation of RBs. The DCI may be categorized into different DCI formats. A DCI format may correspond to a certain message size and may be associated with a particular application/usage.

A wireless device may monitor one or more PDCCH candidates to detect one or more DCI with one or more DCI format. One or more PDCCH transmissions may be transmitted in a common search space or a wireless device-specific search space. A wireless device may monitor PDCCH with only a limited set of DCI formats, for example, to reduce power consumption. A wireless device may not be required to detect DCI, for example, with DCI format 6 (e.g., as used for an eMTC wireless device), and/or any other DCI format. A wireless device with a capability for detection of a higher number of DCI formats may have a higher power consumption.

The one or more PDCCH candidates that a wireless device monitors may be defined in terms of PDCCH wireless device-specific search spaces. A PDCCH wireless device-specific search space at CCE aggregation level L (e.g., $L \in \{1, 2, 4, 8\}$) may be defined by a set of PDCCH candidates for the CCE aggregation level L. A wireless device may be configured (e.g., by one or more higher layer parameters), for a DCI format per serving cell, a quantity of PDCCH candidates per CCE aggregation level L.

A wireless device may monitor one or more PDCCH candidate in control resource set q based on a periodicity of symbols (e.g., $W_{PDCCH,q}$ symbols) for control resource set q. The periodicity of the symbols for the control resource set q may be configured, for example, by one or more higher layer parameters)

Information in the DCI formats used for downlink scheduling may be organized into different groups. Fields present in DCIs corresponding to different DCI formats may be different. The fields may comprise, for example, at least one of: resource information (e.g., comprising carrier indicator (e.g., 0 or 3 bits, or any other quantity of bits) and/or RB allocation); HARQ process number; MCS, new data indicator (NDI), and redundancy version (RV) (e.g., for a first TB); MCS, NDI and RV (e.g., for a second TB); MIMO related information; PDSCH resource-element mapping and QCI; downlink assignment index (DAI); TPC for PUCCH; SRS request (e.g., 1 bit, or any other quantity of bits), an indicator for triggering one-shot SRS transmission; ACK/NACK offset; DCI format 0/1A indication (e.g., used to differentiate between DCI format 1A and DCI format 0); and padding (e.g., if necessary). The MIMO related information may comprise, for example, at least one of: PMI, precoding information, transport block swap flag, power offset between PDSCH and reference signal, reference-signal scrambling sequence, number/quantity of layers, and/or antenna ports for transmission.

Information in the DCI formats used for uplink scheduling may be organized into different groups. Fields present in DCIs corresponding to different DCI formats may be different. The fields may comprise, for example, at least one of: resource information (e.g., comprising carrier indicator, resource allocation type, and/or RB allocation); MCS, NDI (for a first TB); MCS, NDI (for a second TB); phase rotation of an uplink DMRS; precoding information; CSI request, an indicator requesting an aperiodic CSI report; SRS request (e.g., 2 bits, or any other quantity of bits) to trigger aperiodic SRS transmission (e.g., using one of up to three preconfigured settings); uplink index/DAI; TPC for PUSCH; DCI format 0/1A indication; and padding (e.g., if necessary).

A base station may perform cyclic redundancy check (CRC) scrambling for DCI, for example, before transmitting the DCI via a PDCCH. The base station may perform CRC scrambling, for example, by bit-wise addition (or Modulo-2 addition, exclusive OR (XOR) operation, or any other method) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, MCS-C-RNTI, and/or any other identifier) with the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may transmit one or more PDCCH in different control resource sets, for example, to support wide bandwidth operation. A base station may transmit one or more RRC message comprising configuration parameters of one or more control resource sets. At least one of the one or more control resource sets may comprise, for example, at least one of: a first OFDM symbol; a number/quantity of consecutive OFDM symbols; a set of resource blocks; a CCE-to-REG mapping; and/or a REG bundle size (e.g., for interleaved CCE-to-REG mapping).

A base station may configure a wireless device with BWPs (e.g., UL BWPs and/or DL BWPs) to enable BA on a PCell. The base station may configure the wireless device with at least DL BWP(s) (e.g., there may be no UL BWPs in the UL) to enable BA on an SCell (e.g., if CA is configured). An initial active BWP may be a first BWP used for initial access, for example, for the PCell. A first active BWP may be a second BWP configured for the wireless device to operate on the SCell (e.g., upon the SCell being activated). A base station and/or a wireless device may independently switch a DL BWP and an UL BWP, for example, if operating in a paired spectrum (e.g., FDD). A base station and/or a wireless device may simultaneously switch a DL BWP and an UL BWP, for example, if operating in an unpaired spectrum (e.g., TDD).

A base station and/or a wireless device may switch a BWP between configured BWPs, for example, based on DCI, a BWP inactivity timer, and/or any trigger. A base station and/or a wireless device may switch an active BWP to a default BWP, for example, based on or in response to an expiry of a BWP inactivity timer, if configured, associated with a serving cell. The default BWP may be configured by the network.

One UL BWP for each uplink carrier and/or one DL BWP may be active at a time in an active serving cell, for example, for FDD systems that may be configured with BA. One DL/UL BWP pair may be active at a time in an active serving cell, for example, for TDD systems. Operating on the one UL BWP and/or the one DL BWP (or the one DL/UL BWP pair) may improve wireless device battery consumption. BWPs other than the one active UL BWP and/or the one active DL BWP that the wireless device may work on may be deactivated. On or for deactivated BWPs, the wireless device may not monitor PDCCH and/or may not transmit on a PUCCH, PRACH, and/or UL-SCH.

A serving cell may be configured with any quantity of BWPs (e.g., up to four, or up to any other quantity of BWPs). There may be, for example, one or any other quantity of active BWPs at any point in time for an activated serving cell.

BWP switching for a serving cell may be used, for example, to activate an inactive BWP and/or deactivate an active BWP (e.g., at a time t). The BWP switching may be controlled, for example, by a PDCCH indicating a downlink assignment and/or an uplink grant. The BWP switching may be controlled, for example, by a BWP inactivity timer (e.g., bwp-InactivityTimer). The BWP switching may be controlled, for example, by a base station (e.g., a MAC entity of a base station), a wireless device (e.g., a MAC entity of a wireless device), and/or a MAC entity, based on or in response to initiating an RA procedure. One or more BWPs may be initially active, without receiving a PDCCH indicating a downlink assignment or an uplink grant, for example, if an SPCell is added and/or if an SCell is activated. The active BWP for a serving cell may be indicated by RRC message and/or PDCCH. A DL BWP may be paired with an UL BWP. BWP switching may be common for both UL and DL, for example, for unpaired spectrum.

Figure 20:
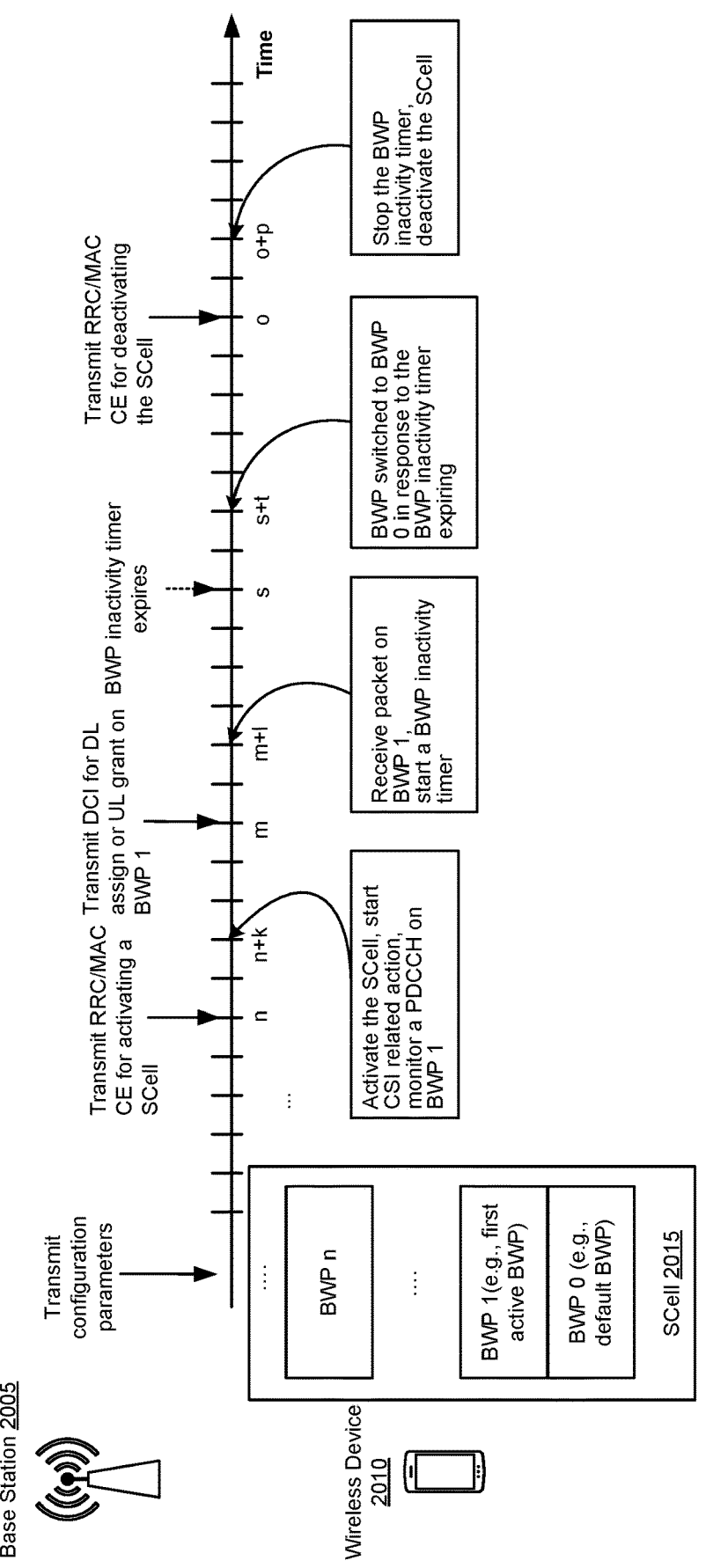
FIG. 20 shows example BWP management on an SCell.

FIG. 20 shows an example of BWP switching for an SCell. A base station 2005 may send (e.g., transmit) one or more messages, to a wireless device 2010. The one or more messages may be for configuring BWPs corresponding to the SCell 2015. The one or more messages may comprise, for example, one or more RRC messages (e.g., RRC connection reconfiguration message, and/or RRC connection reestablishment message, and/or RRC connection setup message). The configured BWPs may comprise BWP 0, BWP 1, . . . BWP n. The BWP 0 may be configured as a default BWP. The BWP 1 may be configured as a first active BWP. At time n, the base station 2005 may send (e.g., transmit) an RRC message and/or a MAC CE for activating the SCell. At or after time n+k, and based on the reception of the RRC message and/or the MAC CE, the wireless device 2010 may activate the SCell and start monitoring a PDCCH on the BWP 1 (e.g., the first active BWP). At or after time m, the base station 2005 may send (e.g., transmit) DCI for DL assignment or UL grant on the BWP 1. At or after time m+1, the wireless device 2010 may receive a packet on the BWP 1 and may start a BWP inactivity timer (e.g., bwp-InactivityTimer). At time s, the BWP inactivity timer may expire. At or after time s+t, a BWP may switch to BWP 0 based on expiration of the BWP inactivity timer. BWP switching may comprise, for example, activating the BWP 0 and deactivating the BWP 1. At time o, the base station 2005 may send (e.g., transmit) an RRC message and/or a MAC CE for deactivating an SCell. At or after time o+p, the wireless device 2010 may stop the BWP inactivity timer and deactivate the SCell 2015.

A wireless device may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 20), one BWP as the default BWP (e.g., BWP 0 in FIG. 20). The wireless device may receive a MAC CE to activate the SCell at $n^{th}$ slot. The wireless device may start a SCell deactivation timer (e.g., SCellDeactivationTimer), and start CSI related actions for the SCell, and/or start CSI related actions for the first active BWP of the SCell. The wireless device may start monitoring a PDCCH on BWP 1 in response to activating the SCell.

The wireless device may start restart a BWP inactivity timer (e.g., bwp-InactivityTimer) at $m^{th}$ slot in response to receiving DCI indicating DL assignment on BWP 1. The wireless device may switch back to the default BWP (e.g., BWP 0) as an active BWP when the BWP inactivity timer expires, at $s^{th}$ slot. The wireless device may deactivate the SCell and/or stop the BWP inactivity timer when the SCell deactivation timer expires.

Using the BWP inactivity timer may reduce a wireless device's power consumption, for example, if the wireless device is configured with multiple cells with each cell having wide bandwidth (e.g., 1 GHz bandwidth, etc.). The wireless device may only transmit on or receive from a narrow-bandwidth BWP (e.g., 5 MHZ) on the PCell or SCell if there is no activity on an active BWP.

A MAC entity may perform operations, on an active BWP for an activated serving cell (e.g., configured with a BWP), comprising: transmitting on an UL-SCH; transmitting on a RACH, monitoring a PDCCH, transmitting on a PUCCH, receiving DL-SCH, and/or (re-) initializing any suspended configured uplink grants of configured grant Type 1 according to a stored configuration, if any. On an inactive BWP for each activated serving cell configured with a BWP, a MAC entity may, for example: not transmit on an UL-SCH, not transmit on a RACH, not monitor a PDCCH, not transmit on a PUCCH, not transmit an SRS, not receive a DL-SCH transmission, clear configured downlink assignment(s) and/or configured uplink grant(s) of configured grant Type 2, and/or suspend configured uplink grant(s) of configured Type 1. A wireless device may perform the BWP switching to a BWP indicated by the PDCCH, for example, if the wireless device (e.g., a MAC entity of the wireless device) receives a PDCCH for a BWP switching of a serving cell and a RA procedure associated with this serving cell is not ongoing.

A bandwidth part indicator field value may indicate an active DL BWP, from a configured DL BWP set, for DL receptions for example, if the bandwidth part indicator field is configured in DCI format 1_1. A bandwidth part indicator field value, may indicate an active UL BWP, from a configured UL BWP set, for UL transmissions, for example, if the bandwidth part indicator field is configured in DCI format 0_1.

A wireless device may be provided by a higher layer parameter a timer value corresponding to a BWP inactivity timer for the PCell (e.g., bwp-InactivityTimer). The wireless device may increment the timer, if running, for example, every interval of 1 millisecond (or any other first duration) for frequency range 1 (or any other first frequency range) or every 0.5 milliseconds (or any other second duration) for frequency range 2 (or any other second frequency range), for example, if: the wireless device does not detect DCI format 1_1 for paired spectrum operation, or the wireless device does not detect DCI format 1_1 or DCI format 0_1 for unpaired spectrum operation, in the interval.

Wireless device procedures on an SCell may be similar to or the same as procedures on a PCell, for example, if the wireless device is configured for the SCell with a higher layer parameter indicating a default DL BWP among configured DL BWPs (e.g., Default-DL-BWP), and/or if the wireless device is configured with a higher layer parameter indicating a timer value (e.g., bwp-InactivityTimer). The wireless device procedures on the SCell may use the timer value for the SCell and the default DL BWP for the SCell. The wireless device may use, as first active DL BWP and first active UL BWP on the SCell or secondary cell, an indicated DL BWP and an indicated UL BWP on the SCell, respectively, if a wireless device is configured, for example, by a higher layer parameter for the DL BWP (e.g., active-BWP-DL-SCell), and/or by a higher layer parameter for the UL BWP on the SCell or secondary cell (e.g., active-BWP-UL-SCell).

A wireless device may transmit uplink control information (UCI) via one or more PUCCH resources to a base station. The wireless device may transmit the one or more UCI, for example, as part of a DRX operation. The one or more UCI may comprise at least one of: HARQ-ACK information; scheduling request (SR); and/or CSI report. A PUCCH resource may be identified by at least: frequency location (e.g., starting PRB); and/or a PUCCH format associated with initial cyclic shift of a base sequence and time domain location (e.g., starting symbol index). A PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH formats 1, 2, 3, and/or 4 may comprise any other quantity of OFDM symbols and/or any other quantity of bits. The PUCCH resource may be configured on a PCell, or a PUCCH secondary cell.

A base station may transmit to a wireless device (e.g., if the wireless device is configured with multiple uplink BWPs), one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

A wireless device may select (e.g., if the wireless device is configured with multiple uplink BWPs) one of the one or more PUCCH resource sets based on a total bit length of UCI information bits (e.g., HARQ-ARQ bits, SR, and/or CSI) the wireless device will transmit. The wireless device may select a first PUCCH resource set (e.g., with the PUCCH resource set index equal to 0, or any other PUCCH resource set index), for example, if the total bit length of UCI information bits is less than or equal to 2 bits (or any other quantity of bits). The wireless device may select a second PUCCH resource set (e.g., with a PUCCH resource set index equal to 1), for example, if the total bit length of UCI information bits is greater than 2 (or any other quantity of bits) and less than or equal to a first configured value. The wireless device may select a third PUCCH resource set (e.g., with a PUCCH resource set index equal to 2), for example, if the total bit length of UCI information bits is greater than the first configured value and less than or equal to a second configured value. The wireless device may select a fourth PUCCH resource set (e.g., with a PUCCH resource set index equal to 3), for example, if the total bit length of UCI information bits is greater than the second configured value and less than or equal to a third value.

A wireless device may determine, for example, based on a quantity of uplink symbols of UCI transmission and a quantity of UCI bits, a PUCCH format from a plurality of PUCCH formats comprising PUCCH format 0, PUCCH format 1, PUCCH format 2, PUCCH format 3 and/or PUCCH format 4. The wireless device may transmit UCI in a PUCCH using PUCCH format 0, for example, if the transmission is during, greater than, or over 1 symbol or 2 symbols and/or the quantity of HARQ-ACK information bits with positive or negative SR (HARQ-ACK/SR bits) is 1 or 2. The wireless device may transmit UCI in a PUCCH using PUCCH format 1, for example, if the transmission is during, greater than, or over 4 or more symbols and the number of HARQ-ACK/SR bits is 1 or 2. The wireless device may transmit UCI in a PUCCH using PUCCH format 2, for example, if the transmission is during, greater than, or over 1 symbol or 2 symbols and the number of UCI bits is more than 2. The wireless device may transmit UCI in a PUCCH using PUCCH format 3, for example, if the transmission is during, greater than, or over 4 or more symbols, the quantity of UCI bits is more than 2 and a PUCCH resource does not include an orthogonal cover code. The wireless device may transmit UCI in a PUCCH using PUCCH format 4, for example, if the transmission is during, greater than, or over 4 or more symbols, the quantity of UCI bits is more than 2 and the PUCCH resource includes an orthogonal cover code.

A wireless device may determine a PUCCH resource from a PUCCH resource set, for example, to transmit HARQ-ACK information on the PUCCH resource. The PUCCH resource set may be determined as described herein. The wireless device may determine the PUCCH resource based on a PUCCH resource indicator field in DCI (e.g., with a DCI format 1_0 or DCI for 1_1) received on a PDCCH. A PUCCH resource indicator field in the DCI may indicate one of eight PUCCH resources in the PUCCH resource set. The wireless device may transmit the HARQ-ACK information in a PUCCH resource indicated by the PUCCH resource indicator field in the DCI. The PUCCH resource indicator field may be 3-bits (e.g., or any other quantity of bits) in length.

The wireless device may transmit one or more UCI bits via a PUCCH resource of an active uplink BWP of a PCell or a PUCCH secondary cell. The PUCCH resource indicated in the DCI may be a PUCCH resource on the active uplink BWP of the cell, for example, if at most one active UL BWP in a cell is supported for a wireless device.

AA wireless device may perform various operations to improve wireless device power consumption efficiency and/or increase battery lifetime. Wireless devices may save power in a variety of ways, including, for example, by not transmitting/receiving via one or more channel resources, turning off antennas, turning off receiving modules, etc. For example, a wireless device may monitor channels and/or receive signals discontinuously, in time, using DRX operation.

A wireless device may discontinuously monitor downlink control channel (e.g., PDCCH or enhanced EPDCCH)) during DRX operation. A base station may configure DRX operation (e.g., via RRC configuration messages) with a set of DRX parameters. The set of DRX parameters may be selected based on an application type such that the wireless device may reduce power and resource consumption. A wireless device may receive data packets with an extended delay, for example, if DRX is configured/activated, The delay may be because the wireless device may be in DRX sleep/OFF state at the time of data arrival at the wireless device and the base station may have to wait until the wireless device transitions to the DRX ON state.

The wireless device may power down most of its circuitry if there are no packets to be received, for example, if the wireless device is operating in a DRX mode. The wireless device may monitor PDCCH discontinuously in the DRX mode. The wireless device may monitor the PDCCH continuously if a DRX operation is not configured. The wireless device may listen to/monitor downlink (DL) channels (e.g., PDCCHs), for example, if a DRX operation is not configured or if the wireless device is in a DRX active state. A wireless device may not listen to/monitor DL channels (e.g., PDCCHs), for example, if a wireless device is in DRX mode of operation and in a DRX sleep state.

A base station may send/transmit an RRC message comprising one or more DRX parameters of a DRX cycle. The one or more parameters may comprise a first parameter and/or a second parameter. The first parameter may indicate a first time value of the DRX active state (e.g., DRX ON duration) of the DRX cycle. The second parameter may indicate a second time value of the DRX sleep state (e.g., DRX OFF duration) of the DRX cycle. The one or more parameters may further comprise a time duration of the DRX cycle. The wireless device may monitor PDCCHs for detecting one or more DCIs on a serving cell, for example, if the wireless device is in a DRX active state. The wireless device may stop monitoring PDCCHs on the serving cell, for example, if the wireless device is in a DRX sleep state. The wireless device, in a DRX active state, may monitor all PDCCHs on (or for) multiple cells, for example, if multiple cells are in active state. The wireless device may stop monitoring all PDCCHs on (or for) the multiple cells, for example, during the DRX OFF duration. The wireless device may repeat the DRX operations according to the one or more DRX parameters.

DRX may be beneficial for the base station. The wireless device may be sending/transmitting periodic CSI reports and/or SRSs frequently (e.g., based on the configuration), for example, if DRX is not configured. The wireless device may not transmit periodic CSI and/or SRS in DRX OFF periods. The base station may assign these resources to the other wireless devices, for example, to improve resource utilization efficiency.

A wireless device (e.g., a MAC entity of the wireless device) may be configured (e.g., by RRC messaging) with a DRX functionality. The DRX functionality may control the wireless device's downlink control channel (e.g., PDCCH) monitoring activity for a plurality of RNTIs. The plurality of RNTIs may comprise at least one of: C-RNTI, CS-RNTI, INT-RNTI, SP-CSI-RNTI, SFI-RNTI, TPC-PUCCH-RNTI, TPC-PUSCH-RNTI, Semi-Persistent Scheduling C-RNTI, eIMTA-RNTI, SL-RNTI, SL-V-RNTI, CC-RNTI, and/or SRS-TPC-RNTI. The wireless device may monitor the PDCCH discontinuously using the DRX operation, for example, if the wireless device is in an RRC connected state (e.g., RRC_CONNECTED) and if DRX operation is configured. The wireless device may monitor the PDCCH continuously, for example, if DRX operation is not configured.

RRC messaging may control DRX operation by configuring a plurality of timers. The plurality of timers may comprise: a DRX ON duration timer (e.g., drx-onDuration Timer), a DRX inactivity timer (e.g., drx-InactivityTimer), a downlink DRX HARQ RTT timer (e.g., drx-HARQ-RTT-TimerDL), an uplink DRX HARQ RTT timer (e.g., drx-HARQ-RTT-TimerUL), a downlink retransmission timer (e.g., drx-RetransmissionTimerDL), an uplink retransmission timer (e.g., drx-RetransmissionTimerUL). RRC messaging may configure one or more parameters of a short DRX configuration (e.g., drx-ShortCycle and/or drx-Short-CycleTimer)), and/or one or more parameters of a long DRX configuration (e.g., drx-LongCycle). Time granularity for DRX timers may be configured in terms of PDCCH subframes (e.g., indicated as psf in the DRX configurations), or in terms of milliseconds (or in any other units of time). The active time (e.g., time period in which the wireless device is in DRX active state) may comprise the time period in which at least one timer is running, for example, if a DRX cycle is configured. The at least one timer may comprise one or more of a DRX ON duration timer (e.g., drx-onDuration-Timer), a DRX inactivity timer (e.g., drx-InactivityTimer), a downlink retransmission timer (e.g., drx-Retransmission-TimerDL), an uplink retransmission timer (e.g., drx-RetransmissionTimerUL), and/or a MAC contention resolution timer (e.g., mac-ContentionResolutionTimer).

The DRX inactivity timer (e.g., drx-Inactivity-Timer) may specify a time duration for which the wireless device may be active, for example, based on/after successfully decoding a PDCCH indicating a new transmission (UL or DL or sidelink (SL)). The DRX inactivity timer may be restarted upon receiving a PDCCH transmission for (e.g., corresponding to, or indicating) a new transmission (UL or DL or SL). The wireless device may transition to a DRX mode (e.g., using a short DRX cycle or a long DRX cycle), for example, based on/in response to the expiry of the DRX inactivity timer.

Short DRX (e.g., configured by parameter drx-Short-Cycle) may be a first type of DRX cycle (e.g., if configured) that may be used, for example, based on (e.g., when) the wireless device enters DRX mode. An information element (IE) (e.g., DRX-Config IE) may indicate the length of the short cycle. A DRX short cycle timer (e.g., drx-ShortCy-cleTimer) may be expressed as multiples of a short DRX cycle (e.g., shortDRX-Cycle). The timer may indicate a quantity of initial short DRX cycles to follow before entering the long DRX cycle.

A DRX ON duration timer (e.g., drx-onDurationTimer) may specify the time duration at the beginning of a DRX Cycle (e.g., DRX ON). DRX ON duration timer may indicate the time duration before entering the sleep mode (DRX OFF). A downlink DRX HARQ RTT timer (e.g., drx-HARQ-RTT-TimerDL) may specify a minimum duration from a time at which a new transmission is received and before the wireless device may expect a retransmission of a same packet. This timer may be fixed and may not be configured by RRC. A downlink retransmission timer (e.g., drx-RetransmissionTimerDL) may indicate a maximum duration for which a wireless device may monitor a PDCCH for a retransmission from a base station (e.g., eNodeB).

The active Time may comprise the time in which a scheduling request is sent via a PUCCH and is pending, for example, if the DRX cycle is configured. The active time may comprise the time in which an uplink grant for a pending HARQ retransmission may occur and there is data in the corresponding HARQ buffer for synchronous HARQ process, for example, if the DRX cycle is configured. The active time may comprise the time in which a PDCCH transmission indicating a new transmission addressed to the C-RNTI of the MAC entity has not been received after successful reception of a random access response for the preamble not selected by the MAC entity, for example, if the DRX cycle is configured.

DRX may be configured for a wireless device. A DL HARQ RTT timer may expire in a subframe/slot and the data of the corresponding HARQ process may not be successfully decoded. The wireless device may start the downlink retransmission timer (e.g., drx-RetransmissionTimerDL) for the corresponding HARQ process, for example, if the DL HARQ RTT timer expires in a subframe/slot and the data of the corresponding HARQ process is not successfully decoded.

An UL HARQ RTT timer may expire in a subframe/slot. The wireless device may start the uplink retransmission timer (e.g., drx-RetransmissionTimerUL) for the corresponding HARQ process, for example, if the UL HARQ RTT timer expires.

A DRX command MAC control element or a long DRX command MAC control element may be received (e.g., by the wireless device). The wireless device may stop the DRX ON duration timer (e.g., drx-onDurationTimer) and stop the DRX inactivity timer (e.g., drx-InactivityTimer), for example, if the wireless device receives a DRX command MAC control element or a long DRX command MAC control element.

The DRX inactivity timer (e.g., drx-InactivityTimer) may expire or a DRX command MAC control element may be received in a subframe. The wireless device, configured with a short DRX cycle, may start or restart the DRX short cycle timer (e.g., drx-ShortCycleTimer) and may use the short DRX cycle, for example, if the DRX inactivity timer expires or if the DRX command MAC control element is received. Otherwise, the wireless device may use the long DRX cycle.

The DRX short cycle timer (e.g., drx-ShortCycleTimer) may expire in a subframe. The wireless device may use the long DRX cycle, for example, if the DRX short cycle timer expires in the subframe. The wireless device may receive a long DRX command MAC control element may be received. The wireless device may stop the DRX short cycle timer (e.g., drx-ShortCycleTimer) and/or may use the long DRX cycle, for example, if the wireless device receives a long DRX command MAC control element.

The wireless device may start the DRX ON duration timer (e.g., drx-onDurationTimer), for example, if the short DRX Cycle is used and if [(SFN*10)+subframe number] modulo (drx-ShortCycle)=(drxStartOffset) modulo (drx-ShortCycle). The wireless device may start the DRX ON duration timer (e.g., drx-onDurationTimer), for example, if the long DRX Cycle is used and [(SFN*10)+subframe number] modulo (drx-longCycle)=drxStartOffset.

A wireless device may be served by a plurality of cells (e.g., a primary cell and one or more secondary cells). A base station may send control signals (e.g., PDCCH transmissions) to the wireless device to schedule downlink/uplink transmissions. Each cell may be associated with one or more common search spaces and/or one or more wireless-device specific search spaces. The wireless device may monitor the search spaces to receive control signals (e.g., DCI) from the base station. For example, the common search spaces may be monitored for receiving control information associated with SIB transmissions, random access processes, RRC reconfiguration, etc. The common search spaces may be monitored for receiving group-common DCI (e.g., comprising slot format indicator, transmission power control information (TPC), pre-emption indication, etc.). The wireless device-specific search spaces may be monitored for receiving control information associated with dedicated data scheduling (e.g., downlink/uplink grants).

Uplink/downlink transmissions on a cell may be scheduled via the same cell (e.g., self-carrier scheduling) or via a different cell (e.g., cross-carrier scheduling). For example, uplink/downlink transmissions may be scheduled on a cell based on control signals sent via control channels associated with the cell (e.g., self-carrier scheduling) and/or based on control signals sent via control channels associated with a different cell (e.g., cross-carrier scheduling), also known as a scheduling cell.

Cross-carrier scheduling of a cell may enable reduced resource utilization on the cell. For example, the cell may be associated with resources that may be shared by different types of communications (e.g., associated with a fourth generation communications standard, such as LTE; a fifth generation standard, such as NR or NR-unlicensed; a 6th generation standard; or any $n^{th}$ generation standard). A scheduling cell may be associated with a communication type that enables increased channel capacity (e.g., a fifth generation standard operating at higher frequencies). Scheduling resources on the cell based on control signaling sent via the scheduling cell (e.g., cross-carrier scheduling) may reduce resource utilization and improve reliability at the cell. As further described herein, cross-carrier scheduling for the cell may lead to issues for certain wireless communication procedures (e.g., random access procedures used for initial access and beam failure recovery, fallback DCI transmission, etc.).

A base station may configure one or more parameters for a cross-carrier scheduling for a first cell. The one or more parameters may comprise a scheduling cell indicator/index. A wireless device may activate the cross-carrier scheduling for the first cell, for example, based on (e.g., in response to) receiving the one or more parameters for the cross-carrier scheduling. The scheduling cell may indicate (and/or may be used for scheduling) one or more control messages (e.g., DCIs) comprising resource assignments for the first cell. The wireless device may not monitor any search space via the first cell, for example, if the first cell is configured with cross-carrier scheduling. The wireless device may not monitor any CORESET on the first cell, for example, if cross-carrier scheduling is enabled.

Disabling monitoring any CORESET on a primary cell, configured with cross-carrier scheduling, may lead to an inefficient initial access procedure (e.g., a random access procedure). The base station may configure resources (e.g., PRACH resources) in an initial UL BWP of the primary cell. The base station may send an RAR based on receiving a PRACH transmission. The base station may configure one or more search spaces, in an initial DL BWP of the primary cell, for RAR reception. The base station may configure one or more second search spaces, on a scheduling cell for the primary cell, for RAR reception, for example, if cross-carrier scheduling is enabled for the primary cell. RAR may be multiplexed among a plurality of wireless devices, wherein a first wireless device of the plurality of the wireless devices may operate using self-carrier scheduling of the primary cell and a second wireless device of the plurality of wireless devices may operate using cross-carrier scheduling for the primary cell. The base station may determine to or need to send first DCI via the primary cell, and second DCI via the scheduling cell, as the base station may not know whether the first wireless device and/or the second wireless device may have sent the PRACH transmission. Sending DCIs via both the primary cell and the scheduling cell may be inefficient and/or may result in increased resource utilization.

A wireless device may monitor one or more search spaces of a scheduling cell for receiving downlink/uplink scheduling. The wireless device may monitor one or more search spaces of a scheduling cell for receiving downlink/uplink scheduling, for example, DCIs, for example, if the wireless device is configured with cross-carrier scheduling for a cell (e.g., different from the scheduling cell). The wireless device may trigger a random access procedure for the cell (e.g., for a beam failure recovery of the wireless device for a beam failure detected on the cell). The wireless device may receive a RAR (e.g., Msg 2 1312 as described with reference to FIG. 13A, or Msg 2 1322 as described with reference to FIG. 13B) via a scheduling cell different from the cell. The wireless device may determine a new beam based on the received RAR. The wireless device may not be able to accurately determine the new beam, for example, if the wireless device receives the RAR via the scheduling cell for a random access procedure triggered for the cell. The new beam may not be a best beam for the wireless device because the wireless device may have detected the beam failure on the cell and the new beam may be associated with an RAR received via the scheduling cell.

A base station may send/transmit, via a common search space, fallback DCI scheduling data for RRC reconfiguration (e.g., for reconfiguring a scheduling cell for a primary cell). The base station may send/transmit the fallback DCI via a scheduling cell, for example, if cross-carrier scheduling is configured for the primary cell. The base station may transmit the fallback DCI via the scheduling cell, where a link quality of the scheduling cell may be poor. The wireless device may perform a radio link monitoring for the primary cell and may not perform a radio link monitoring for the scheduling cell. The base station may not be aware of the link quality of the scheduling cell (e.g., which may have poor radio link quality) and/or the base station may not be able to successfully transmit (and/or the wireless device may not successfully receive) the fallback DCI. The wireless device may not trigger a radio link failure if the link quality of the primary cell is good. Not triggering a radio link failure may lead to failure of RRC reconfiguration and/or increase a latency in RRC reconfiguration.

A wireless device may monitor one or more search spaces of a first scheduling cell for receiving downlink/uplink scheduling DCIs, for example, if the wireless device is configured with cross-carrier scheduling for a primary cell (e.g., different from the first scheduling cell). Cross-carrier scheduling may need to be reconfigured to a second scheduling cell, for example, if channel conditions associated with the first scheduling cell are poor. Poor channel conditions at the first scheduling cell, for example, during a time period at which the reconfiguration occurs, may result in the base station being unable to efficiently schedule transmissions via the primary cell.

A wireless device may need additional capabilities to support monitoring one or more common search spaces of a secondary cell for scheduling data (e.g., RAR messages, SIB messages, and/or RRC messages messages) for a primary cell. The secondary cell may be a scheduling cell for the primary cell for cross-carrier scheduling. Cross-carrier scheduling for the primary cell may result in increased complexity at the wireless device in such scenarios. Described herein are example enhancements for supporting cross-carrier scheduling.

A wireless device may be configured with cross-carrier scheduling for a primary cell. The wireless device may be configured with self-carrier scheduling for the primary cell. The wireless device may use self-carrier scheduling and/or cross-carrier scheduling for the primary cell, for example, based on one or more considerations as described herein.

A wireless device may use self-carrier scheduling for one or more first search spaces in a BWP of a first cell. The wireless device may use cross-carrier scheduling for one or more second search spaces of the BWP of the first cell. The one or more first search spaces may be cell-specific/common search spaces which may be shared among a plurality of wireless devices. The one or more first search spaces may be configured via one or more SIB messages, MIB messages, and/or RRC messages. The one or more second search spaces may be wireless device-specific (e.g., UE-specific) search spaces which may be dedicated to the wireless device. The one or more second search spaces may be configured via one or more RRC messages. The wireless device may maintain performance metrics for receiving one or more broadcast messages (e.g., RARs, SIBs, paging messages) and may increase control channel capacity for receiving one or more unicast messages, for example, by allowing mixed self-carrier and cross-carrier scheduling among a plurality of search spaces for a primary cell.

A base station may configure cross-carrier scheduling for a primary cell. Cross-carrier scheduling for the primary cell may increase capacity of control channels if a scheduling cell for the cross-carrier scheduling has more available resources (e.g., operates at a higher frequency band). The wireless device may maintain one or more common search spaces via self-carrier scheduling on the primary cell. The wireless device may maintain one or more wireless device-specific search spaces via cross-carrier scheduling on the scheduling cell. Maintaining one or more common search spaces via self-carrier scheduling on the primary cell may allow the wireless device to receive control signals (e.g., DCIs) scheduling messages associated with certain procedures (e.g., RAR corresponding to a PRACH transmission, as triggered based on a beam failure recovery, an initial access procedure, etc.) on the primary cell. A base station need not configure PRACH resources in the scheduling cell, thereby reducing channel usage. Scheduling RARs, associated with a beam failure recovery procedure on the primary cell, via the primary cell may enable successful beam failure recovery for beam failures detected on the primary cell. Scheduling RARs associated with an initial access procedure only via the primary cell may enable the base station to skip transmission of RARs via the scheduling cell, reducing channel utilization on the scheduling cell. Various examples described herein may reduce complexity of the wireless device and enable a random access procedure to be used for a beam failure recovery procedure. The wireless device may determine that a candidate beam used in a preamble is confirmed by DCI scheduling the RAR, for example, based on receiving the DCI. The wireless device may determine that the beam failure recovery procedure is completed based on the confirming the candidate beam. Maintaining common search spaces via self-carrier scheduling on the primary cell and wireless device-specific search spaces via cross-carrier scheduling on the scheduling cell may allow efficient fallback mechanisms between the base station and the wireless device, for example, if the wireless device experiences poor link quality in the scheduling cell or the scheduling cell experiences a beam failure.

The wireless device may use self-carrier scheduling for a primary cell, for example, if an active BWP is an initial BWP. The wireless device may be able to fallback to a reliable operation of the self-carrier scheduling by disabling the cross-carrier scheduling of the initial BWP. The wireless device may use self-carrier scheduling, for example, if a scheduling cell of the primary cell is not active. The wireless device may use self-carrier scheduling, for example, if the wireless device switches to the initial BWP to trigger a PRACH transmission.

Various examples described herein may enable efficient handling of common search spaces and/or improved control channel capacity of wireless device-specific search spaces for a primary cell. Flexible configuration of mixed self-carrier and cross-carrier scheduling may be provided. A fallback operation of self-carrier scheduling for the primary cell may be provided, for example, wherein the wireless device may switch back to the self-carrier scheduling (e.g., if an active BWP is an initial BWP).

A base station may configure a wireless device with cross-carrier scheduling for a first cell. The base station may configure a second cell to be a scheduling cell for the first cell. The wireless device may apply cross-carrier scheduling for the first cell, for example, based on the cross-carrier scheduling configuration. The base station may configure a plurality of BWPs for the first cell. The plurality of BWPs may comprise an initial BWP and a BWP. The plurality of BWPs may comprise a default BWP. The plurality of BWPs may comprise a dormant BWP. The plurality of BWPs may comprise a power-saving BWP.

Cross-carrier scheduling may be configured as a cell-level configuration parameter. The cross-carrier scheduling may be applied for each BWP of the plurality of BWPs of the first cell, for example, if the first cell is configured with cross-carrier scheduling. The wireless device may apply cross-carrier scheduling to an active BWP of the first cell, regardless of which BWP, among the plurality of BWPs, is the active BWP. Applying cross-carrier scheduling for each of the plurality of BWPs of the first cell may lead to inefficiencies (e.g., performance degradation, higher power consumption, etc.) in at least certain scenarios. A first BWP of the plurality of BWPs of the first cell may be a default BWP or an initial BWP or may have a small bandwidth for power saving mode operation. A second BWP of the plurality of BWPs of the first cell may have a large/full bandwidth for active traffic. Enabling cross-carrier scheduling for the second BWP may be advantageous for increasing control signaling capability and reducing overhead at the first cell. However, enabling cross-carrier scheduling for the first BWP may be inefficient (e.g., may increase power consumption). For example, an active BWP of the scheduling cell may have a large/full bandwidth, and a search space of the active BWP of the scheduling cell may have large quantity of control channel candidates. The wireless device may consume more power to monitor a large number/quantity of control channel candidates for the first cell, even though the first cell may be in power saving state and the first BWP may have a small bandwidth.

Applying cross-carrier scheduling for each of the plurality of BWPs of the first cell may impose restrictions on transitioning of cells (e.g., from an active state to a dormant state). For example, the base station may be triggered to transition the second cell (e.g., a scheduling cell) to a dormant state and transition to the default BWP, of the first cell, with low traffic for the wireless device. The base station may not be able to transition the second cell to the dormant state, for example, if cross-carrier scheduling is enabled for the first cell (e.g., and the default BWP of the first cell).

Applying cross-carrier scheduling for each of the plurality of BWPs of the first cell may not account for variations in channel qualities among the plurality of BWPs. Better efficiency of scheduling may be achieved based on self-carrier scheduling or cross-carrier scheduling, for example, if BWPs are individually configured with self-carrier scheduling and cross-carrier scheduling based on channel qualities. For example, self-carrier scheduling of a BWP may be beneficial, for example, if a channel quality of the second cell is low. Cross-carrier scheduling of a BWP may be beneficial, for example, if a channel quality of the second cell is high.

Various examples described herein may configure self-carrier scheduling or cross-carrier scheduling on a per-BWP basis for BWPs of a cell. A base station may configure self-carrier scheduling or a cross-carrier scheduling for each BWP of one or more BWPs of a cell. The base station may configure one or more parameters of cross-carrier scheduling via cell-level configuration (e.g., using higher layer parameter CrossCarrierScheduling). The base station may further indicate/configure, for each BWP of the one or more BWPs, self-carrier scheduling or the cross-carrier scheduling. Self-carrier scheduling or cross-carrier scheduling for each BWP may be implicitly or explicitly indicated.

The base station may indicate self-carrier scheduling or cross-carrier scheduling for each BWP based on configuration of one or more CORESETs. The base station may not configure one or more first CORESETs, associated with one or more search spaces of the cell, for a first BWP of the cell, for example, to enable cross-carrier scheduling for the first BWP. The base station may configure one or more second CORESETs, associated with the one or more search spaces of the cell, for a second BWP of the cell, for example, to enable self-carrier scheduling for the second BWP. The one or more search spaces may be wireless device-specific search spaces. The base station may indicate self-carrier scheduling or cross-carrier scheduling for each BWP based on explicit indication. The wireless device may determine (e.g., based on CORESET configuration or based on explicit indication), self-carrier scheduling for one or more BWPs (e.g., dormant BWP, initial BWP, default BWP). The wireless device may determine (e.g., based on CORESET configuration or based on explicit indication) cross-carrier scheduling for one or more other BWPs (e.g., non-dormant BWP, non-initial BWP, non-default BWP).

A base station may configure one or more first BWPs of a first cell. The one or more first BWPs may be configured/indicated with self-carrier scheduling by the first cell. The base station may configure one or more second BWPs of the first cell. The one or more second BWPs may be configured/indicated with a cross-carrier scheduling by a second cell. The base station may enable cross-carrier scheduling by the first cell, for example, based on indicating switching of an active BWP of the first cell from a first BWP of the one or more first BWPs to a second BWP of the one or more second BWPs. The base station may disable cross-carrier scheduling and/or switch to the self-carrier scheduling, for example, based on indicating switching of the active BWP of the first cell from the second BWP of the one or more second BWPs to the first BWP of the one or more first BWPs. The base station may be able to dynamically enable or disable cross-carrier scheduling for the first cell based on BWP switching framework. Dynamically enabling and disabling of cross-carrier scheduling based on BWP switching framework is advantageous if applied for a primary cell of a cell group or a PUCCH group, where reliability and control channel performance are continuously measured (e.g., radio link monitoring for checking live connection with the base station) to handle wireless device mobility. Dynamically enabling and disabling of cross-carrier scheduling based on BWP switching framework may reduce overhead associated with enabling or disabling cross-carrier scheduling.

A wireless device may support up to K BWPs for a cell and M search spaces for the cell (e.g., K=4, or any other quantity, and M=20, or any other quantity). Using BWP switching for enabling/disabling cross-carrier scheduling for the cell, as described above, may encounter limitations if a quantity of BWPs is high. The wireless device may be configured with an initial BWP and a default BWP on a primary cell of a cell group. The wireless device may need to support different scheduling options (e.g., self-carrier scheduling and cross-carrier scheduling) based on the remaining quantity BWPs (e.g., K−2 BWPs). A quantity of BWPs K may need to may need to be increased to support the different scheduling options. A signaling overhead (e.g., a quantity of bits required in DCI) to indicate BWP switching may increase, for example, if a quantity of BWPs is increased. For example, the quantity of bits in DCI to indicate BWP switching may be log 2(K).

Various examples described herein enable signaling of BWPs (e.g., for BWP switching) with reduced overhead even if a quantity of BWPs is increased to accommodate different types of scheduling configurations. A base station may configure a first BWP group for a first cell. The first BWP group may comprise one or more first BWPs configured/associated with self-carrier scheduling. The base station may configure a second BWP group for the first cell. The second BWP group may comprise one or more second BWPs configured/associated with cross-carrier scheduling by a second cell. The base station may switch, based on BWP switching DCI, from a first BWP within a group to a second BWP within the same group. A quantity of bits in DCI for BWP switching may be limited to a quantity of BWPs of the group. The base station and the wireless device may switch between the first BWP group and the second BWP group based on one or more rules and/or one or more indications. For example, the wireless device may switch to the second BWP group, for example, based on/in response to receiving an activation of the second cell. The base station may send/transmit a DCI field indicating the first BWP group or the second BWP group for the first cell. The DCI may be scheduling DCI or dedicated non-scheduling DCI.

Various examples described herein may allow dynamic enabling/disabling of cross-carrier scheduling for a cell with a low overhead (e.g., DCI overhead, wireless device capability, and/or the like). Flexibility of scheduling for a cell may be provided, for example, with a base station utilizing different scheduling mechanisms or a different set of search spaces based on an active BWP of the cell.

A wireless device may receive (e.g., from a base station) one or more system information blocks (SIBs) for a cell via one or more search spaces (e.g., search space #0 and/or a search space #1) of the cell. The wireless device may receive one or more DCIs comprising resource assignments for scheduling PDSCH transmissions. The PDSCH transmissions may comprise the one or more SIBs.

The wireless device may send a PRACH transmission for accessing the cell (e.g., associating with the cell), for example, based on the one or more SIBs of the cell. A base station may send/transmit a RAR, for example, based on/in response to receiving the PRACH transmission. The base station may send/transmit DCI, via a first search space of the cell (e.g., the search space #1 or a search space #2), comprising resource assignments for a PDSCH transmission (e.g., comprising the RAR). The wireless device may send a PUSCH transmission (e.g., Msg 3, similar to Msg 3 1313 as described with reference to FIG. 13A), for example, based on/in response to receiving the RAR. The wireless device may monitor, a second search space of the cell (e.g., the search space #1 or the search space #2), for one or more DCIs scheduling PDSCHs (e.g., comprising Msg 4, similar to Msg 4 1314, and/or RRC configurations). The wireless device may monitor, for the random access procedure, one or more DCIs scheduling downlink/uplink data reception/transmissions via one or more search spaces of the cell that the wireless device attempts to be associated with.

A wireless device may perform a random access procedure initially on an initial DL BWP and/or an initial UL BWP of a cell. The wireless device may monitor the first search space and the second search space of the cell on the initial DL BWP. The initial DL BWP may be an initial active DL BWP. The wireless device may send a PRACH transmission via the initial UL BWP of the cell. The initial UL BWP may be an initial active UL BWP. The wireless device may switch to a DL BWP and/or a UL BWP from the initial DL/UL BWP. The wireless device may switch back to the initial DL/UL BWP of the cell, for example, if the wireless device is not configured with RACH resources in an active DL/UL BWP of the cell.

The wireless device may be associated with a first DL BWP and a first UL BWP as an active DL/UL BWP of the cell. The first DL BWP and the first UL BWP may be the same or different from the initial DL BWP and the initial UL BWP. The base station may configure cross-carrier scheduling for the cell. A wireless device may or may not apply the cross-carrier scheduling, for example, if the active DL BWP is the initial DL BWP of the cell. The wireless device may disable one or more configuration parameters for the cross-carrier scheduling and may switch back to self-carrier scheduling for the cell, for example, if the current active DL BWP is the initial DL BWP. The wireless device may monitor the first search space and/or the second search space of the cell on the initial DL BWP regardless of whether the wireless device is configured with cross-carrier scheduling for the cell or self-carrier scheduling for the cell. The wireless device may monitor the first search space and/or the second search space, for example, only if the wireless device may have sent one or more PRACH transmissions via the cell. A wireless device may be configured with PRACH configurations to support four-step and two-step random access procedures on a cell. The wireless device may monitor one or more search spaces of the cell for one or more DCIs scheduling one or more messages (e.g., response messages for the four-step based PRACH transmission or the two-step based PRACH transmission, based on the type of the selected random access procedure). The wireless device may monitor DCIs for the random access procedure on the cell (e.g., regardless of the type of the selected random access procedure), for example, if a PRACH transmission has been sent via the cell.

A wireless device may monitor one or more first search spaces of a first BWP of a first cell. The wireless device may receive one or more first DCIs, comprising resource assignments for downlink/uplink transmission for the first cell, via the one or more first search spaces. The wireless device may monitor one or more second search spaces of a second BWP of a second cell. The wireless device may receive one or more second DCIs, comprising resource assignments for downlink/uplink transmission for the first cell, via the one or more second search spaces. The one or more first search spaces may comprise one or more common search spaces configured/associated with the first cell. The one or more second search spaces of the second cell may comprise one or more wireless device-specific search spaces configured for cross-carrier scheduling the first cell. The one or more first search spaces may comprise one or more first common search spaces and/or one or more first wireless device-specific search spaces. The one or more second search spaces may comprise one or more second common search spaces and/or one or more second wireless device-specific search spaces.

The one or more first search spaces may comprise a search space for the first cell. The wireless device may monitor the search space for DCIs scheduling paging. The wireless device may monitor the search space for DCIs scheduling a RAR. The wireless device may monitor the search space for DCIs scheduling a message (e.g., Msg 4 and/or a RAR message for a two-step RACH procedure (Msg B), and/or DCIs scheduling PDSCH transmissions comprising RRC (re)configuration messages. The wireless device may monitor the search space for DCIs scheduling SIBs. The wireless device may monitor the search space for fallback DCIs (e.g., DCI transmitted via a PDCCH based on a fallback DCI format such as DCI format 0_0/1_0) scheduling data. The one or more search spaces may comprise a second search space, of the second cell, for scheduling transmissions in the first cell. The wireless device may monitor the second search space of the second cell for non-fallback DCIs (e.g., DCI transmitted via a PDCCH based on a non-fallback DCI format such as DCI format 0_1/1_1) scheduling data for the first cell.

A base station may configure a cell indicator/index corresponding to a search space. The cell indicator/index may indicate a same cell in which the search space is configured or may indicate a cell different from the cell in which the search space is configured. The wireless device may monitor the search space on the cell via self-carrier scheduling, for example, if the same cell is indicated. The wireless device may monitor the search space on the indicated cell, different from the cell, via a cross-carrier scheduling, for example, if the different cell is indicated.

Various examples described herein may allow flexible configuration for a primary cell of a cell group and/or a PUCCH SCell of a cell group. Self-carrier scheduling of such a cell of the cell group (e.g., primary cell of a master cell group, primary cell of a secondary cell group, or PUCCH SCell of a PUCCH cell group) may be beneficial as the primary cell may always active and may be configured to a frequency which shows a good channel quality. Cross-carrier scheduling for the cell may be beneficial as the primary cell may not have sufficient resources for control channel transmissions. A BWP (or any other wireless resource, frequency range, etc.) of the cell may comprise search spaces associated with both self-carrier scheduling and cross-carrier scheduling in order to achieve benefits of both self-carrier and cross-carrier scheduling. The BWP of the cell may comprise one or more first search spaces associated with self-carrier scheduling. The BWP of the cell may also comprise one or more second search spaces associated with the cross-carrier scheduling. Using self-carrier scheduling for one or more common search spaces may improve resource utilization. For example, the base station may send a shared control/data channel transmission via the same cell to a plurality of wireless devices. The base station may maintain one or more first frequencies as candidate cells for a primary cell for a wireless device. The base station may maintain one or more second frequencies as candidate cells for a second cell for the wireless device. The base station may not send/transmit SIBs/RARs via the one or more second frequencies as the one or more second frequencies may be used as the secondary cells. It may be beneficial to keep common search spaces of a primary cell on the primary cell (e.g., use self-carrier scheduling), for example, even if a cell from the one or more second frequencies may schedule for the primary cell for the wireless device. Keeping the common search spaces of the primary cell on the primary cell may enable the base station to not be required to additionally transmit control/data via other common search spaces of a scheduling cell.

A wireless device may receive one or more messages. The one or more messages may comprise a MIB, a SIB, and/or RRC messages. The one or more messages may comprise configuration parameters for a first cell. The first cell may be a primary cell of a cell group (e.g., PCell for a first cell group, PSCell for a second cell group, a PUCCH cell for a PUCCH group). The configuration parameters may comprise one or more parameters for cross-carrier scheduling. The one or more parameters for the cross-carrier scheduling may comprise a scheduling cell indicator/index for the first cell, for example, if the cross-carrier scheduling is enabled. The one or more parameters for the cross-carrier scheduling may comprise a carrier index field (CIF) used for the first cell, for example, if the cross-carrier scheduling is enabled. The configuration parameters may comprise a first DL BWP and a second downlink BWP. The first DL BWP may be configured via MIB transmission. The first DL BWP may be a first active DL BWP of the first cell, for example, if the first cell is a secondary cell. The first DL BWP may be a default DL BWP that may be activated/used following an expiration of a BWP inactivity timer of the first cell. The second DL BWP may be different from the first DL BWP. The first DL BWP may be a dormant BWP. The second DL BWP may be a non-dormant BWP. The second DL BWP may not be the initial DL BWP. The second DL BWP may not be the default DL BWP.

The wireless device may activate the first DL BWP of the first cell as an active DL BWP of the first cell. The wireless device may activate the first DL BWP via an initial access to the first cell. The wireless device may activate the first DL BWP, for example, based on/in response to triggering a PRACH transmission. The wireless device may activate the first DL BWP, for example, based on/in response to an expiration of the BWP inactivity timer of the first cell. The wireless device may activate the first DL BWP based on receiving DCI indicating a BWP switching to the first DL BWP. The wireless device may apply a self-carrier scheduling, for example, based on/in response to the activating the first DL BWP as the active DL BWP. The wireless device may not apply the one or more parameters for the cross-carrier scheduling for the first cell if the active DL BWP is the first DL BWP, or if the active DL BWP is the initial DL BWP of the first cell, or if the active DL BWP is the default DL BWP of the first cell. The wireless device may monitor one or more first search spaces of the first cell for receiving first DCIs comprising resource assignments for the first cell, for example, based on applying the self-carrier scheduling.

The wireless device may receive a command to switch to the second DL BWP as the active DL BWP of the first cell. The command may be DCI indicating the BWP switching. The command may be DCI indicating transitioning to a non-dormant state for the first cell. The command may be DCI indicating waking-up the first cell from a DRX OFF state. The wireless device may apply the one or more parameters for the cross-carrier scheduling for the first cell, for example, based on/in response to receiving the command. The wireless device may monitor one or more second search spaces of the scheduling cell for receiving second DCIs comprising resource assignments for the first cell.

The wireless device may monitor one or more third search spaces of the first cell in addition to the one or more second search spaces of the second cell, for example, if the second DL BWP is the active DL BWP of the first cell. The one or more third search spaces may be cell-specific/common search spaces. The one or more first search spaces may be common search spaces and/or wireless device-specific search spaces. The one or more second search spaces may be wireless device-specific search spaces. The wireless device may apply the cross-carrier scheduling for one or more wireless device-specific search spaces, for example, if the wireless device is configured with the cross-carrier scheduling for the first cell. The wireless device may apply the self-carrier scheduling for the one or more CSSs. The wireless device may continue monitoring one or more CSSs configured for the active DL BWP of the first cell regardless of whether the cross-carrier scheduling of the first cell is activated/configured/initiated.

Figure 21A:
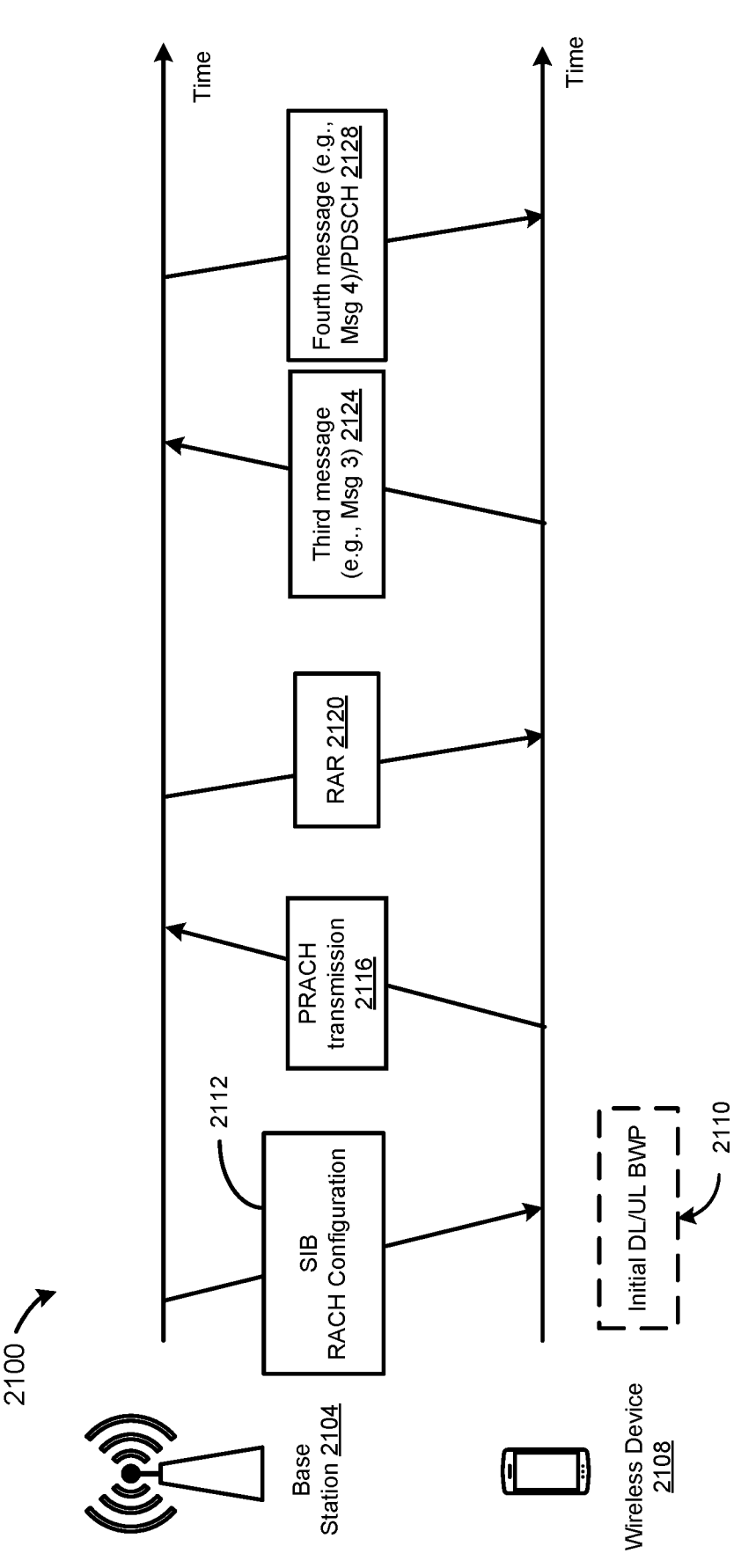
FIG. 21A shows an example random access procedure.
Figure 21B:
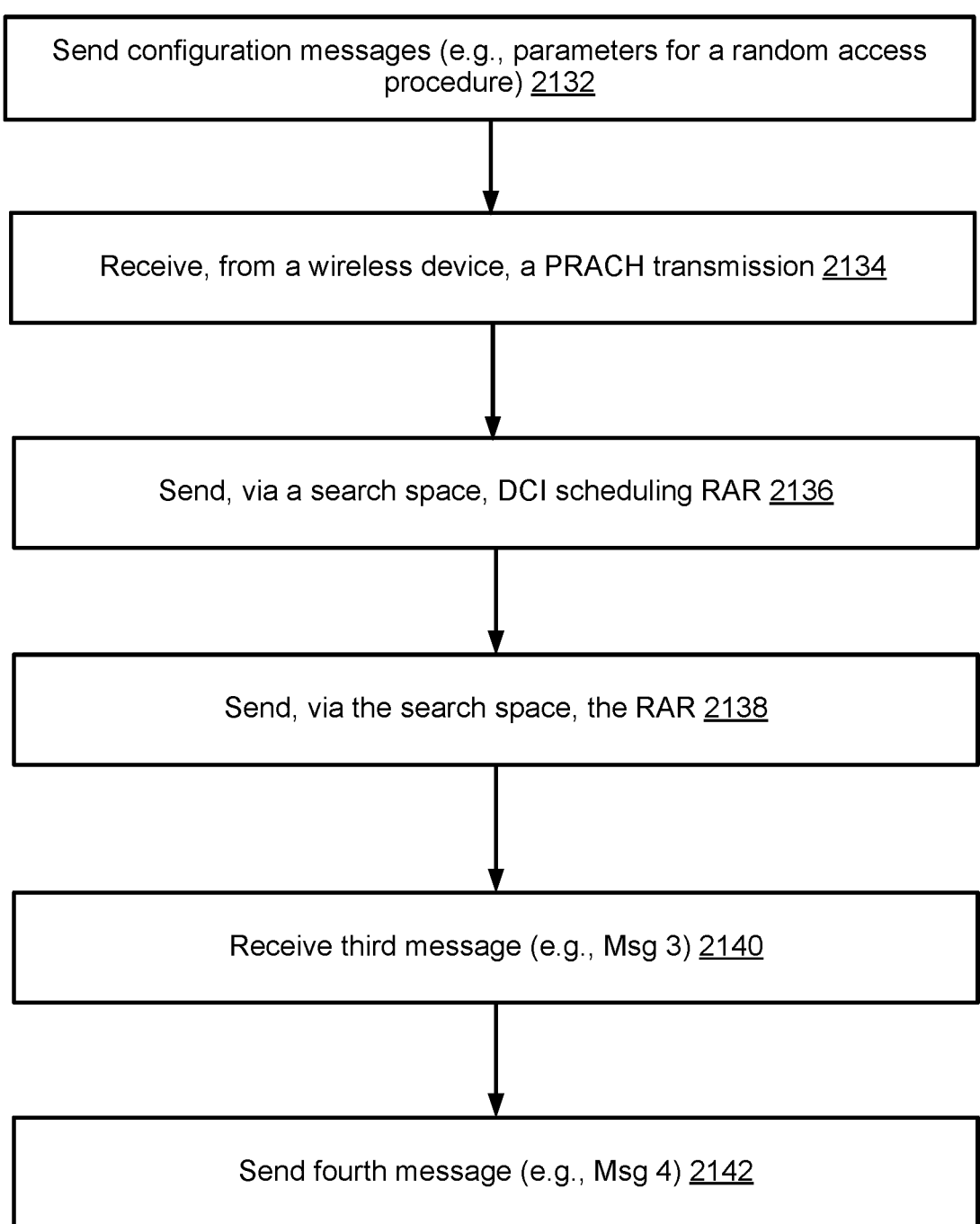
FIG. 21B shows an example method for a random access procedure.
Figure 21C:
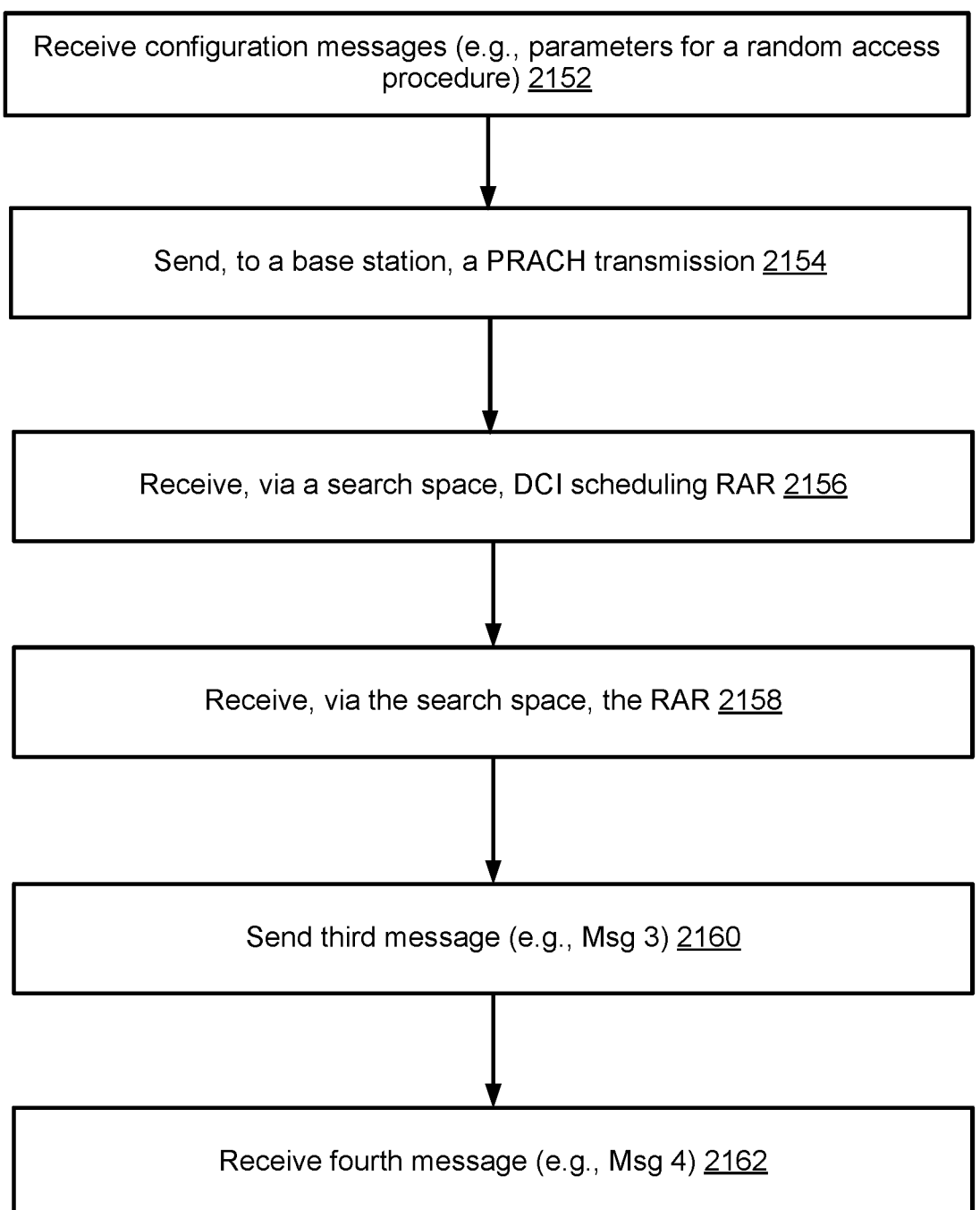
FIG. 21C shows an example method for a random access procedure.

FIG. 21A shows an example random access procedure. The example random access procedure may be a four-step random access procedure (e.g., as described with reference to FIG. 13A) The example random access procedure may be for an initial access procedure. The example random access procedure may be for other communication procedures (e.g., beam failure recovery procedure). FIG. 21B and FIG. 21C show an example method 2130 that may be performed by a base station and an example method 2150 that may be performed by a wireless device, respectively, for the random access procedure. A wireless device 2108 may perform self-carrier scheduling, for example, for the random access procedure. The wireless device 2108 may activate an initial DL BWP and/or an initial UL BWP via the initial access procedure. The wireless device 2108 may send/transmit a preamble (e.g., PRACH transmission) and a third message (e.g., Msg 3 or Msg A) in a two-step random access procedure. A base station 2104 may send/transmit a RAR and a fourth message (e.g., Msg 4 or Msg B) based on (e.g., in response to) the preamble and the third message in the two-step random access procedure.

The base station 2104 may send (e.g., step 2130) one or more configuration messages 2112. The wireless device 2108 may receive (e.g., step 2152), from the base station 2104, the one or more configuration messages 2112. The one or more configuration messages 2112 may comprise one or more SIBs and an MIB for a cell. The wireless device 2108 may determine an initial DL BWP and an initial UL BWP (e.g., initial DL/UP BWP 2110), for example, based on the MIB and the SIBs. The initial DL BWP of the cell may be defined based on a bandwidth and a numerology of CORE-SET #0 (e.g., a CORESET with CORESET index=0) of the cell. The base station 2104 may configure one or more search spaces for the initial DL BWP via the one or more SIBs. The base station 2104 may transmit configuration parameters (e.g., via the one or more SIBs in the one or more messages 2112) for the random access procedure. The one or more configuration parameters may comprise one or more of RACH occasion configurations, a search space (e.g., search space #1) for receiving DCI scheduling a RAR, etc. The search space may be associated with the cell. The wireless device 2108 may determines the initial UL BWP, for example, based on information broadcasted via the one or more SIBs. The initial DL BWP and the initial UL BWP of the cell may be based on a cell-specific configuration. A first wireless device of the cell may share same configurations to a second wireless device of cell, for example, if the cell if a primary cell of the first wireless device and the second wireless device.

The wireless device 2108 may send (e.g., step 2154) a PRACH transmission 2116 to initiate a connection/initial access procedure to the base station 2108. The PRACH transmission 2116 may correspond to a first message (e.g., Msg 1) associated with the four-step random access procedure. The base station 2104 may receive (e.g., step 2134) the PRACH transmission 2116.

The base station 2104 may send (e.g., step 2136), via the search space (e.g., search space #1), first DCI scheduling a second message (e.g., an RAR). The wireless device 2108 may monitor the search space for the first DCI. The wireless device 2108 may receive (e.g., step 2156) the first DCI via the search space. The wireless device 2108 may monitor the search space (e.g., search space #1) for receiving RAR 2120, for example, based on/in response to sending the PRACH transmission 2116 and/or based on the first DCI. The base station 2104 may send (e.g., step 2138), and the wireless device 2108 may receive (e.g., step 2158), the RAR 2120 via the search space. The RAR 2120 may comprise resource allocation for a third message (e.g., Msg 3 2124).

The wireless device 2108 may send (e.g., step 2160) the third message 2124 (e.g., Msg 3), for example, based on receiving the RAR 2120. The base station 2104 may receive (e.g., step 2140) the third message 2124. The third message 3 2124 may be used for contention resolution among different wireless devices. The base station 2104 may send/transmit (e.g., step 2142) a fourth message 2128 (e.g., Msg 4), for example, based on receiving the third message 2124. The fourth message 4 2128 may comprise one or more of contention resolution message, RRC configuration parameters, and/or RRC configuration messages. The fourth message 2128 may be sent via a PDSCH. The wireless device 2108 may receive, via the search space used for scheduling for the RAR 2120 (e.g., search space #1) or a second search space (e.g., search space #2), second DCI scheduling the fourth message 2128. The wireless device 2108 may receive the second DCI, for example, via a search space different from the search space used for receiving the first DCI. The wireless device 2108 may receive the second DCI via search space 2 and may receive the first DCI via search space 1. The wireless device 2108 may connect to the base station 2104, for example, based on receiving (e.g., step 2162) the fourth message 2128.

Figure 21D:
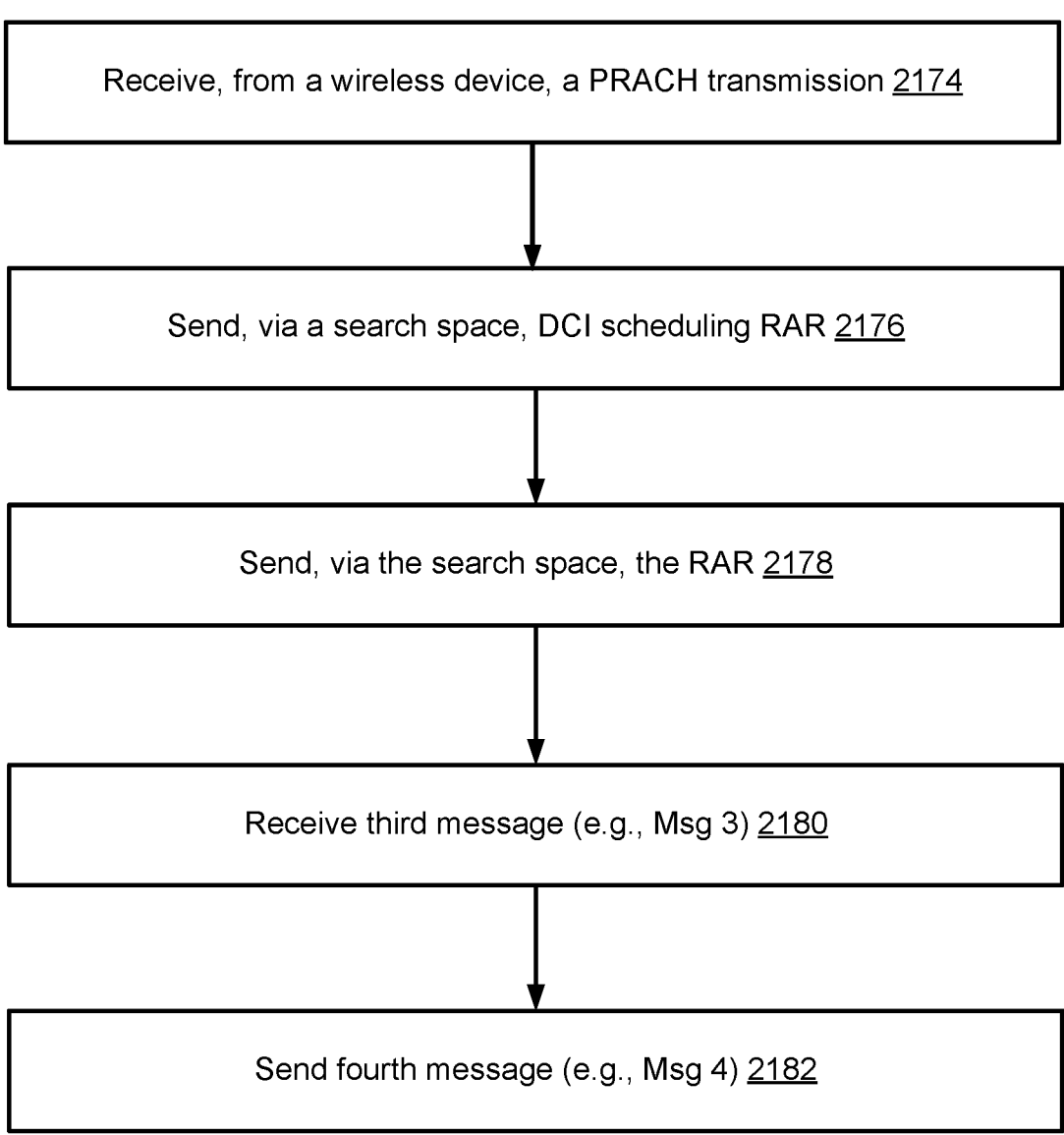
FIG. 21D shows an example method for a random access procedure.
Figure 21E:
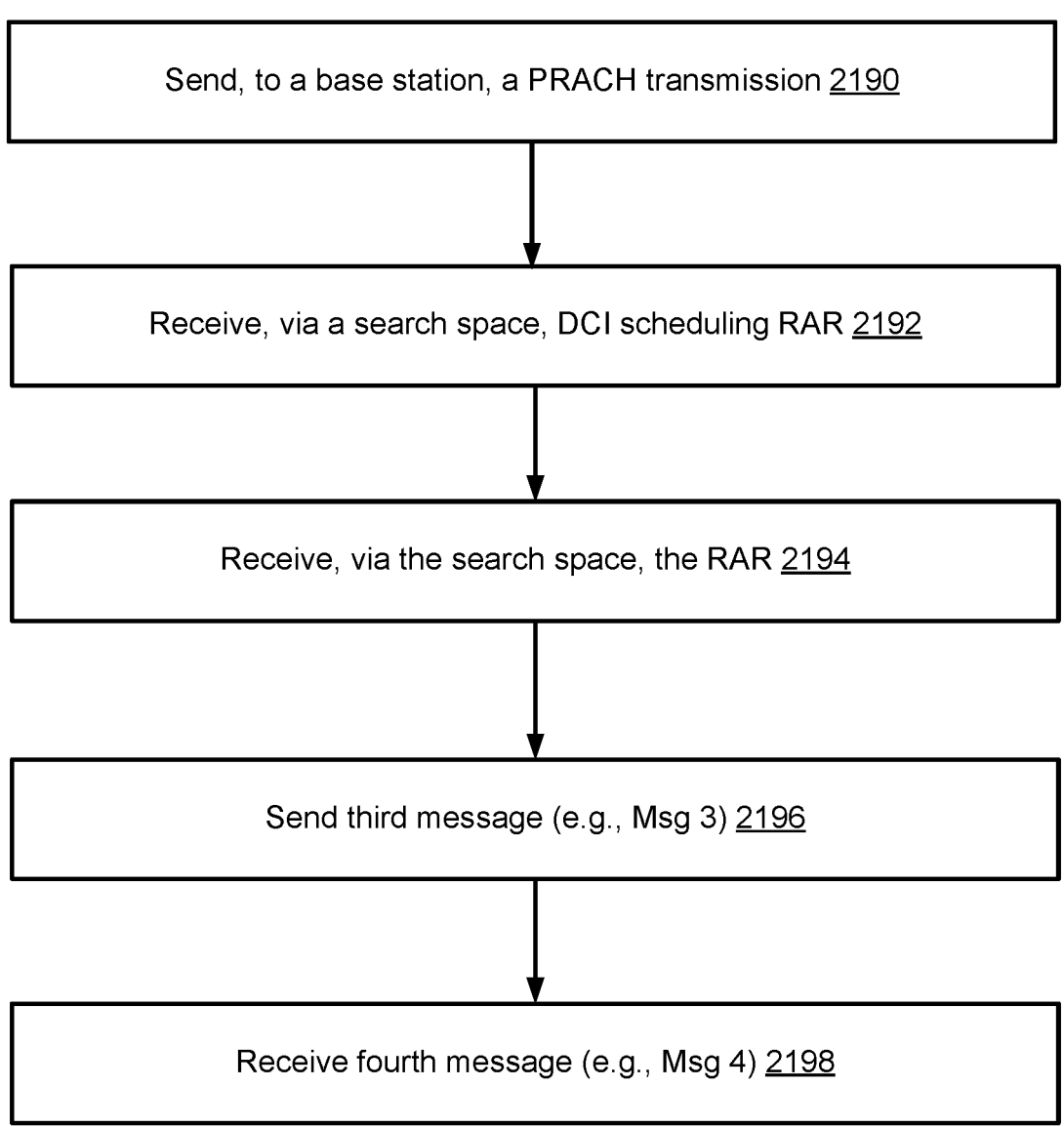
FIG. 21E shows an example method for a random access procedure.

FIG. 21D and FIG. 21E show an example method 2170 that may be performed by the base station 2104 and an example method 2108 that may be performed by the wireless device 2108, respectively, for the random access procedure. Steps 2174-2182 of FIG. 21D may be similar to steps 2134-2142, respectively, as described with reference to FIG. 21B. Steps 2190-2198 of FIG. 21E may be similar to steps 2154-2162, respectively, as described with reference to FIG. 21C.

An active DL BWP and an active UL BWP of the cell, for the initial access procedure, may be the initial DL BWP and the initial UL BWP. The base station 2104 may configure, via wireless device-specific RRC signaling, a second BWP, for example, based on/after the initial access procedure. The wireless device 2108 may switch to the second BWP, for example, based on the wireless device-specific RRC signaling. The base station 2104 may configure one or more BWPs, for example, based on/after the initial access procedure. The base station 2104 may activate a BWP, from the one or more BWPs, via BWP switching DCI. The wireless device 2108 may transition to a new BWP for the active BWP, for example, based on/in response to receiving the BWP switching DCI.

A base station may be able to configure cross-carrier scheduling for a wireless device via a wireless device-specific signaling. The base station may be able to configure cross-carrier scheduling for the wireless device, for example, if the wireless device has connected/setup to the base station (e.g., based on/after receiving the fourth message/Msg 4). The initial access procedure may be used if the wireless device switches from an RRC idle (e.g., RRC_IDLE) state to an RRC connected (e.g., RRC_CON-NECTED) state. The initial access procedure may be used if the wireless device switches from an RRC inactive (e.g., RRC_INACTIVE) state to the RRC connected state. An initial DL/UL BWP of a cell may be maintained as an active DL/UL BWP, for example, for/during the initial access procedure. The wireless device may use self-carrier scheduling on the initial DL/UL BWP of the cell, for example, at least for/during the initial access procedure. Enabling cross-carrier scheduling on the initial DL/UL BWP may require dynamic self/cross-carrier scheduling for the initial DL/UL BWP based on one or more conditions. The one or more conditions may be an RRC state of the wireless device (e.g., cross-carrier scheduling may be enabled if the wireless device is in an RRC connected state). Dynamic self/cross-carrier scheduling may require configurations of one or more first search spaces associated with self-carrier scheduling and one or more second search spaces associated with a cross-carrier scheduling for the initial DL BWP. The configurations of the initial DL BWP (e.g., configuration of search spaces) may be indicated/transmitted via the one or more SIBs. The configuration of the one or more second search spaces may not be effectively performed because SIBs may be broadcasted whereas cross-carrier scheduling configuration may be a wireless device-dedicated configuration.

The wireless device may perform self-carrier scheduling for a first cell. The wireless device may receive one or more DCIs via CORESETs of the first cell. The one or more DCIs may comprise resource assignments for the first cell, for example, based on the self-carrier scheduling. The wireless device may perform cross-carrier scheduling for the first cell. The wireless device may receive one or more second DCIs via CORESETs/search spaces of a scheduling cell, different from the first cell. The one or more second DCIs may comprise resource assignments for the first cell, for example, based on the self-carrier scheduling.

A wireless device may receive one or more RRC messages. The one or more RRC messages may comprise configuration parameters for a first cell. The first cell may be a primary cell of a cell group. The first cell may be a primary cell of a PUCCH group. The first cell may be a primary cell of a second cell group. The configuration parameters may indicate a first search space. The wireless device may monitor the first search space for receiving/monitoring DCIs of a PDCCH of the first cell. The configuration parameters may indicate a second search space for monitoring DCIs of PDCCHs of the first cell. The configuration parameters may indicate a third search space for monitoring DCIs of PDCCHs of a second cell. The configuration parameters may comprise one or more parameters for cross-carrier scheduling for the first cell. The one or more parameters may indicate that the second cell is a scheduling cell for the first cell, for example, if cross-carrier scheduling is enabled. The wireless device may monitor the first search space of the first cell for first DCI. The first DCI may be scheduling DCI for downlink data or uplink data of the first cell. The first DCI may be based on a fallback DCI format (e.g., DCI format 0_0 and DCI format 1_0). The first DCI may be group-common DCI. The group-common DCI may comprise one or more of: slot formation information/slot format indicator (SFI) (e.g., parameter Slotformatindicator), transmission power control (TPC) information (e.g., for PUCCH transmission, PUSCH transmission, or SRS), and/or pre-emption indication (P1). The first search space may be a search space #0 (e.g., a search space with indicator/index=0) of the first cell. The first search space may be a common search space. The first search space may be a search space #1 (e.g., a search space with index=1) or search space #2. The first search space may be for receiving DCIs scheduling SIBs. The first search space may be for receiving DCIs scheduling RARs. The first search space may be for receiving DCIs scheduling a message associated with a random access procedure (e.g., Msg 4).

The wireless device may monitor the second search space of the first cell for second DCI, for example, if cross-carrier scheduling is not activated. The cross-carrier scheduling may be activated via RRC signaling, MAC-CE, and/or DCI signaling. The second DCI may comprise resource assignments for downlink or uplink data of the first cell. The second search space may be a wireless device-specific search space. The second search space may be configured via RRC signaling. The second search space may be configured for monitoring the second DCI based on a non-fallback DCI format (e.g., DCI format 1_1 and DCI format 0_1).

The wireless device may receive a command indicating switching from self-carrier scheduling to cross-carrier scheduling for the first cell. The command may be sent/transmitted via RRC signaling, MAC-CE signaling, and/or DCI signaling. The command may be a MAC CE comprising an activation of the second cell. The wireless device may activate the cross-carrier scheduling for the first cell, for example, based on activating the second cell. The command may be an explicit indication via the RRC signaling, MAC-CE signaling, and/or DCI signaling. The command may be an indication via a scheduling DCI. The scheduling DCI may comprise an indication to disable or enable cross-carrier scheduling. The command may be a first SCell activation/deactivation MAC CE. The SCell activation/deactivation MAC CE may comprise an indication for activation or deactivation for one or more secondary cells and may comprise an indication for the activation for the scheduling cell indicated for the cross-carrier scheduling. The wireless device may receive one or more RRC messages comprising configuration parameters of the scheduling cell (e.g., serving cell configuration of the scheduling cell). The wireless device may consider the one or more RRC messages as the command, for example, based on activating the scheduling cell and if the scheduling cell is a primary cell of a cell group. The command may be DCI transitioning the scheduling cell to a non-dormant state from a dormant state. The wireless device may determine a status of the scheduling cell, for example, based on the command. Determining the status may comprise determining whether one or more search spaces of the scheduling cell is being actively monitored (e.g., the scheduling cell is in a non-dormant state, in an active state, in DRX active time, and/or the like). The command may be a MAC CE or DCI comprising an indication of activation of the cross-carrier scheduling for the first cell. The wireless device may transition the scheduling cell to a non-dormant state, and active state, or DRX active time, for example, based on receiving the command. The wireless device may transition the scheduling cell to the non-dormant state, for example, if the scheduling cell is in a dormant state and based on receiving the command activating cross-carrier scheduling for the first cell. The wireless device may activate the scheduling cell, for example, if the scheduling cell is deactivated and based on receiving the command. The command may be a second MAC CE comprising a cell indicator/index of the scheduling cell for the first cell.

The wireless device may continue monitoring the first search space of the first cell for the first DCI, for example, based on receiving the command. The wireless device may activate the cross-carrier scheduling for the first cell, for example, based on receiving the command. The wireless device may stop (e.g., halt or suspend) monitoring the second search space of the first cell for the second DCI, for example, based on/in response to the activating the cross-carrier scheduling for the first cell. The wireless device may start monitoring the third search space of the second cell for third DCI comprising resource assignments for the first cell, for example, based on/in response to the activating the cross-carrier scheduling of the first cell. The wireless device may monitor one or more first common search spaces of the first cell, for example, even if the wireless device activates cross-carrier scheduling for the first cell. The wireless device may monitor one or more second wireless device-specific search spaces of the second cell for resource assignments for the first cell, for example, based on cross-carrier scheduling for the first cell. The wireless device may monitor one or more first search spaces of the first cell for resource assignments for the first cell, for example, even if the wireless device activates cross-carrier scheduling for the first cell. The wireless device may monitor one or more second search spaces of the second cell (e.g., a scheduling cell for the first cell) for resource assignments for the first cell, for example, based on cross-carrier scheduling for the first cell.

The second cell configured as a scheduling cell for the first cell may be a secondary cell of a cell group. The cell group may comprise the first cell. The first cell may be a primary cell of the cell group. The cell group may be a cell group in a dual connectivity. The cell group may be a PUCCH group in a carrier aggregation scenario. The cell group may be a multiple-timing advance group (TAG). The cell group may be a group of cells indicated with a dormancy or non-dormancy indication by DCI. Cells associated with a same cell group may transition to a dormant state or a non-dormant state together. The cell group may be a group of cells configured with a same DRX configuration. The cell group may comprise one or more cells based on base station configuration.

The wireless device may receive a second command. The second command may be sent/transmitted via RRC signaling, MAC CE signaling, and/or DCI signaling. The second command may indicate switching from cross-carrier scheduling for the first cell to self-carrier scheduling for the first cell. The second command may deactivate cross-carrier scheduling for the first cell. The wireless device may stop (e.g., halt or suspend) monitoring the third search space of the second cell for the third DCI for the first cell, for example, based on receiving the second command. The wireless device may resume (e.g., start or restart) monitoring the second search space of the first cell for the second DCI, for example, based on the first cell operating the self-carrier scheduling. The wireless device may continue monitoring the first search space for the first DCI regardless of whether cross-carrier scheduling is used or the self-carrier scheduling is used or regardless of whether cross-carrier scheduling is enabled or disabled.

The second command may be a MAC CE comprising an deactivation of the second cell or the scheduling cell of the first cell. The second command may be an RRC message indicating removal or deconfiguration of the one or more parameters.

A base station may indicate enabling or disabling of cross-carrier scheduling for a first cell. The base station may indicate enabling or disabling of cross-carrier scheduling for a BWP of the first cell. The base station may configure one or more parameters related to cross-carrier scheduling for the BWP of the first cell. The base station may indicate the enabling or the disabling of cross-carrier scheduling for the BWP of the first cell via one or more MAC CEs and/or DCIs.

A base station may enable cross-carrier scheduling of a cell for one or more DL BWPs. The one or more DL BWPs may or may not comprise an initial DL BWP. The wireless device may operate based on self-carrier scheduling on the initial DL BWP and may operate based on cross-carrier scheduling if a BWP, of the one or more DL BWPs, becomes the active DL BWP. Switching between self-carrier and cross-carrier scheduling based on activation of a BWP may allow flexible adaptation between self-carrier scheduling and cross-carrier scheduling. The base station may switch between self-carrier scheduling and cross-carrier via a BWP switching mechanism.

A wireless device may receive one or more messages. The one or more messages may comprise configuration parameters for a first cell. The configuration parameters may indicate one or more first DL BWPs of the first cell indicated/configured with self-carrier scheduling. The configuration parameters may indicate one or more second DL BWPs of the first cell indicated/configured with cross-carrier scheduling and a scheduling cell indicator/index of a scheduling cell for cross-carrier scheduling. The wireless device may activate a first DL BWP of the one or more first DL BWPs as an active DL BWP of the first cell. The first DL BWP may be an initial DL BWP. The first DL BWP may be a first active DL BWP configured for a secondary cell. The first cell may be a primary cell of a cell group (e.g., PCell, PSCell). The first cell is a primary cell of a PUCCH group. The wireless device may use self-carrier scheduling by activating the first DL BWP of the one or more first DL BWPs, regardless of whether cross-carrier scheduling is configured or not, for example, at least if the first cell is the primary cell of the cell group or the PUCCH group. The wireless device may use self-carrier scheduling with the first DL BWP as the active DL BWP of the first cell, for example, if the scheduling cell for the first cell is not activated. The wireless device use self-carrier scheduling with the first DL BWP as the active DL BWP of the first cell, for example, if the scheduling cell for the first cell is in dormant state.

The wireless device may determine a second DL BWP of the one or more second DL BWPs based on a first BWP indicator/index of the first DL BWP, for example, based on receiving the command activating cross-carrier scheduling. The command activating cross-carrier scheduling may be a command indicating switching from the first DL BWP to the second DL BWP. A second BWP indicator/index of the second DL BWP may be the same as the first BWP index. The second BWP index of the second DL BWP may be a function of the first BWP index (e.g., the second BWP index=the first BWP index+an offset). The second BWP index may be k-th lowest BWP index among one or more indices of the one or more second BWPs. The first BWP index may be the k-th lowest BWP index among one or more indices of the one or more first BWPs. The wireless device may switch to the second DL BWP of the one or more second DL BWPs as the active DL BWP of the first cell. The wireless device may use cross-carrier scheduling for the first cell, for example, if the second DL BWP is the active DL BWP.

The second BWP index of the second DL BWP may be associated with the first BWP index of the first DL BWP. The base station may configure the association between the second DL BWP and the first DL BWP for the first cell. The wireless device may switch between the first DL BWP and the second DL BWP for transitioning between self-carrier scheduling and cross-carrier scheduling. The association may be determined by the wireless device based on BWP indices of the first DL BWP and the second DL BWP. The association between the first BWP index and the second BWP index may be configured by the base station.

The wireless device may receive one or more RRC messages. The one or more RRC messages may comprise parameters of one or more first search spaces for the first DL BWP. The wireless device may monitor the one or more first search spaces of the first DL BWP for one or more first DCIs scheduling resource assignments of data for the first cell, for example, based on self-carrier scheduling being used for the first cell. The one or more RRC messages may comprise second parameters of one or more second search spaces for the second DL BWP. The wireless device may receive one or more second RRC messages. The one or more second RRC messages may comprise third parameters of one or more third search spaces of a third DL BWP of the scheduling cell. The one or more third search spaces may correspond to the one or more second search spaces of the second DL BWP of the first cell, for example, if cross-carrier scheduling is being used for the first cell. The wireless device may monitor the one or more third search spaces of the second cell for one or more second DCIs comprising resource assignments of data for the first cell, for example, based on cross-carrier scheduling being used for the first cell. The wireless device may stop monitoring the one or more third search spaces of the second cell for the one or more second DCIs, for example, based on/in response to transitioning from cross-carrier scheduling to self-carrier scheduling for the first cell.

Various examples herein describe communication devices (e.g., a base station and/or a wireless device) sending and/or receiving control messages (e.g., DCI) via search spaces. Sending and/or receiving control messages via search spaces may comprise sending and/or receiving the messages via control channels (e.g., PDCCHs) associated with the search spaces.

Figure 22A:
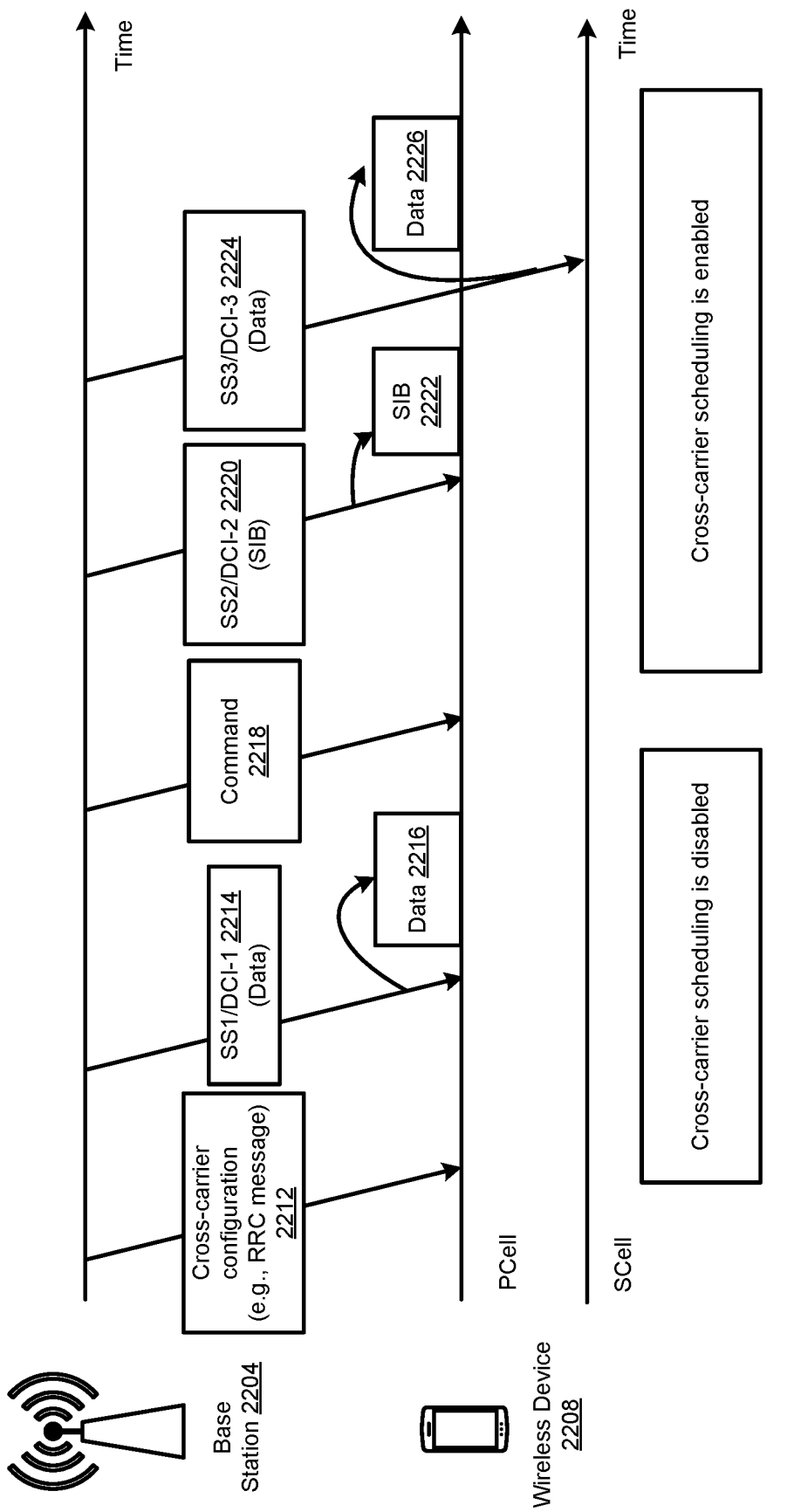
FIG. 22A shows an example of switching from self-carrier scheduling and cross-carrier scheduling.
Figure 22B:
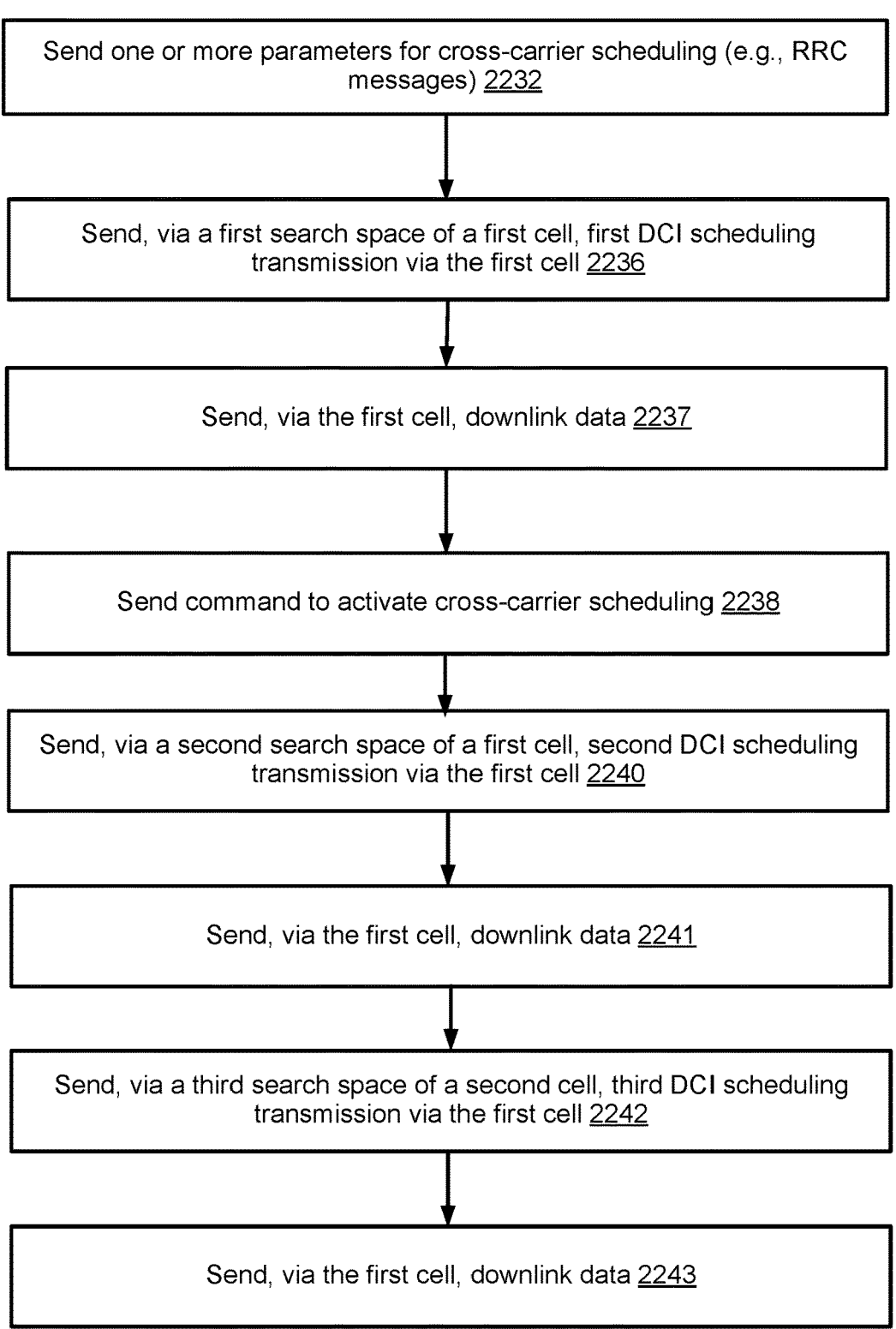
FIG. 22B shows an example method for signal transmission.

FIG. 22A shows an example of switching between cross-carrier scheduling and self-carrier scheduling. A base station 2204 may activate cross-carrier scheduling for a cell. A wireless device 2208 may continue monitoring one or more search spaces of the cell even if cross-carrier scheduling is activated. FIG. 22B and FIG. 22C show example methods that may be performed by the base station 2204 and the wireless device 2208, respectively, for cross-carrier and self-carrier scheduling.

The base station 2204 may send/transmit (e.g. at step 2232) one or more configuration messages (e.g., RRC messages). The one or more configuration messages may comprise one or more parameters related to a cross-carrier scheduling (e.g., cross-carrier configuration 2212) for a first cell (e.g., primary cell, PCell). The wireless device 2208 may receive (e.g., at step 2252) the one or more configuration messages comprising the one or more parameters. The one or more parameters may comprise a scheduling cell indicator/index of a second cell (e.g., secondary cell, SCell). The second cell may schedule (e.g., the base station may send, via the second cell) one or more DCIs for the first cell, for example, based on cross-carrier scheduling. The wireless device 2208 may assume/use self-carrier scheduling for the first cell, for example, until the wireless device 2208 may receive an indication of the cross-carrier scheduling for the first cell. The base station 2204 may configure (e.g., via the one or more configuration messages) search spaces for the first cell and/or the second cell. The base station 2204 may configure a first search space (e.g., SS1) of the first cell. The SS1 may be used for sending/transmitting one or more DCIs scheduling downlink and/or uplink data for the first cell. The base station may send (e.g., step 2236), via the SS1, first DCI (e.g., DCI-1 2214).

The wireless device 2208 may receive (e.g., step 2254), via the SS1, the DCI-1 2214 scheduling downlink data. The wireless device 2208 may monitor the SS1, for example, based on the wireless device 2208 being activated with self-carrier scheduling for the first cell. The base station 2204 may send (e.g., step 2237), via the first cell, downlink data 2216 as scheduled by the DCI-1 2214. The wireless device 2208 may receive (e.g., step 2256), via the first cell, the downlink data 2216 scheduled by the DCI-1 2214.

The base station 2204 may send (e.g., step 2238), to the wireless device 2208, a message (e.g., command 2218) to activate cross-carrier scheduling. The wireless device 2208 may activate cross-carrier scheduling for the first cell, for example, based on receiving the command 2218. The base station 2204 and/or the wireless device 2208 may continue self-carrier scheduling via one or more search spaces of the first cell. The base station 2204 may configure/indicate a second search space (e.g., SS2) of the first cell. The base station 2204 may send (e.g., step 2240), via the SS2, second DCI (e.g., DCI-2 2220).

The wireless device 2208 may receive (e.g., step 2258), via the SS2 of the first cell, the DCI-2 2220, for example, based on the cross-carrier scheduling being activated. The DCI-2 2220 may schedule resource assignments for an SIB transmission (or any other downlink/uplink transmission). The resource assignments may correspond to resources associated with the first cell. The base station 2204 may send (e.g., step 2241), via the first cell, a transmission scheduled by the DCI-2 2220. The wireless device 2208 may receive (e.g., step 2260) the transmission (e.g., an SIB transmission 2222), for example, via the first cell and based on the DCI-2 2220. The DCI-2 2220 may comprise resource assignments for an RAR transmissions. The wireless device 2208 may receive the RAR transmission, for example, based on the DCI 2220.

The base station 2204 may configure a third search space (SS3) of the second cell. The base station 2204 may send (e.g., step 2242), via the SS3, third DCI (e.g., DCI-3 2224). The DCI-3 2224 may schedule data transmission via the first cell, for example, based on the cross-carrier scheduling being activated. The wireless device 2208 may receive (e.g., step 2262) the DCI-3 2224 via the SS3 of the SCell. The DCI-3 2224 may schedule a downlink transmission 2226 via the first cell. The base station 2204 may send (e.g., step 2243), via the first cell, a transmission scheduled by the DCI-3 2224. The wireless device 2208 may receive (e.g., step 2264) a downlink transmission 2226, for example, via the first cell and based on the DCI-3 2224.

FIG. 22D and FIG. 22E show an example method 2270 that may be performed by the base station 2204 and an example method 2286 that may be performed by the wireless device 2208, respectively, for cross-carrier scheduling and self-carrier scheduling. Steps 2272-2284 of FIG. 22D may be similar to steps 2236-2243, respectively, as described with reference to FIG. 22B. Steps 2288-2298 of FIG. 22E may be similar to steps 2254-2264, respectively, as described with reference to FIG. 22C.

The wireless device 2208 may enable or disable cross-carrier scheduling of first cell. The command 2218 may be an SCell activation MAC CE. The command 2218 may be a scheduling DCI indicating an activation of cross-carrier scheduling. The command 2218 may be an RRC message (e.g., comprising an indicator/index of the second cell). The wireless device 2208 may receive another command to disable or deactivate the cross-carrier scheduling for the first cell. The wireless device 2208 may switch back to self-carrier scheduling, for example, based on receiving the another command.

The first cell (e.g., a scheduled cell) and the second cell (e.g., a scheduling cell) may belong to a same cell group.

The first cell and the second cell may belong to a same PUCCH group. The command 2218 indicating/activating cross-carrier scheduling may be sent/transmitted via RRC signaling, MAC CE signaling, and/or DCI signaling.

A base station may configure one or more parameters related to cross-carrier scheduling for a first cell. A wireless device may activate the cross-carrier scheduling for the first cell, for example, based on the one or more parameters. The wireless device may activate the cross-carrier scheduling for the first cell, for example, based on/in response to receiving a command. The command may indicate an activation of a scheduling cell configured for the cross-carrier scheduling for the first cell. The wireless device may fallback to self-carrier scheduling for the first cell and/or may disable the cross-carrier scheduling for the first cell, for example, based on one or more considerations (e.g., occurrence of one or more events). The one or more events may comprise the wireless device switching to an initial DL and/or initial UL BWP of the first cell. The wireless device may disable cross-carrier scheduling or may not apply cross-carrier scheduling, for example, if an active BWP is the initial DL BWP and/or the initial UL BWP. The one or more events may comprise an expiration of a BWP inactivity timer of the first cell at the wireless device. The wireless device may switch to a default BWP of the first cell, for example, based on an expiration of the BWP inactivity timer. The wireless device may disable cross-carrier scheduling, for example, if the active BWP is the default BWP. The one or more events may comprise the wireless device receiving a command indicating deactivation of the scheduling cell, wherein the cross-carrier scheduling is not supported. The one or more events may comprise the wireless device receiving a command comprising a dormancy indication of the scheduling cell. The wireless device may not monitor any search space of the scheduling cell that is in a dormant state. The one or more events may comprise the wireless device triggering a PRACH transmission and switching back to the initial DL BWP. The one or more events may comprise the wireless device starting a random access procedure. The one or more events may comprise the wireless device determining a beam failure of the scheduling cell and starting a beam recovery procedure for the scheduling cell. The one or more events may comprise the wireless device receiving a command to deactivate cross-carrier scheduling for the first cell.

Figure 23A:
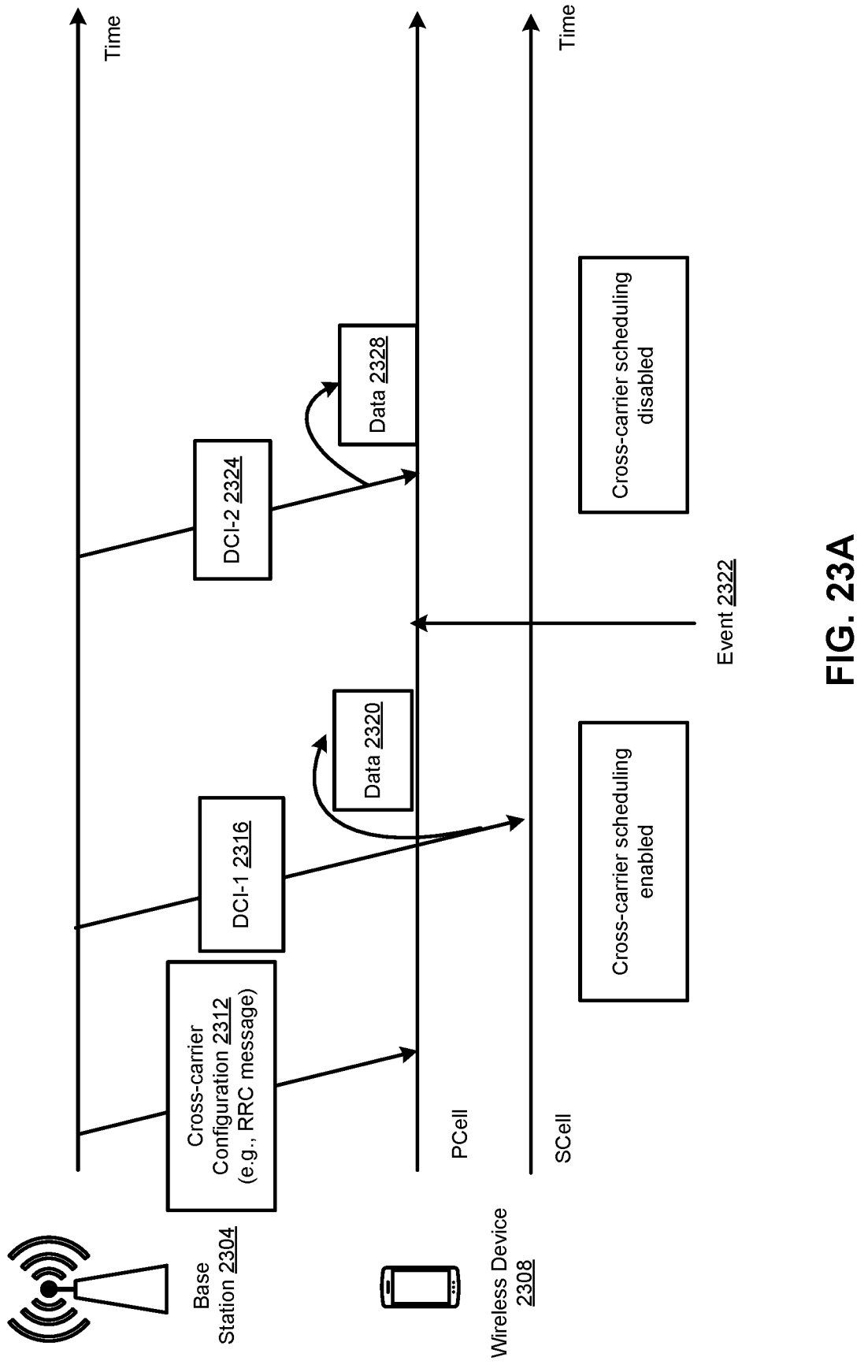
FIG. 23A shows an example of switching from cross-carrier scheduling and self-carrier scheduling.

FIG. 23A shows an example of switching between cross-carrier scheduling and self-carrier scheduling. Cross-carrier scheduling may be deactivated based on an event as described above. The wireless device may switch to using self-carrier scheduling based on deactivation of cross-carrier scheduling. FIG. 23B and FIG. 23C show example methods at a base station 2304 and a wireless device 2308, respectively, for cross-carrier and self-carrier scheduling.

The base station 2304 may send (e.g., step 2332), to the wireless device 2308, one or more configuration messages (e.g., RRC messages). The one or more configuration messages may comprise parameters for cross-carrier scheduling (e.g., cross-carrier configuration 2312) of a first cell (e.g., PCell, primary cell). The one or more parameters may comprise a scheduling cell indicator/index of a second cell (e.g., SCell, secondary cell).

The wireless device 2308 may receive (e.g., step 2352) the one or more configuration messages. The wireless device 2308 may activate (e.g., step 2354) cross-carrier scheduling for the first cell, for example, based on receiving the one or more configuration messages. The base station 2304 may send/transmit (e.g., step 2334) first DCI (DCI-1 2316) via a search space of second cell. The DCI-1 2316 may comprise resource assignment(s) for data scheduled for the first cell. The wireless device 2308 may receive (e.g., step 2356), via the search space of the second cell, the DCI-1 2316. The base station 2304 may send (e.g., step 2335), via the first cell, data 2320 as scheduled by the DCI-1 2316. The wireless device 2308 may receive (e.g., step 2358), via the first cell, data 2320 scheduled by the DCI-1 2316.

The wireless device 2308 may switch to self-carrier scheduling and/or disable the cross-carrier scheduling for the first cell, for example, based on/in response to an event 2322 (e.g., an event as described above). For example, the base station 2304 may send (e.g., step 2336) a command indicating deactivation of the second cell. The wireless device 2308 may disable cross-carrier scheduling and/or enables self-carrier scheduling, for example, based on the event 2322. The base station 2304 may send/transmit (e.g., step 2340) second DCI (DCI-2 2324) via a second search space of the first cell. The DCI-2 2324 may schedule resource assignment(s) for data scheduled for the first cell. The base station 2304 may send (e.g., step 2342), via the first cell, data 2328 as scheduled by the DCI-2 2324. The wireless device 2308 may receive (e.g., step 2362), via the first cell, data 2328 scheduled by the DCI-2 2324, for example, based on cross-carrier scheduling being deactivated and based on receiving the DCI-2 2324 (e.g., step 2360).

Figure 23D:
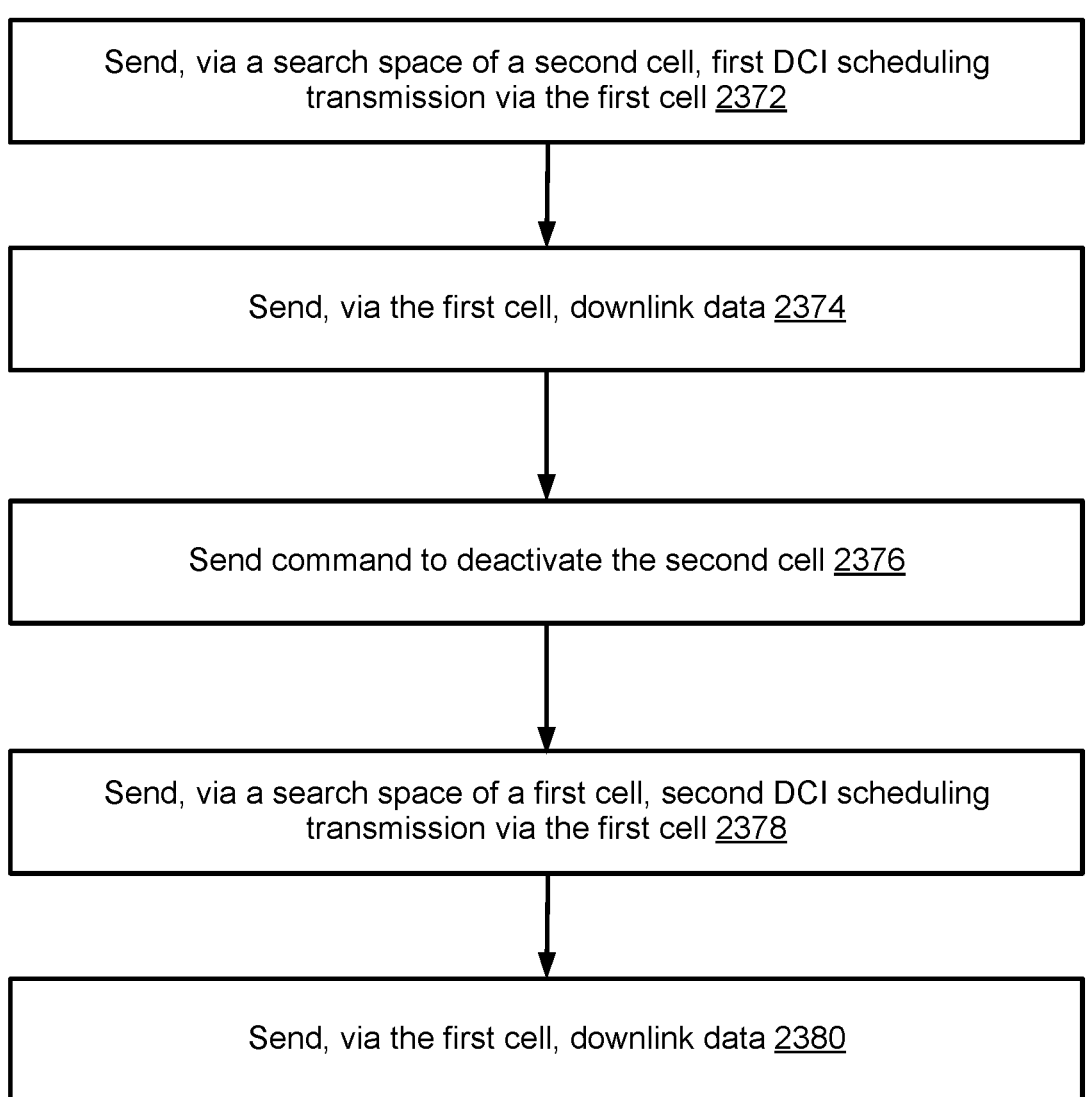
FIG. 23D shows an example method for signal transmission.

FIG. 23D and FIG. 23E show an example method 2370 that may be performed by the base station 2304 and an example method 2382 that may be performed by the wireless device 2308, respectively, for cross-carrier scheduling and self-carrier scheduling. Steps 2372-2380 of FIG. 23D may be similar to steps 2334-2342, respectively, as described with reference to FIG. 23B. Steps 2384-2392 of FIG. 23E may be similar to steps 2354-2362, respectively, as described with reference to FIG. 23C.

Various examples described herein (e.g., with reference to FIGS. 22A-C and FIGS. 23A-C) may be applied for scheduling downlink transmissions or uplink transmissions. With reference to FIG. 22A, for example, the DCIs (e.g., DCI-1 2214, DCI-2 2220, or DCI-3 2224) may schedule resources for either a downlink transmission or an uplink transmission. With reference to FIG. 23A, for example, the DCIs (e.g., DCI-1 2316 and DCI-2 2324) may schedule resources for either a downlink transmission or an uplink transmission.

A base station may configure a wireless device with self-carrier scheduling for a cell at least for an initial DL BWP. The cell may be a primary cell of a cell group (e.g., PCell, SPCell) or a PUCCH SCell. The base station may configure cross-carrier scheduling for the cell for the wireless device, wherein an active DL BWP of the cell may be a first DL BWP. The first DL BWP may be the initial DL BWP. The first DL BWP may be a non-initial DL BWP. The first DL BWP may or may not be a default DL BWP. The first DL BWP may not be the initial DL BWP. The base station may send/transmit one or more configuration messages (e.g., RRC messages). The one or more messages may comprise one or more parameters for cross-carrier scheduling for the cell (e.g., cross-carrier configuration 2212 or 2312). The base station may configure a cross-carrier scheduling configuration (e.g., higher layer parameter CrossCarrierSchedulingConfig) as a part of one or more parameters configured for the cell (e.g., higher layer parameter ServingCellConfig). The cross-carrier scheduling configuration may comprise an indicator (e.g., cif-Presence) for a second cell (e.g., a scheduling cell for the cell). The indicator may indicate whether a carrier indicator field is present in DCI (e.g., from the second cell to schedule resources of the cell). The cross-carrier scheduling configuration may comprise one or more additional parameters (e.g., schedulingCellId and cif-In-SchedulingCell) for the cell. The parameter schedulingCel-lId may comprise an indicator/index (e.g., servingcellindex) corresponding to the second cell. The parameter cif-In-SchedulingCell may indicate an indicator/index for the cell in DCI, via the second cell, scheduling resources in the cell.

The cross-carrier scheduling configuration may be configured for the cell. The cell may be the primary cell of the cell group or the PUCCH SCell. The wireless device may or may not activate the one or more parameters of the cross-carrier scheduling configuration, for example, based on/in response to the receiving the cross-carrier scheduling configuration for the cell. The base station may indicate activation of the cross-carrier scheduling configuration for the cell via another message. The another message may be an RRC message (e.g., indicating configuration of a BWP enabled with cross-carrier scheduling, a configuration of a BWP with one or more search spaces enabled with cross-carrier scheduling), a MAC CE (e.g., an SCell activation MAC CE, comprising an enable/disable indication), and/or DCI (e.g., comprising enable/disable indication). Cross-carrier scheduling configuration may be activated, for example, after the cross-carrier scheduling configuration is configured. The wireless device may activate the cross-carrier scheduling configuration of the cell, for example, based on/in response to the second cell being activated. The wireless device may activate the cross-carrier scheduling configuration of the cell, for example, based on/in response to receiving an indication for activation of (or after activating) a DL BWP of the second cell that is different from a default BWP of the second cell, a first active DL BWP of the second cell, or a dormant DL BWP of the second cell. The first active DL BWP of the second cell may be a DL BWP indicated in a serving cell configuration of the second cell. The wireless device may activate the first active DL BWP, for example, based on/in response to receiving an activation command for the second cell. The dormant DL BWP of the second cell may be a DL BWP that the wireless device switches to based on receiving a dormancy indication for the second cell.

Cross-carrier scheduling configuration may be configured for a DL BWP of the cell (e.g., instead of being configured for the cell). A base station may configure a first cross-carrier scheduling configuration for a first DL BWP of the cell. The base station may not configure the cross-carrier scheduling configuration for a second DL BWP of the cell. The base station may configure a second cross-carrier scheduling configuration for a third DL BWP of the cell. The first cross-carrier scheduling configuration may indicate a first SCell as a scheduling cell. The second cross-carrier scheduling configuration may indicate a second SCell as a scheduling cell. The wireless device may receive one or more first DCIs, from the first SCell, for scheduling downlink/uplink data for the cell, for example, if the first DL BWP is an active DL BWP. The wireless device may receive one or more second DCIs, from the second SCell, for scheduling downlink/uplink data for the cell, for example, if the active DL BWP is the third active DL part. The wireless device may switch from cross-carrier scheduling to self-carrier scheduling, for example, if the wireless device switches from the first DL BWP or the third DL BWP to the second DL BWP. The wireless device may assume that self-carrier scheduling is used for the cell, for example, if an active DL BWP is not configured with the cross-carrier scheduling configuration.

The wireless device may assume that self-carrier scheduling is used for the cell, for example, if the second DL BWP is the active DL BWP.

A base station may configure a first cross-carrier scheduling configuration for a first DL BWP of a second cell. The second cell may be a scheduling cell for a first cell. The base station may not configure cross-carrier scheduling configuration for a second DL BWP of the second cell. The base station may configure a second cross-carrier scheduling configuration for a third DL BWP of a second cell. The wireless device may assume self-carrier scheduling or cross-carrier scheduling by the second cell, for the first cell, for example, based on an active DL BWP of the second cell. The wireless device may assume self-carrier scheduling for the first cell, for example, if the active DL BWP of the second cell is the second DL BWP (e.g., where cross-carrier scheduling configuration is not configured or disabled). The wireless device may assume cross-carrier scheduling, for the first cell, based on the first cross-carrier scheduling configuration, for example, if the active DL BWP of the second cell is the first DL BWP (e.g., where the first cross-carrier scheduling configuration is configured). The wireless device may assume cross-carrier scheduling, for the first cell, based on the third cross-carrier scheduling configuration, for example, if the active DL BWP of the second cell is the third DL BWP (e.g., where the third cross-carrier scheduling configuration is configured). Cross-carrier scheduling configuration may be applied per BWP of the first cell and/or BWP of the second cell.

A base station may configure a plurality of cells of a cell group for a wireless device. The base station may configure a PUCCH cell among the plurality of cells of the cell group. The wireless device may support a first PUCCH group comprising a primary cell of the cell group and one or more first secondary cells (e.g., SCells). HARQ-ACK feedbacks of the one or more first SCells may be sent/transmitted via the primary cell. The wireless device may support a second PUCCH group comprising the PUCCH cell and one or more second SCells. HARQ-ACK feedbacks f the one or more second SCells may be sent/transmitted via the PUCCH cell. The base station may configure a first SCell as a scheduling cell for the primary cell of the cell group. The base station may select the first SCell, from the one or more first SCells, such that the scheduling cell of the primary cell and the primary cell of the cell group belong to a same PUCCH group (e.g., the first PUCCH group). The base station may configure a second SCell as a scheduling cell for the PUCCH cell of the cell group. The base station may select the second SCell, from the one or more second SCells, such that the scheduling cell of the PUCCH cell and the PUCCH cell of the cell group belong to a same PUCCH group (e.g., the second PUCCH group).

The base station may configure a scheduling cell of a cell (e.g., primary cell or PUCCH cell of the cell group). The scheduling cell may belong to a PUCCH group different from a PUCCH group of the cell. The scheduling cell may be configured with PUCCH-cell as the primary cell whereas the cell may be the PUCCH cell and the scheduling cell may be for the PUCCH cell, or the scheduling cell may be configured with PUCCH-cell as the PUCCH cell whereas the cell may be the primary cell and the scheduling cell may be for the primary cell. The wireless device may send/transmit first HARQ-ACK feedbacks corresponding to the scheduling cell via the PUCCH-cell configuration of the scheduling cell. The PUCCH-cell of the scheduling cell may be same or different from the cell. The wireless device may send/transmit second HARQ-ACK feedbacks corresponding to the cell via the cell.

A base station may configure cross-carrier scheduling for a first cell. The base station may configure the cross-carrier scheduling for at least a DL BWP of the first cell. A wireless device may be activated with the first cell and the wireless device may or may not be activated with a second cell, for example, at a time of the configuration. The second cell may be a scheduling cell for the first cell. The wireless device may be configured with the second cell at a time of the configuration. The base station may configure the second cell as the scheduling cell for the first cell via one or more RRC messages, MAC CEs, and/or DCIs. The wireless device may determine whether to apply self-carrier scheduling or cross-carrier scheduling for a first DL BWP of the first cell (e.g., wherein the first DL BWP is an active DL BWP of the first cell), for example, based on one or more parameters of the cross-carrier scheduling comprising the scheduling cell for the first cell and a status of the scheduling cell.

The wireless device may apply cross-carrier scheduling, for example, if the scheduling cell becomes activated (e.g., via MAC CE and/or DCI signaling). The MAC CE may be an SCell activation/deactivation command. The wireless device may activate cross-carrier scheduling of the first cell, for example, if the scheduling cell becomes activated via the signaling. The wireless device may continue self-carrier scheduling, for example, until cross-carrier scheduling of the first cell is activated (e.g., at or after a time t). The time may be determined based on a delay associated with the scheduling cell activation latency. The activation latency may be 3 ms (e.g., or any other time period), for example, after receiving the MAC CE activation command. The wireless device may start the cross-carrier scheduling of the first cell, for example, 3 ms (or any other time period) after receiving the MAC CE. The wireless device may start cross-carrier scheduling, for example, after the scheduling cell is activated and after a delay T following the activation. The wireless device may receive an activation command for the scheduling cell at a first time. The wireless device may activate the scheduling cell at the first time+SCell activation latency (e.g., 3 ms, 3 slots, 8 slot, and/or any other period of time, any other quantity of slots). The wireless device may start a timer to count the delay T, for example, after the scheduling cell is activated. The wireless device may start the cross-carrier scheduling for the first cell at the first time+SCell activation latency+T. The wireless device may continue self-carrier scheduling for the first cell, for example, at least until the first time+SCell activation latency.

The wireless device may switch from a second DL BWP to the first DL BWP, for example, based on/in response to the scheduling cell being activated. The delay T may be a BWP switching latency. The wireless device may activate the scheduling cell. The wireless device may perform BWP switching to a BWP of the first cell, for example, based on/in response to the scheduling cell of the first cell being activated and based on cross-carrier scheduling being configured for the BWP. The wireless device may select a lowest BWP indicator/index, among the indicators/indices of the plurality of the BWPs, to switch to (e.g., unless an active BWP is configured also with the cross-carrier scheduling), for example, if the wireless device is configured with a plurality of BWPs where cross-carrier scheduling is configured or enabled. The wireless device may stay in the current BWP, for example, if the active BWP is configured with cross-carrier scheduling. The delay T may be zero, for example, if the wireless device stays in the current BWP. The wireless device may apply cross-carrier scheduling at the time at which the scheduling cell is activated.

Self-carrier scheduling or cross-carrier scheduling may be configured/associated with a DL BWP of the first cell. Scheduling of a UL BWP of the first cell (e.g., via UL grants) may follow the active DL BWP of the first cell.

A base station may configure cross-carrier scheduling configuration for a first cell. The cross-carrier scheduling configuration may comprise a parameter of a scheduling cell. The base station may configure a parameter (e.g., CrossCarrierSchedulingEnabled or CrossCarrierSchedulingDisabled) for a DL BWP of the first cell. The wireless device may assume that a first DL BWP is configured with a self-carrier scheduling (e.g., CrossCarrierSchedulingDisabled), for example, if the parameter is not provided for the first DL BWP. The wireless device may consider that cross-carrier scheduling (e.g., CrossCarrierSchedulingEnabled) as a default value, for example, if a parameter per DL BWP is not available and cross-carrier scheduling configuration is available for the first cell. The default value may be different for a DL BWP. The wireless device may assume self-carrier scheduling for an initial DL BWP of the first cell. The wireless device may assume cross-carrier scheduling for a non-initial DL BWP of the first cell, for example, if cross-carrier scheduling configuration is configured for the first cell.

The wireless device may switch back to self-carrier scheduling for the first cell, for example, if the scheduling cell is in an inactive state, the scheduling cell is in a dormant state, the scheduling cell is in a deactivated state, the scheduling cell is in a DRX OFF state, in case of beam failure, or in case of radio link failure of the scheduling cell. The scheduling cell may be deactivated by a MAC CE deactivation command. The wireless device may switch back to self-carrier scheduling. The wireless device may switch back to self-carrier scheduling, for example, based on/in response to the receiving of the deactivation command for the scheduling cell. The wireless device may apply the latency T for switching between cross-carrier scheduling and the self-carrier scheduling for the first cell. The latency T may follow the reception of the deactivation command. The wireless device may switch back to self-carrier scheduling, for example, if the wireless device sends a beam failure request for the scheduling cell, or if the wireless device determines a beam failure for the scheduling cell. The beam failure request may be sent/transmitted via the first cell. A response for the beam failure request may be received via the first cell based on self-carrier scheduling.

The wireless device may switch back to self-carrier scheduling, for example, if the scheduling cell enters a dormant state based on a command and/or a timer. The wireless device may switch the scheduling cell into the dormant state and/or may switch to self-carrier scheduling for the first cell, for example, based on the base station requesting the scheduling cell to enter the dormant state. The wireless device may switch back to self-carrier scheduling for the first cell, for example, if the wireless device is in a DRX OFF state or a sleep state for the scheduling cell and if the wireless device is not in a DRX OFF state or sleep state for the first cell.

A first base station may configure, for a wireless device, one or more first cells of a first cell group. A second base station may configure, for the wireless device, one or more second cells of a second cell group. The first base station and/or the second base station may indicate a cell group indicator/index in MAC CEs and/or DCIs. The MAC CEs and/or DCIs may be transmitted by either base station for the other base station.

Figure 24A:
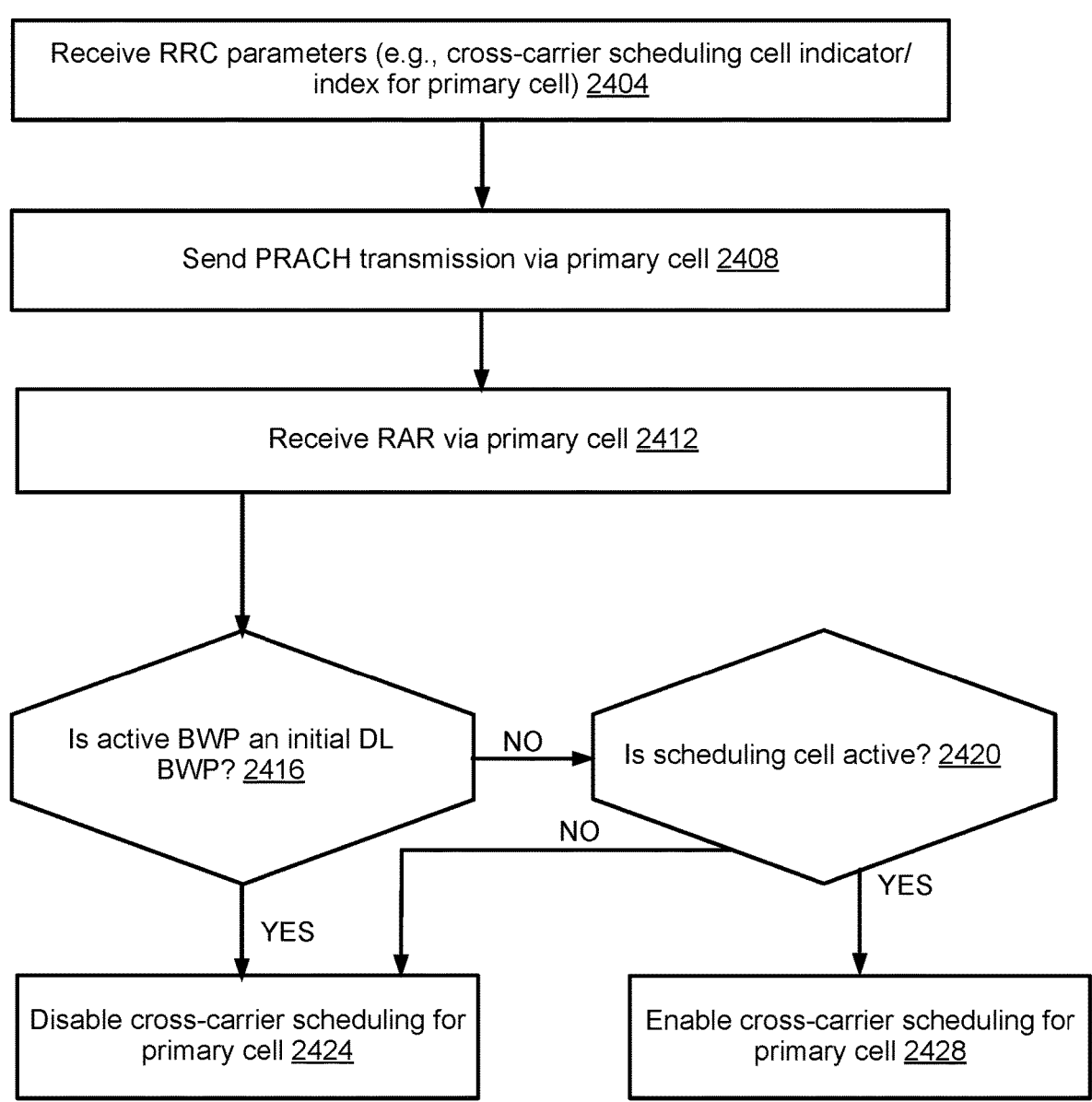
FIG. 24A and FIG. 24B show example methods for switching between cross-carrier scheduling and self-carrier scheduling.

FIG. 24A shows an example method for switching between cross-carrier scheduling and self-carrier scheduling. The example method 2400 may be performed by a wireless device. The wireless device may enable cross-carrier scheduling based on configuration if one or more conditions are being met, for example, after initial access. The wireless device may enable cross-carrier scheduling, for example, if an active BWP is not an initial BWP. The wireless device may enable cross-carrier scheduling, for example, if a scheduling cell for a primary cell is active. Otherwise, the wireless device continues self-carrier scheduling for primary cell.

At step 2404, the wireless device may receive one or more RRC parameters. The one or more RRC parameters may comprise a scheduling cell indicator/index for the primary cell. At step 2408, the wireless device may send, via the primary cell, a PRACH transmission. At step 2412, the wireless device may receive an RAR via the primary cell.

At step 2416, the wireless device may determine whether an active DL BWP for the primary cell is an initial DL BWP. At step 2424, the wireless device may disable cross-carrier scheduling for the primary cell if the active DL BWP is an initial DL BWP. At step 2420, the wireless device may determine if a scheduling cell if active, for example, if the active DL BWP is not an initial DL BWP. At step 2428, the wireless device may enable cross-carrier scheduling for the primary cell if the wireless device determines that the scheduling cell is active. The wireless device may disable cross-carrier scheduling if the wireless device determines that the scheduling cell is not active.

Figure 24B:
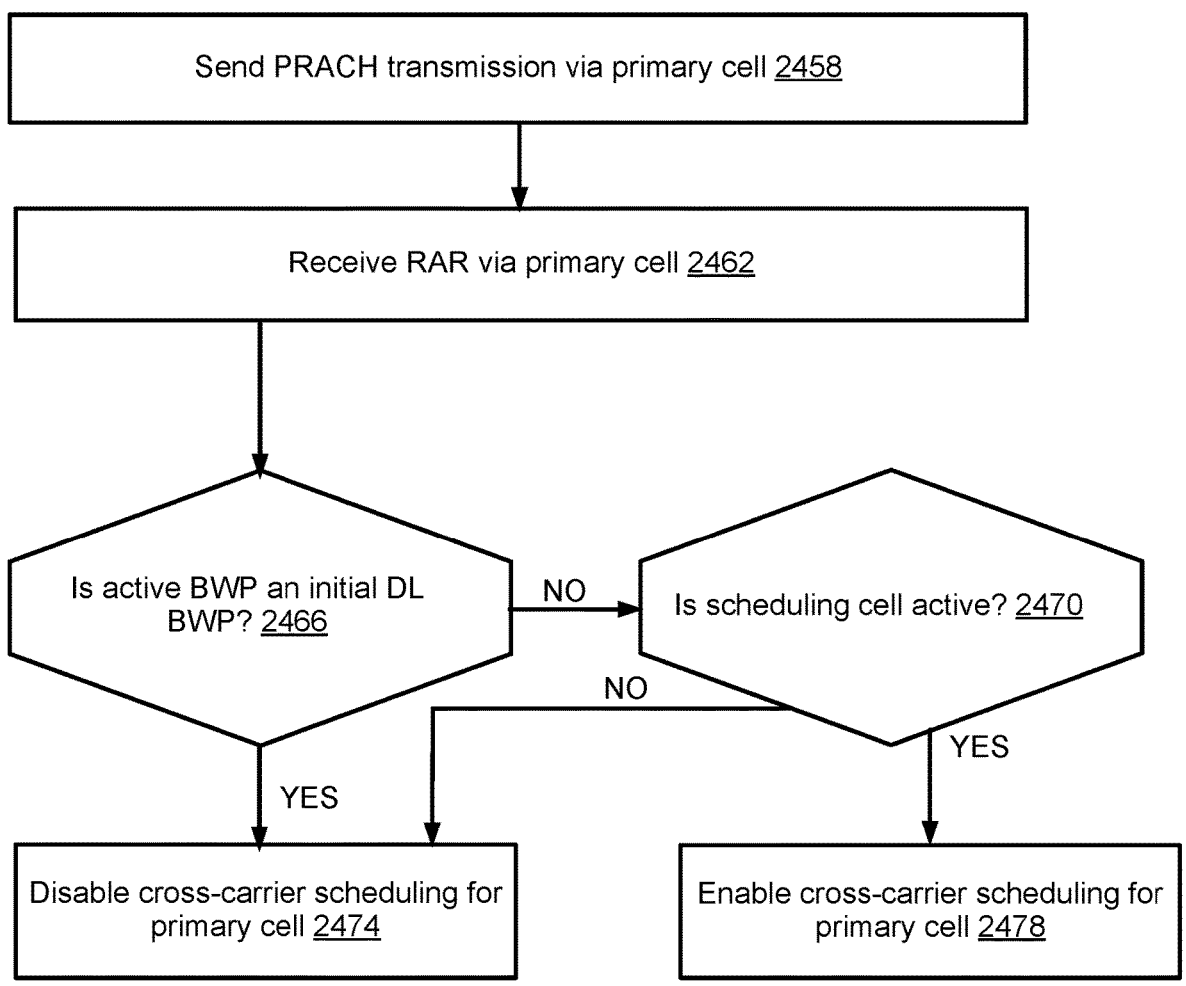

FIG. 24B shows an example method for switching between cross-carrier scheduling and self-carrier scheduling. The example method 2450 may be performed by a wireless device. Steps 2458-2478 of FIG. 24B may be similar to steps 2408-2428, respectively, as described with reference to FIG. 24A.

FIG. 25A shows an example method for monitoring search spaces. The example method 2500 may be performed by a wireless device. The wireless device may monitor a first search space of the primary cell regardless of whether cross-carrier scheduling is enabled or disabled. The wireless device may monitor a third search space of a scheduling cell for a primary cell, for example, if cross-carrier scheduling is enabled for the primary cell. The wireless device may stop monitoring a second search space of the primary cell, for example, based on activating the cross-carrier scheduling.

At steps 2504 and 2508, the wireless device may receive one or more RRC parameters. The one or more RRC parameters may comprise a scheduling cell indicator/index for the primary cell. The one or more RRC parameters may indicate the first search space and the second search space of the primary cell. The one or more RRC parameters may indicate the third search space of the scheduling cell.

At step 2512, the wireless device may determine whether an active DL BWP for the primary cell is an initial DL BWP. At step 2520, the wireless device may monitor the first search space and the second search space of the primary cell, for example, if the active DL BWP for the primary cell is an initial DL BWP. At step 2516, the wireless device may determine if a scheduling cell if active, for example, if the active DL BWP is not an initial DL BWP. At step 2428, the wireless device may monitor the first search space of the primary cell and the third search space of the scheduling cell, for example, if the wireless device determines that the scheduling cell is active. The wireless device may monitor the first search space and the second search space of the primary cell if the wireless device determines that the scheduling cell is not active.

Figure 25B:
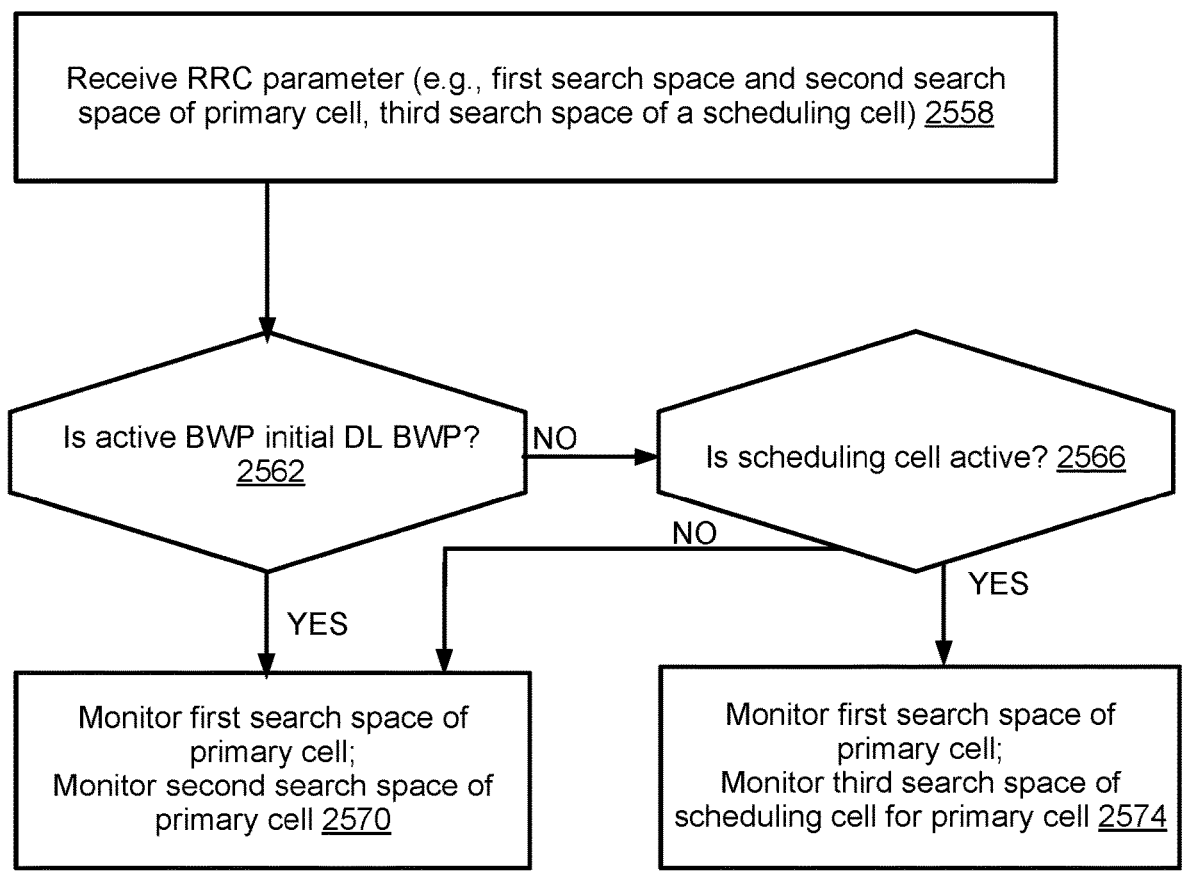
FIG. 25B shows an example method for monitoring search spaces.

FIG. 25B shows an example method for monitoring search spaces. The example method 2550 may be performed by a wireless device. Steps 2558-2574 of FIG. 25B may be similar to steps 2508-2524, respectively, as described with reference to FIG. 25A.

A wireless device may receive one or more messages. The one or more messages may comprise configuration parameters for a first cell. The configuration parameters may indicate a first search space for monitoring for DCIs of a downlink control channel of the first cell. The configuration parameters may indicate a second search space for monitoring for DCIs of the downlink control channel of the first cell, a third search space for monitoring for DCIs of the downlink control channel of a second cell, and one or more parameters for a cross-carrier scheduling. The one or more parameters may indicate that the second cell is a scheduling cell of the first cell. The wireless device may monitor the first search space of the first cell for first DCI. The wireless device may monitor the second search space of the first cell for second DCI comprising resource assignments for the first cell. The wireless device may receive a command indicating switching from self-carrier scheduling to cross-carrier scheduling for the first cell. The wireless device, based on the receiving, may continue monitoring the first search space of the first cell for the first DCI, stop monitoring the second search space of the first cell, and start monitoring the third search space of the second cell for a third DCI comprising resource assignments for the first cell.

A wireless device may receive one or more messages. The one or more messages may comprise configuration parameters for a first cell. The configuration parameters may indicate a first search space for monitoring for DCIs of a downlink control channel of the first cell. The configuration parameters may indicate a second search space for monitoring for DCIs of the downlink control channel of the first cell, a third search space for monitoring for DCIs of the downlink control channel of a second cell, and one or more parameters for a cross-carrier scheduling. The one or more parameters may indicate that the second cell is a scheduling cell of the first cell. The wireless device may monitor the first search space of the first cell for first DCI. The wireless device may monitor the third search space of the second cell for second DCI comprising resource assignments for the first cell. The wireless device may receive a command indicating switching from cross-carrier scheduling to self-carrier scheduling for the first cell. The wireless device, based on the receiving, may continue monitoring the first search space of the first cell for the first DCI, stop monitoring for the third search space of the second cell, and start monitoring the second search space of the first cell for a third DCI comprising resource assignments for the first cell.

A wireless device may receive one or more messages. The one or more messages may comprise configuration parameters for a first cell. The configuration parameters may indicate a scheduling cell indicator/index, a first DL BWP, and a second DL BWP. The wireless device may activate the first DL BWP of the first cell as an active DL BW of the first cell. The wireless device may determine to use self-carrier scheduling based on the activating the first DL BWP. The wireless device may monitor one or more first search spaces of the first cell for receiving first DCIs (e.g., comprising resource assignments for the first cell), for example, based on the determining. The wireless device may receive a command to switch to the second DL BWP as the active DL BWP of the first cell. The wireless device may apply the one or more parameters for cross-carrier scheduling, for example, based on the receiving the command. The wireless device may monitor one or more second search spaces of the scheduling cell for receiving second DCIs (e.g., comprising resource assignments for the first cell).

A wireless device may receive one or more messages. The one or more messages may comprise configuration parameters for a first cell. The configuration parameters may indicate a scheduling cell indicator/index, an initial DL BWP, and a second DL BWP. The wireless device may activate the initial DL BWP of the first cell as an active DL BW of the first cell. The wireless device may determine to use self-carrier scheduling, for example, based on the activating the initial DL BWP. The wireless device may monitor one or more first search spaces of the first cell for receiving first DCIs (e.g., comprising resource assignments for the first cell), for example, based on the determining. The wireless device may receive a command to switch to the second DL BWP as the active DL BWP of the first cell. The wireless device may apply the one or more parameters for cross-carrier scheduling, for example, based on receiving the command. The wireless device may monitor one or more second search spaces of the scheduling cell for receiving second DCIs (e.g., comprising resource assignments for the first cell).

Figure 26A:
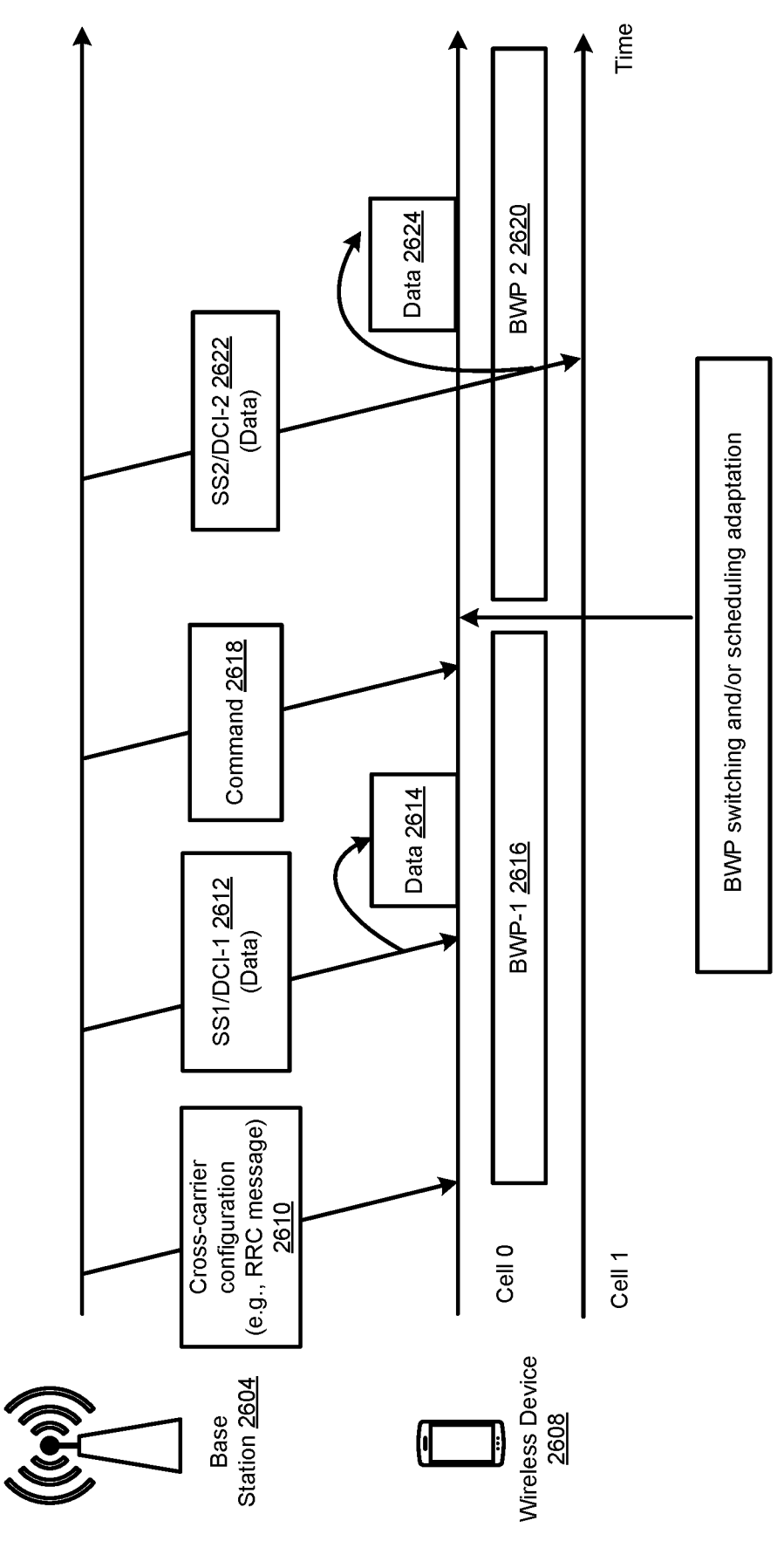
FIG. 26A shows an example of switching between self-carrier scheduling and cross-carrier scheduling.

FIG. 26A shows an example of switching between self-carrier scheduling and cross-carrier scheduling. The switching between self-carrier scheduling and cross carrier scheduling may be based on BWP switching. The switching between self-carrier scheduling and cross carrier scheduling may comprise BWP switching based on receiving a command indicating switching between self-carrier scheduling and cross-carrier scheduling. FIG. 26B and FIG. 26C show example methods that may be performed by a base station 2604 and a wireless device 2608, respectively, for cross-carrier scheduling and self-carrier scheduling.

The base station 2604 may send/transmit (e.g. at step 2632) one or more RRC messages 2610. The wireless device 2608 may receive (e.g., at step 2652) the one or more RRC messages 2610. The one or more RRC messages 2610 may comprise one or more parameters related to a cross-carrier scheduling. The wireless device 2608 may receive the one or more RRC message 2610 comprising the one or more parameters. The wireless device 2608 may be configured with a plurality of cells. The plurality of cell may comprise a first cell (e.g., cell 0, primary cell) and a second cell (e.g., cell 1, secondary cell). The base station 2604 may configure (e.g., via the one or more RRC messages 2610) one or more parameters for cross-carrier scheduling for the first cell. The second cell may be configured as a scheduling cell for the first cell. The base station 2604 may configure a first BWP (e.g., BWP 1 2616, initial BWP) and a second BWP (e.g., BWP 2 2620, non-initial BWP, non-default BWP) for the first cell. The first BWP may be associated/configured with self-carrier scheduling. The second BWP may associated/configured with the cross-carrier scheduling. The one or more parameters may comprise an indicator/index of the second cell.

The wireless device 2608 may activate the first BWP, for example, via an initial access procedure. The wireless device 2608 may apply the self-carrier scheduling, for example, if the first BWP is an active BWP of the first cell. The base station may send/transmit (e.g., step 2636) first DCI (DCI-1 2612) via a first search space (SS1) of the first cell, for example, based on self-carrier scheduling. The first search space may be associated with the first BWP. The first DCI may schedule a first data transmission (e.g., data 2614) for the first cell. The wireless device 2608 may receive (e.g., step 2654), via the first search space of the first cell, the first DCI. The base station 2604 may send (e.g., step 2637), via the first BWP of the first cell, the first data transmission as scheduled by the first DCI. The wireless device 2608 may receive (e.g., step 2656), via the first BWP of the first cell and based on the first DCI, the first data transmission.

The base station 2604 may send (e.g., step 2638) a command 2618 activating cross-carrier scheduling for the first cell. The command 2618 may be DCI indicating BWP switching from the first BWP to the second BWP. The command 2618 may be DCI indicating a transition to cross-carrier scheduling. The command 2618 may be a MAC CE indicating an activation of the second cell.

The wireless device 2608 may transition to the second BWP of the first cell, for example, based on receiving the command. The wireless device 2608 may use cross-carrier scheduling, for example, if the second BWP is the active BWP (e.g., based on transitioning to the second BWP). The base station 2604 may send/transmit (e.g., step 2640) second DCI (DCI-2 2622) via a second search space (e.g., SS2) of the second cell, for example, based on cross-carrier scheduling. The second search space may correspond to a third DL BWP (e.g., of the second cell) and may be associated with a search space of the second DL BWP of the first cell. The second DCI may schedule a second data transmission (e.g., data 2624) for the first cell. The wireless device 2608 may receive (e.g., step 2662), via the second search space of the second cell, the second DCI. The base station 2604 may send (e.g., step 2642), via the second BWP of the first cell, the second data transmission as scheduled by the second DCI. The wireless device 2608 may receive (e.g., step 2664), via the second BWP of the first cell and based on the second DCI, the second data transmission.

FIG. 26D and FIG. 26E show an example method 2670 that may be performed by the base station 2604 and an example method 2682 that may be performed by the wireless device 2608, respectively, for switching between self-carrier scheduling and cross-carrier scheduling. Steps 2672-2680 of FIG. 26D may be similar to steps 2636-2642, respectively, as described with reference to FIG. 26B. Steps 2684-2690 of FIG. 26E may be similar to steps 2654-2664, respectively, as described with reference to FIG. 26C.

The example communication described with reference to FIGS. 26A-E may be applied for scheduling downlink transmissions or uplink transmissions. With reference to FIGS. 26A, for example, the DCIs (e.g., DCI-1 2612 and/or DCI-2 2622) may schedule resources for either a downlink transmission or an uplink transmission.

A wireless device may use cross-carrier scheduling for a first cell. The wireless device may use one or more following approaches to monitoring reception of one or more DCIs comprising resource assignments for the first cell. The wireless device may monitor, for the one or more DCIs, one or more search spaces of a scheduling cell (e.g., a second cell) and the wireless device may not monitor any search space of the first cell. The wireless device may monitor, for one or more second DCIs (e.g., group-common DCI), one or more first search spaces of the first cell. The wireless device may monitor, for the one or more DCIs, one or more first search spaces of the second cell and one or more second search spaces of the first cell. The wireless device may monitor, for the one or more DCIs, the one or more search spaces of the second cell. The wireless device may monitor, for one or more third DCIs (e.g., DCIs based on a fallback DCI format, such as DCI format 0_0/1_0), one or more third spaces of the first cell. The wireless device may monitor one or more wireless device-specific search spaces of the second cell for receiving one or more scheduling DCIs for the first cell. The wireless device may monitor one or more cell-specific search spaces of the first cell for receiving one or more second scheduling DCIs for the first cell. The one or more second scheduling DCIs may schedule broadcast data. The one or more second scheduling DCIs may be sent/transmitted based on a fallback DCI format (e.g., DCI format 0_0/1_0).

Figure 27:
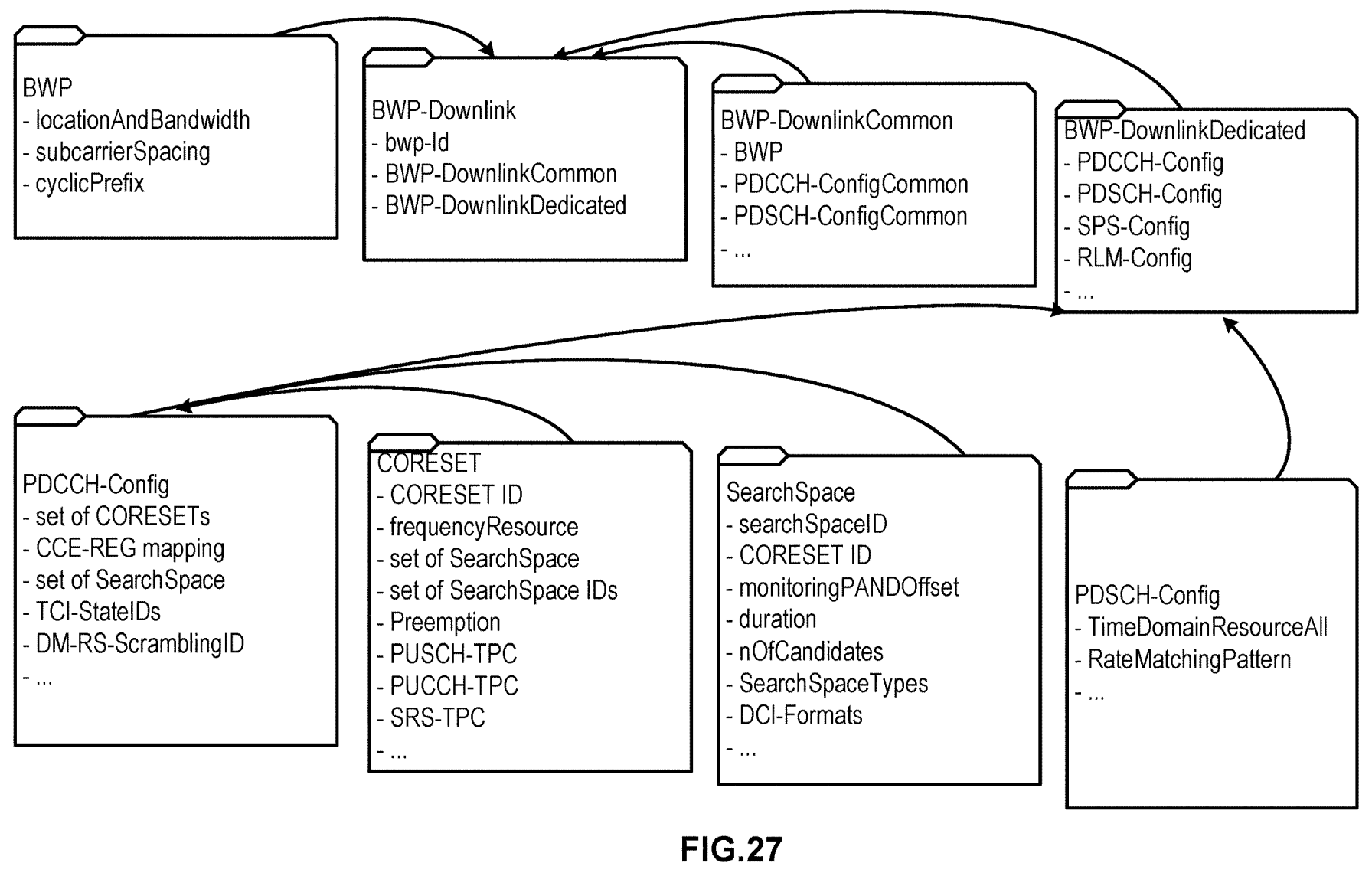

FIG. 27 shows an example configuration of a BWP. A wireless device may receive (e.g., from a base station) one or more BWP DL configurations (e.g., BWP-Downlink). A BWP DL configuration may comprise one or more of a BWP indicator (e.g., bwp-Id), a common BWP DL configuration (e.g., BWP-DownlinkCommon), and/or a dedicated BWP downlink configuration (e.g., BWP-DownlinkDedicated). The common BWP DL configuration may comprise one or more of a BWP configuration, a common PDCCH configuration (e.g., PDCCH-ConfigCommon), and/or a common PDSCH configuration (e.g., PDSCH-ConfigCommon). The common PDCCH configuration may comprise a set of parameters for receiving DCI comprising a resource assignment for common data or common DCI. The common PDSCH configuration may comprise a set of parameters for receiving broadcast data or unicast data. The dedicated BWP DL configuration may comprise a set of parameters for a PDCCH configuration (e.g., PDCCH-Config), a PDSCH configuration (e.g., PDSCH-Config), an SPS configuration (e.g., SPS-Config), or RLM-RS configurations. The PDCCH configuration may comprise a set of parameters for CORE-SETs, search space sets, and related scrambling information and beam information to receive DCI. The PDSCH configuration may comprise/indicate a list of time-domain resource allocation entries, rate matching patterns, and/or scrambling information for downlink data. The parameters of a BWP configuration may comprise/indicate location and bandwidth information (e.g., frequency location and bandwidth of a BWP), subcarrier spacing, and/or cyclic prefix (e.g., numerology of a BWP).

The base station may configure a first PDCCH configuration (e.g., first PDCCH-Config) and a second PDCCH configuration (e.g., second PDCCH-Config) associated with a first DL BWP of a first cell. The first DL BWP of the first cell may be indicated by the BWP indicator. The first PDCCH configuration may comprise/indicate a first set of search spaces for the first DL BWP. The first set of search spaces may be configured with self-carrier scheduling. The second PDCCH configuration (e.g., second PDCCH-Config) may comprise/indicate a second set of search spaces for the first DL BWP. The second set of search spaces may be configured with cross-carrier scheduling. The base station may configure cross-carrier scheduling configuration (e.g., CrossCarrierSchedulingConfig) for the first cell. The cross-carrier scheduling configuration may comprise a scheduling cell indicator/index. The base station may enable or disable the cross-carrier scheduling for the first cell and/or for the first DL BWP of the first cell, for example, based on one or more MAC CEs and/or one or more DCIs (e.g., the command 2618 as described with reference to FIG. 26A). The wireless device may apply the second PDCCH configuration, for example, if cross-carrier scheduling is enabled. The first DL BWP may be an active DL BWP of the first cell. The wireless device may apply the first PDCCH configuration, for example, if self-carrier scheduling is enabled. The first DL BWP may be the active DL BWP of the first cell.

The base station may configure CORESETs for DL BWPs to enable a wireless device to differentiate between DL BWPs configured with self-carrier scheduling and cross-carrier scheduling. A base station may configure a first DL BWP with self-carrier scheduling for a first cell. The base station may configure a second DL BWP with cross-carrier scheduling for the first cell. The base station may or may not configure a set of CORESETs for the first DL BWP to differentiate between self-carrier scheduling and cross-carrier scheduling for the first DL BWP. A wireless device may consider that the first DL BWP is configured with self-carrier scheduling for example, if the set of CORESETs are configured for the first DL BWP. The wireless device may consider that the first DL BWP, configured with at least one CORESET, is configured with self-carrier scheduling, for example, if the at least one CORESET is associated with one or more wireless device-specific search spaces. The wireless device may consider that the second DL BWP is configured with cross-carrier scheduling, for example, if no CORESET configuration is available for the second DL BWP or no CORESET associated with a wireless device-specific search space is configured for the second DL BWP. The second DL BWP may be configured with a first CORESET. The first CORESET may be associated with one or more common search spaces. The wireless device may consider that the second DL BWP is configured with cross-carrier scheduling, for example, if the first CORESET is configured with cross-carrier scheduling. The wireless device may determine whether a BWP is configured with self-carrier scheduling or cross-carrier scheduling based on CORESET configuration associated with a set of search spaces of wireless device-specific search spaces. The BWP may be configured with one or more CORESETs associated with common search spaces, for example, if cross-carrier scheduling is enabled.

A base station may configure a first set of BWPs (e.g., a first BWP set) for a first cell. The first set of BWPs comprise one or more first DL BWPs of the first cell. The base station may configure a second set of BWPs for the first cell. The second set of BWPs comprise one or more second DL BWPs of the first cell. The base station may configure/associate self-carrier scheduling for the one or more first DL BWPs of the first set of BWPs. The base station may configure/associated cross-carrier scheduling for the one or more second DL BWPs of the second set of BWPs. The base station may switch from a first BWP of the one or more first BWPs to a second BWP of the one or more second BWPs to enable cross-carrier scheduling for the first cell. The base station may switch from the second BWP to the first BWP to disable cross-carrier scheduling.

Figure 28A:
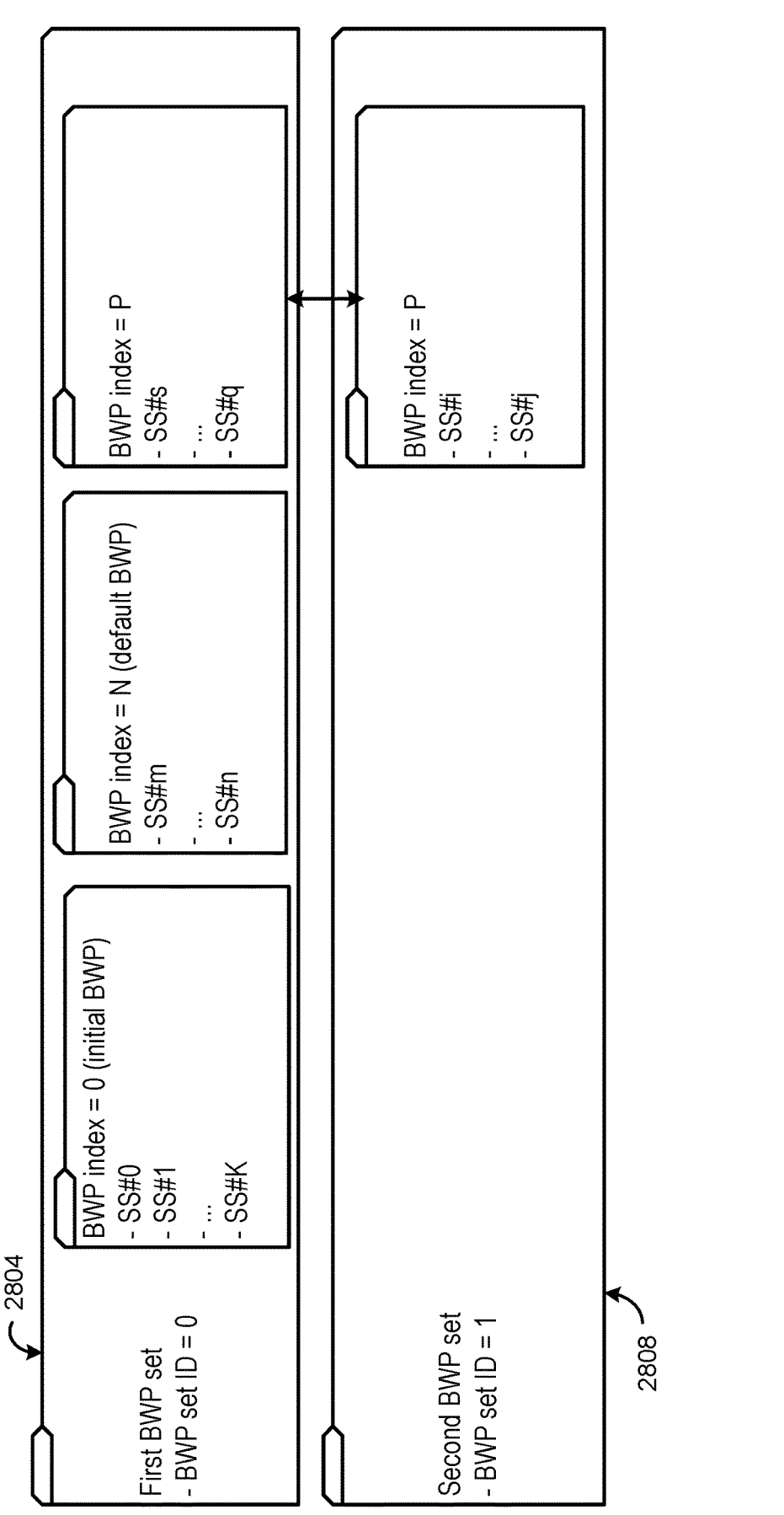
FIG. 28A shows an example configuration of a plurality of BWP sets for a cell.

FIG. 28A shows an example configuration of a plurality of BWP sets for a cell. The example configuration of the plurality of sets may enable dynamic enabling/disabling of cross-carrier scheduling for the cell as further described herein. A base station may configure multiple sets of BWPs. Each set of BWP may be configured with either self-carrier scheduling or cross-carrier scheduling. One or more BWPs in the multiple sets may share BWP indicators/indices. BWP switching procedures may be used to switch between BWPs in a BWP set. An indicator of a BWP set may be used to enable/disable cross-carrier scheduling. FIG. 28B and FIG. 28C show example methods that may be performed by a base station and a wireless device, respectively, for cross-carrier scheduling and self-carrier scheduling.

A base station may send (e.g., step 2832), to the wireless device, one or more configuration messages indicating a first BWP set 2804 and/or a second BWP set 2808 for the cell. The base station may configure, via the one or more configuration messages, the first BWP set 2804 and/or the second BWP set 2808, each comprising respective one or more BWPs. The first BWP set 2804 may comprise a BWP #0 (e.g., a BWP with BWP indicator/index 0, or an initial BWP), a BWP #N (e.g., a BWP with BWP indicator/index N, or a default BWP), and a BWP #P (e.g., a BWP with BWP indicator/index P, or a non-initial/non-default BWP). The first BWP set 2804 may comprise any other quantity of BWPs. A wireless device may consider that an initial DL BWP and a default DL BWP may correspond to the first BWP set 2804, for example, based on an explicit configuration from the base station (e.g., based on receiving configuration parameters). The wireless device may consider that an initial DL BWP and a default DL BWP may correspond to the first BWP set 2804, for example, without an explicit configuration from the base station. The base station may use a BWP set indicator/ID (e.g., 0 or 1) to indicate a BWP set (e.g., the first BWP set 2804 or the second BWP set 2808) for a non-initial DL BWP and/or a non-default DL BWP. The wireless device may expect to be configured with the second BWP set 2804, for example, if the wireless device is configured with cross-carrier scheduling for the cell. The wireless device may receive (e.g., step 2852) the one or more configuration messages.

One or more BWP indices may be shared between the first BWP set 2804 and the second BWP set 2808. Sharing BWP indices between the first BWP set 2804 and the second BWP set 2808 may enable reduced overhead for indicating BWP switching even if a quantity of BWPs is increased. For example, the second BWP set may also comprise a BWP with BWP indicator/index P). The base station may configure/associate self-carrier scheduling for one or more first DL BWPs of the first BWP set 2804. The base station may configure/associate cross-carrier scheduling for one or more second DL BWPs of the second BWP set 2808.

The wireless device may activate a first BWP of the first BWP set 2804 (e.g., BWP #P of the first BWP set 2804) as an active BWP. The wireless device may operate on the first BWP based on self-carrier scheduling for the cell. The wireless device may monitor one or more search spaces configured for the first BWP (e.g., SS #s, . . . , SS #q). The base station may send (e.g., step 2836), via a search space of the one or more search spaces configured for the first BWP, first DCI scheduling transmission (e.g., downlink transmission) via the cell. The wireless device may receive (e.g., step 2854), the first DCI. The base station 2804 may send (e.g., step 2837), via the first BWP of the cell, downlink data as scheduled by the first DCI. The wireless device may receive (e.g., step 2856), via the first BWP of the cell and based on the first DCI, the downlink data.

The base station may send/transmit (e.g., step 2838) a command/indication to enable cross-carrier scheduling for the cell. The command may indicate a BWP set indicator of the second BWP set 2808. The wireless device may determine (e.g., step 2862) a second BWP from the second BWP set 2808 based on the BWP indicator/index of the active BWP of the cell (e.g., the BWP indicator/index of the first BWP), for example, based on/in response to receiving the command/indication. The wireless device may determine the second BWP that shares a same BWP indicator/index as the first BWP. The wireless device may switch to the second BWP, for example, based on/in response to the determining. The wireless device may further determine (e.g., step 2864) one or more second search spaces of a scheduling cell based on one or more first search spaces of the second BWP. The second BWP may comprise SS #i, . . . , SS #j (e.g., corresponding to search space indicator/index i, . . . , a search space indicator/index j). The wireless device may determine the one or more second search spaces, wherein a second search space indicator/index of a second search space of the one or more second search spaces is same as a first search space indicator/index of a first search space of the one or more first search spaces. The wireless device may determine the one or more second search spaces of the scheduling cell based on one or more search space indicators/indices of the one or more first search spaces of an active DL BWP, for example, if cross-carrier scheduling is enabled.

The base station may send (e.g., step 2840), via a search space of the scheduling cell, second DCI scheduling transmission (e.g., downlink transmission) via the cell. The wireless device may receive (e.g., step 2866), via a search space of the scheduling cell, the second DCI. The base station 2804 may send (e.g., step 2842), via the second BWP of the cell, downlink data as scheduled by the second DCI. The wireless device may receive (e.g., step 2868), via the second BWP of the cell and based on the second DCI, the downlink data.

Figure 28D:
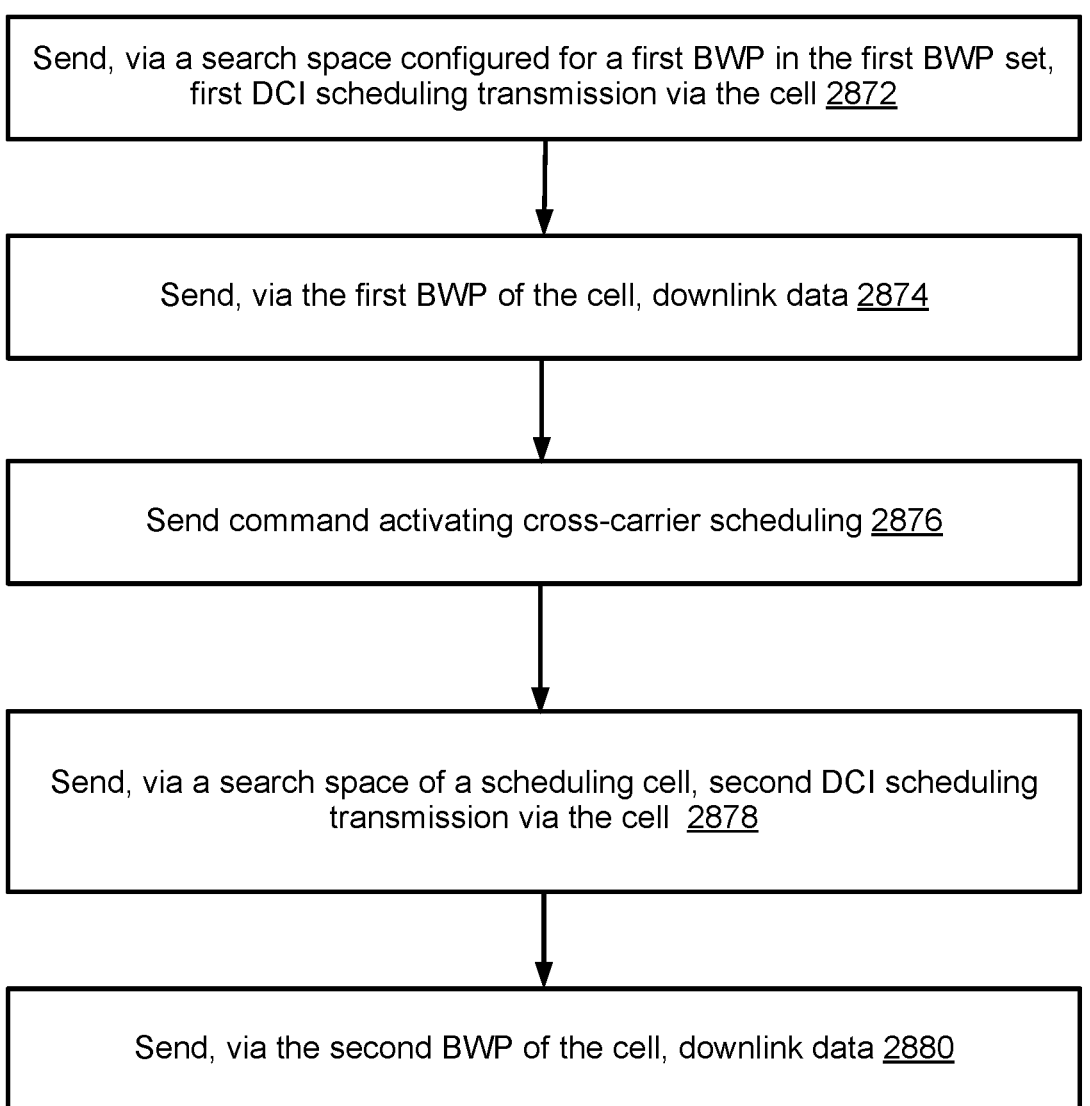
FIG. 28D shows an example method for signal transmission.
Figure 28E:
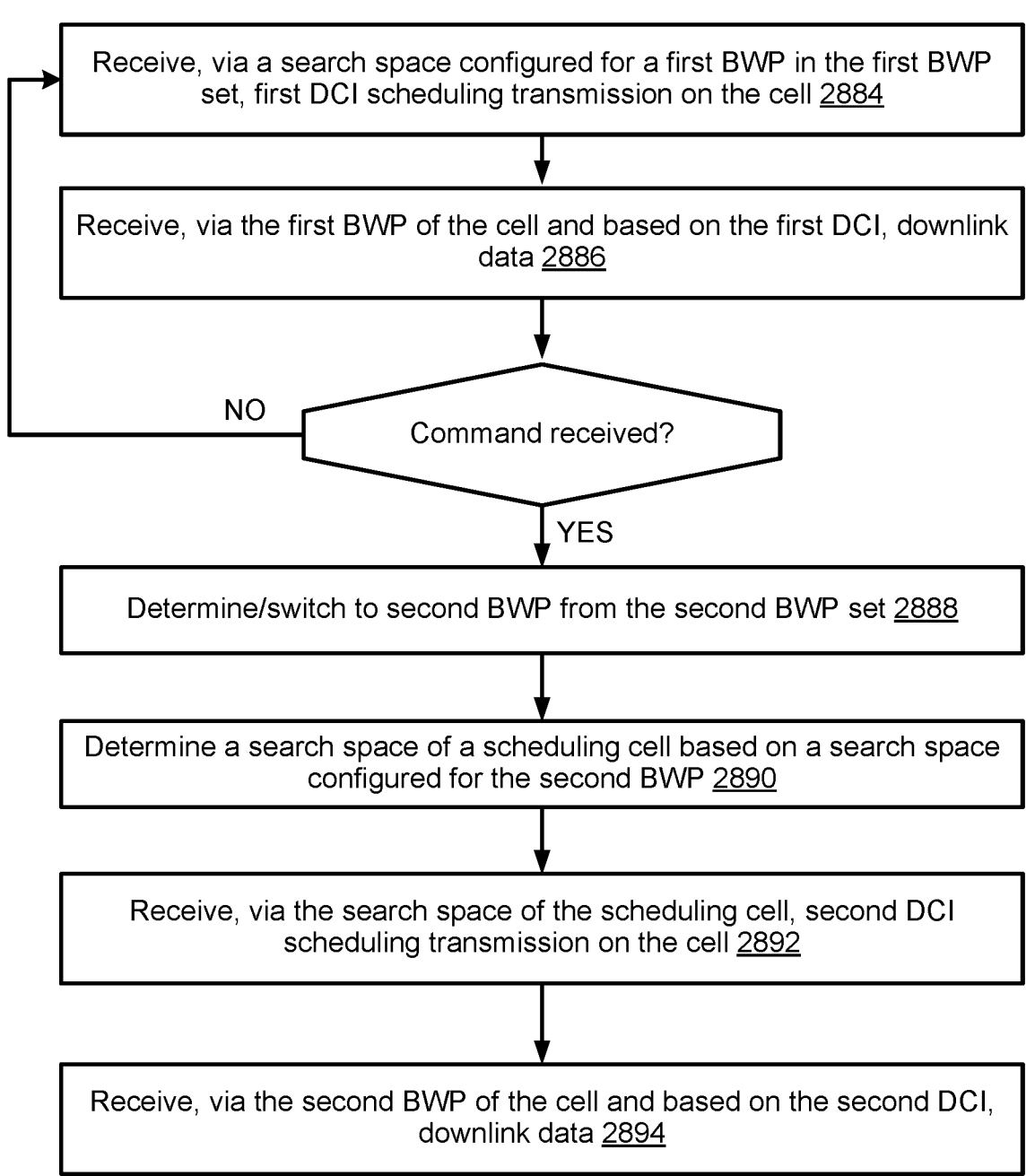
FIG. 28E shows an example method for signal reception.

FIG. 28D and FIG. 28E show an example method 2870 that may be performed by a base station and an example method 2882 that may be performed by a wireless device, respectively. Steps 2872-2880 of FIG. 28D may be similar to steps 2836-2842, respectively, as described with reference to FIG. 28B. Steps 2884-2894 of FIG. 28E may be similar to steps 2854-2868, respectively, as described with reference to FIG. 28C.

The base station may send BWP switching DCI to the wireless device. The BWP switching DCI may comprise a BWP indicator/index for a new active DL BWP. The wireless device may switch to the new active DL BWP. The active DL BWP and the new active DL BWP may correspond to a same BWP set. The BWP switching DCI may not switch between cross-carrier scheduling and self-carrier scheduling. The BWP switching DCI may switch between BWPs corresponding to a same BWP set. A DCI bit field size of the BWP switching DCI may be determined based on a quantity of BWPs in the first BWP set 2804 or the second BWP set 2808. The DCI bit field size may be equal to 2 bits, for example, if the first BWP set 2804 comprises 3 BWPs. The DCI bit field size may be equal to any other quantity of bits and may be determined based on a quantity of BWPs in the first BWP set 2804 or the second BWP set 2804. K may be equal to a maximum quantity of BWPs in a BWP set. The wireless device may not expect to be configured with more than K BWPs for each BWP set, wherein the K is a quantity of BWPs supported with and without cross-carrier scheduling (e.g., K=4, or any other quantity).

The wireless device may experience an expiration of a BWP inactivity timer of the cell. The wireless device may transition to the default BWP as the active DL BWP, for example, based on the expiration of the BWP inactivity timer. The wireless device may transition to the default BWP of the first BWP set 2804, for example, if the wireless device is activated with the second BWP of second BWP set 2808 and if the default BWP is associated with self-carrier scheduling. A first default BWP and a second default BWP may be configured respectively in each BWP set (e.g., the first BWP set 2804 and the second BWP set 2808). The wireless device may switch to the first default BWP, for example, if the current active BWP corresponds to the first BWP set 2804. The wireless device may switch to the second default BWP, for example, if the current active BWP belongs to the second BWP set 2808. The current active BWP may be the active BWP at a time of the expiration of the BWP inactivity timer.

The wireless device may switch to the initial DL BWP regardless of whether the current active BWP belongs to the first BWP set 2804 or the second BWP set 2808, for example, if the wireless device is not configured with a default BWP.

A base station may configure a plurality of DL BWPs for a cell. The base station may configure a first BWP with a first BWP indicator/index with a value that is less than K (e.g., the first BWP index<K). The base station may configure a second BWP with a second BWP indicator/index with a value that is equal to or larger than K (e.g., the second BWP index>=K). K may be equal to a quantity of BWPs supported by BWP switching. The wireless device may determine whether the first BWP corresponds to a BWP set configured for self-carrier scheduling (e.g., a first BWP set) or a BWP set configured for cross-carrier scheduling (e.g., a second BWP set) based on the first BWP indicator/index. The wireless device may determine that a BWP corresponds to the BWP set configured for self-carrier scheduling (e.g., the first BWP set), for example, if a value of a BWP indicator/index of the BWP is less than K. Otherwise, the wireless device may determine that the BWP corresponds to the BWP set configured for cross-carrier scheduling (e.g., the second BWP set). The wireless device may determine that the first BWP corresponds to the first BWP set and the second BWP corresponds to the second BWP set based on corresponding values of the BWP indicators. The base station may configure a BWP set based on a BWP indicator/index of a BWP. The wireless device may determine the second BWP set, for example, the base station configures one or more parameters for cross-carrier scheduling for the cell.

Figure 29:
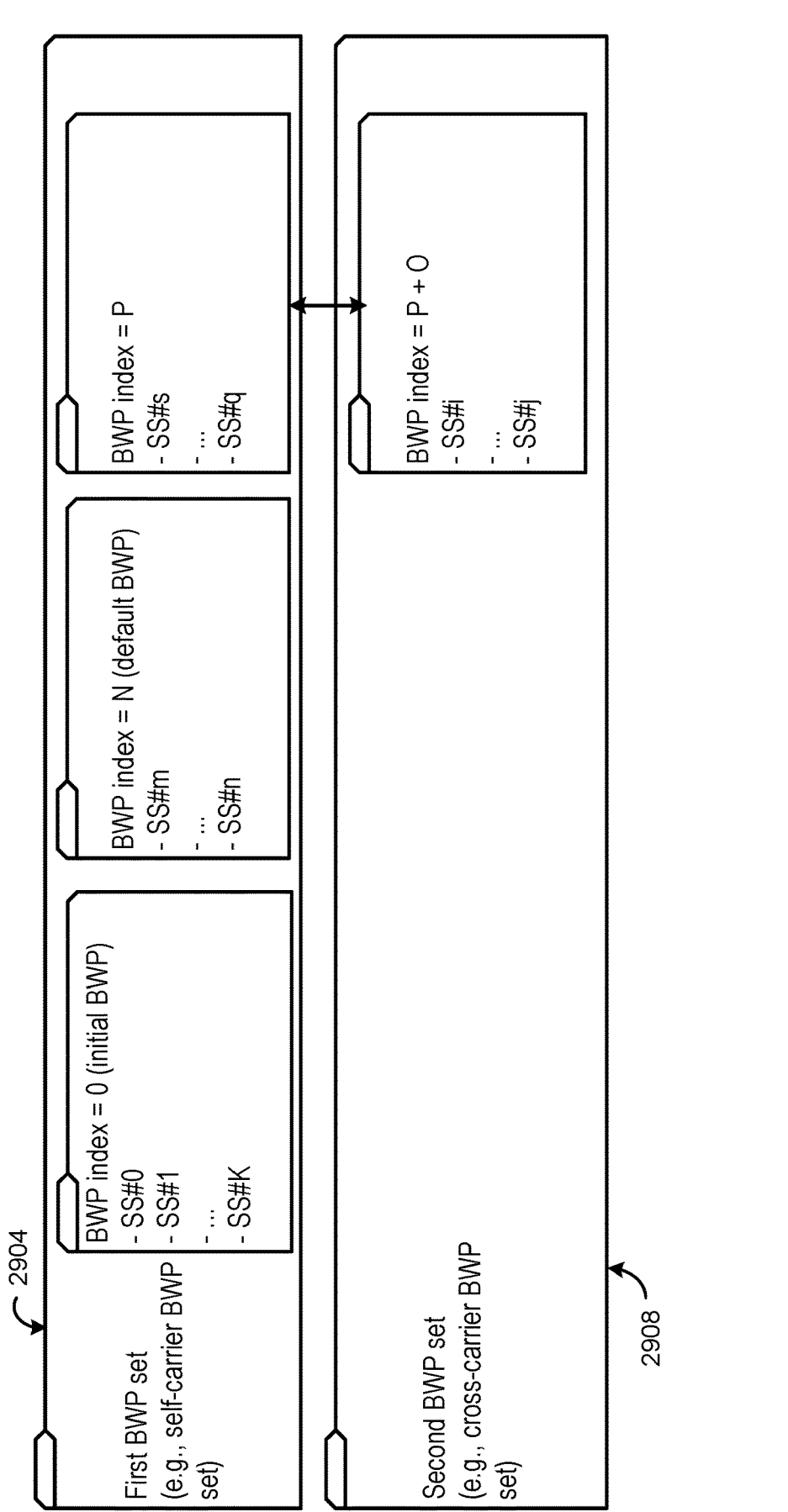
FIG. 29 shows an example configuration of a plurality of BWP sets for a cell.

FIG. 29 shows an example configuration of a plurality of BWP sets for a cell. BWPs may be grouped based on BWP indicators/indices. The example configuration of the plurality of sets may enable dynamic enabling/disabling of cross-carrier scheduling for the cell as further described herein.

A base station may configure, for a first BWP set 2904, an initial BWP (e.g., BWP with BWP indicator/index 0), a default BWP (e.g., BWP with BWP indicator/index N) and a first BWP (BWP with BWP indicator/index P). P and the N may be less than K (e.g., K=4, or any other quantity). K may be equal to a maximum quantity of BWPs in a BWP set. The wireless device may determine that the initial BWP, the default BWP and the first BWP belong to the first BWP set 2904, for example, based on BWP indicator/indices of the initial BWP, the default BWP, and the first BWP being smaller than K. The base station may configure, for a second BWP set 2908 (e.g., a second BWP set, a second BWP (e.g., BWP with BWP indicator/index P+O). P+O may be greater than or equal to K (e.g., O=K). The wireless device may determine that the second BWP corresponds to the second BWP set 2908, for example, based on a second BWP index of the second BWP being greater than or equal to K. Offset O may be implicitly or explicitly configured to be equal to K (or any other value). The base station may configure/associate self-carrier scheduling for one or more first DL BWPs of the first BWP set 2904. The base station may configure/associate cross-carrier scheduling for one or more second DL BWPs of the second BWP set 2908.

The wireless device may activate the first BWP of the first BWP set 2904 (e.g., BWP with BWP indicator/index P) as an active BWP. The wireless device may switch from the first BWP to the second BWP, for example, based on/in response to receiving a command activating/enabling cross-carrier scheduling for the cell. The wireless device may determine the second BWP from the second BWP set 2908 based on the BWP indicator/index of an active BWP of the cell (e.g., the BWP indicator/index P of the first BWP), for example, based on/in response to receiving the command/indication. The wireless device may determine the second BWP based on determining a sum of the BWP indicator/index of the first BWP and the offset (e.g., P+O). The wireless device may perform one or more operations related to cross-carrier scheduling in accordance with the procedures described with reference to FIG. 28A-C. For example, the wireless device may determine search spaces of a scheduling cell, for cross-carrier scheduling of the cell, based on search spaces of the second BWP from the second BWP set 2908.

The first BWP set 2904 may comprise one or more first BWPs associated/configured with self-carrier scheduling for a primary cell of a cell group or a PUCCH group. The second BWP set 2908 may comprise one or more second BWPs associated/configured with cross-carrier scheduling for a secondary cell, for example, if the secondary cell is configured with cross-carrier scheduling.

A base station may configure a first UL BWP set and a second UL BWP set. The first UL BWP set may correspond to a first (DL) BWP set and the second UL BWP set may correspond to a second (DL) BWP set. The configuration may be applied for unpaired spectrum or if an UL BWP is mapped to a DL BWP in terms of BWP switching. The base station may configure a single UL BWP set regardless of a configured quantity of DL BWP sets. The base station may configure any other quantity of UL BWP sets. The wireless device may be configured with one or more UL BWPs (e.g., with UL BWP indicators/indices being less than K), for example, if the wireless device may implicitly determine the first BWP set and the second BWP set based on a BWP indicator/index of a BWP (e.g., as described with reference to FIG. 29). The wireless device may determine a corresponding UL BWP for an active DL BWP, where a BWP indicator/index of the active DL BWP is greater than or equal to K by determining a new value of BWP indicator/index (e.g., the new value=the BWP indicator/index−O, or the BWP indicator/index−K). The wireless device may determine a paired DL BWP in a different BWP set or the first BWP set, and may use a BWP indicator/index of the paired DL BWP to determine the corresponding UL BWP.

A base station may configure self-carrier scheduling or cross-carrier scheduling for a BWP (e.g., DL BWP, UL BWP) of a first cell. The base station may configure self-carrier scheduling for a first BWP of the first cell. The base station may configure cross-carrier scheduling for a second BWP of the first cell. The base station may configure a cross carrier scheduling configuration (e.g., CrossCarrierSchedulingConfig) for the second BWP. The first BWP and the second BWP may share a same set of parameters, (e.g., a same bandwidth and a same numerology) except for configurations of search spaces and indication of self/cross-carrier scheduling. The base station may switch between the first BWP and the second BWP to switch between self-carrier scheduling and cross-carrier scheduling for the first cell. The base station may expect a first delay for switching between the first BWP and the second BWP. The base station may expect a second delay for switching between the first BWP and a third BWP. The first BWP and the third BWP may or may not have a same bandwidth and a same numerology. The first delay may be smaller than the second delay. A wireless device may report its capability corresponding to the first delay. The wireless device may report its capability corresponding to the second delay. The first delay and the second delay may be independent of each other.

A wireless device may be configured with a first DL BWP of a first cell. A base station may configure one or more first search spaces for the first DL BWP of the first cell. The one or more first search spaces may support self-carrier scheduling via the first DL BWP for the first cell regardless of whether self-carrier scheduling is enabled or a cross-carrier scheduling is enabled for the first cell. The base station may configure one or more second search spaces for the first DL BWP of the first cell. The one or more second search spaces may support self-carrier scheduling via the first DL BWP, for example, if self-carrier scheduling is enabled for the first cell. The base station may configure one or more third search spaces for the first DL BWP of the first cell. The one or more third search spaces may support cross-carrier scheduling via the first DL BWP, for example, if cross-carrier scheduling is enabled for the first cell. The wireless device may monitor the one or more first search spaces and the one or more second search spaces, for example, if self-carrier scheduling is enabled for the first cell and an active DL BWP is the first DL BWP. The wireless device may monitor the one or more first search spaces and the one or more third search spaces, for example, if cross-carrier scheduling is enabled for the first cell and the active DL BWP is the first DL BWP. The enabling of the self-carrier or the cross-carrier may be indicated via RRC, MAC CE and/or DCI signaling.

A base station may configure (e.g., via one or more RRC messages) a first search space of a DL BWP of a first cell. The base station may configure (e.g., via the one or more RRC messages) a second search space of the DL BWP of the first cell. The base station may configure self-carrier scheduling for the first search space. A wireless device may monitor the first search space for one or more DCIs. The one or more DCIs may comprise resource assignments for the first cell. The base station may configure cross-carrier scheduling for the second search space. The base station may configure a parameter (e.g., crossCarrierScheduled) as enabled or disabled, for example, to configure cross-carrier scheduling for the second search space. The wireless device may use a cross carrier scheduling configuration (e.g., CrossCarrierSchedulingConfig) of the first cell to locate a scheduling cell for the first cell (e.g., for cross-carrier scheduling for the second search space), for example, if the parameter is enabled.

The base station may or may not enable cross-carrier scheduling for one or more common search spaces. The base station may or may not enable cross-carrier scheduling for one or more wireless device-specific search spaces. The base station may not enable cross-carrier scheduling for one or more wireless device-specific search spaces, for example, if the wireless device is configured to monitor one or more fallback DCIs on the one or more wireless device-specific search spaces. The wireless device may monitor non-fallback DCIs in one or more search spaces of the scheduling cell for the first cell, for example, if the wireless device is configured with cross-carrier scheduling corresponding to the one or more search spaces. The wireless device may not be configured with cross-carrier scheduling for a common search space. Cross-carrier scheduling may be applied for one or more wireless device-specific search spaces of a BWP of the first cell.

A base station may configure (e.g., via RRC signaling) a plurality of DL BWPs for a first cell. The first cell may be a primary cell of a cell group. A wireless device may be activated with an initial DL BWP, wherein the plurality of DL BWPs may not comprise the initial DL BWP. The wireless device may be activated with the initial DL BWP via an initial access procedure or a random access procedure. The base station may configure one or more first search spaces for a first DL BWP, of the plurality of the DL BWPs of the first cell. The one or more first search spaces may be configured with self-carrier scheduling. The one or more first search spaces may be common search spaces. The wireless device may determine that the common search spaces are self-carrier scheduled. The one or more first search spaces may be wireless device-specific search spaces. The base station may determine whether to apply self-carrier scheduling or cross-carrier scheduling for the one or more second first spaces.

The base station may configure one or more second search spaces for the first DL BWP of the plurality of the DL BWPs of the first cell. The one or more second search spaces may be configured with cross-carrier scheduling. The one or more second search spaces may be wireless device-specific search spaces. The base station may determine whether to apply self-carrier scheduling or cross-carrier scheduling for the one or more second search spaces.

A wireless device may monitor one or more search spaces of a scheduling cell for receiving downlink/uplink scheduling information for a cell (e.g., a primary cell). The wireless device may not monitor any search space via the cell, for example, if cross-carrier scheduling is enabled for the cell. The base station may configure one or more search spaces specific to the cell. The base station may configure a BFR search space for the cell or a search space for monitoring sidelink DCIs. The wireless device may monitor the BFR search space and/or the search space for sidelink DCIs, via the scheduling cell, for example, if cross-carrier scheduling is enabled for the cell. Monitoring the BFR search space and/or the search space for sidelink DCIs may degrade performance of the wireless device. The wireless device may not be able to determine a new beam based on a TCI state of the BFR search space/BFR-CORESET, for example, if the wireless device monitors the BFR search space via the scheduling cell. The wireless device may not be able to receive sidelink DCIs, for example, if the scheduling cell is inactive state. The wireless device may get interrupted due to switching between scheduling via the cell (e.g., self-carrier scheduling) and scheduling via the scheduling cell (e.g., cross-carrier scheduling), resulting in service interruption. Various enhancements may be used for facilitating self-carrier scheduling and cross-carrier scheduling of a cell. A base station may indicate a search space, of the cell, as being associated with cross-carrier scheduling based on mapping the search space to another search space of a scheduling cell. The wireless device may determine a search space, of the cell, as being configured with self-carrier scheduling based on an indicator/index of the search space not being mapped to any indicator/index of one or more search spaces of a scheduling cell. The wireless device may determine a search space as being configured with cross-carrier scheduling based on an indicator/index of the search space being mapped to another search space of a scheduling cell. Determination of whether a search space is configured with self-carrier scheduling or cross-carrier scheduling based on mapping of search space indicators/indices may limit flexibility of the base station in determining/assigning search space indicators/indexes among multiple BWPs of the cell and the scheduling cell.

A base station may indicate, for each search space of a cell, self-carrier scheduling or cross-carrier scheduling. The base station may indicate self-carrier scheduling for a BFR search space. The base station may indicate self-carrier scheduling for a common search space (e.g., for monitoring SIBs, RARs, paging signals). The base station may indicate self-carrier scheduling for a search space for monitoring sidelink DCIs. The base station may indicate cross-carrier scheduling for a wireless device-specific search space for monitoring non-fallback DCIs. The base station may configure self-carrier scheduling or cross-carrier scheduling for the search spaces explicitly (e.g., via RRC signaling, MAC-CE, etc.) such that the base station is not restricted in assigning search space indicators/indexes. The wireless device may monitor one or more first search spaces of the cell, via the cell, based on self-carrier scheduling. The wireless device may monitor one or more second search spaces of the cell, via the scheduling cell, based on cross-carrier scheduling. Indicating self-carrier scheduling or cross-carrier scheduling for each search space may allow efficient cross-carrier scheduling for the cell (e.g., a primary cell) enabling the wireless device to perform various operations associated with cell based on different search spaces.

FIG. 30 shows an example search space configuration of a search space. The search space configuration may be used to configure a search space with self-carrier scheduling or cross-carrier scheduling. A base station may send the search space configuration to the wireless device.

One or more parameters of a search space (e.g., configured for a DL BWP of the first cell) may comprise an indication (e.g., CrossCarrierScheduled) to enable (e.g., configure) or disable cross-carrier scheduling for the search space, The one or more parameters may indicate, for the search space, a quantity of candidates (e.g., PDCCH candidates) for each aggregation level (e.g., nrofCandidates). The wireless device may use the indicated quantity of candidates for each aggregation level of the search space, for example, if cross-carrier scheduling is enabled/configured for the search space. The wireless device may monitor a second search space of a scheduling cell for the first cell, for example, if cross-carrier scheduling is enabled for the search space. The wireless device may use all the configuration parameters of the search space for monitoring one or more DCIs (e.g., scheduling data for the first cell) via the search space, for example, if cross-carrier scheduling is disabled for the search space. The indication for enabling or disabling cross-carrier scheduling for the search space may be available, for example, if the search space is a wireless device-specific search space and the first cell is configured with cross-carrier scheduling by the scheduling cell.

A parameter (e.g., ue-Specific-cross-carrier) may indicate DCI formats of DCI to be monitored via a search space. The indication for enabling or disabling cross-carrier scheduling for a search space may be present/available in the search space configuration based on one or more considerations. The indication for enabling or disabling cross-carrier scheduling for the search space may be available, for example, if the search space is a wireless device-specific search space, DCI formats (e.g., parameter dci-Formats) configured with the search space (e.g., monitored for the search space) does not comprise fallback DCI (e.g., one or more DCI formats configured for the search space comprise non-fallback DCIs), and/or the first cell is configured with cross-carrier scheduling by the scheduling cell. DCI formats corresponding to fallback DCIs may comprise DCI format 0_0/1_0 (e.g., indicated by parameter formats0-0-And-1-0). Otherwise, the wireless device may not be configured with the indication for enabling or disabling cross-carrier scheduling for the search space. A parameter (e.g., controlResource-SetId) may indicate a CORESET associated with the search space.

The wireless device may not apply (or enable) cross-carrier scheduling for a third search space of a DL BWP of the first cell, for example, if one or more following conditions are being met. The one or more conditions may comprise: the third search space being a wireless device-specific search space, the third search space being configured for monitoring one or more DCIs based on non-fallback DCI formats (e.g., DCI format 1_1, DCI format 0_1, DCI format 1_2, DCI format 0_2), a first DL BWP of the first cell not being an initial DL BWP, the first DL BWP of the first cell not being configured as a default DL BWP, the first cell being a primary cell of a cell group, the first cell being a primary cell of a PUCCH group (e.g., a PUCCH Cell), the first cell not being configured with a—carrier scheduling. The wireless device may not expect that the indication for enabling or disabling cross-carrier scheduling for the search space to be available/configured for the search space, for example, if the one or more conditions are not met.

A wireless device may receive (e.g., from a base station) one or more messages. The one or more messages may comprise configuration parameters for a first cell. The configuration parameters may comprise a cross-carrier scheduling cell indicator (e.g., index, or identifier) and one or more first parameters of a first search space for monitoring one or more first DCIs. The first DCIs may comprise/schedule resource assignments/resources corresponding to data for the first cell. The one or more first parameters may comprise a first search space indicator/index of the first search space. The configuration parameters may comprise one or more second parameters of a second search space for monitoring one or more second DCIs. The one or more second DCIs may comprise resource assignments corresponding to data for the first cell. The one or more second parameters may comprise a second search space indicator/index of the second search space and an indication of a cross-carrier scheduling.

The wireless device may determine a third search space, configured for the scheduling cell, based on the one or more second parameters of the second search space of the first cell. The third search space may be configured for an active DL BWP of the scheduling cell. A third search space indicator/index of the third search space may be the same as the second search space indicator/index of the second search space. The third search space indicator/index of the third search space may be associated with the second search space indicator/index of the second search space. The association may be configured by the base station. The third search space indicator/index may be a sum of the second search space indicator/index and an offset value (e.g., the offset value=10, or any other value). The third search space may have a same order, among one or more search spaces configured for the active DL BWP of the scheduling cell, as an order of the second search space among one or more search spaces for an active DL BWP of the first cell. The base station may indicate cross-carrier scheduling for the second search space based on the third search space indicator/index of the third search space being associated with the second search space indicator/index. The base station may indicate cross-carrier scheduling for the second search space based on the third search space indicator/index of the third search space being the same as the second search space indicator/index.

The wireless device may monitor the first search space of the first cell for the one or more first DCIs. The wireless device may monitor the third search space of the scheduling cell for the first cell for the one or more second DCIs. The first search space may be indicated with self-carrier scheduling regardless of whether or not the second search space is enabled with cross-carrier scheduling.

The wireless device may receive a command (e.g., via MAC CE(s), and/or DCI(s)) activating cross-carrier scheduling for the first cell. The command may be a MAC CE activating one or more secondary cells. The MAC CE may indicate an activation of the scheduling cell. The command may enable cross-carrier scheduling. The wireless device may activate the scheduling cell (e.g., if not already active), for example, based on/in response receiving the command. The wireless device may start monitoring the third search space of the scheduling cell for the one or more second DCIs, for example, based on/in response to receiving the command. The wireless device may monitor the third search space for one or more third DCIs comprising resource assignments for the scheduling cell. The second search space indicator/index may be larger than the first search space index. A smallest indicator/index for the second search space may be greater than a highest indicator/index for the first search space. The lowest indicator/index for the second search space may be 40 (e.g., or any other value).

A wireless device may determine self-carrier scheduling or cross-carrier scheduling for a search space of a DL BWP of a first cell based on a search space indicator/index of the search space, for example, if cross-carrier scheduling is enabled/configured for the first cell. The wireless device may determine that the search space is configured with cross-carrier scheduling, for example, if search space indicator/index is greater than or equal to M (e.g., M=10, 40, or any other value). The wireless device may determine that the search space is configured/indicated with self-carrier scheduling, for example, if search space indicator/index is smaller than M.

A wireless device may determine self-carrier scheduling or cross-carrier scheduling for a search space of a DL BWP of a first cell based on a CORESET associated with the search space, for example, if cross-carrier scheduling is enabled/configured for the first cell. The wireless device may determine that the search space is configured/indicated with self-carrier scheduling, for example, if the search space is associated/configured with a first CORESET of the first cell (e.g., controlResourceSetId is present and indicates the first CORESET of the first cell). The wireless device may determine the search space is configured/associated with cross-carrier scheduling, for example, if no CORESET is associated with the search space or if an invalid CORESET indicator is indicated (e.g., in controlResourceSetId).

Figure 31A:
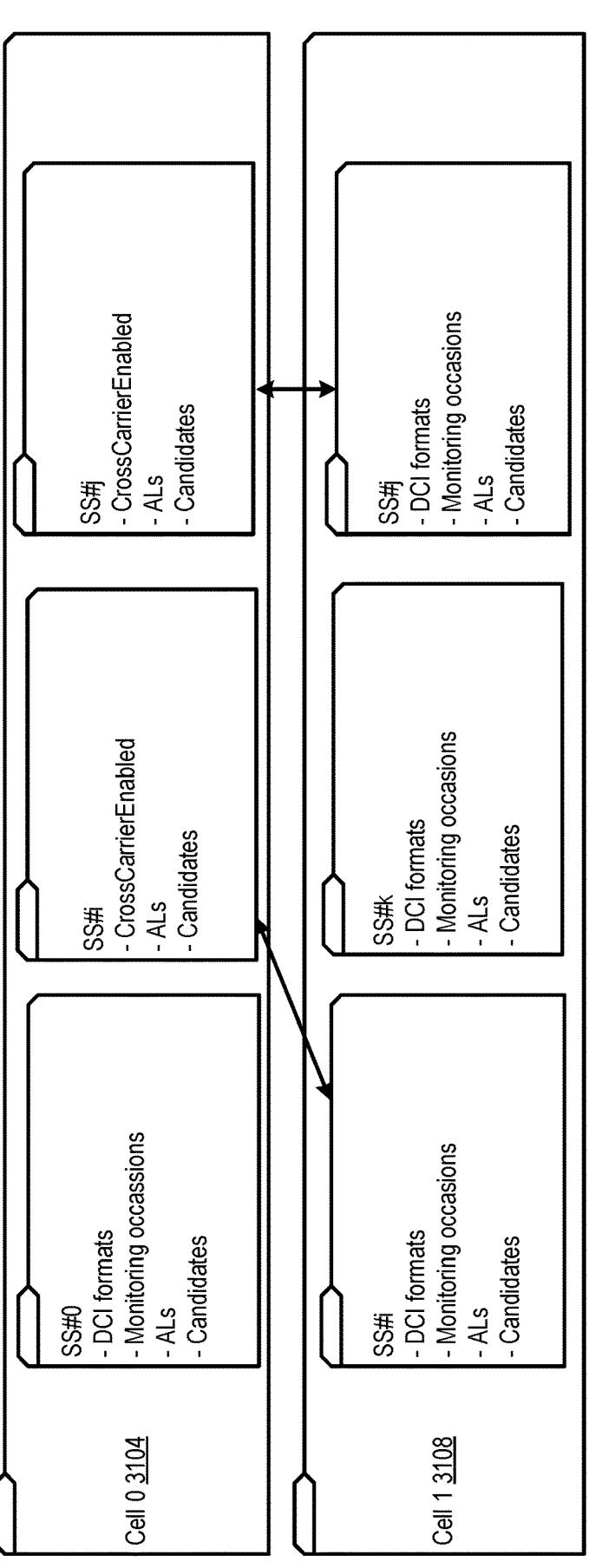
FIG. 31A shows an example configuration of search spaces.

FIG. 31A shows an example configuration of search spaces. The example configuration of search spaces may be used to indicate self-carrier scheduling or cross-carrier scheduling for a search space in a scheduled cell. The example configuration of search spaces may be used to implicitly indicate search spaces of a scheduling cell to be used for cross-carrier scheduling of resources in the scheduled cell. A search space in a scheduling cell, that has a same search space indicator/index as a search space in a scheduled cell, may be used to receive control signaling (e.g., indicating assignments in the scheduled cell). FIG. 31B and FIG. 31C show example methods at a base station and a wireless device, respectively, for cross-carrier scheduling and self-carrier scheduling.

A base station may send (e.g., step 3132) configuration parameters to a wireless device. The configuration parameters may indicate search spaces for a first cell 3104 (e.g., scheduled cell, cell 0) and a second cell 3108 (e.g., a scheduling cell, cell 1). The configuration parameters may indicate, for each search space, one or more of the parameters as described with reference to FIG. 30. The configuration parameters may indicate, for each search space, one or more of: DCI formats to be monitored via the search space, whether the search space is configured/enabled with cross-carrier scheduling, monitoring occasions associated with the search space, a quantity of candidates (e.g., PDCCH candidates) to be monitored for each CCE aggregation level (ALs), etc.

The base station may configure a first search space (e.g., with search space indicator/index 0), a second search space (e.g., with search space indicator/index i) and a third search space (e.g., with search space indicator/index j) for the first cell 3104. The base station may configure a fourth search space (e.g., with search space indicator/index i) for the second cell 3108. The wireless device may receive (e.g., step 3152) the configuration parameters. The wireless device may determine the fourth search space for the second cell 3108 corresponding to the second search space of the first cell 3104, for example, if cross-carrier scheduling is enabled for the second search space and/or for the first cell 3104. The wireless device may determine the fourth search space corresponding to the second search space based on the fourth search space and the second search space having a same search space indicator/index (e.g., i). The base station may configure fifth search space (e.g., with search space indicator/index k) and sixth search space (e.g., with search space indicator/index j) for the second cell 3108. The wireless device may determine the sixth search space for the second cell 3108 corresponding to the third search space of the first cell 3104, for example, if cross-carrier scheduling is enabled for the third search space and/or for the first cell 3104. The wireless device may determine the sixth search space corresponding to the third search space based on the sixth search space and the third search space having a same search space indicator/index (e.g., j).

The wireless device may determine that cross-carrier scheduling is configured for the second search space of the first cell 3104 based on the fourth search space of the second cell 3108 having a same search space indicator/index as the second search space of the first cell 3104. The wireless device may determine that cross-carrier scheduling is configured for the third search space of the first cell 3104 based on the sixth search space of the second cell 3108 having a same search space indicator/index as the third search space of the first cell 3104. The wireless device may determine that cross-carrier scheduling is configured for the second search space of the first cell 3104 based on an indication (e.g., parameter CrossCarrierEnabled, or parameter CrossCarrierScheduled being set to true) associated with a configuration of the second search space. The wireless device may determine that cross-carrier scheduling is configured for the third search space of the first cell 3104 based on an indication (e.g., parameter CrossCarrierEnabled) associated with a configuration of the third search space.

The base station may send (e.g., step 3136), via a search space of the first cell (e.g., the first search space), first DCI scheduling transmission via the first cell. The wireless device may receive (e.g., step 3154), via the search space of the first cell, the first DCI scheduling transmission via the first cell (e.g., comprising resource assignment for the first cell). The base station 3108 may send (e.g., step 3137), via the first cell, downlink data as scheduled by the first DCI.

The wireless device may subsequently receive (e.g., step 3156), via the first cell and based on the resource assignment, downlink data.

The base station may send (e.g., step 3138) a command enabling/activating cross-carrier scheduling for the first cell. The base station may send (e.g., step 3140), via a search space of the second cell (e.g., the fifth search space and/or the sixth search space), second DCI scheduling transmission via the first cell (e.g., comprising resource assignment for the first cell). The wireless device may determine (e.g., step 3158) the search space of the second cell as a search space corresponding to a search space of the first cell (e.g., as described above). The wireless device may receive (e.g., step 3160), via the search space of the second cell, the second DCI. The base station 3108 may send (e.g., step 3142), via the first cell, downlink data as scheduled by the second DCI. The wireless device may subsequently receive (e.g., step 3162), via the first cell and based on the resource assignment, the downlink data.

Figure 31D:
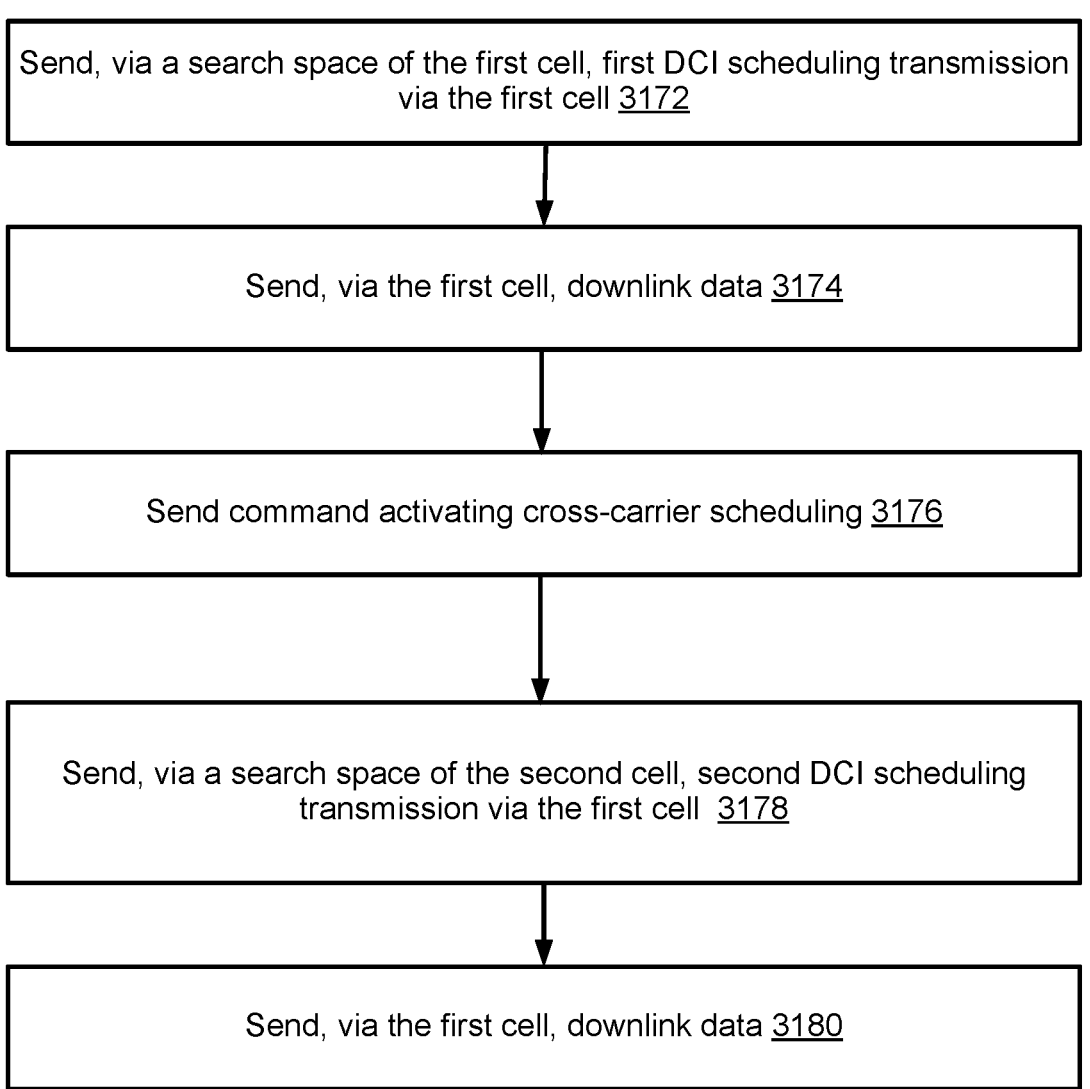
FIG. 31D shows an example method for signal transmission.
Figure 31E:
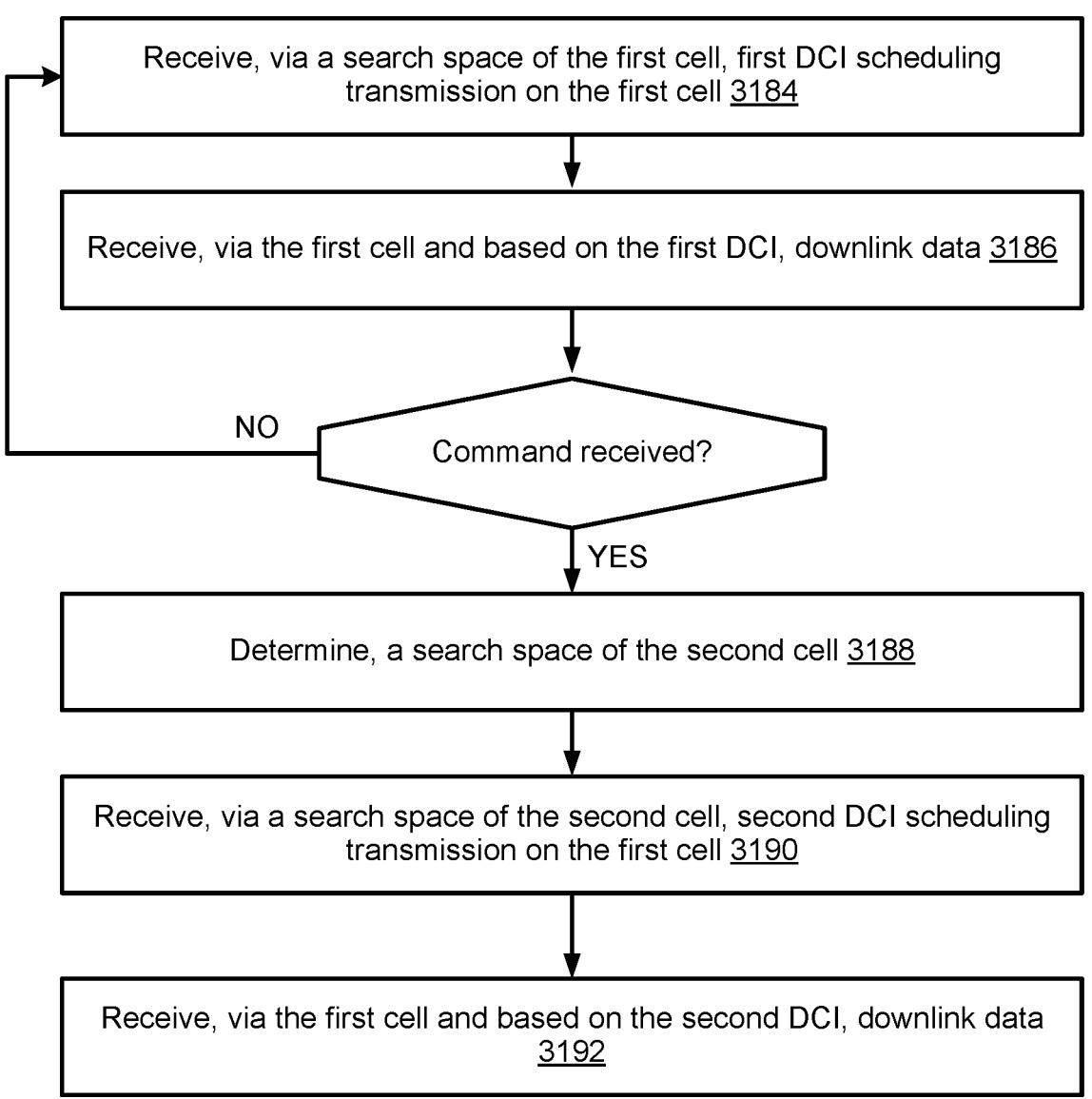
FIG. 31E shows an example method for signal reception.

FIG. 31D and FIG. 31E show an example method 3170 that may be performed by a base station and an example method 3182 that may be performed by a wireless device, respectively. Steps 3172-3180 of FIG. 31D may be similar to steps 3136-3142, respectively, as described with reference to FIG. 31B. Steps 3184-3192 of FIG. 31E may be similar to steps 3154-3162, respectively, as described with reference to FIG. 31C.

The wireless device may receive DCIs (e.g., the first DCI and/or the second DCI) based on monitoring the search spaces. The wireless device may monitor the first search space of the first cell regardless of whether or not cross-carrier scheduling is enabled/disabled. The wireless device may or may not monitor the second search space or the third search space, for example, based on the cross carrier scheduling being enabled. The wireless device may monitor the fourth search space and the sixth search space for receiving DCIs (e.g., comprising resource assignments for the first cell), for example, if cross-carrier scheduling is enabled and based on the fourth search space corresponding to the second search space and the sixth search space corresponding to the third search space. The wireless device may monitor the fourth search space based on configuration parameters of the fourth search space (e.g., DCI formats and/or monitoring occasions associated with the fourth search space). The wireless device may monitor the fourth search space based on configuration parameters of the second search space (e.g., DCI formats and/or aggregation levels associated with the second search space). The wireless device may monitor the sixth search space based on configuration parameters of the sixth search space (e.g., DCI formats and/or monitoring occasions associated with the sixth search space). The wireless device may monitor the sixth search space based on configuration parameters of the third search space (e.g., DCI formats and/or aggregation levels associated with the second search space). The wireless device may determine candidates for receiving the DCIs via the fourth search space based on configuration parameters of the second search space (e.g., ALs, candidates of the second search space). The wireless device may determine candidates for receiving the DCIs via the sixth search space based on configuration parameters of the third search space (e.g., ALs, candidates of the third search space). The second search space and the third search space may or may not be configured with other parameters (e.g., monitoring occasions and/or DCI formats).

Figure 32:
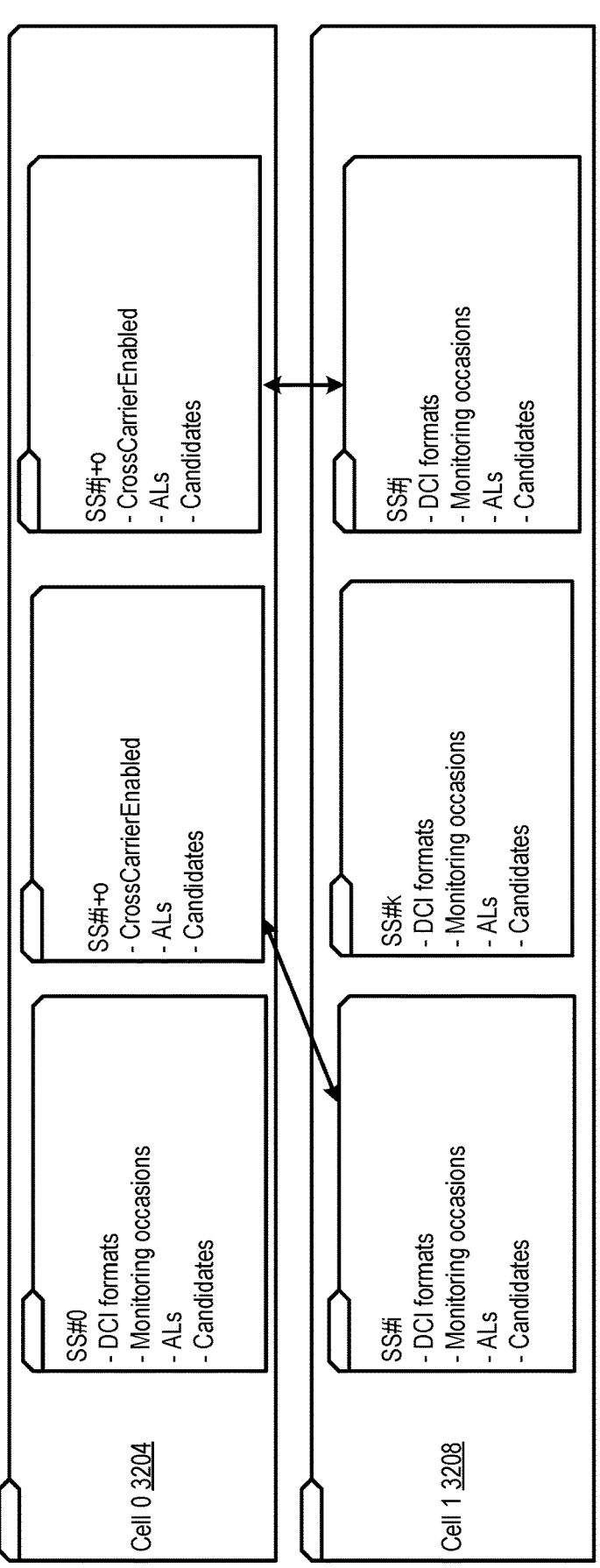
FIG. 32 shows an example configuration of search spaces.

FIG. 32 shows an example configuration of search spaces. The example configuration of search spaces may be used to implicitly indicate self-carrier scheduling or cross-carrier scheduling for a search space in a scheduled cell. The example configuration of search spaces may be used to implicitly indicate search spaces of a scheduling cell to be used for cross-carrier scheduling of resources in the scheduled cell. A search space in a scheduling cell that is associated with a search space in a scheduled cell may be used to determine resource assignments in the scheduled cell. The association may be based on an offset value.

A base station may configure (e.g., via one or more messages sent to a wireless device) search spaces for a first cell 3204 (e.g., scheduled cell, cell 0) and a second cell 3208 (e.g., a scheduling cell, cell 1). The base station may send/indicate, to the wireless device, one or more configuration parameters for each search space (e.g., as described above with reference to FIG. 31A).

The base station may configure a first search space (e.g., with search space indicator/index 0), a second search space (e.g., with search space indicator/index i+o) and a third search space (e.g., with search space indicator/index j+o) for the first cell 3204. The base station may configure a fourth search space (e.g., with search space indicator/index i) for the second cell 3208. The wireless device may determine the fourth search space of the second cell 3208 corresponding to the second search space of the first cell 3204, for example, if cross-carrier scheduling is enabled for the second search space and/or for the first cell. The wireless device may determine the fourth search space corresponding to the second search space based on the fourth search space being associated with the second search space (e.g., a search space indicator/index i of the fourth search space and a search space indicator i+o of the second search space being separated by a predefined offset value o). The base station may configure a fifth search space (e.g., with search space indicator/index k) and sixth search space (e.g., with search space indicator/index j) for the second cell. The wireless device may determine the sixth search space of the second cell 3208 corresponding to the third search space of the first cell 3204, for example, if cross-carrier scheduling is enabled for the sixth search space and/or for the first cell. The wireless device may determine the sixth search space corresponding to the third search space based on the sixth search space being associated with the third search space (e.g., a search space indicator/index j of the sixth search space and a search space indicator/index j+o of the second search space being separated by a predefined offset value o).

The wireless device may determine that cross-carrier scheduling is enabled for the second search space of the first cell 3204 based on the fourth search space of the second cell 3208 corresponding to the second search space of the first cell 3204. The wireless device may determine that cross-carrier scheduling is enabled for the third search space of the first cell 3204 based on the sixth search space of the second cell 3208 corresponding to the third search space of the first cell 3204. The wireless device may determine that cross-carrier scheduling is enabled for the second search space of the first cell 3204 based on an indication (e.g., parameter CrossCarrierEnabled) associated with a configuration of the second search space. The wireless device may determine that cross-carrier scheduling is enabled for the third search space of the first cell 3204 based on an indication (e.g., parameter CrossCarrierEnabled) associated with a configuration of the third search space. The base station and/or the wireless device may perform various operations as described with reference to FIGS. 31A-C.

The wireless device may monitor the first search space of the first cell regardless of whether or not cross-carrier scheduling is enabled/disabled. The wireless device may or may not monitor the second search space or the third search space. The wireless device may monitor the fourth search space and the sixth search space for receiving DCIs (e.g., comprising resource assignments for the first cell), for example, if cross-carrier scheduling is enabled and based on the fourth search space corresponding to the second search space and the sixth search space corresponding to the third search space. The wireless device may monitor the fourth search space based on configuration parameters of the fourth search space (e.g., DCI formats and/or monitoring occasions associated with the fourth search space). The wireless device may monitor the fourth search space based on configuration parameters of the second search space (e.g., DCI formats and/or aggregation levels associated with the second search space). The wireless device may monitor the sixth search space based on configuration parameters of the sixth search space (e.g., DCI formats and/or monitoring occasions associated with the sixth search space). The wireless device may monitor the sixth search space based on configuration parameters of the third search space (e.g., DCI formats and/or aggregation levels associated with the second search space). The wireless device may determine candidates for receiving the DCIs via the fourth search space based on configuration parameters of the second search space (e.g., ALs, candidates of the second search space). The wireless device may determine candidates for receiving the DCIs via the sixth search space based on configuration parameters of the third search space (e.g., ALs, candidates of the third search space). The second search space and the third search space may or may not be configured with other parameters such as monitoring occasions and/or DCI formats.

A wireless device may receive one or more messages. The one or more messages may comprise configuration parameters for a first cell. The configuration parameters may comprise a cross-carrier scheduling cell index/identifier and one or more first parameters of a first search space for monitoring one or more first DCIs. The first DCIs may comprise/schedule resource assignments/resources corresponding to data associated with the first cell. The one or more first parameters may comprise a first search space indicator/index. The configuration parameters may comprise one or more second parameters of a second search space for monitoring one or more second DCIs. The one or more second DCIs may comprise resource assignments corresponding to data associated with the first cell. The one or more second parameters may comprise a second search space indicator/index and an indication of a cross-carrier scheduling.

The wireless device may monitor the first search space of the first cell and the second search space of the cell, for example, if cross-carrier scheduling is not enabled (e.g., during an initial access procedure, before BWP switching, before receiving a command activating cross-carrier scheduling, before a scheduling cell is being activated).

The wireless device may receive a command (e.g., MAC CE(s), and/or DCI(s)) activating cross-carrier scheduling for the first cell. The command may be a MAC CE activating one or more secondary cells. The MAC CE may indicate an activation of the scheduling cell. The command may enable the cross-carrier scheduling. The wireless device may activate the scheduling cell (e.g., if not already activated), for example, based on receiving the command. The wireless device may determine a third search space of the scheduling cell based on the second search space indicator/index, for example, based on receiving the command. A third search space indicator/index of the third search space may be the same as the second search space indicator/index of the second search space. The wireless device may continue monitoring the first search space of the first cell for the one or more first DCIs. The wireless device may stop monitoring the second search space of the first cell. The wireless device may start monitoring the third search space of the scheduling cell for the one or more second DCIs.

Figure 33:
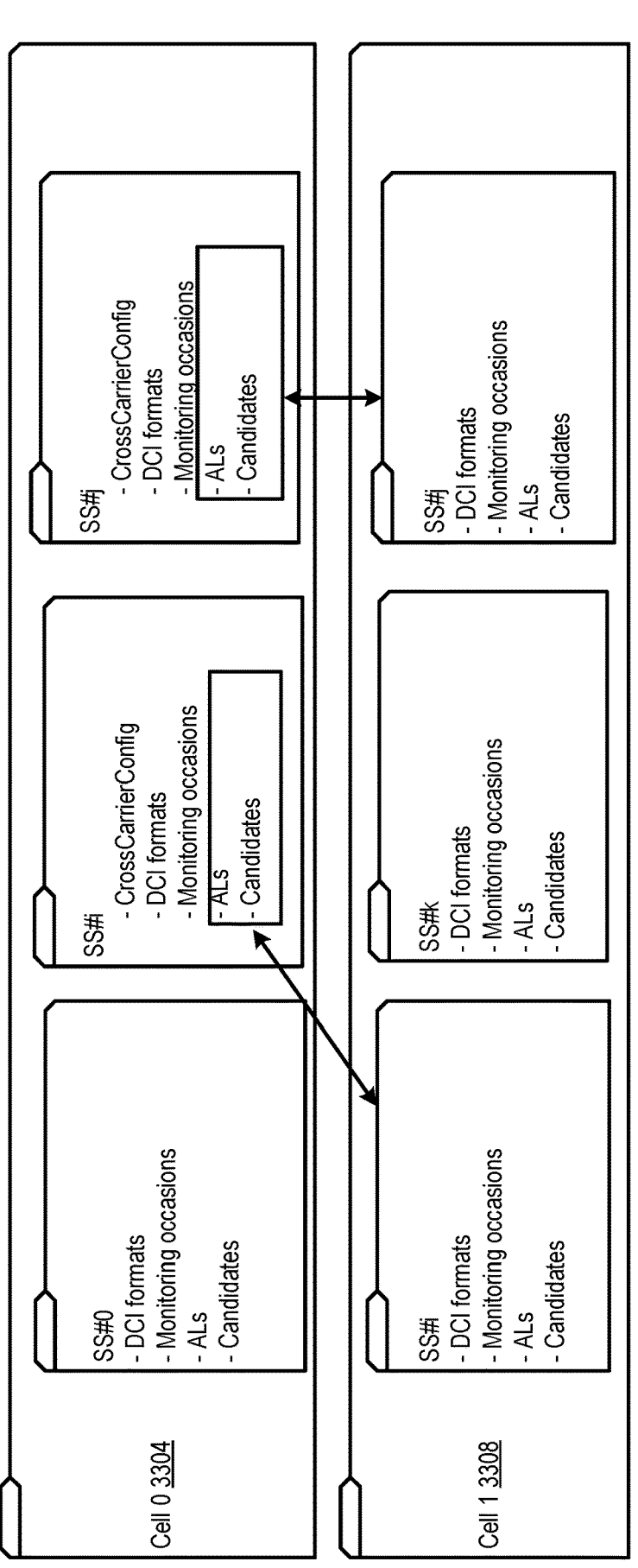
FIG. 33 shows an example configuration of search spaces.

FIG. 33 shows an example configuration of search spaces. The example configuration of search spaces may be used to implicitly indicate self-carrier scheduling or cross-carrier scheduling for a search space in a scheduled cell. One or more parameters configured for the search space in the scheduled cell may be used for receiving resource assignment information via a search space in the scheduling cell. One or more procedures associated with FIG. 33 may be similar to procedures described above with reference to FIGS. 31 and 32.

A base station may configure (e.g., via one or more messages sent to a wireless device) search spaces for a first cell 3304 (e.g., scheduled cell, cell 0) and a second cell 3308 (e.g., a scheduling cell, cell 1). The base station may send/indicate, to the wireless device, one or more configuration parameters for each search space (e.g., as described above with reference to FIG. 31A).

The base station may configure a first search space (e.g., with search space indicator/index 0), a second search space (e.g., with search space indicator/index i) and a third search space (e.g., with search space indicator/index j) for the first cell 3304. The base station may configure a fourth search space (e.g., with search space indicator/index i). The wireless device may determine the fourth search space corresponding to the second search space of the first cell 3304, for example, if cross-carrier scheduling is enabled for the second search space and/or the first cell 3304. The wireless device may determine the fourth search space corresponding to the second search space based on the fourth search space and the second search space having a same search space indicator/index (e.g., i). The base station may configure a fifth search space (e.g., with search space indicator/index k) and a sixth search space (e.g., with search space indicator/index j) for the second cell 3308. The wireless device may determine the sixth search space for the second cell 3308 corresponding to the third search space of the first cell 3304, for example, if cross-carrier scheduling is enabled for the third search space and/or the first cell 3304. The wireless device may determine the sixth search space corresponding to the third search space based on the sixth search space and the third search space having a same search space indicator/index (e.g., j).

The wireless device may determine that cross-carrier scheduling is configured for the second search space of the first cell 3304 based on the fourth search space of the second cell 3308 corresponding to the second search space of the first cell 3304. The wireless device may determine that cross-carrier scheduling is configured for the third search space of the first cell 3304 based on the sixth search space of the second cell 3308 corresponding to the third search space of the first cell 3304. The wireless device may determine that cross-carrier scheduling is configured for the second search space of the first cell 3304 based on an indication (e.g., parameter CrossCarrierEnabled) associated with a configuration of the second search space. The wireless device may determine that cross-carrier scheduling is configured for the third search space of the first cell 3304 based on an indication (e.g., parameter CrossCarrierEnabled) associated with a configuration of the third search space. The base station and/or the wireless device may perform various operations as described with reference to FIGS. 31B and 31C.

Various examples described herein (e.g., with reference to FIGS. 26-33) may be applied for scheduling downlink transmissions or uplink transmissions. With reference to FIG. 26A, for example, the DCI (e.g., DCI-1 2612 or DCI-2 2622) may schedule resources for either a downlink transmission or an uplink transmission.

The wireless device may monitor the first search space of the first cell regardless of whether or not cross-carrier scheduling is enabled/disabled. The wireless device may monitor the second search space and the third search space based on configuration parameters indicated by the base station, for example, if self-carrier scheduling is enabled. The wireless device may monitor the fourth search space and the sixth search space for receiving DCI messages comprising resource assignments for the first cell, for example, if cross-carrier scheduling is enabled and based on the fourth search space corresponding to the second search space and the sixth search space corresponding to the third search space. The wireless device may or may not stop monitoring the second search space and the third search space, for example, if cross-carrier scheduling is enabled.

The wireless device may continue monitoring the first search space, the second search space, and the third search space, for example, even if cross-carrier scheduling is enabled. The wireless device may additionally monitor the fourth search space and the sixth search space for receiving DCI messages for the first cell, for example, if cross-carrier scheduling is enabled.

The wireless device may determine candidates for receiving the DCI messages via the fourth search space based on one or more configuration parameters of the second search space (e.g., ALs, candidates of the second search space). The wireless device may determine candidates for receiving the DCI messages via the sixth search space based on one or more configuration parameters of the third search space (e.g., ALs, candidates of the third search space). The second search space and the third search space may or may not be configured with other parameters (e.g., monitoring occasions and/or DCI formats).

FIG. 34A shows an example method for self-carrier scheduling and cross-carrier scheduling based on configuration of BWP sets. The example method 3400 may be performed by a wireless device. At step 3404, the wireless device may receive an indication of first set of BWPs and a second set of BWPs for a first cell. The first set of BWPs may be configured for self-carrier scheduling and the second set of BWPs may be configured for cross-carrier scheduling.

At step 3408, the wireless device may receive cross-carrier scheduling configuration for the second set of BWPs. The cross-carrier scheduling configuration may indicate a scheduling cell for the first cell. At step 3412, the wireless device may activate a BWP from the first set of BWPs. The wireless device may activate the BWP from the first set of BWPs, for example, based on receiving an indication from the base station. The wireless device may perform self-carrier scheduling for the first cell based on the activated BWP.

At step 3416, the wireless device may determine whether an indication to enable cross-carrier scheduling of the activated BWP is received (e.g., from the base station). The indication may be DCI, a MAC CE, or an RRC configuration message. The indication may be a command activating a scheduling cell. The indication may be a command to switch to cross-carrier scheduling for the activated BWP. At step

3420, the wireless device may continue self-carrier scheduling for the first cell, for example, if the wireless device determines that the indication to enable cross-carrier scheduling is not received.

At step 3424, the wireless device may determine a second BWP from the second set of BWPs, for example, if the wireless device determines that the indication to enable cross-carrier scheduling is received. The second BWP may have a same BWP indicator/index as the activated BWP (e.g., as described with reference to FIG. 28). The second BWP may have a BWP indicator/index that is equal to a sum of a BWP indicator/index of the first BWP and an offset value (e.g., as described with reference to FIG. 29). At step 3428, the wireless device may activate the second BWP from the second set of BWPs. At step 3432, the wireless device may enable cross-carrier scheduling for the first cell. The wireless device may determine one or more second search spaces of the scheduling cell based on one or more first search spaces of the second BWP. The wireless device may determine the one or more second search spaces, wherein a second search space indicator/index of a second search space of the one or more second search spaces is same as a first search space indicator/index of a first search space of the one or more first search spaces. The wireless device may monitor the one or more second search spaces to receive control information scheduling resources in the first cell.

Figure 34B:
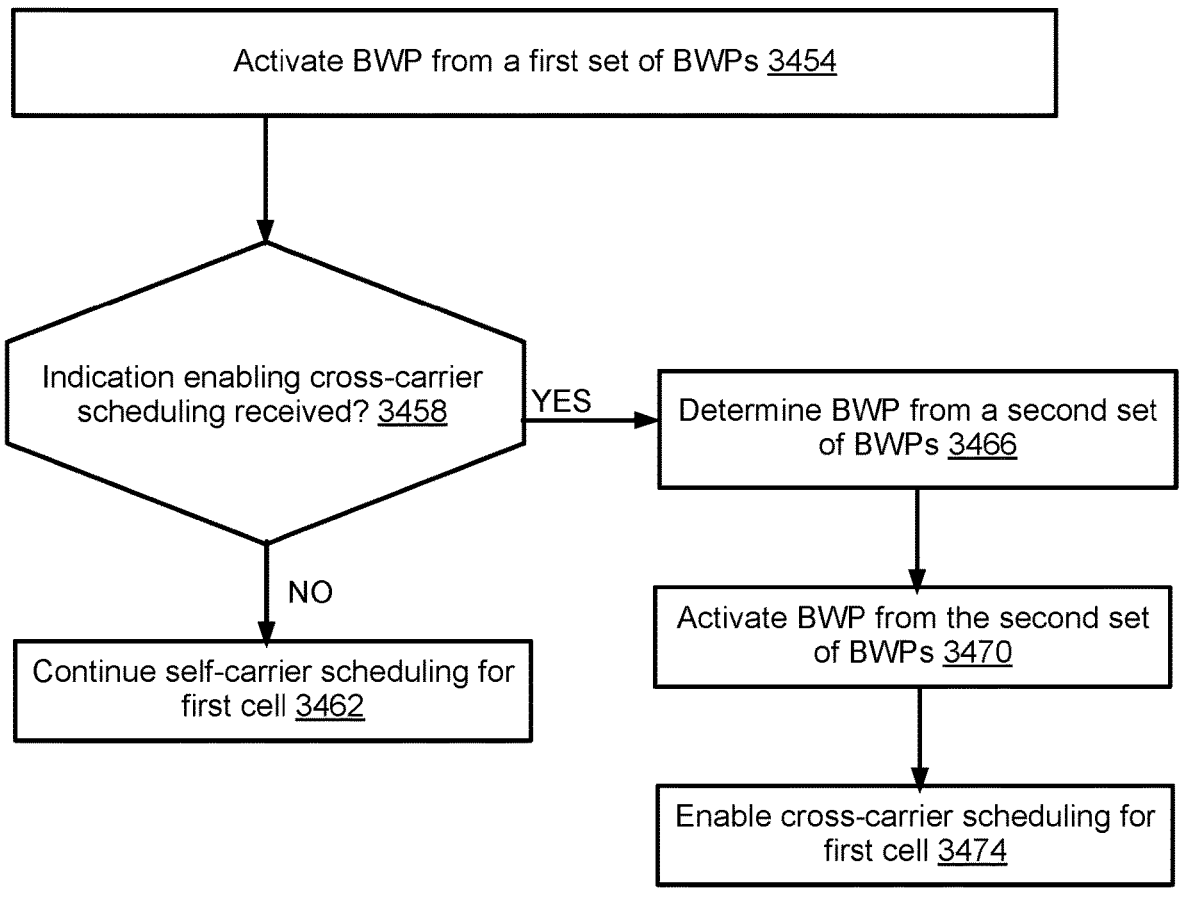
FIG. 34B shows an example method for self-carrier scheduling and cross-carrier scheduling.

FIG. 34B shows an example method for self-carrier scheduling and cross-carrier scheduling. The example method 3450 may be performed by a wireless device. Steps 3454-3474 of FIG. 34B may be similar to steps 3412-3432, respectively, as described with reference to FIG. 34A.

Figure 35A:
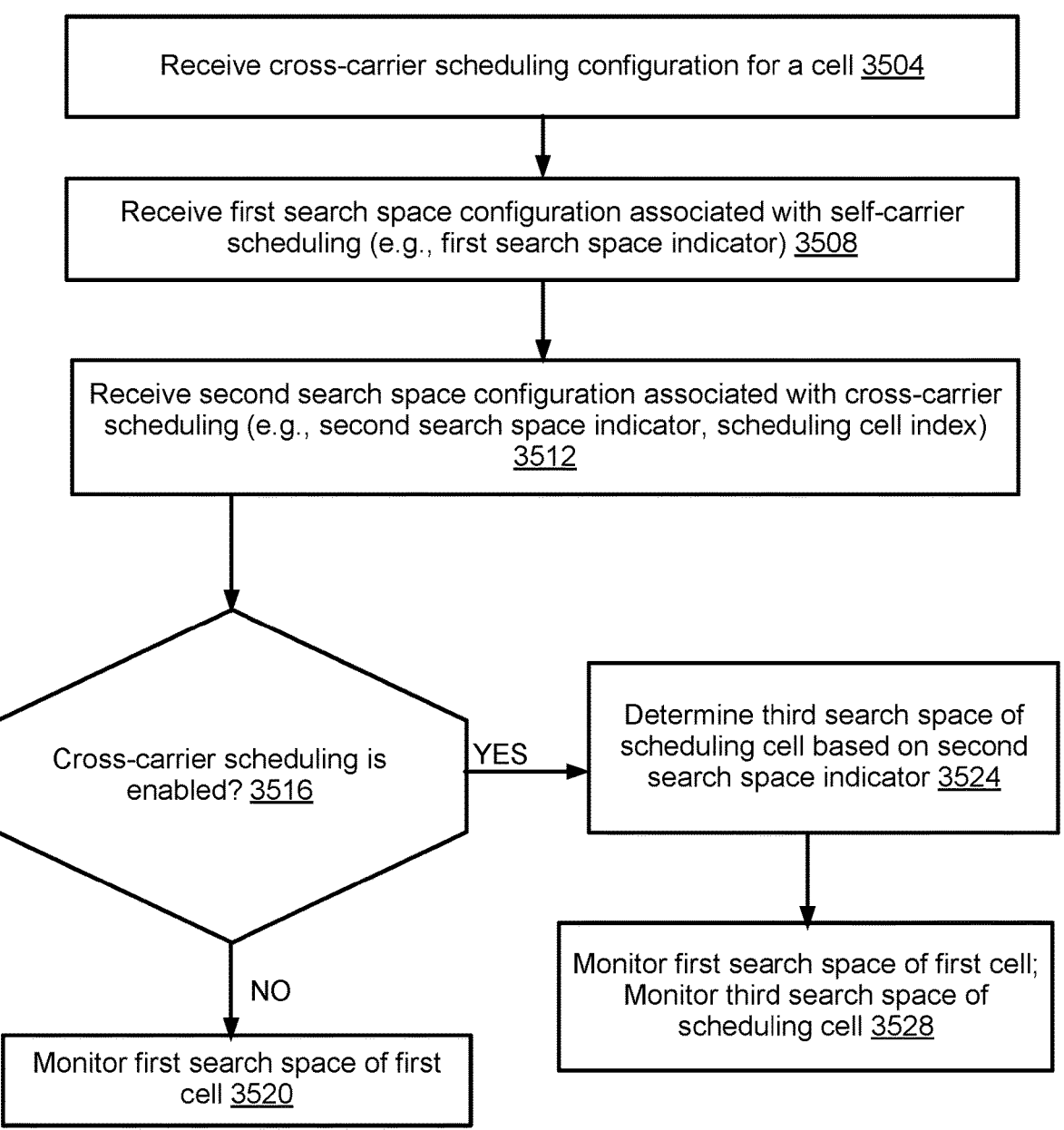
FIG. 35A and FIG. 35B shows an example method of self-carrier scheduling and cross-carrier scheduling based on configuration of search spaces.

FIG. 35A shows an example method of self-carrier scheduling and cross-carrier scheduling based on configuration of search spaces. The example method 3500 may be performed by a wireless device. At step 3504, the wireless device may receive a cross-carrier scheduling configuration for a cell. The cross-carrier scheduling configuration may comprise an indicator of a scheduling cell for the cell. At step 3508, the wireless device may receive a first search space configuration for the cell. The first search space configuration may be associated with a first search space configured for self-carrier scheduling. The first search space configuration may comprise an indicator of the first search space. At step 3512, the wireless device may receive a second search space configuration for the cell. The second search space configuration may be associated with a second search space configured/enabled with cross-carrier scheduling. The second search space configuration may comprise an indicator of the second search space. The second search space configuration may also comprise an indicator of a scheduling cell.

At step 3516, the wireless device may determine whether cross-carrier scheduling is enabled/activated for the cell. The wireless device may determine that cross-carrier scheduling is enabled based on receiving an indication. The indication may be DCI, a MAC CE, or an RRC configuration message. The indication may be a command activating the scheduling cell.

At step 3520, the wireless device may monitor the first search space of the first cell, for example, based on determining that cross-carrier scheduling is not enabled. The wireless device may additionally monitor the second search space of the first cell, for example, based on determining that cross-carrier scheduling is not enabled.

At step 3524, the wireless device may determine a third search space of the scheduling cell based on the indicator of the second search space, for example, based on determining that cross-carrier scheduling is not enabled. An indicator of the third search space may be the same as the indicator of the second search space. A value of an indicator of the third search space may be separated from a value of an indicator of the second search space by an offset value.

At step 3528, the wireless device may monitor the first search space of the first cell, for example, based on determining that cross-carrier scheduling is enabled. The wireless device may monitor the third search space of the scheduling cell, for example, based on determining that cross-carrier scheduling is enabled.

Figure 35B:
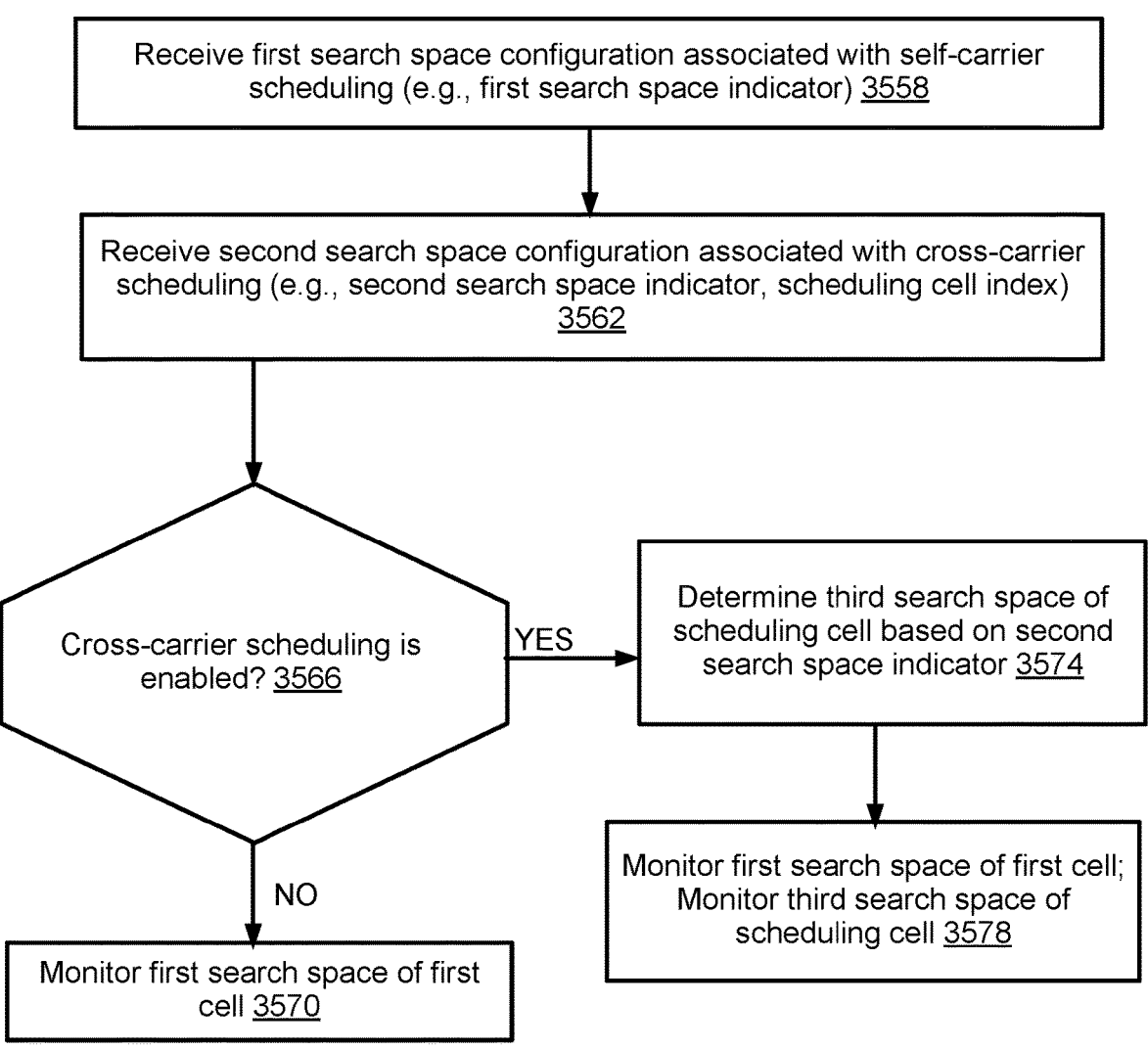

FIG. 35B shows an example method for self-carrier scheduling and cross-carrier scheduling. The example method 3550 may be performed by a wireless device. Steps 3558-3578 of FIG. 35B may be similar to steps 3508-3528, respectively, as described with reference to FIG. 35A.

Figure 36:
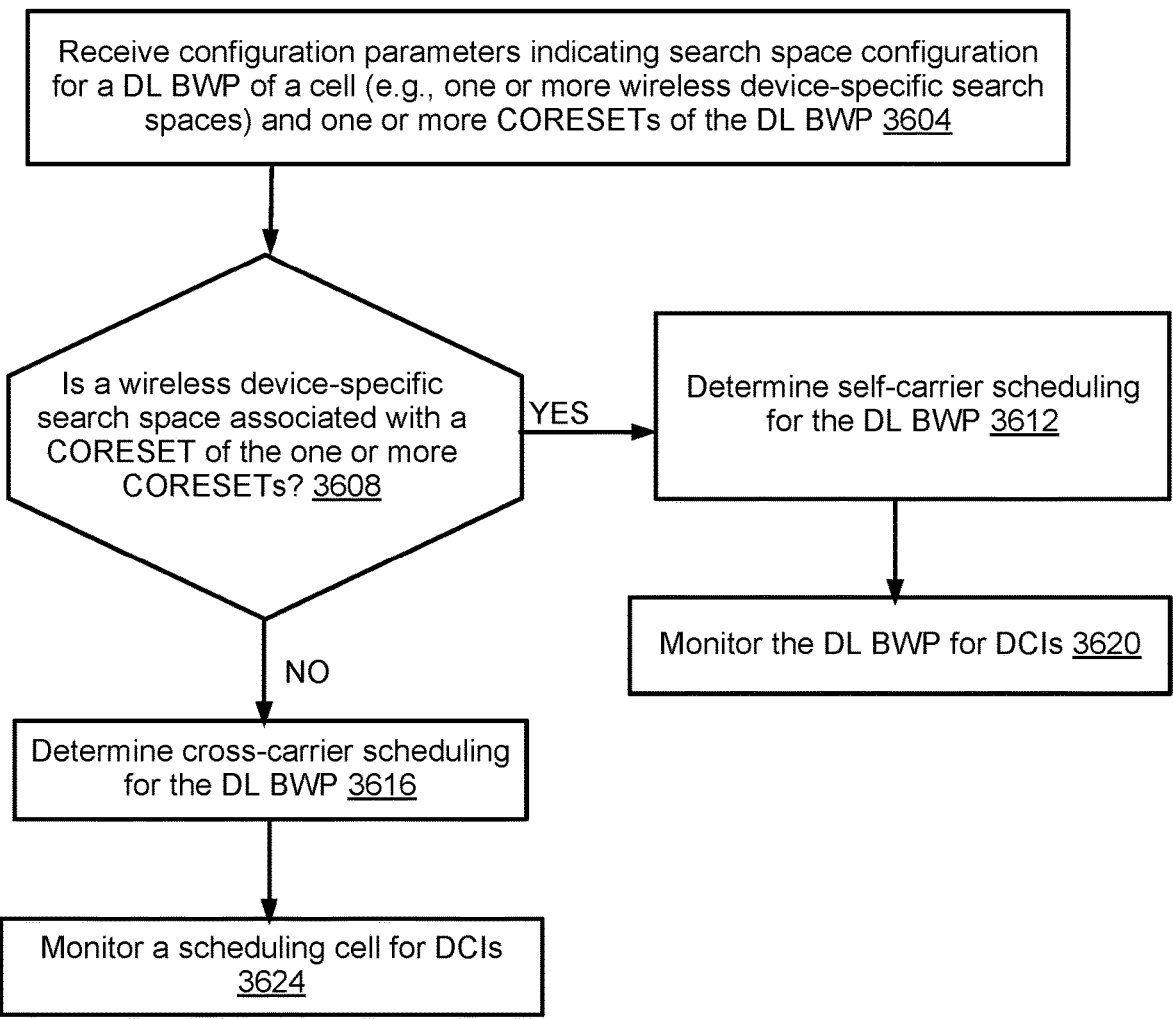
FIG. 36 shows an example method for determining a scheduling type for a DL BWP.

FIG. 36 shows an example method for determining whether a DL BWP of a primary cell is configured with self-carrier scheduling or cross-carrier scheduling. The example method 3600 may be performed by a wireless device. At step 3604, the wireless device may receive configuration parameters for the DL BWP of the primary cell. The configuration parameters may indicate search space configurations (e.g., as described with reference to FIG. 30) for a plurality of search spaces in the DL BWP. The search space configurations may indicate one or more wireless device-specific search spaces. The configuration parameters may indicate/comprise one or more CORESETs of the DL BWP.

At step 3612, the wireless device may determine that the DL BWP is configured with self-carrier scheduling, for example, based on a wireless device-specific search space of the one or more wireless device-specific search spaces being associated with a CORESET of the one or more CORESETs. The wireless device may determine that wireless device-specific search space is associated with the CORESET based on an indication in the search space configuration (e.g., parameter controlResourceSetId). At step 3620, the wireless device may monitor a search space of the DL BWP for DCIs (e.g., scheduling resources of the primary cell) based on determining that the DL BWP is configured with self-carrier scheduling.

At step 3616, the wireless device may determine that the DL BWP is configured with cross-carrier scheduling, for example, based on none of the one or more wireless device-specific search spaces being associated with any CORESET of the one or more CORESETs. The wireless device may determine that the DL BWP is configured with cross-carrier scheduling, for example, based on none of the CORESET indicators associated with the wireless device-specific search spaces being the same as a CORESET indicator of the one or more CORESETs. The wireless device may determine that a wireless device-specific search space is not associated with any CORESET of the one or more CORE-SETs, for example, if the search space configuration does not comprise a parameter (e.g., controlResourceSetId or a con-trolResourceSetId) being set to a predetermined value (e.g., 4, or any other value). At step 3624, the wireless device may monitor a search space of a scheduling cell for DCIs (e.g., scheduling resources of the primary cell) based on determining that the DL BWP is configured with cross-carrier scheduling.

A wireless device may receive one or more messages. The one or more messages may comprise configuration parameters for a first cell. The configuration parameters may indicate one or more first DL BWPs indicated/configured with self-carrier scheduling, one or more second DL BWPs indicated/configured with cross-carrier scheduling, and a scheduling cell indicator/index for cross-carrier scheduling. The wireless device may activate the first DL BWP of the one or more first DL BPWs as an active DL BWP of the first cell. The wireless device may receive a command activating cross-carrier scheduling for the first cell. The wireless device may determine a second DL BWP of the one or more second DL BWPs based on a first BWP indicator/index of the first DL BWP. The wireless device may switch to the second DL BWP of the one or more second DL BWPs as the active DL BWP of the first cell.

A wireless device may receive one or more messages. The one or more messages may comprise configuration parameters for a first cell. The configuration parameters may indicate a first BWP configured with a first BWP indicator/index, a second BWP configured with a second BWP indicator/index, and a scheduling cell indicator/index for cross-carrier scheduling. The wireless device may activate the first DL BWP as an active DL BWP of the first cell. The wireless device may receive a command activating cross-carrier scheduling for the first cell. The wireless device may determine the second DL BWP based on a first BWP indicator/index of the first DL BWP. The wireless device may switch to the second DL BWP as the active DL BWP of the first cell.

A wireless device may receive one or more messages. The one or more messages may comprise configuration parameters for a first cell. The configuration parameters may comprise a cross-carrier scheduling cell indicator/index. The configuration parameters may comprise one or more first parameters of a first search space (e.g., for monitoring one or more first DCIs comprising resource assignments of data for the first cell). The one or more first parameters may comprise a first search space indicator/index. The configuration parameters may comprise one or more second parameters of a second search space (e.g., for monitoring one or more second DCIs comprising resource assignments of data for the first cell) The one or more second parameters may comprise a second search space indicator/index and an indication of cross-carrier scheduling. The wireless device may determine a third search space of the scheduling cell based on the one or more second parameters of the second search space of the first cell. The wireless device may monitor/receive the one or more first DCIs via the first search space of the first cell. The wireless device may monitor/receive the one or more second DCIs via the third search space of the scheduling cell.

A wireless device may receive one or more messages. The one or more messages may comprise configuration parameters for a first cell. The configuration parameters may comprise a cross-carrier scheduling cell indicator/index. The configuration parameters may comprise one or more first parameters of a first search space (e.g., for monitoring one or more first DCIs comprising resource assignments of data for the first cell). The one or more first parameters may comprise a first search space indicator/index. The configuration parameters may comprise one or more second parameters of a second search space (e.g., for monitoring one or more second DCIs comprising resource assignments of data for the first cell). The one or more second parameters may comprise a second search space indicator/index and an indication of cross-carrier scheduling. The wireless device may monitor the first search space and the second search space of the first cell. The wireless device may receive a command activating cross-carrier scheduling for the first cell. The wireless device may determine a third search space of the scheduling cell based on the one or more second parameters of the second search space of the first cell, for example, based on receiving the command. The wireless device may continue monitoring the one or more first DCIs via the first search space of the first cell. The wireless device may stop monitoring the second search space of the first cell. The wireless device may start monitoring the one or more second DCIs via the third search space of the scheduling cell.

A base station may configure cross-carrier scheduling for a first cell for a wireless device. The base station may configure a second cell as a scheduling cell for the first cell. The wireless device may apply cross-carrier scheduling for the first cell, for example, based on the cross-carrier scheduling configuration. The wireless device may not monitor search spaces (e.g., wireless device-specific search spaces) of the first cell, for example, based on the wireless device performing cross-carrier scheduling for the first cell. Low frequency spectrum (e.g., below 6 GHz, or any other low frequency spectrum) may be critical for providing increased network coverage for some types of communications (e.g., communications associated with 5G or 6G communication standards, or other communications that use higher frequency spectrum). For example, the first cell may be associated with a communication type that uses low frequency spectrum.

Communication via low frequency spectrum may necessitate dynamic spectrum sharing among different types of communications (e.g., communications associated with different generations or different radio access technologies (RATs), such as LTE and 5G; LTE and NR; and/or 3G, 4G, and 5G. A first type of communication (e.g., a first RAT, such as NR) may not necessarily be able to use low frequency spectrum based on dynamic spectrum sharing because of existing usage by a second type of communication (e.g., a second RAT, such as LTE). The first type of communication may be able to use the low frequency spectrum only if the second type of communication is not using the low frequency spectrum. Availability of resources for the first type of communication may fluctuate based on usage by the second type of communication. Non-availability and/or fluctuating availability of resources (e.g., associated with low frequency spectrum) for the first type of communication may lead to performance degradation of the first type of communication. Performance degradation may be more severe for control channels as control channel transmissions are mostly periodic, whereas resources for the control channels may only be available intermittently. Dynamic resource allocations for control channel transmissions may be necessary for an efficient spectrum sharing.

A base station may configure cross-carrier scheduling for a primary cell via configuration messages (e.g., RRC signaling). A scheduling cell (e.g., a secondary) cell may be configured. The scheduling cell may be active or inactive at a time of configuration. The wireless device may not monitor the scheduling cell until the scheduling cell becomes active, for example, if the scheduling cell is inactive at a time of configuration. The base station may not be able to send/transmit, via the scheduling cell, scheduling control information (e.g., DCI) for the primary cell until the scheduling cell becomes active. The wireless device may be unable to receive scheduling information via the scheduling cell, for example, if control channel resources of the scheduling cell are occupied for other communications. Inability to receive control information via the scheduling cell may lead to service interruption at the primary cell. The primary cell may be reconfigured with self-carrier scheduling, for example, if the scheduling cell becomes deactivated. Reconfiguration may result in high latency (e.g., because of high latency associated with transmission of configuration messages, such as semi-static RRC messages). The wireless device may not be able to receive scheduling DCIs for the primary cell, for example, at a time at which the reconfiguration is occurring.

A base station and a wireless device may enable or disable cross-carrier scheduling of a primary cell based on dynamic signaling (e.g., a MAC CE or DCI). The MAC CE may comprise an SCell activation/deactivation MAC CE. The MAC CE and/or DCI may explicitly indicate enabling or disabling cross-carrier scheduling of the primary cell. The MAC CE and/or DCI may comprise a scheduling cell indicator/index of a scheduling cell of the primary cell, such that the scheduling cell may be dynamically adapted among one or more secondary cells available to the wireless device. Using dynamic scheduling may allow fast adaptation of cross-carrier/self-carrier scheduling of the primary cell based on various factors. The various factors may comprise one or more of a traffic pattern for the primary cell, channel conditions of the primary cell, status of the scheduling cell (e.g., whether the scheduling cell is active or inactive), a status of CA (e.g., whether CA is activated or not). Using dynamic scheduling may enable the base station to dynamically change a scheduling cell for the primary cell (e.g., based on an active BWP of a secondary cell (e.g., no dormant secondary cell is configured as the scheduling cell), based on a channel condition of the secondary cell, based on congestion level of the secondary cell). The wireless device may apply self-carrier scheduling for the primary cell based on the cross-carrier scheduling being disabled. The wireless device may apply cross-carrier scheduling for the primary cell based on the cross-carrier scheduling being enabled.

A base station may configure cross-carrier scheduling for a first cell. The first cell may be associated with a first type of communication (e.g., a first RAT) that may share frequency spectrum with a second cell associated with a second type of communication (e.g., a second RAT). The base station may dynamically indicate a scheduling cell via MAC CE(s) and/or DCI(s). The base station may indicate enabling of cross-carrier scheduling and determining the scheduling cell, for example, if the first cell does not have sufficient control channel resources. The base station may determine the scheduling cell that has a sufficient quantity of control channels with good channel qualities. Indication of the scheduling cell, via semi-static signaling (e.g., RRC signaling), may not efficiently reflect dynamic changes of resource availability and channel qualities. Various examples described herein may allow the base station to dynamically select (e.g., determine and/or update) a scheduling cell for the first cell based on the resource availability and/or the channel quality of both the scheduling cell and the first cell.

A wireless device may dynamically switch between self-carrier scheduling and cross-carrier scheduling. The wireless device may dynamically switch between self-carrier scheduling and cross-carrier scheduling, for example, without receiving an explicit command to indicate the switching. A wireless device may receive one or more configuration messages (e.g., RRC messages). The configuration messages may comprise configuration parameters. The configuration parameters may comprise an indication of cross-carrier scheduling for a first cell, a first search space of a first cell, and a second search space of a second cell. The second cell may be a scheduling cell for the first cell if cross-carrier scheduling is used/enabled for the first cell. The wireless device may determine between self-carrier scheduling and cross-carrier scheduling based on the first search space, the second search space, and/or an activation status of the second cell. The wireless device may determine that the second cell is not activated at a first time (e.g., in a first slot). The wireless device may determine to use self-carrier based on determining that the second cell is not activated. The wireless device may monitor the first search space of the first cell for receiving first DCI (e.g., comprising resource assignments for the first cell), for example, based on the second cell not being activated. The wireless device may determine, at a second time (e.g., in a second slot), that monitoring occasions associated with the first search space are not valid (e.g., based on slot format indication of the first cell). The wireless device may not be able to monitor the first search space, for example, based on determining that the monitoring occasions associated with the first search space are not valid. The wireless device may use/switch to cross-carrier scheduling based on determining that the monitoring occasions associated with the first search space are not valid. The wireless device may monitor the second search space of the second cell for receiving second DCI (e.g., comprising resource assignments for the first cell), for example, based on determining that the monitoring occasions associated with the first search space are not valid. Various examples described herein allow dynamic switching between self-carrier and a cross-carrier scheduling without increasing wireless device complexity.

A wireless device may perform cross-carrier scheduling for a first cell, for example, if the cross-carrier scheduling is enabled for the first cell. The wireless device may continue performing self-carrier scheduling for the first cell in addition to cross-carrier scheduling. Various examples herein allow additional control channel resources/capacity, based on cross-carrier scheduling, without impacting on control channel resources/capacities of self-carrier scheduling. First DCI may be sent/transmitted via a second cell to schedule resources for the first cell. The wireless device may determine a first DCI size of the first DCI based on a second DCI size of second DCI for the second cell. The second cell may be a scheduling cell for the first cell, for example, if cross-carrier scheduling is enabled. The first DCI size may be based on one or more first DCI formats and the second DCI size. The one or more first DCI formats may be determined based on one or more parameters configured for the first cell. The second DCI size may be based on one or more second DCI formats. The one or more second DCI formats may be determined based on one or more parameters configured for the second cell. The first DCI may comprise resource assignments for the first cell. The second DCI may comprise resource assignments for the second cell. A first RNTI and a second RNTI may be used for the first DCI and the second DCI, respectively, to differentiate between the first DCI and the second DCI. Various examples herein allow increased control channel capacity without substantially increasing wireless device complexity.

A wireless device may monitor a first search space of a first cell, for example, based on one or more first conditions being met. The wireless device may monitor a second search space of a second cell for cross-carrier scheduling of the first cell. The wireless device may monitor the second search space based on one or more second conditions being met. The wireless device may monitor the first search space for first DCI. The first DCI may comprise resource assignments for the first cell. The wireless device may monitor the second search space of the second cell for second DCI, The second DCI may comprise resource assignments for the first cell. The one or more first conditions may comprise that the first DCI is scrambled with a first RNTI. The one or more first conditions may comprise that the first DCI is based on one or more first DCI formats. The one or more first conditions may comprise that at least a monitoring occasion of the first search space is configured in one or more downlink OFDM symbols of a first slot. The wireless device may monitor the monitoring occasion of the first search space in the first slot. The one or more second conditions may comprise that the second DCI is scrambled with a second RNTI. The one or more second conditions may comprise that the second DCI is based on one or more second DCI formats. The one or more second conditions may comprise that no monitoring occasion of the first search space is valid (e.g., configured over the one or more downlink OFDM symbols) in the first slot. The wireless device may monitor the second search space for the first cell in the first slot. The first RNTI may be a C-RNTI. The second RNTI may be configured by the base station, and may be different from the first RNTI (e.g., C-RNTI). The one or more first DCI formats may comprise fallback DCI formats. The one or more second DCI formats may comprise non-fallback DCI formats.

A wireless device may receive one or more configuration messages (e.g., RRC messages). The one or more RRC messages may comprise configuration parameters related to cross-carrier scheduling for a first cell. The configuration parameters may comprise a scheduling cell indicator/index (e.g., an indicator/index of a second cell). The configuration parameters may comprise a second RNTI used for cross-carrier scheduling. The wireless device may receive a first RNTI (e.g., C-RNTI), from a base station, for example, via an initial access procedure. The second RNTI, used for the cross-carrier scheduling, may be configured by the base station. The wireless device may monitor a first search space of the first cell for first DCI. The first DCI may comprise resource assignments for the first cell. The base station may activate cross-carrier scheduling. Cross-carrier scheduling may be activated, for example, if the base station activates the second cell. The base station may send/transmit an indication (e.g., via MAC CE(s) and/or DCI(s)) enabling the cross-carrier scheduling. The wireless device may monitor a second search space of the second cell for second DCI, for example, based on/in response to the activation of cross-carrier scheduling. The second DCI may comprise resource assignment for the first cell.

The wireless device may continue monitoring the first search space for the first DCI, for example, if cross-carrier scheduling is enabled. The wireless device may monitor the first search space for the first DCI that is scrambled based on the first RNTI. The wireless device may monitor the second search space for the second DCI that is scrambled based on the second RNTI.

The first DCI may be based on a first DCI format (e.g., DCI format 1_0/0_0, a fallback DCI format). The first DCI may be based on a DCI format 1_1/0_1 (e.g., a non-fallback DCI format) and/or DCI format 1_2/0_2 (e.g., a compact DCI format). One or more DCI fields of the DCI format for the first DCI may be determined based on one or more configuration parameters for the first cell. A DCI field indicating a frequency resource allocation may be determined based on an active DL/UL BWP of the first cell. A DCI field indicating a time domain resource allocation may be determined based on one or more time-domain resource allocation entries (pre)-configured for the first cell. The second DCI may or may not be based on a fallback DCI format (e.g., DCI format 1_0/0_1). The second DCI may be based on a second DCI format (e.g., a non-fallback DCI format, such as DCI format 1_1/0_1 and/or a compact DCI format, such as DCI format 1_2/0_2). The wireless device may or may not monitor any DCI based on the fallback DCI format based on cross-carrier scheduling.

One or more first DCI fields of a second DCI format for the second DCI may be determined based on the one or more configuration parameters for the first cell. A DCI field, of the one or more first DCI fields for the second DCI, indicating frequency resource allocation may be determined based on the active DL/UL BWP of the first cell. The wireless device may determine a first DCI size of the second DCI based on the determining the one or more first DCI fields, The wireless device may monitor the second search space of the second cell for the second DCI.

The wireless device may monitor the second search space of the second cell for third DCI. The third DCI may comprise resource assignments for the second cell. The wireless device may perform, via the second search space, self-carrier scheduling for the second cell and cross-carrier scheduling for the first cell. The wireless device may determine one or more second DCI fields of the third DCI based on one or more second configuration parameters for the second cell. A frequency domain allocation DCI field of the third DCI may be determined based on an active DL/UL BWP of the second cell. The wireless device may determine a second DCI size of the second DCI based on the determining the one or more second DCI fields.

The wireless device may compare the first DCI size and the second DCI size. The wireless device may determine a third DCI size wherein the third DCI size may be a larger DCI size among the first DCI size and the second DCI size. The wireless device may add padding bits (e.g., zeros) to the second DCI (or the second DCI format) if the second DCI size is smaller than the first DCI size. The wireless device may add zeros to the third DCI (or a DCI format for the third DCI) if the second DCI size is smaller than the first DCI size. Addition of padding bits may align DCI sizes between DCIs, sent via the second search space of the second cell, for self-carrier scheduling and cross-carrier scheduling. The third DCI may be scrambled with the first RNTI. The second DCI may be scrambled with the second RNTI.

Figure 37A:
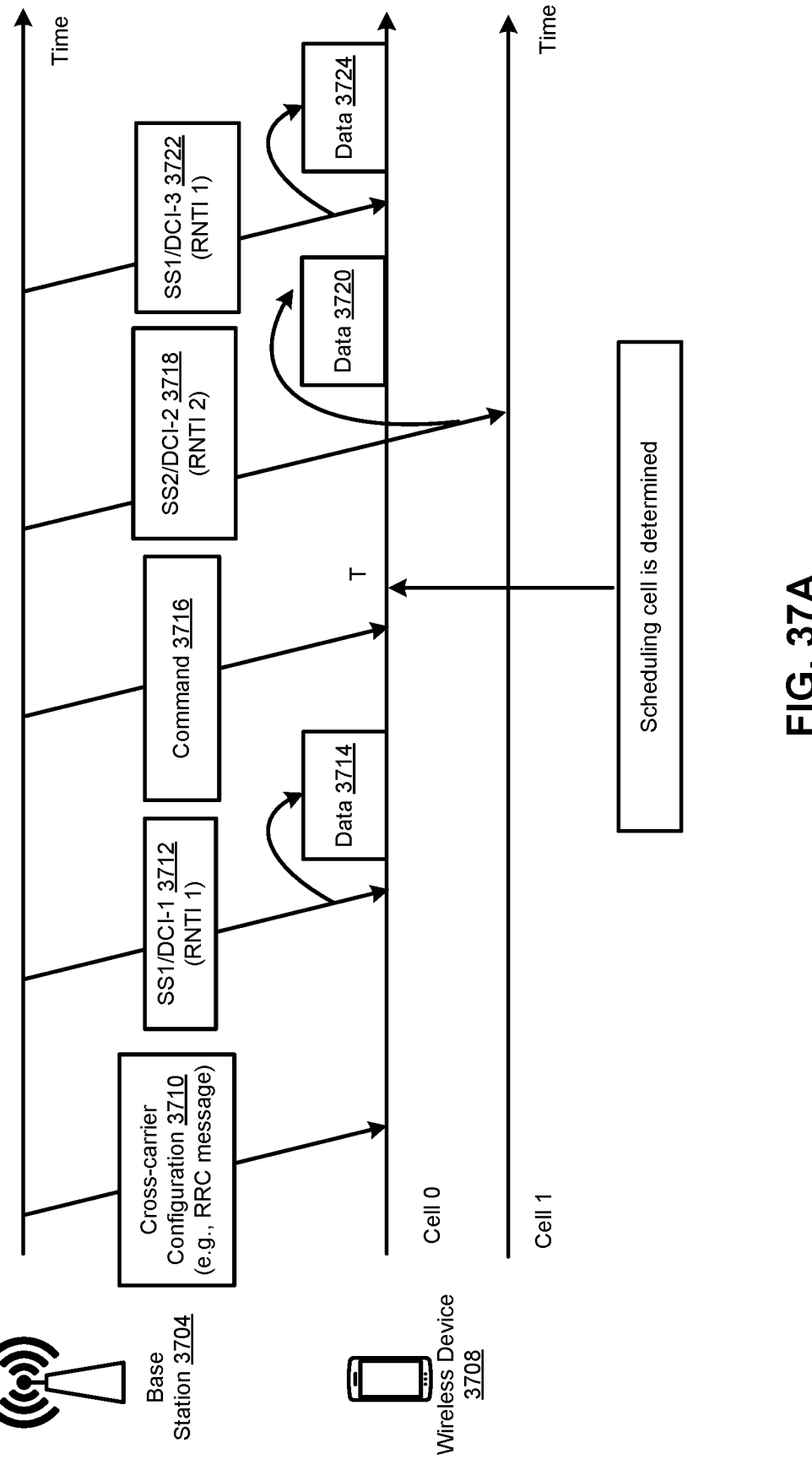
FIG. 37A shows example communication based on cross-carrier scheduling and self-carrier scheduling.
Figure 37B:
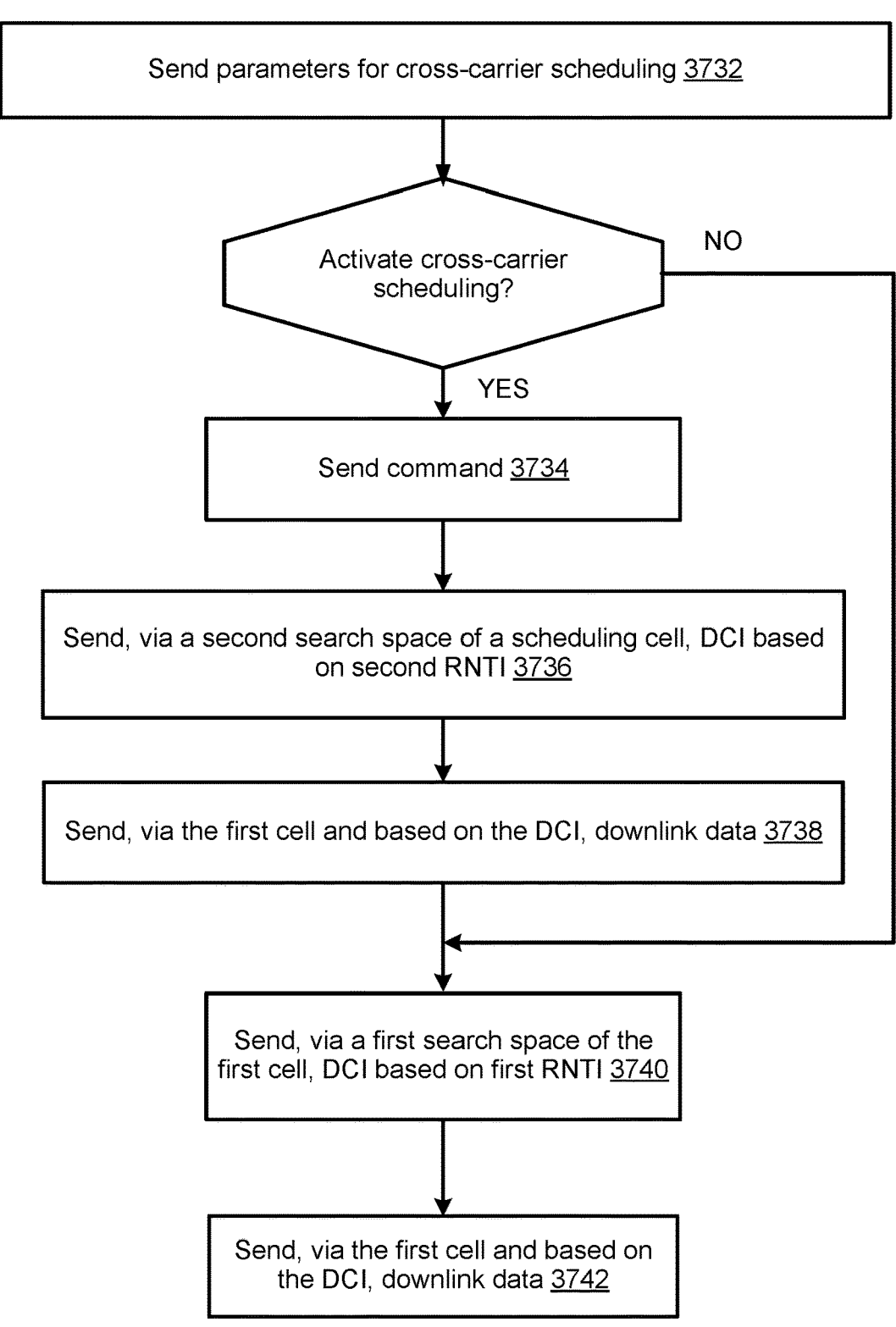
FIG. 37B shows an example method for signal transmission.

FIG. 37A shows an example of switching between self-carrier scheduling and cross-carrier scheduling for a cell. A base station 3704 may activate cross-carrier scheduling for a cell. Different indicators (e.g., RNTIs) may be used to differentiate between control signals associated with cross-carrier scheduling and self-carrier scheduling. FIG. 37B and FIG. 37C show example methods at the base station 3704 and the wireless device 3708, respectively, for cross-carrier and self-carrier scheduling.

The base station 3704 may send (e.g., step 3732), to the wireless device 3708, one or more parameters for cross-carrier scheduling (e.g., cross-carrier configuration 3710) for a first cell (e.g., primary cell, cell 0). The one or more parameters may be sent via RRC signaling. The one or more parameters may comprise an indication of cross-carrier scheduling. The one or more parameters may comprise a second RNTI. The second RNTI may be used for DCI, comprising resource assignments for the first cell, as sent/transmitted via one or more search spaces of a scheduling cell for the first cell (e.g., a second cell, Cell 1). The one or more parameters may comprise a scheduling cell indicator (e.g., index or identifier). The scheduling cell indicator for cross-carrier scheduling may be updated via MAC CE(s) and/or DCI(s). The wireless device may receive (e.g., step 3752) the one or more parameters.

The wireless device 3708 may operate using self-carrier scheduling for the first cell, for example, until the wireless device 3708 receives a command to activate cross-carrier scheduling for the first cell. The base station 3704 may send (e.g., step 3740), via a first search space (e.g., SS1) of the first cell, first DCI (e.g., DCI-1 3712). As further described herein the first DCI may be based on (e.g., scrambled with) a first RNTI. The first DCI may comprise resource assignments for downlink data 3714 for the first cell. The wireless device 3708 may receive (e.g., step 3760), via the first search space of the first cell, the first DCI. The base station 3704 may send (e.g., step 3742), via the first cell and based on the assigned resources indicated by the first DCI, the downlink data 3714. The wireless device 3708 may receive (e.g., step 3762), via the first cell and based on the assigned resources indicated by the first DCI, the data 3714.

The base station 3704 may send (e.g., step 3734), to the wireless device 3708, a command 3716 to activate cross-carrier scheduling for the first cell. The command may be a MAC CE or DCI. The command may be an SCell activation/deactivation MAC CE. The command 3716 may comprise an indication of activation of the scheduling cell for the first cell. The command 3716 may comprise a bit field indicating an activation of cross-carrier scheduling for the first cell. The first cell may be a primary cell of a cell group. The first cell may be a primary cell of a PUCCH group. The bit field may indicate the activation or a deactivation of cross-carrier scheduling of the primary cell of the cell group or the primary cell of the PUCCH group. The wireless device 3708 may be configured with cross-carrier scheduling either for the primary cell of the cell group or the primary cell of the PUCCH group. The wireless device 3708 may or may not expect to be configured with cross-carrier scheduling for both the primary cell of the cell group and the primary cell of the PUCCH group. The wireless device 3708 may ignore the command 3716 (e.g. ignore the bit field and continue cross-carrier scheduling), for example, if the command 3716 indicates the activation of cross-carrier scheduling for the first cell and if the first cell is already activated with cross-carrier scheduling. The command 3716 may activate one or more secondary cells. The wireless device 3708 (e.g., at or after time T) may determine (e.g., step 3754) the scheduling cell. The wireless device 3708 may determine an indicator (e.g., index or identifier) of the scheduling cell based on the one or more secondary cells activated by the command 3716, for example, based on the command 3716 comprising an indication of activation of cross-carrier scheduling. The wireless device 3708 may select a secondary cell, among the one or more secondary cells, with a lowest index among indices of the one or more secondary cells as the scheduling cell. The wireless device 3708 may activate cross-carrier scheduling based on determining the scheduling cell.

The wireless device 3708 may monitor a second search space (e.g., SS2) of the scheduling cell for second DCI (e.g., DCI-2 3718) comprising resource assignments for the first cell. The base station 3704 may send (e.g., step 3736), via the second search space of the scheduling cell, the second DCI. As further described herein the second DCI may be based on (e.g., scrambled with) a second RNTI. The wireless device 3708 may receive (e.g., step 3756), via the second search space of the scheduling cell, the second DCI. The second DCI may comprise resource assignments for the first cell. The base station 3704 may send (e.g., step 3738), via the first cell and based on the assigned resources indicated by the second DCI, downlink data 3720. The wireless device may receive (e.g., step 3758), via the first cell and based on the assigned resources indicated by the second DCI, the downlink data 3720.

Figure 37D:
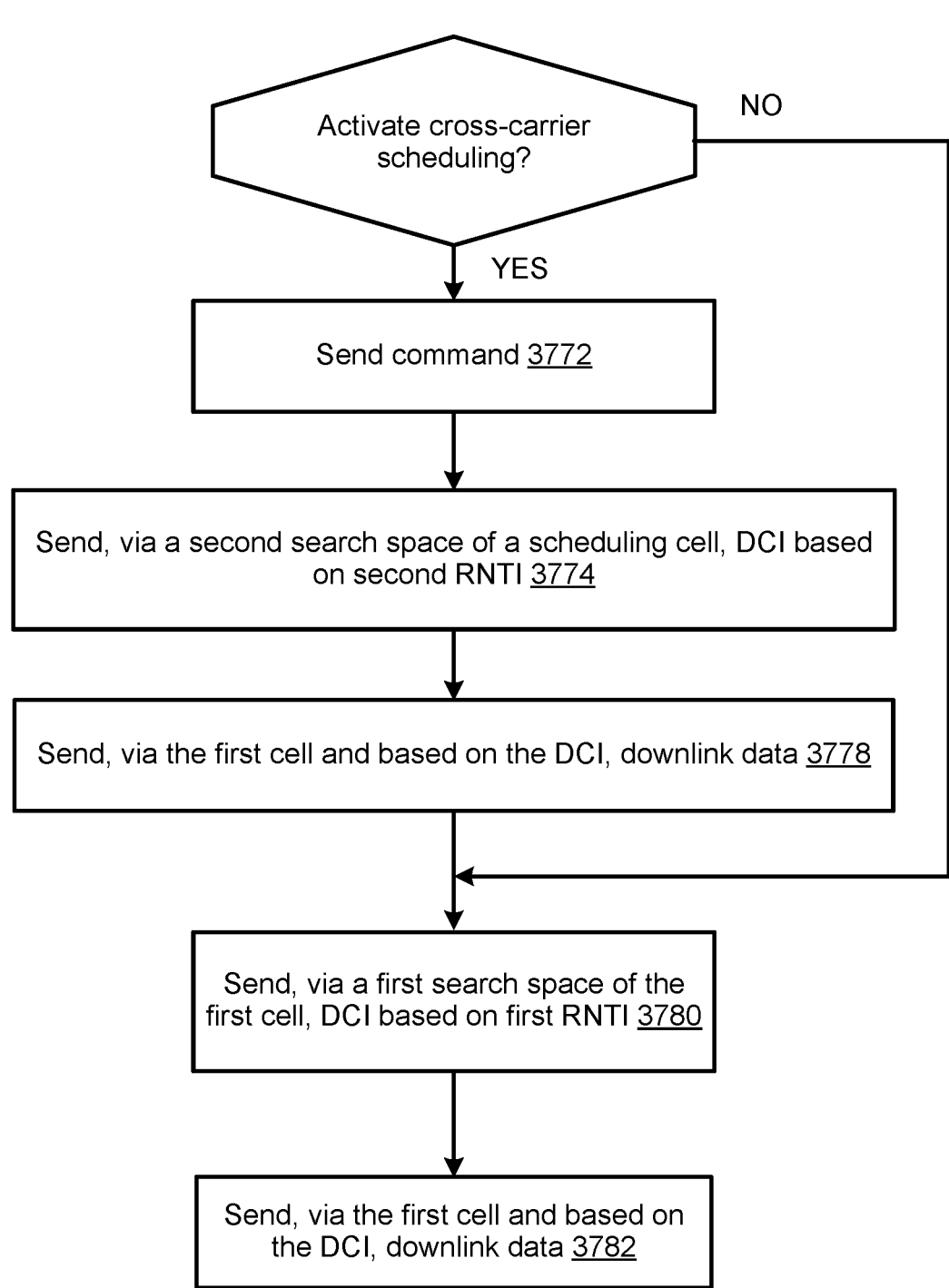
FIG. 37D shows an example method for signal transmission.
Figure 37E:
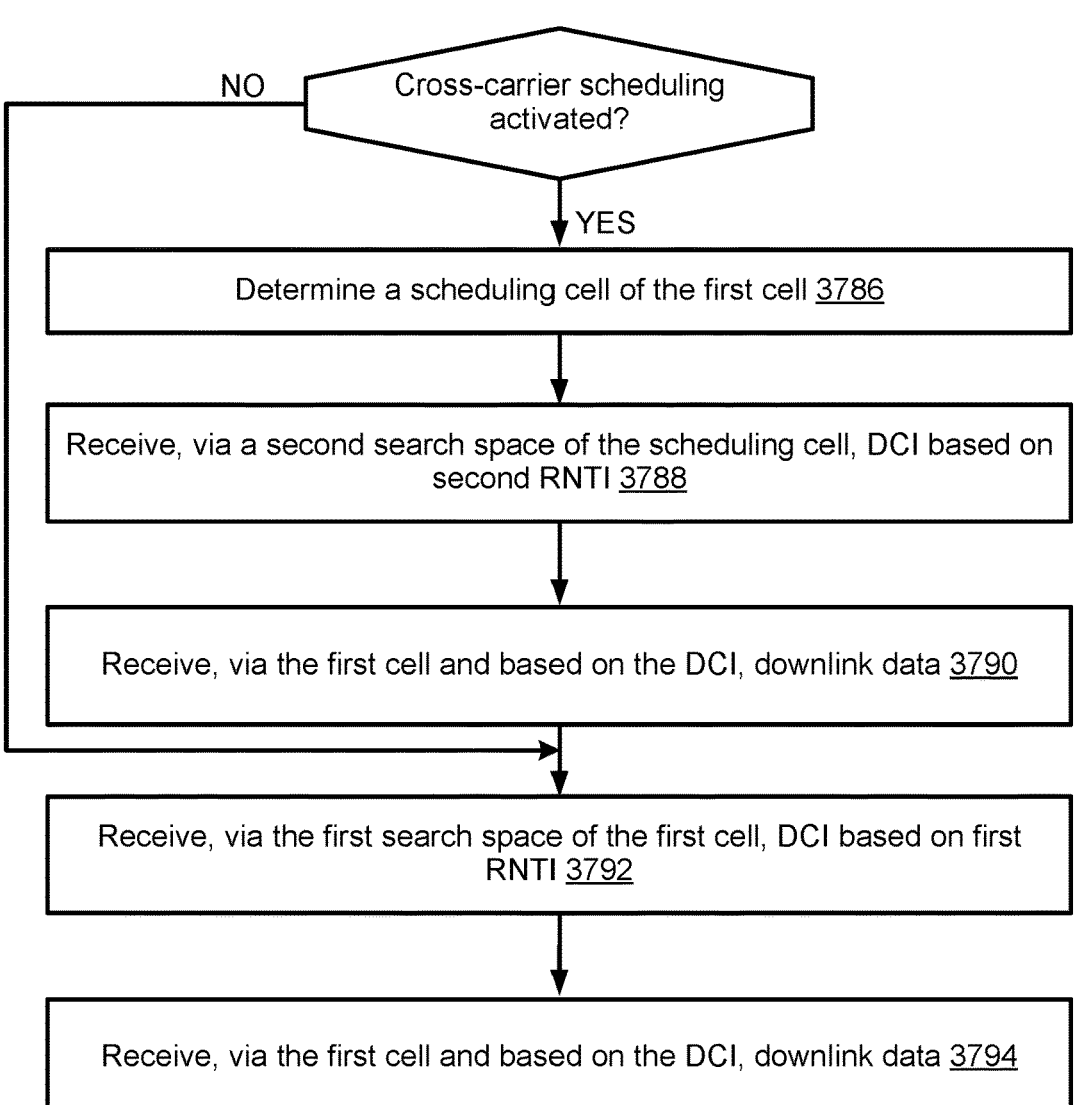
FIG. 37E shows an example method for signal reception.

FIG. 37D and FIG. 37E show an example method 3770 that may be performed by the base station 3704 and an example method 3784 that may be performed by the wireless device 3708, respectively. Steps 3772-3782 of FIG. 37D may be similar to steps 3734-3742, respectively, as described with reference to FIG. 37B. Steps 3786-3794 of FIG. 37E may be similar to steps 3754-3762, respectively, as described with reference to FIG. 37C.

The command 3716 may comprise a bit field indicating the scheduling cell indicator (e.g., index or identifier) for cross-carrier scheduling of the first cell. The scheduling cell may be activated and the wireless device 3708 may activate cross-carrier scheduling for the first cell. The command 3716 may comprise a second scheduling cell indicator/index of a second scheduling cell and a secondary cell indicator/ index of a second secondary cell. The second secondary cell may be a scheduled cell associated with the second scheduling cell, for example, based on cross-carrier scheduling being configured for the second secondary cell.

The wireless device 3708 may continue monitoring the first search space for the DCIs, regardless of whether or not cross-carrier scheduling is enabled. The base station 3704 may send (e.g., step 3740), via the first search space (e.g., SS1) of the first cell, third DCI (e.g., DCI-3 3722). The third DCI may comprise resource assignments for data 3724 via the first cell. The wireless device 3708 may receive (e.g., step 3760), via the first search space of the first cell, the third DCI. The base station 3704 may send (e.g., step 3742), via the first cell and based on the assigned resources indicated by the third DCI, the data 3724. The wireless device 3708 may receive (e.g., step 3762), via the first cell and based on the third DCI, the data 3724.

The first DCI may be based on fallback DCI formats. The first DCI may be based on non-fallback DCI formats. The first DCI, sent via the first search space of the first cell, may be scrambled with a first RNTI (e.g., RNTI 1). The second DCI (e.g., comprising resource assignments for the first cell), sent via the second search space of the second cell, may be scrambled with a second RNTI (e.g., RNTI 2). The first RNTI may be a C-RNTI (e.g., an RNTI used if the wireless device is in an RRC connected state). The second RNTI may be configured for the first cell, by the base station, for supporting cross-carrier scheduling. A wireless device may be associated with a plurality of cells configured with cross-carrier scheduling. A single RNTI may be shared among the plurality of cells or the base station may configure independent (e.g., different) RNTIs for each scheduled cell, for example, if the wireless device is associated with a plurality of cells configured with cross-carrier scheduling.

The wireless device 3708 may determine the scheduling cell based on the command 3716. The command 3716 may update the scheduling cell indicator, for example, if the one or more parameters for cross-carrier scheduling (e.g., cross-carrier configuration 3710) comprise the scheduling cell indicator. The one or more parameters may or may not comprise the scheduling cell indicator. The one or more parameters may indicate that the first cell is configured with cross-carrier scheduling. Other parameters to support the cross-carrier scheduling (e.g., the scheduling cell indicator) may be available via separate RRC signaling, MAC CE(s) and/or DCI(s).

The wireless device 3708 may determine the second RNTI, used for the second DCI, based on the first RNTI. The wireless device 3708 may determine the second RNTI by adding a fixed value to the first RNTI. The first RNTI may be an RNTI used for DCI comprising resource assignments for wireless device-specific data (e.g., for a serving cell configured for the wireless device). The first RNTI may be a C-RNTI, a CS-RNTI, an SP CSI C-RNTI, or an MCS-C-RNTI. The second RNTI may be C-RNTI+v, CS-RNTI+v, SP CSI C-RNTI+v, or MCS-C-RNTI+v. The base station may configure the value v via a RRC signaling. The value of v may be fixed or may be reconfigurable.

A base station may configure one or more RNTIs used for DCI, via one or more search spaces of a second cell, comprising resource assignments for a first cell. A wireless device may monitor, based on the one or more RNTIs, one or more search spaces of a second cell for the DCI. The second cell may be a scheduling cell for the first cell. The base station may configure a first RNTI (e.g., C-RNTI). The wireless may monitor, based on the first RNTI, the one or more search spaces of the second cell for the DCI. The wireless device may not monitor the one or more search spaces for second DCI that is not scrambled with a valid RNTI (e.g., the first RNTI) or that is scrambled with a second RNTI that is different from the first RNTI. The base station may have not configured the second RNTI, for the first cell, for DCIs monitored via the one or more search spaces of the second cell. For example, the wireless device may not monitor the one or more search spaces for second DCI comprising an activation/release of a downlink SPS configuration or an activation/release of uplink configured grant as the wireless device is not configured with a proper RNTI for the second cell. The wireless device may monitor the one or more search spaces of the second cell based on the one or more RNTIs, for example, if cross-carrier scheduling is activated. The one or more RNTIs may comprise the first RNTI and may not comprise the second RNTI.

A base station may configure a first cell in a frequency spectrum. The frequency spectrum may be shared among multiple RATs and/or multiple base stations. Control channel capacity of a first RAT may be affected based on utilization of the frequency spectrum by a second RAT. Fluctuating control channel capacity may lead to low quality of service ((e.g., increased latency), for example, if the first cell is a primary cell for a wireless device. The base station may configure additional search space in a second cell, where the wireless device may monitor the additional search space if the first cell is not available for a search space. The additional search space may carry one or more DCIs comprising resource assignments for the first cell. Utilizing the second cell may address the control channel capacity of the first cell. Monitoring the additional search space may only be performed if the wireless device may not monitor the search space of the first cell. A wireless device capability (e.g., blind decoding candidates, number of non-overlapped CCEs) is not required to be increased with a time-domain partitioning between the first cell and the second cell for control channels. The wireless device capability may be used for the first cell or the second cell depending on the availability of the search space of the first cell.

A base station may configure cross-carrier scheduling and self-carrier scheduling for a first cell for a wireless device. The base station may configure, for the wireless device, a first search space of the first cell for self-carrier scheduling. The base station may configure a second search space of a second cell (e.g., a scheduling cell for the first cell) for the cross-carrier scheduling. The base station may configure a first periodicity P1 (e.g., 1 slot, or any other quantity of slots and/or time period) for the first search space. The base station may configure a second periodicity P2 (e.g., 2 slots, or any other quantity of slots and/or time period) for the second search space. The wireless device may monitor the first search space for a first DCI or the second search space for a second DCI (e.g., performing wither self-carrier scheduling or cross-carrier scheduling) based on a slot formation indication for one or more slots for the first cell. The wireless device may perform self-carrier scheduling, for example, if the slot formation indication for a first slot, among the one or more slots, indicates a downlink slot that is available for downlink reception (e.g., control monitoring occasion of the first search space is valid). The wireless device may monitor the first search space for the first DCI based on self-carrier scheduling. The wireless device may not be able to receive any DCI via the first search space, for example, if the slot formation indication for the first slot, among the one or more slots, indicates an unavailable slot (e.g., no downlink reception or uplink transmission). The wireless device may apply cross-carrier scheduling and monitor the second search space for the second DCI, for example, if the slot formation indication for the first slot, among the one or more slots, indicates an unavailable slot.

The wireless device may perform either the self-carrier scheduling or the cross-carrier scheduling in a slot of the first cell. The wireless device may determine to perform self-carrier scheduling for a slot, for example, if at least one search space monitoring occasion of a search space in the slot is configured for valid downlink symbols (e.g., OFDM symbols) by the slot formation indication of the slot. The wireless device may determine to perform cross-carrier scheduling for the slot, for example, if no search space monitoring occasion of a search space in the slot is available for valid downlink symbols. The wireless device may monitor the second search space of the second cell for the second DCI if cross-carrier scheduling is used. The wireless device may determine whether to perform self-carrier scheduling or cross-carrier scheduling based on a slot of the second cell, for example, if a subcarrier spacing of the second cell is higher than a subcarrier spacing of the first cell. The wireless device may determine, for a slot of the second cell, whether to perform self-carrier scheduling or cross-carrier scheduling, for example, based on whether or not there is a valid search space monitoring occasion of any search space configured for the first cell within the slot. The wireless device may determine whether to perform self-carrier scheduling or cross-carrier scheduling in a slot of the first cell, for example, if the subcarrier spacing of the second cell is equal to or smaller than the first cell. The wireless device may determine whether to perform self-carrier scheduling or cross-carrier scheduling for a span of the first cell. A span may comprise one or more consecutive symbols comprising one or more search space monitoring occasions in a slot of the first cell. The wireless device may determine whether to use self-carrier scheduling or cross-carrier scheduling for a span of the second cell, for example, at least if the subcarrier spacing of the second cell is larger than the subcarrier spacing of the first cell.

Figure 38A:
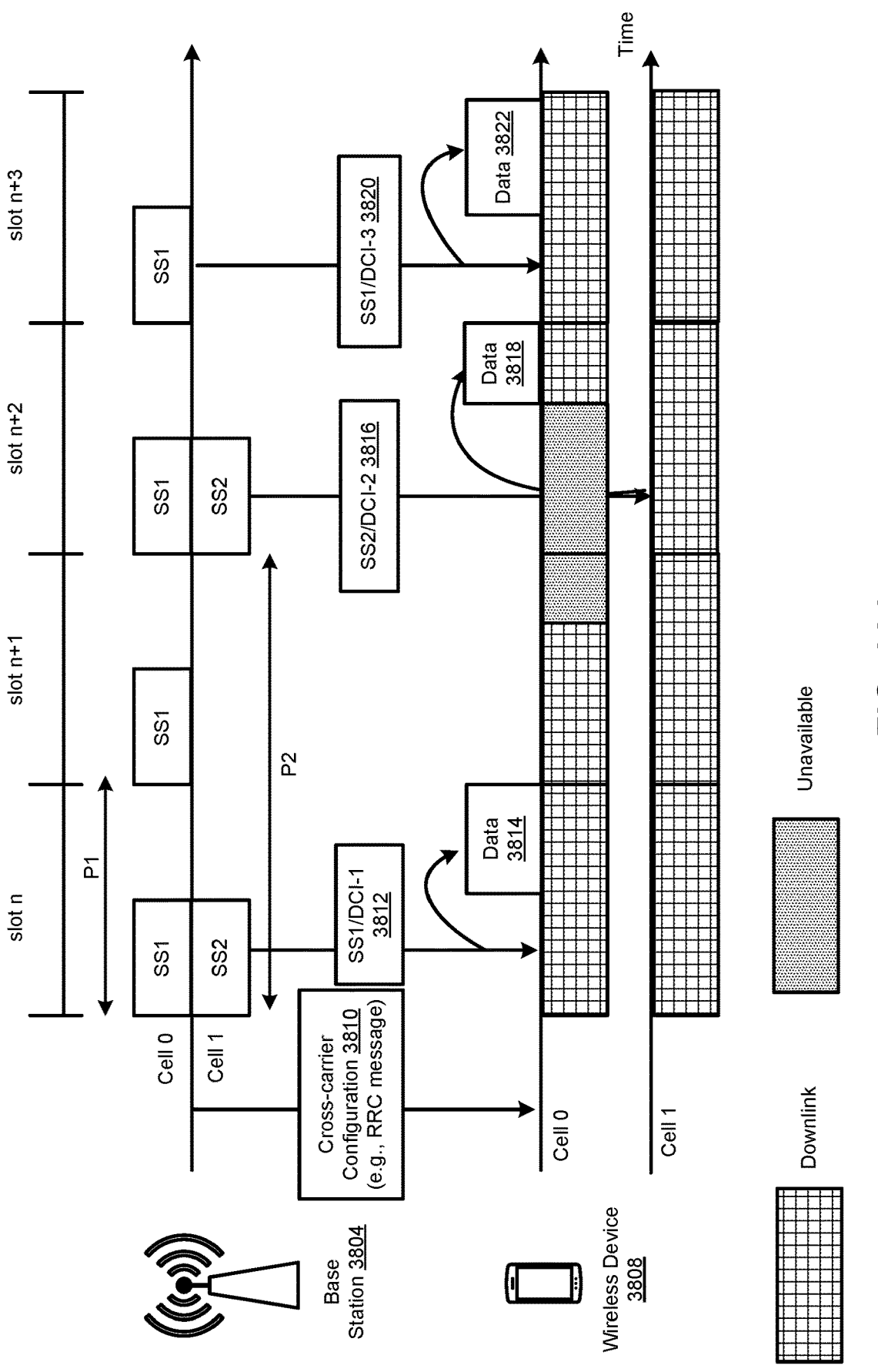
FIG. 38A shows example communication based on a slot format indication.
Figure 38C:
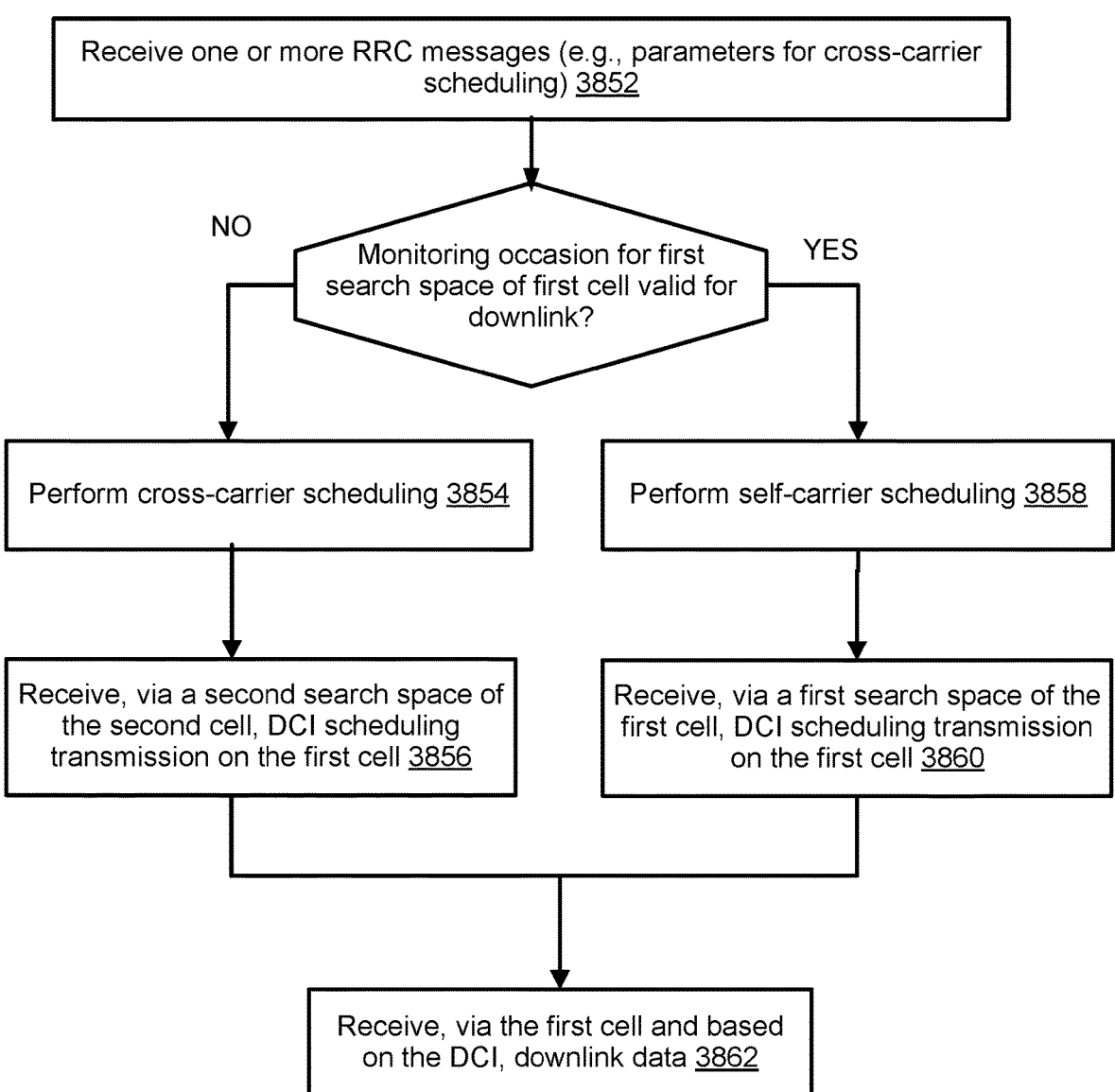
FIG. 38C shows an example method for signal reception.

FIG. 38A shows an example of self-carrier scheduling and cross-carrier scheduling. A wireless device 3808 may perform self-carrier scheduling or cross-carrier scheduling within a time interval (e.g., a slot) based on whether a monitoring occasion of a search space of a cell is configured on valid downlink symbols. FIG. 38B and FIG. 38C show example methods at a base station 3804 and the wireless device 3808, respectively, for cross-carrier and self-carrier scheduling.

The base station 3804 may send (e.g., step 3832), to the wireless device 3808, one or more parameters for cross-carrier scheduling (e.g., cross-carrier configuration 3810) of a first cell (e.g., primary cell, cell 0). The wireless device 3808 may receive (e.g., step 3852) the one or more configuration parameters. A second cell (e.g., a secondary cell, cell 1) may be indicated (e.g., via the one or more parameters) as a scheduling cell for the first cell. The base station 3804 may configure the wireless device with (e.g., indicate to the wireless device 3808) a first search space (e.g., SS1) of the first cell. The base station 3804 may configure the wireless device with (e.g., indicate to the wireless device 3808) a second search space (e.g., SS2) of the second cell for cross-carrier scheduling of the first cell. The base station 3804 may indicate a monitoring periodicity of the first search space (e.g., P1) and a monitoring periodicity of the second search space. A monitoring periodicity of the first search space may be one slot (e.g., or any other quantity of slots) based on a numerology of the first cell. A monitoring periodicity of the second search space may be two slots (e.g., or any other quantity of slots) based on a numerology of the second cell that may be the same as the numerology of the first cell. The base station 3804 may send, to the wireless device 3808, a first slot format indicator/indication for the first cell and a second slot format indicator/indication for the second cell. The first slot format indicator may indicate whether symbols in a slot are valid for transmissions (e.g., downlink transmission) or are unavailable. The first slot format indication for the first cell may indicate downlink transmission for a slot n, downlink transmission for a first portion of slot n+1 and non-availability for a second portion of slot n+1, non-availability for a first portion of slot n+2 and downlink transmission for a second portion of slot n+2, and downlink transmission for slot n+3. The second slot format indication for the second cell may indicate downlink transmission for slots n, n+1, n+2, and n+3.

The wireless device 3808 may perform, for the first cell, self-carrier scheduling or cross-carrier scheduling in a slot based on determining whether a search space monitoring occasion for the first search space in the slot is configured on valid downlink symbols. The wireless device may determine whether the search space monitoring occasion for the first search space in the slot is configured on valid downlink symbols based on the first slot format indication of the first cell.

The wireless device 3808 may have a valid monitoring occasion, in the slot n, for the first search space. The base station 3804 and/or the wireless device 3808 may determine to perform self-carrier scheduling in slot n (e.g., steps 3838, 3858), for example, based on the wireless device 3808 having a monitoring occasion, for the first search space in slot n, on valid downlink OFDM symbols. The base station 3804 may send (e.g., step 3840), to the wireless device 3808 via the first search space, first DCI (e.g., DCI-1 3812). The first DCI may comprise resource assignments for the first cell. The wireless device 3808 may receive (e.g., step 3860), via the first search space, the first DCI. The base station 3804 may send (e.g., step 3842) and the wireless device 3808 may receive (e.g., step 3862), via the first cell, downlink data corresponding to the first DCI. The base station 3804 and/or the wireless device 3808 may similarly perform the self-carrier scheduling in slot n+1 based on a monitoring occasion of the slot n+1 being configured on valid downlink OFDM symbols.

The base station 3804 and/or the wireless device 3808 may determine to perform cross-carrier scheduling in slot n+2 (e.g., steps 3834, 3854), for example, based on the wireless device 3808 not having a monitoring occasion, for the first search space in slot n+2, on valid downlink OFDM symbols. The wireless device 3808 may monitor the second search space for second DCI (e.g., DCI-2 3816). The base station 3804 may send (e.g., step 3836), to the wireless device 3808 via the second search space, second DCI (e.g., DCI-2 3816). The second DCI may comprise resource assignments for the first cell. The wireless device 3808 may receive (e.g., step 3856), via the second search space, the second DCI. The base station 3804 may send (e.g., step 3842) and the wireless device 3808 may receive (e.g., step 3862), via the first cell, downlink data corresponding to the second DCI.

The base station 3804 and/or wireless device 3808 may determine to perform self-carrier scheduling (e.g., steps 3838, 3858) in slot n+3 based on the monitoring occasion of the first search space in slot n+3 being configured on valid downlink OFDM symbols. The base station 3804 may send (e.g., step 3840), to the wireless device 3808 via the first search space, third DCI (e.g., DCI-3 3820). The third DCI may comprise resource assignments for the first cell. The wireless device 3808 may receive (e.g., step 3860), via the first search space, the third DCI (DCI-3) scheduling data for the first cell. The base station 3804 may send (e.g., step 3842) and the wireless device 3808 may receive (e.g., step 3862), via the first cell, downlink data corresponding to the third DCI.

Figure 38D:
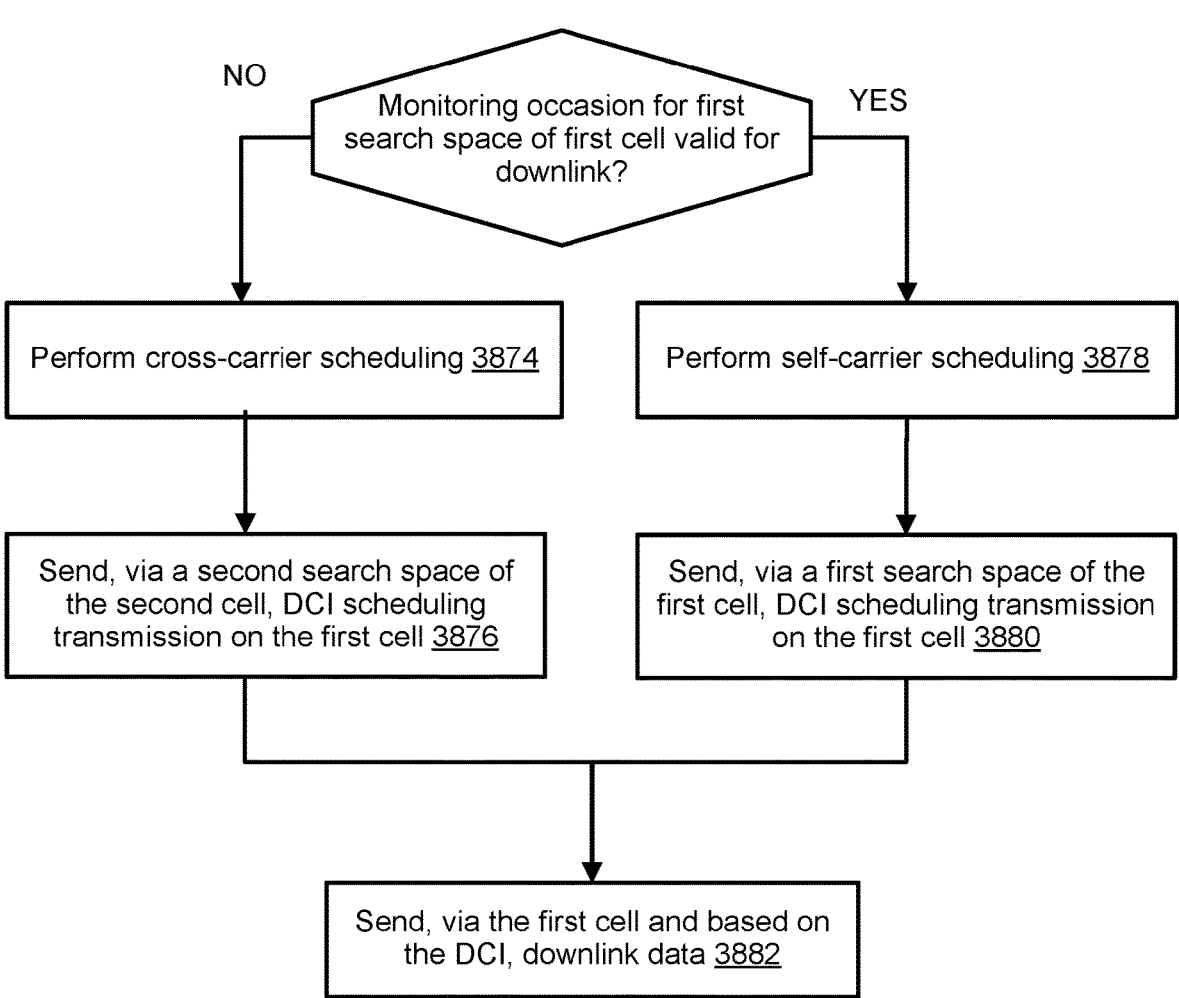
FIG. 38D shows an example method for signal transmission.
Figure 38E:
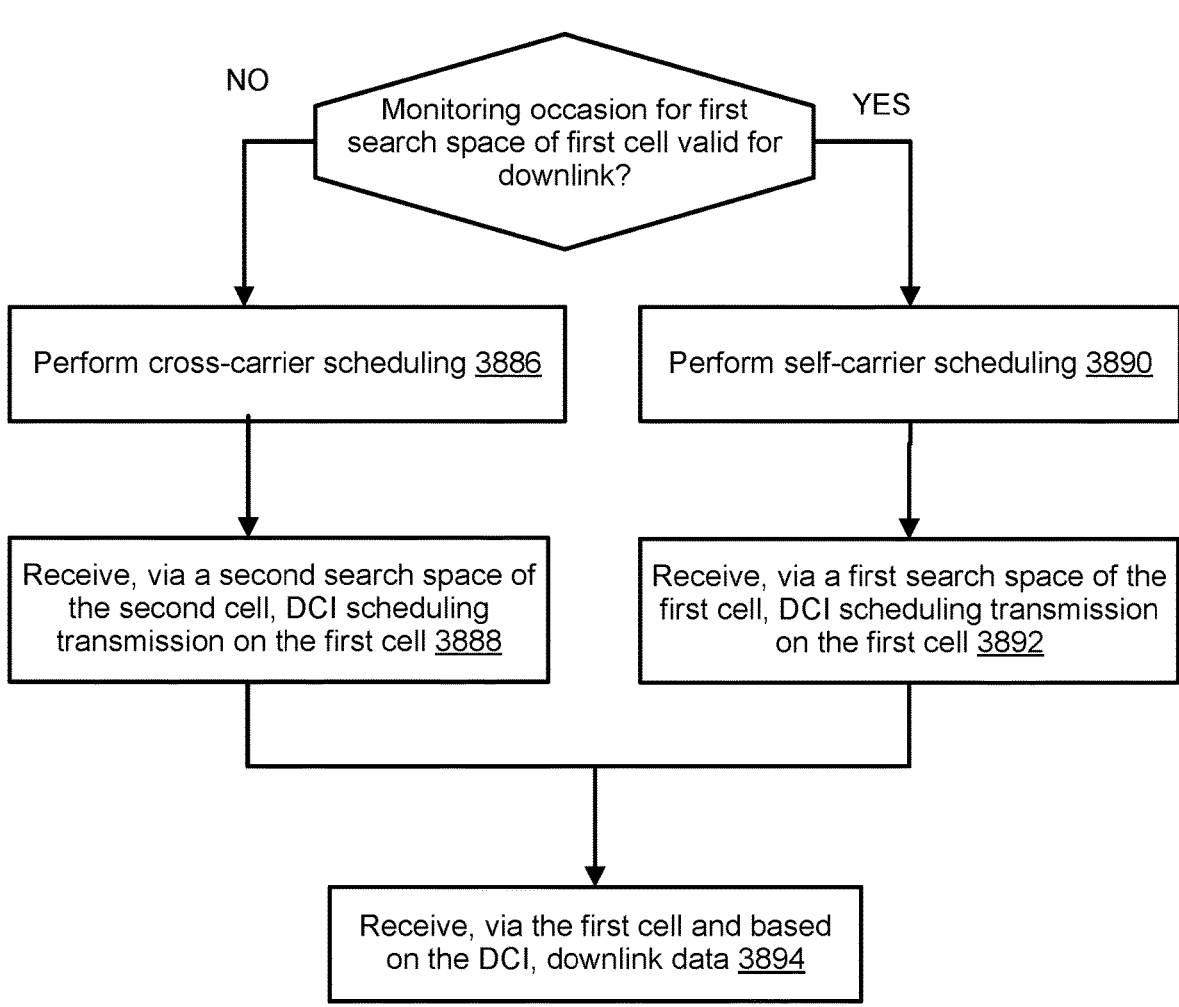
FIG. 38E shows an example method for signal reception.

FIG. 38D and FIG. 38E show an example method 3870 that may be performed by the base station 3804 and an example method 3884 that may be performed by the wireless device 3808, respectively. Steps 3874-3882 of FIG. 38D may be similar to steps 3834-3842, respectively, as described with reference to FIG. 38B. Steps 3886-3894 of FIG. 38E may be similar to steps 3854-3862, respectively, as described with reference to FIG. 38C.

Wireless device complexity relating to a quantity of blind decoding candidates per slot may be maintained and need not be increased by performing self-carrier scheduling or a cross-carrier scheduling at a given slot. The wireless device may be able to receive, for the first cell, DCI from either the first cell or the second cell depending on the availability of the first cell. Various examples herein enable increased control channel capacity for the first cell (e.g., a primary cell of a cell group) without increasing wireless device complexity.

A wireless device may receive one or more configuration messages (e.g., RRC messages). The one or more configuration messages may comprise configuration parameters for a first cell. The configuration parameters may comprise an indication of cross-carrier scheduling and one or more monitoring occasions of a first search space of the first cell. The configuration parameters may indicate a second search space of a second cell used for cross-carrier scheduling of the first cell. The second cell may be a scheduling cell for the first cell. The wireless device may receive a slot format indication-DCI (e.g., SFI-DCI) comprising a slot format indication of one or more slots of the first cell. The wireless device may determine, based on the SFI-DCI, that a first monitoring occasion, of the one or more monitoring occasions of the first search space, fully overlaps with one or more downlink OFDM symbols of a first slot of the first cell. The wireless device may monitor the first monitoring occasion in the first slot for a first DCI, for example, based on the determining that the first monitoring occasion fully overlaps with the one or more downlink OFDM symbols of the first slot. The first DCI may comprise resource assignments for the first cell. The wireless device may that determine a second monitoring occasion, of the one or more monitoring occasions of the first search space, may not fully overlap with one or more downlink OFDM symbols in a second slot of the first cell. The wireless device may determine that the second monitoring occasion is invalid based on the second monitoring occasion not fully overlapping with one or more downlink OFDM symbols in the second slot of the first cell The wireless device may monitor the second search space in the second slot for a second DCI, for example, based on determining that the second monitoring occasion is invalid. The second DCI may comprise resource assignments for the first cell.

The wireless device may or may not monitor the first search space in the second slot and may monitor the second search space in the second slot based on the cross-carrier scheduling. The wireless device may or may not monitor the second search space in the first slot and may monitor the first search space on the first slot base on the self-carrier scheduling.

A wireless device may receive one or more configuration messages. The one or more configuration messages may comprise configuration parameters for a first cell. The configuration parameters may comprise an indication of cross-carrier scheduling, one or more first DCI formats for self-carrier scheduling, and one or more second DCI formats for the cross-carrier scheduling. The configuration parameters may indicate one or more first search spaces for monitoring for first DCIs comprising resource assignments for the first cell. The wireless device may receive a command indicating a second cell as a scheduling cell for cross-carrier scheduling of the first cell. The wireless device may determine one or more second search spaces of the second cell based on one or more second DCI formats for the cross-carrier scheduling. The wireless device may monitor the one or more first search spaces of the first cell for the first DCIs based on the one or more first DCI formats. The first DCIs may comprise resource assignments for the first cell. The wireless device may monitor the one or more second search spaces of the second cell for second DCIs based on one or more second DCI formats. The second DCIs may comprise resource assignments for the first cell.

The wireless device may monitor the one or more second search spaces of the second cell for the second DCIs based on a second RNTI. The wireless device may monitor the one or more first search spaces of the first cell for the first DCIs based on a first RNI. The wireless device may determine a second DCI size of the one or more second DCI formats based on an active DL and/or UL BWPs of the second cell. The wireless device may align a first DCI size, of the one or more second DCI formats, to the second DCI size based an active DL and/or UL BWPs of the first cell. The one or more first search spaces may be cell-specific search spaces (e.g., common search spaces) and/or wireless device-specific search spaces. The one or more first DCI formats may comprise fallback DCI formats ((e.g., DCI format 1_0 and DCI format 0_0). The one or more second search spaces may be wireless device-specific search spaces. The one or more second DCI formats may comprise non-fallback DCI formats (e.g., DCI format 1_1 and DCI format 0_1). The one or more first DCI formats may comprise the DCI format 1_0/0_0 and DCI format 1_1/0_1. The one or more second DCI formats may comprise the DCI format 1_1/0_1. The wireless device may determine the one or more second search spaces of the second cell among one or more third search spaces of an active DL BWP of the second cell. The wireless device may be configured to monitor the one or more second search spaces and/or the one or more third search spaces for DCIs based on the second DCI formats (e.g., DCI format 1_1/0_1). The wireless device may monitor the one or more first search spaces of the first cell and the one or more second search spaces of the second cell for DCIs based on the second DCI formats. The DCIs may comprise resource assignments for the first cell.

Figure 39A:
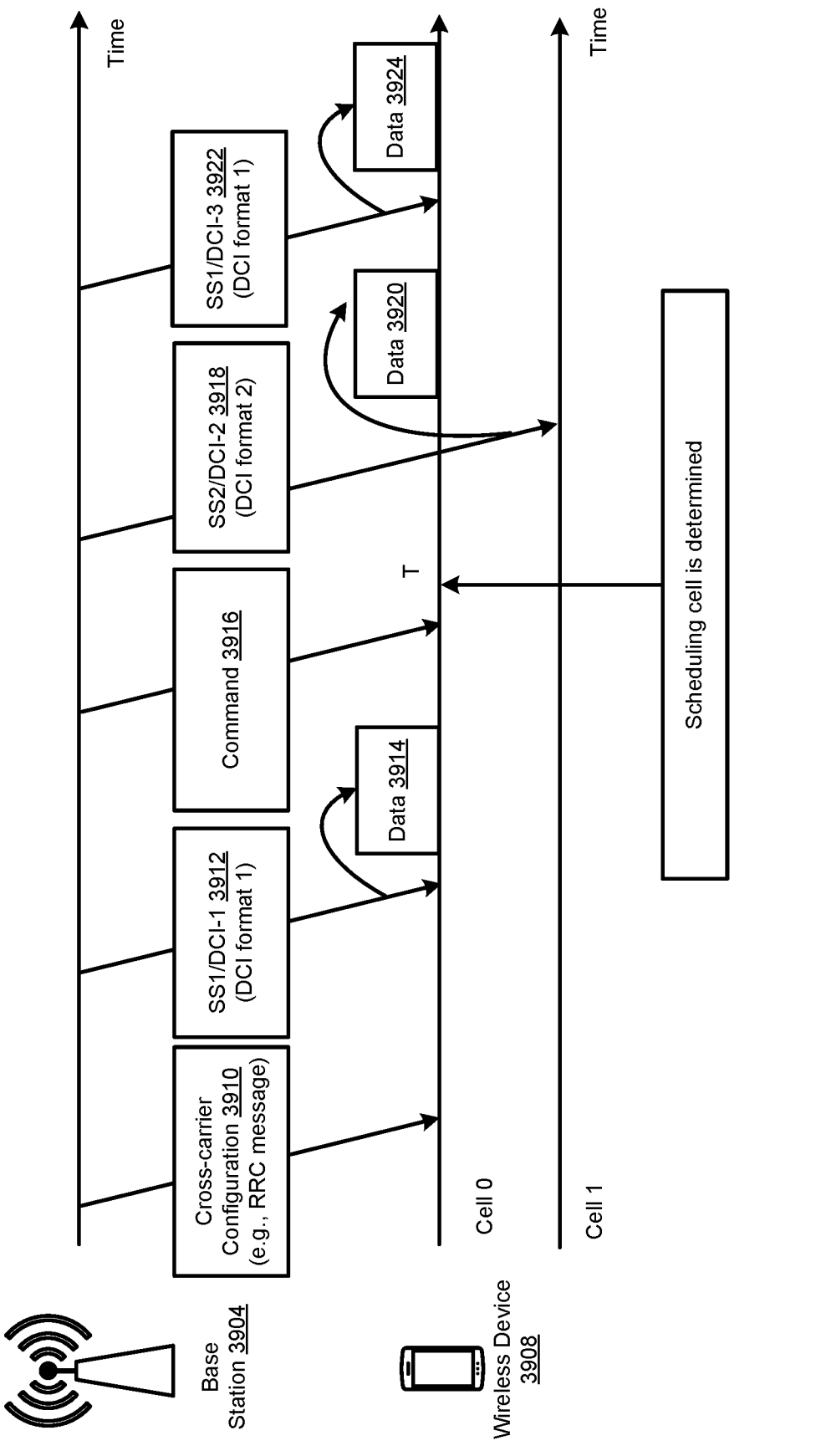
FIG. 39A shows example communication based on cross-carrier scheduling and self-carrier scheduling.

FIG. 39A shows an example of switching between self-carrier scheduling and cross-carrier scheduling for a cell. A base station 3904 may activate cross-carrier scheduling for a cell. Different formats (e.g., DCI formats) may be used to differentiate between control signals (e.g., DCIs) associated with cross-carrier scheduling and self-carrier scheduling. FIG. 37B and FIG. 37C show example methods at the base station 3704 and the wireless device 3708, respectively, for cross-carrier and self-carrier scheduling. The base station 3904 and the wireless device 3908 may perform one or more operations described with reference to the base station 3704 and the wireless device 3708 as described with reference to FIGS. 37A-C.

The base station 3904 may send (e.g., step 3932) one or more configuration parameters (e.g., via RRC signaling) for cross-carrier scheduling (e.g., cross-carrier configuration 3910) for a first cell. The wireless device 3908 may receive (e.g., step 3952) the one or more configuration parameters. The one or more configuration parameters may comprise a scheduling cell indicator/index (e.g., of a scheduling cell) and a second DCI format for DCIs to be monitored on the scheduling cell for the first cell if cross-carrier scheduling is enabled. The wireless device 3908 may be configured with a first search space (e.g., SS1) of the first cell for self-carrier scheduling. The wireless device 3908 may monitor the first search space for DCIs based on a first DCI format (e.g., DCI format 1) via. The wireless device 3908 may monitor a second search space (e.g., SS2) of the scheduling cell for second DCI based on the second DCI format, for example, based on an activation of cross-carrier scheduling for the first cell. The wireless device 3908 may continue to monitor the first search space of the first cell for DCIs based on the first DCI format, for example, based on the activation of cross-carrier scheduling for the first cell. The first DCI format may be the same as the second DCI format. The first DCI format may comprise the second DCI format. The first DCI format may be a fallback DCI format for downlink and/or uplink data scheduling (e.g., DCI format 0_0/1_0). The second DCI format may be non-fallback DCI formats (e.g., DCI format 1_1/0_1).

The wireless device 3908 may operate using self-carrier scheduling for the first cell, for example, until the wireless device 3908 receives a command to activate cross-carrier scheduling for the first cell. The base station 3904 may send (e.g., step 3940), via the first search space of the first cell, first DCI (e.g., DCI-1 3912). The first DCI may correspond to the first DCI format. The first DCI may comprise resource assignments for downlink data 3914 for the first cell. The wireless device 3908 may receive (e.g., step 3960), via the first search space of the first cell, the first DCI. The base station 3904 may send (e.g., step 3942), via the first cell and based on the assigned resources indicated by the first DCI, the downlink data 3914. The wireless device 3908 may receive (e.g., step 3962), via the first cell and based on the assigned resources indicated by the first DCI, the data 3914.

The base station 3904 may send (e.g., step 3934), to the wireless device 3908, a command 3916 to activate cross-carrier scheduling for the first cell. The command may be a MAC CE or DCI. The wireless device 3908 may monitor the second search space of the scheduling cell for second DCI (e.g., DCI-2 3918) comprising resource assignments for the first cell. The base station 3904 may send (e.g., step 3936), via the second search space of the scheduling cell, the second DCI. The second DCI may correspond to the second DCI format. The wireless device 3908 may receive (e.g., step 3956), via the second search space of the scheduling cell, the second DCI. The second DCI may comprise resource assignments for the first cell. The base station 3904 may send (e.g., step 3938), via the first cell and based on the assigned resources indicated by the second DCI, downlink data 3920. The wireless device 3908 may receive (e.g., step 3958), via the first cell and based on the assigned resources indicated by the second DCI, the downlink data 3920.

The wireless device 3908 may continue monitoring the first search space for DCIs, regardless of whether or not cross-carrier scheduling is enabled. The base station 3904 may send (e.g., step 3940), via the first search space (e.g., SS1) of the first cell, third DCI (e.g., DCI-3 3922). The third DCI may comprise resource assignments for data 3924 via the first cell. The wireless device 3908 may receive (e.g., step 3960), via the first search space of the first cell, the third DCI. The base station 3904 may send (e.g., step 3942), via the first cell and based on the assigned resources indicated by the third DCI, the data 3924. The wireless device 3908 may receive (e.g., step 3962), via the first cell and based on the third DCI, the data 3924.

Figure 39B:
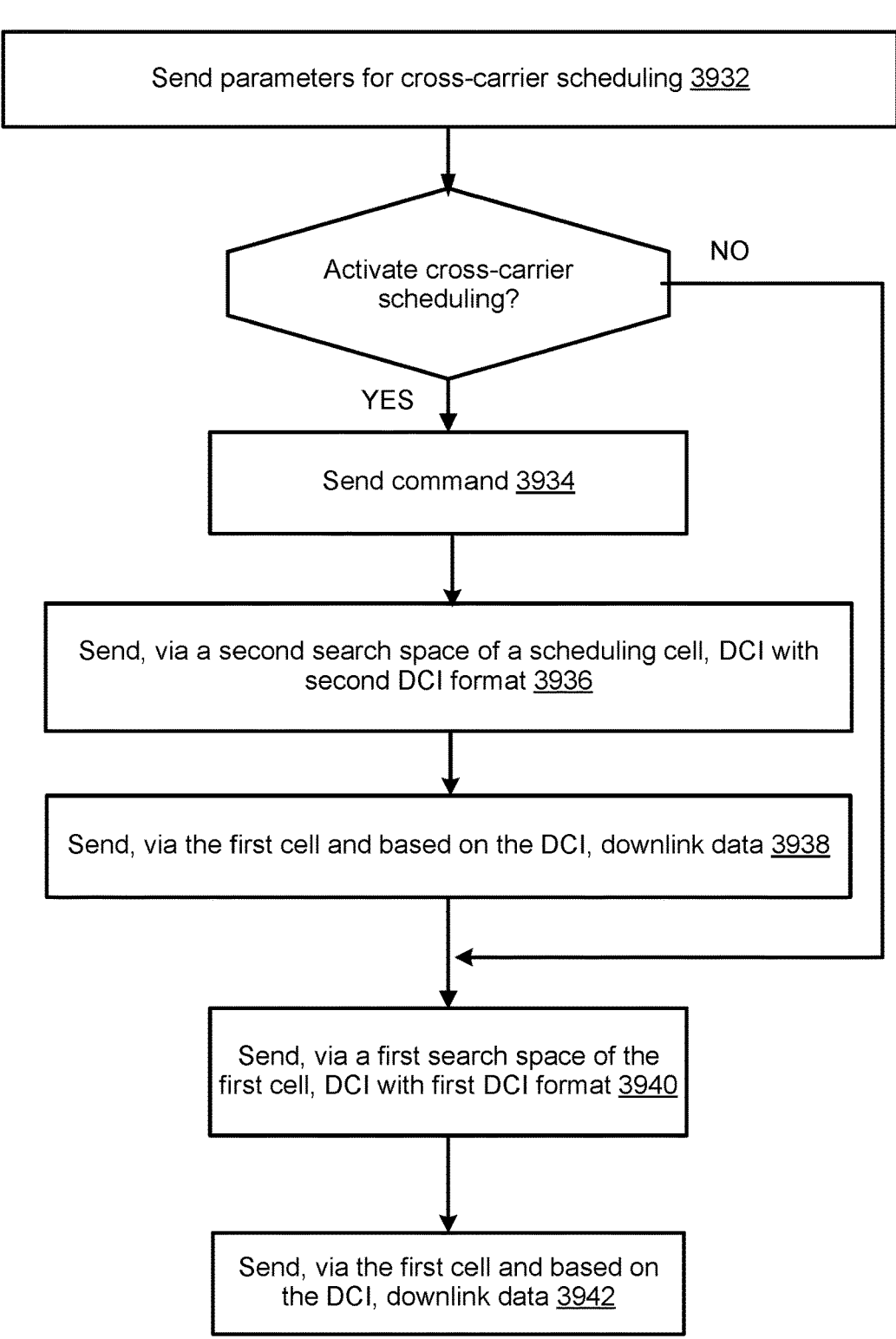
FIG. 39B shows an example method for signal transmission.
Figure 39C:
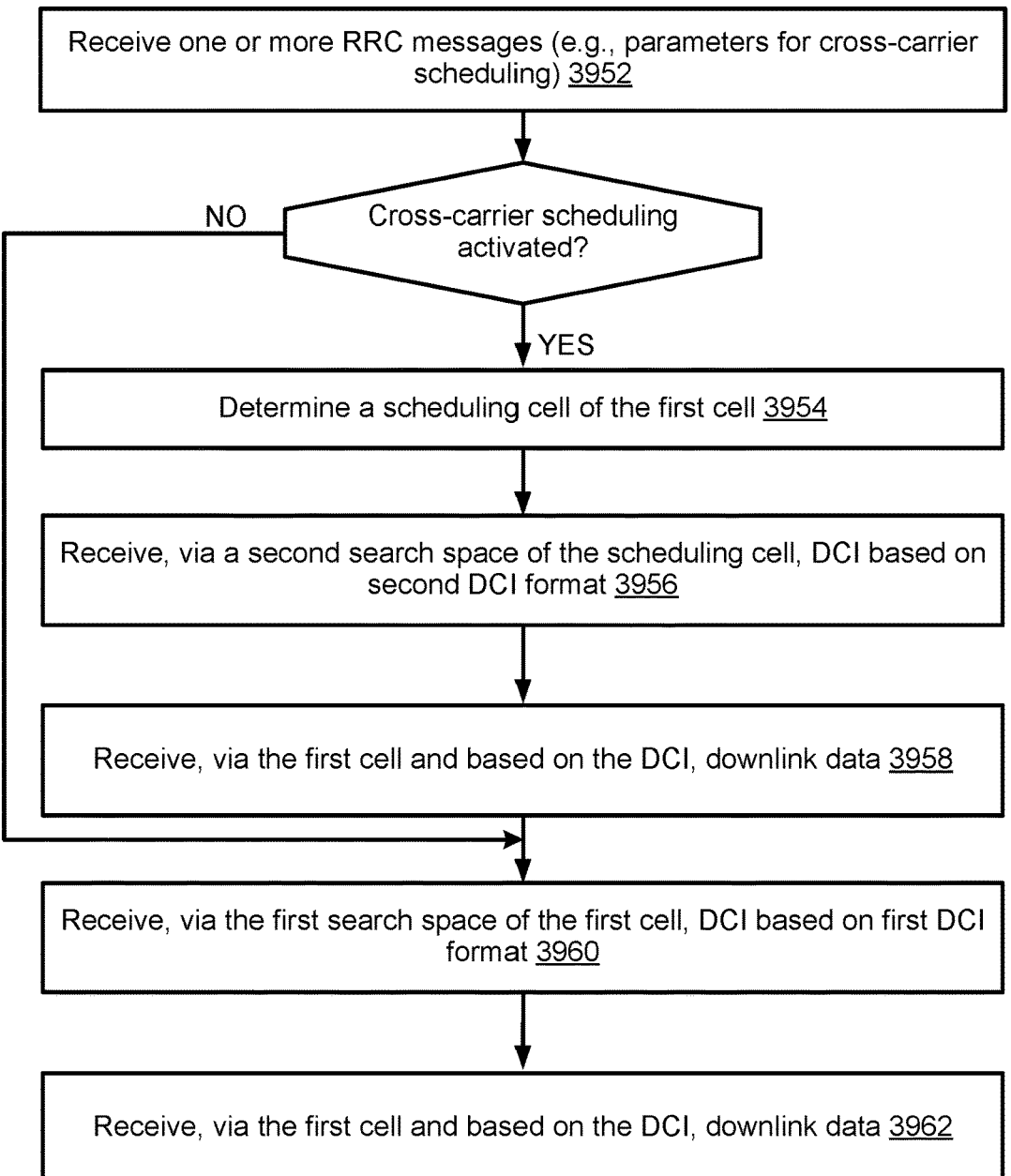
FIG. 39C shows an example method for signal reception.
Figure 39D:
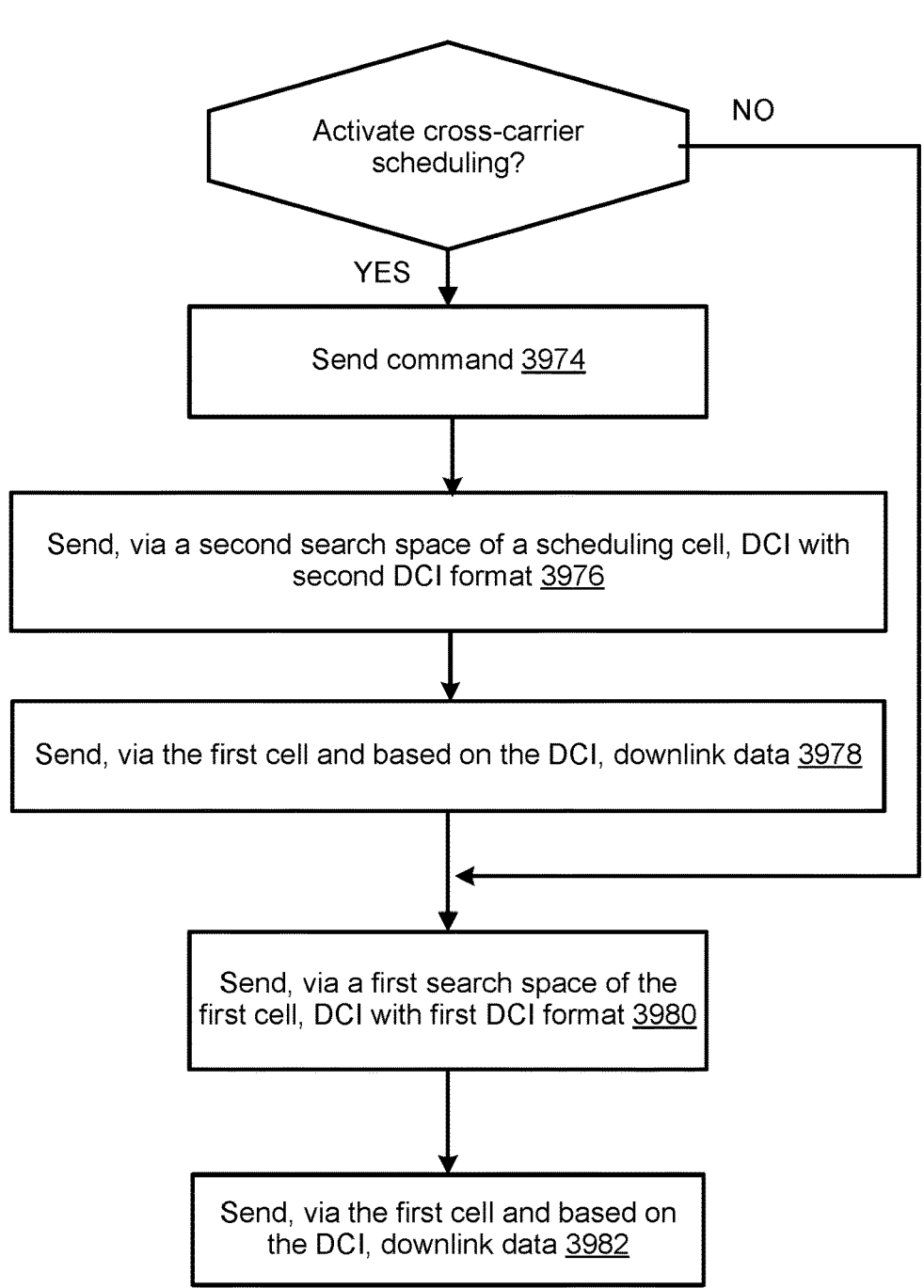
FIG. 39D shows an example method for signal transmission.
Figure 39E:
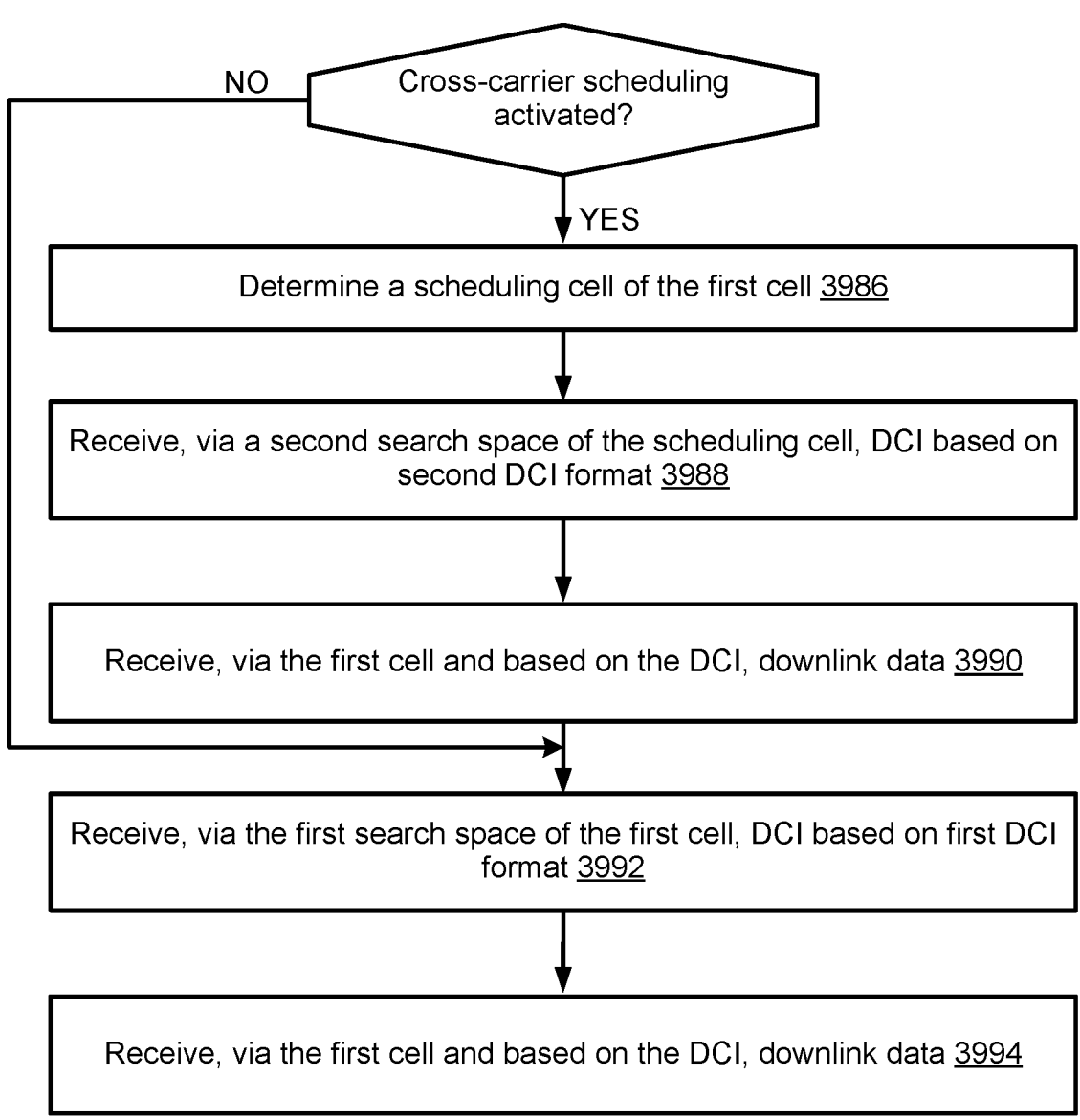
FIG. 39E shows an example method for signal reception.

FIG. 39D and FIG. 39E show an example method 3970 that may be performed by the base station 3904 and an example method 3984 that may be performed by the wireless device 3908, respectively. Steps 3974-3982 of FIG. 39D may be similar to steps 3934-3942, respectively, as described with reference to FIG. 39B. Steps 3986-3994 of FIG. 39E may be similar to steps 3954-3962, respectively, as described with reference to FIG. 39C.

Various examples described herein (e.g., with reference to FIGS. 37-39) may be applied for scheduling downlink transmissions or uplink transmissions. With reference to FIG. 37A, for example, the DCIs (e.g., DCI-1 3712, DCI-2 3718, or DCI-3 3712) may schedule resources for either a downlink transmission or an uplink transmission.

A base station may send/transmit one or more configuration messages (e.g., RRC messages). The one or more configuration messages may comprise one or more parameters for cross-carrier scheduling for a cell. The base station may send/configure a cross-carrier scheduling configuration (e.g., CrossCarrierSchedulingConfig) as a part of one or more parameters configured for the cell (e.g., ServingCell-Config). The cross-carrier scheduling configuration may comprise an indicator (e.g., cif-Presence) for a second cell. The indicator may indicate whether a carrier indicator field is present in DCI (e.g., from the second cell). The second cell may be a scheduling cell for the cell. The cross-carrier scheduling configuration may comprise one or more additional parameters (e.g., schedulingCellId and cif-InSched-ulingCell) for the cell. The parameter schedulingCellId may comprise an indicator/index (e.g., servngcellindex) corre-sponding to the second cell. The parameter cif-InSchedul-ingCell may indicate an indicator/index for the cell by DCI, via the second cell, scheduling the cell.

The cross-carrier scheduling configuration may be con-figured for the cell. The cell may be a primary cell of the cell group or the PUCCH SCell. The wireless device may or may not activate the one or more parameters of the cross-carrier scheduling configuration (e.g., activate the cross-carrier scheduling), for example, based on/in response to the receiv-ing the cross-carrier scheduling configuration for the cell. The base station may indicate, to the wireless device, activation of the cross-carrier scheduling configuration for the cell via MAC CEs (e.g., SCell activation MAC CE, comprising an enable/disable indication), and/or DCIs (e.g., comprising an enable/disable indication), for example, after the cross-carrier scheduling configuration is configured for the cell.

FIG. 40 shows an example cross-carrier scheduling configuration (e.g., as indicated to a wireless device). The cross-carrier scheduling configuration may comprise an indicator/index of a scheduled cell (e.g., scheduledCellId). The cross-carrier scheduling configuration may be configured for a scheduling cell that schedules transmissions via the scheduled cell.

A base station may configure (e.g., indicate to a wireless device) one or more parameters for cross-carrier scheduling for a first cell. The wireless device may not activate cross-carrier scheduling for the first cell until the wireless device may receive a command from the base station. The base station may send/transmit a command (e.g., an SCell activation/deactivation MAC CE). The MAC CE may comprise an indication for enabling or disabling the cross-carrier scheduling of the first cell. A first MAC CE may comprise one or more indications to activate and/or deactivate one or more secondary cells of a cell group. The first MAC CE may enable or disable the cross-carrier scheduling of a primary cell (e.g., the first cell) of the cell group, for example, if the cell group comprises the primary cell without an additional PUCCH cell. The first MAC CE may enable or disable cross-carrier scheduling of the primary cell of the cell group, for example, the cell group comprises the primary cell (e.g., the first cell) and a PUCCH cell. Cross-carrier scheduling may be activated by RRC configuration (e.g., without receiving an additional MAC CE indication), for example, if the cross-carrier scheduling is configured for the PUCCH cell. A MAC CE may enable r disable cross-carrier scheduling of the primary cell and the PUCCH cell, for example, if cross-carrier scheduling is configured for both the primary cell and the PUCCH cell. The first MAC CE may not enable or disable cross-carrier scheduling, for example, if cross-carrier scheduling is not configured for the primary cell. Enabling or disabling cross-carrier scheduling may be indicated via a reserved bit in the MAC CE (e.g., SCell activation/deactivation MAC CE).

Figures 41A, 41B:
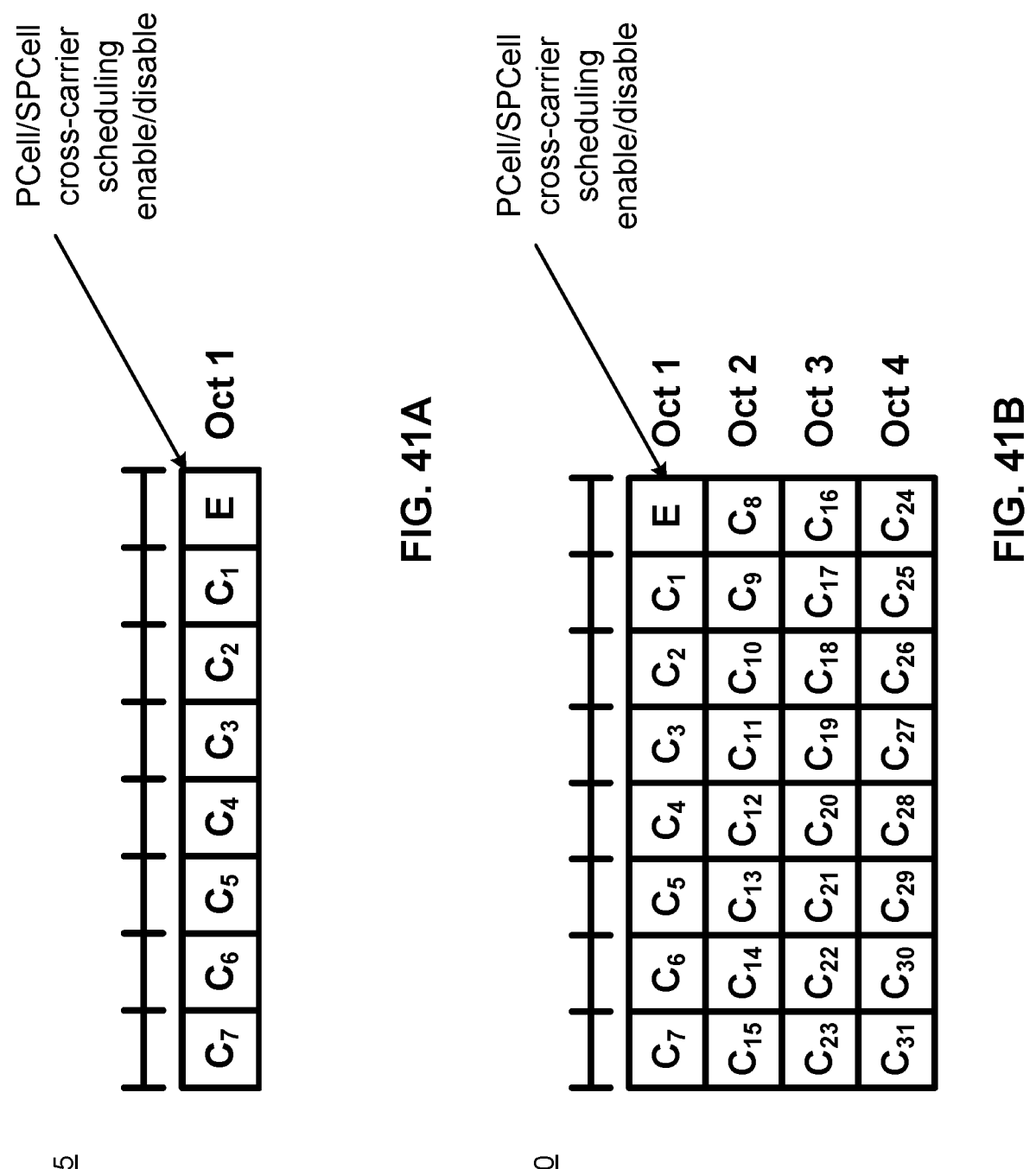
FIG. 41A and FIG. 41B show example MAC CE formats.

FIGS. 41A and 41B shows example MAC CE formats. The MAC CE formats may correspond to an SCell activation/deactivation MAC CE. FIG. 41A shows an example of an SCell activation/deactivation MAC CE 4105 comprising one octet. FIG. 41B shows an example of an SCell Activation/Deactivation MAC CE 4110 comprising four octets. MAC CEs 4105 and 4110 may be similar to the MAC CEs described with reference to FIGS. 17A and 17B.

The example MAC CE formats may correspond to MAC CEs for enabling or disabling cross-carrier scheduling for a primary cell of a cell group. A reserved bit field (e.g., bit E in FIGS. 41A and 41B) of the SCell activation/deactivation MAC CE may be used to indicate enabling or disabling of cross-carrier scheduling for a primary cell of a cell group or a primary cell of a PUCCH group. The wireless device may or may not expect to be configured with cross-carrier scheduling for both the primary cell of the cell group and a PUCCH cell belonging to the same cell group.

A base station may configure cross-carrier scheduling for a first cell via one or more configuration messages (e.g., RRC signaling). The RRC signaling may or may not configure/indicate a scheduling cell indicator/index. The base station may update or configure the scheduling cell indicator/index via MAC CEs and/or DCI signaling. The base station may indicate, via a first MAC CE, a scheduling cell indicator/index for the first cell. The first cell may be a primary cell of a cell group comprising the first cell and the scheduling cell. The first MAC CE (e.g., an SCell activation/deactivation MAC CE) may comprise one or more entries for activation/deactivation for one or more secondary cells of the cell group. The first MAC CE may comprise the scheduling cell indicator/index of a scheduling cell for the first cell. The wireless device may apply the indicated scheduling cell for the first cell and may activate cross-carrier scheduling for the first cell, for example, based on receiving the scheduling cell indicator/index. The scheduling indicator/index may be 3 bits (e.g., to indicate a value in a range of 0 to 7 or 1 to 8), for example, if the MAC CE may correspond to up to 7 or 8 secondary cells. The scheduling cell index may be 5 bits (e.g., to indicate a value in a range of 0 to 31 or 1 to 32), for example, if the MAC CE correspond to up to 31 or 32 secondary cells. The scheduling cell indicator/index may be fixed as K bits (e.g., 3 bits, or any other quantity of bits) and a value of the scheduling cell indicator/index may range from indicator/index 0 (e.g., corresponding to a first SCell) to indicator/index $2^K-1$ (e.g., corresponding to an eighth SCell). A scheduling cell of a primary cell of a cell group may be determined/updated based on a MAC CE (e.g., SCell activation/deactivation MAC CE). A scheduling cell for a secondary cell of the cell group may be determined based on RRC configurations (e.g., CrossCarrierSchedulingConfig of the secondary cell may comprise schedulingCellId).

Figures 42A, 42B:
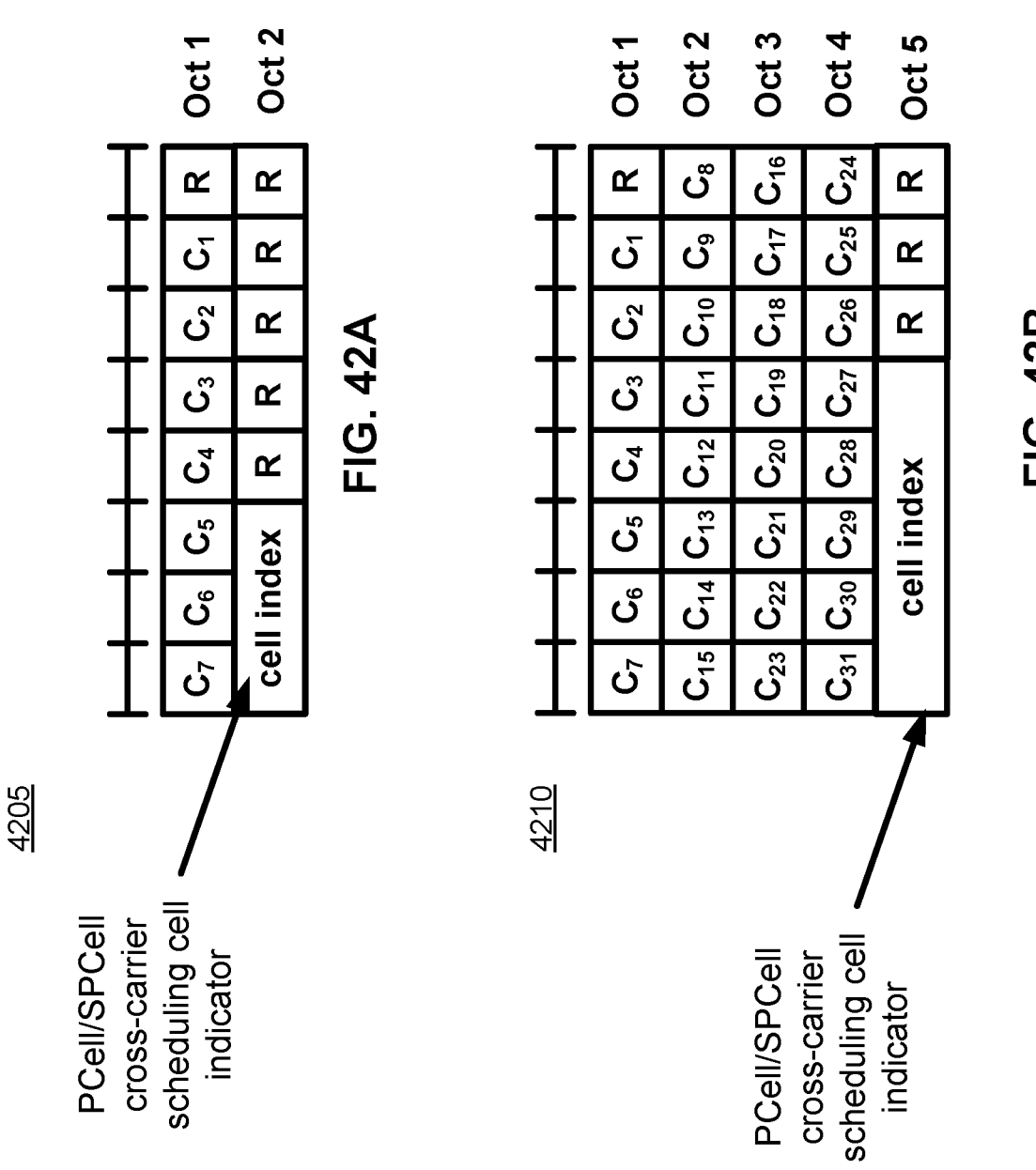
FIG. 42A and FIG. 42B show example MAC CE formats.

FIGS. 42A and 42B show example MAC CE formats. The MAC CE formats may correspond to SCell activation/deactivation MAC CEs. A MAC CE 4205 may be used for activation/deactivation of 7 secondary cells (e.g., via bits C1 to C7). A MAC CE 4210 may be used for activation/deactivation of 31 secondary cells. The MAC CEs 4205 and 4210 may indicate a scheduling cell for cross-carrier scheduling for a primary cell of a cell group. MAC CEs 4105 and 4110 may be similar to the MAC CEs described with reference to FIGS. 17A and 17B except for additional bits that may added to indicate the scheduling cell.

An octet comprising a cell indicator/index (e.g., a scheduling cell indicator/index) and one or more reserved bits may be added to an SCell activation/deactivation MAC CE. The octet comprising the cell indicator/index and the one or more reserved bits may be formed as a dedicated MAC CE that may be separate from the SCell activation/deactivation MAC CE.

A base station may send/transmit a MAC CE to activate and/or deactivate cross-carrier scheduling for a first cell. The MAC CE may comprise one or more entries to activate and/or deactivate cross-carrier scheduling for one or more cells. An entry of the MAC CE may comprise a scheduled cell indicator/index of a scheduled cell. The entry of the MAC CE may comprise a scheduling cell indicator/index, of a scheduling cell, corresponding to the scheduled cell indicator/index. The entry of the MAC CE may comprise a CIF value used for cross-carrier scheduling. The wireless device may determine/assume that cross-carrier scheduling is enabled, for example, if the scheduled cell indicator/index and the scheduling cell indicator/index are different. The wireless device may determine/assume that self-carrier scheduling is enabled (e.g., or cross-carrier scheduling is disabled), for example, if the scheduled cell indicator/index and the scheduling cell indicator/are same.

A base station may configure a scheduling cell indicator/index for a scheduled cell, for example, via RRC signaling. The base station may indicate/configure cross-carrier scheduling configuration (e.g., CrossCarrierSchedulingConfig) for the scheduled cell and/or the scheduling cell. The base station may activate or deactivate cross-carrier scheduling for each scheduled cell (e.g., via MAC CEs and/or DCIs). The base station may configure a plurality of cells of a cell group for a wireless device. The base station may configure a first cell of the plurality of cells for cross-carrier scheduling (e.g., via CrossCarrierSchedulingConfig). The base station may configure a second cell of the plurality of cells for cross-carrier scheduling (e.g., via CrossCarrierSchedulingConfig). A cell indicator/index of the first cell may M and a cell indicator/index of the second cell may be K (e.g., M and K>1). The base station may send, to the wireless device, a use MAC CE for enabling/disabling cross-carrier scheduling for the first cell and the second cell of the cell group. The base station may use two bits of the MAC CE for enabling disabling cross-carrier scheduling for the first cell and the second cell. The first bit may correspond to the first cell, for example, if the cell indicator/index of the first cell is smaller than the cell indicator/index of the second cell. The second bit may correspond to the second cell. A quantity of bits of the MAC CE to be used for enabling or disabling cross-carrier scheduling may be determined based on a quantity of cells configured with cross-carrier scheduling. A quantity of bits of the MAC CE may be determined based on a quantity of configured secondary cells (e.g., 8 bits if a quantity of configured secondary cells is less than 8 and 32 bits if the quantity is greater than 8, or any other quantity of bits).

A MAC CE may comprise P bits indicating a scheduling cell indicator/index and S bits for indicating enabling/disabling cross-carrier scheduling (e.g., for S secondary cells). The scheduling cell indicator/index may indicate scheduling cell for a primary cell of a cell group, for example, if the MAC CE is sent/transmitted for the cell group. Each bit of S bits may indicate whether to enable or disable cross-carrier scheduling for a corresponding secondary cell of the cell group. S may be determined based on a quantity of secondary cells configured with cross-carrier scheduling. S may be determined based on a quantity of configured secondary cells.

Figure 43A:
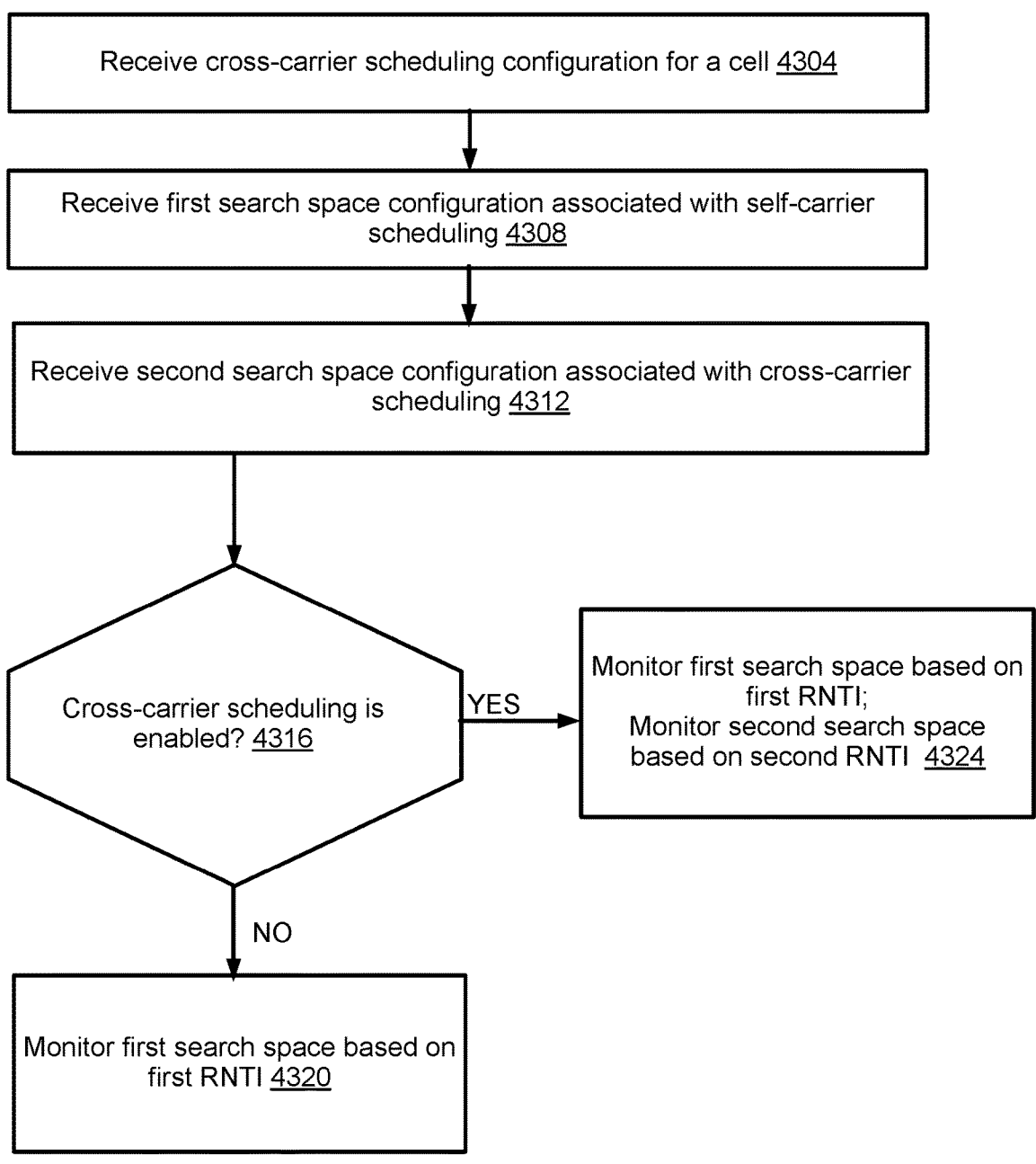
FIG. 43A and FIG. 43B shows example methods for monitoring search spaces based on traffic indicators.

FIG. 43A shows an example method for monitoring search spaces based on RNTIs. The example method 4300 may be performed at a wireless device. At step 4304, the wireless device may receive a cross-carrier scheduling configuration for a cell. The cross-carrier scheduling configuration may comprise an indicator of a scheduling cell for the cell. At step 4308, the wireless device may receive a first search space configuration. The first search space configuration may be associated with a first search space of the cell configured for self-carrier scheduling. The first search space configuration may comprise an indicator of the first search space. The first search space configuration may comprise a first RNTI associated with self-carrier scheduling. At step 4312, the wireless device may receive a second search space configuration. The second search space configuration may be associated with a second search space of the scheduling cell. The second search space configuration may comprise an indicator of the second search space. The second search space configuration may comprise a second RNTI associated with cross-carrier scheduling.

At step 4316, the wireless device may determine whether cross-carrier scheduling is enabled/activated for the cell. The wireless device may determine that cross-carrier scheduling is enabled based on receiving an indication. The indication may be DCI, a MAC CE, or an RRC configuration message. The indication may be a command activating the scheduling cell.

At step 4320, the wireless device may monitor the first search space of the cell based on first RNTI, for example, based on determining that cross-carrier scheduling is not enabled. The wireless device may monitor the first search space for receiving DCI scheduling transmission via the cell.

At step 4324, the wireless device may monitor the first search space of the cell based on first RNTI, for example, based on determining that cross-carrier scheduling is enabled. The wireless device may monitor the first search space for receiving DCI scheduling transmission via the cell. The wireless device may additionally monitor the second search space of the scheduling cell based on the second RNTI, for example, based on determining that cross-carrier scheduling is enabled. The wireless device may monitor the second search space for receiving DCI scheduling transmission via the cell.

Figure 43B:
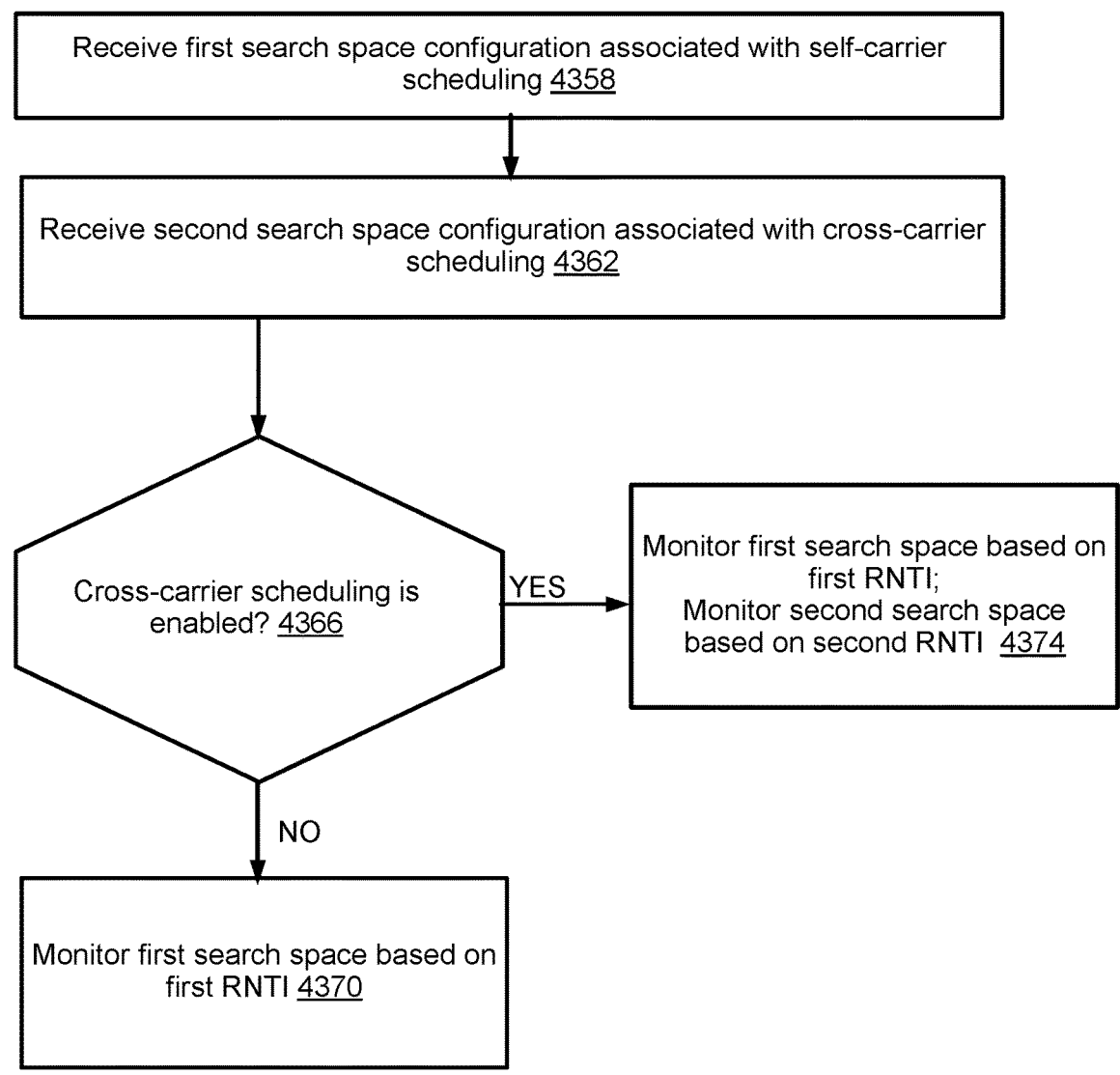

FIG. 43B shows an example method for monitoring search spaces based on RNTIs. The example method 4450 may be performed by a wireless device. Steps 4358-4374 of FIG. 43B may be similar to steps 4308-4324, respectively, as described with reference to FIG. 43A.

FIG. 44A shows an example method for monitoring search spaces based on a slot format indication. The example method 4400 may be performed at a wireless device. At step 4404, the wireless device may receive a cross-carrier scheduling configuration for a cell. The cross-carrier scheduling configuration may comprise an indicator of a scheduling cell for the cell.

At step 4408, the wireless device may receive a first search space configuration. The first search space configuration may be associated with a first search space of the cell configured for self-carrier scheduling. The first search space configuration may comprise an indicator of the first search space. At step 4412, the wireless device may receive a second search space configuration. The second search space configuration may be associated with a second search space of the scheduling cell. The second search space configuration may comprise an indicator of the second search space. At step 4416, the wireless device may receive a slot format indication (e.g., via DCI). The slot format indication may indicate whether symbols (e.g., OFDM symbols) in a slot are valid for transmissions (e.g., downlink transmission) or are unavailable. For example, the slot format indication may indicate downlink OFDM symbols in a slot.

At step 4420, the wireless device may determine, for a slot of the cell, whether a monitoring occasion of the first search space is configured on downlink OFDM symbols of the slot. At step 4424, the wireless device may monitor the first search space in the slot, for example, based on determining that the monitoring occasion of the first search space, in the slot, is configured on downlink OFDM symbols. The wireless device may monitor the first search space for receiving DCI scheduling transmission via the cell.

At step 4428, the wireless device may monitor the second search space in the slot, for example, based on determining that the monitoring occasion of the first search space, in the slot, is not configured on downlink OFDM symbols. The wireless device may monitor the second search space of the scheduling cell for receiving DCI scheduling transmission via the cell.

Figure 44B:
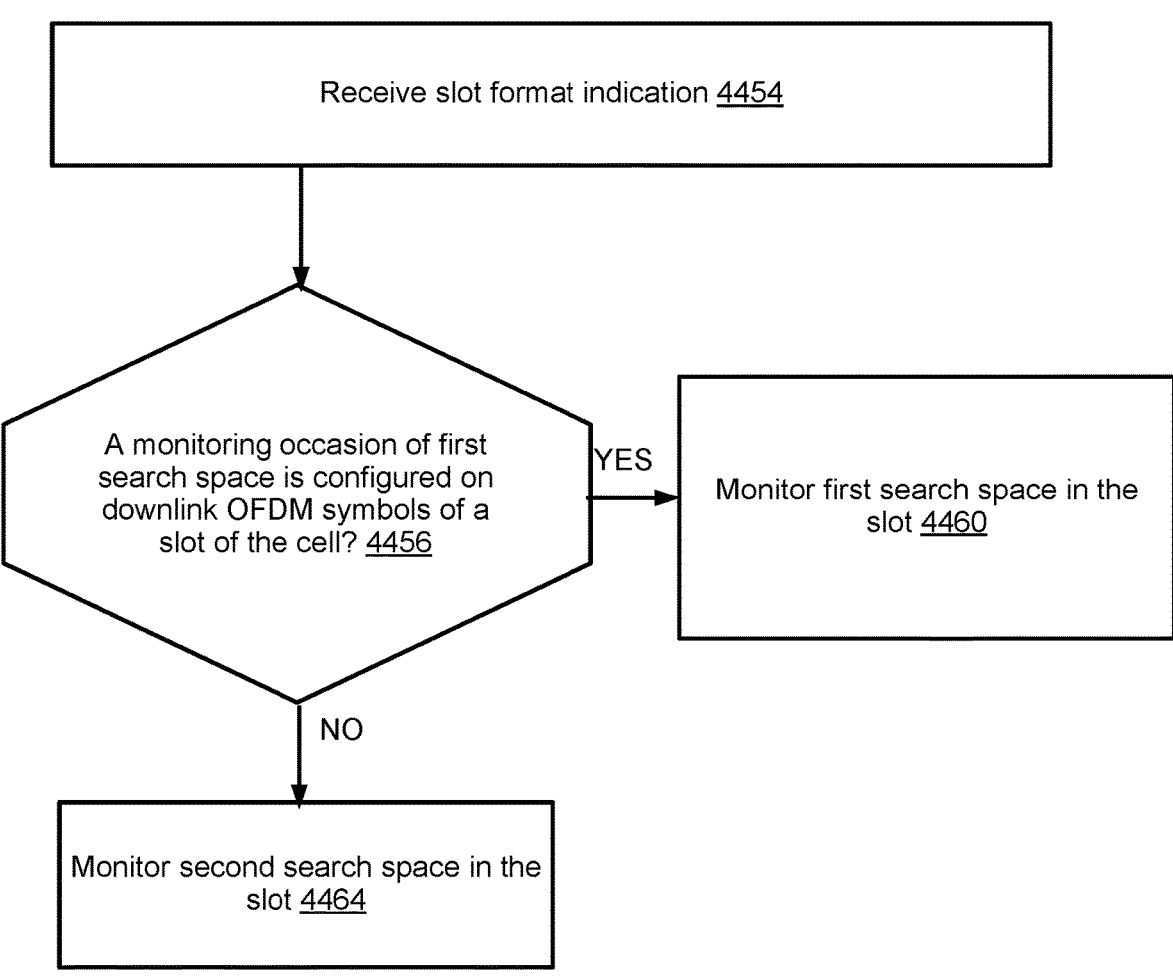

FIG. 44B shows an example method for monitoring search spaces based on a slot format indication. The example method 4450 may be performed by a wireless device. Steps 4454-4464 of FIG. 44B may be similar to steps 4416-4428, respectively, as described with reference to FIG. 44A.

A wireless device may receive one or more RRC messages. The one or more RRC messages may comprise configuration parameters. The configuration parameters may comprise an indication of cross-carrier scheduling for a first cell, an indication of a first search space of the first cell, and an indication of a second search space of a second cell. The second cell may be a scheduling cell for the first cell if cross-carrier scheduling is used for the first cell. The wireless device may determine a condition associated with a slot of the first cell. The condition may be that there is no valid monitoring occasion of the first search space in the slot of the first cell. The wireless device may stop monitoring the first search space of the first cell during the slot, for example, based on determining that there is no valid monitoring occasion of the first search space in the slot of the first cell. The wireless device may monitor the second search space of the second cell in the slot for receiving second DCI. The second DCI may comprise resource assignments for the first cell.

A wireless device may receive one or more RRC messages. The one or more RRC messages may comprise configuration parameters for cross-carrier scheduling for a first cell. The wireless device may receive a command indicating that a second cell is a scheduling cell for the first cell. The command may be a MAC CE comprising a cell indicator/index of the scheduling cell. The command may be an SCell activation/deactivation MAC CE comprising an indication (e.g., a bit) to enable or disable cross-carrier scheduling for the first cell. The wireless device may receive, via the second cell, DCI comprising a resource assignment for the first cell. The wireless device may communicate with a base station, via the first cell, based on the resource assignment.

A wireless device may receive one or more RRC messages. The one or more RRC messages may comprise configuration parameters for a first cell. The configuration parameters may comprise indications of cross-carrier scheduling for the first cell, one or more first DCI formats for self-carrier scheduling, one or more second DCI formats for cross-carrier scheduling, and one or more first search spaces for monitoring for first DCIs comprising resource assignments for the first cell. The wireless device may receive a command indicating that a second cell is a scheduling cell for the first cell. The wireless device may determine one or more second search spaces of the second cell based on the one or more second DCI formats for cross-carrier scheduling. The wireless device may monitor the one or more first search spaces of the first cell for the first DCIs, for example, based on the one or more first DCI formats. The first DCIs may comprise resource assignments for the first cell, via. The wireless device may monitor the one or more second search spaces of the second cell for second DCIs, for example, based on the one or more second DCI formats. The second DCIs may comprise resource assignments for the first cell. The wireless device may monitor for the first DCIs based on a first RNTI. The wireless device may monitor for the second DCIs based on a second RNTI.

A wireless device may receive one or more RRC messages. The one or more RRC messages may comprise configuration parameters for a first cell. The configuration parameters may comprise indications of cross-carrier scheduling, one or more monitoring occasions of a first search space of a first cell, and a second search space of a second cell used for cross-carrier scheduling of the first cell. The second cell may be a scheduling cell for the first cell. The wireless device may receive a slot format indication DCI (e.g., SFI-DCI) comprising a slot formation indication of one or more slots of the first cell. The wireless device may determine that a first monitoring occasion, of the one or more monitoring occasions of the first search space, overlaps fully with one or more downlink OFDM symbols of a first slot of the first cell, for example, based on the SFI-DCI. The wireless device may monitor the first monitoring occasion in the first slot for first DCI, for example, based on determining that the first monitoring occasion overlaps fully with one or more downlink OFDM symbols of the first slot. The first DCI may comprise resource assignments for the first cell. The wireless device may determine that a second monitoring occasion of the one or more monitoring occasions of the first search space does not fully overlap with one or more downlink OFDM symbols in a second slot of the first cell. The wireless device may monitor the second search space of the second cell in the second slot for second DCI, for example, based on determining that the second monitoring occasion does not overlap fully with one or more downlink OFDM symbols of the second slot. The second DCI may comprise resource assignments for the first cell via.

A wireless device may perform a method comprising multiple operations. The wireless device may receive one or more messages comprising configuration parameters for a primary cell, wherein the primary cell may comprise a first search space and a second search space. The configuration parameters may comprise: a first indication indicating that the first search space is enabled with self-carrier scheduling; and a second indication indicating that the second search space is enabled with cross-carrier scheduling; and a third indication, of a secondary cell, for cross-carrier scheduling the primary cell. The wireless device may monitor for downlink control information (DCI), wherein the monitoring may comprise at least one of: monitoring, based on the first indication, the first search space for self-carrier scheduling via the primary cell; or monitoring, based on the second indication, a third search space for cross-carrier scheduling via the secondary cell. The wireless device may receive, based on the monitoring for DCI, at least one resource assignment for the primary cell. The wireless device may also perform one or more additional operations. The wireless device may receive a command indicating activation of cross-carrier scheduling for the primary cell, wherein the monitoring the third search space may be based on the activation of cross-carrier scheduling for the primary cell. The wireless device may determine, based on the second search space of the primary cell, the third search space of the secondary cell. The wireless device may receive, via the primary cell and based on the at least one resource assignment, downlink data. The receiving the at least one resource assignment may comprise receiving the at least one resource assignment via the third search space. The receiving the at least one resource assignment may comprise receiving the at least one resource assignment via the first search space. The wireless device may determine, based on the second search space of the primary cell, the third search space of the secondary cell. The determining the third search space may comprise determining a search space indicator of the third search space that is associated with a search space indicator of the second search space. The determining the third search space may comprise determining the third search space based on a search space indicator of the third search space that is the same as a search space indicator of the second search space. The determining the third search space of the secondary cell may comprise determining the third search space based on a search space indicator of the third search space being a sum of a search space indicator of the second search space and an offset value. The determining the third search space of the secondary cell may comprise determining the third search space based on an order of the second search space among one or more search spaces, of the primary cell, enabled with cross-carrier scheduling. The configuration parameters may indicate a quantity of control channel candidates for the second search space, wherein the monitoring the third search space of the secondary cell may comprise monitoring the third search space based on the quantity of control channels for the second search space. The configuration parameters may indicate that the first search space is configured with self-carrier scheduling and an indication of cross-carrier scheduling may be absent for the first search space. A search space indicator of the second search space may be greater than a search space indicator of the first search space. The configuration parameters may comprise a parameter indicating disabling cross-carrier scheduling for the first search space. The wireless device may determine that the first search space is for self-carrier scheduling based on the parameter indicating disabling of cross-carrier scheduling. The first search space may be a wireless device-specific search space. The configuration parameters may comprise a parameter indicating enabling cross-carrier scheduling for the second search space. The wireless device may determine that the second search space is for cross-carrier scheduling based on the parameter indicating enabling of cross-carrier scheduling. The configuration parameters may further indicate one or more first DCI formats for the second search space. The wireless device may receive one or more second messages indicating one or more second DCI formats for the third search space of the secondary cell. The one or more second DCI formats may comprise the one or more first DCI formats. The wireless device may determine, based on the second search space, one or more aggregation levels and one or more quantity of monitoring candidates for an aggregation level. The wireless device may monitor, based on the one or more aggregation levels and the one or more quantity of monitoring candidates for the aggregation level, the third search space of the secondary cell. The primary cell may be one of: a primary cell of a master cell group; a primary cell of a secondary cell group; or a physical uplink control channel (PUCCH) cell of a PUCCH group. The first search space may be a common search space or a wireless device-specific search space, and the second search space may be a wireless device-specific search space. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive one or more messages comprising configuration parameters for a primary cell. The configuration parameters may comprise: an indication of a secondary cell for cross-carrier scheduling the primary cell, wherein the primary cell comprises a first search space and the secondary cell comprises a second search space; parameters associated with the first search space; and parameters associated with the second search space. The wireless device may determine, based on the first search space of the primary cell, the second search space of the secondary cell. The wireless device may monitor, based on the parameters associated with the first search space and the parameters associated with the second search space, the second search space of the secondary cell for first downlink control information (DCI). The wireless device may also perform one or more additional operations. The first DCI may comprise resource assignments for the primary cell. The primary cell may further comprise a third search space. The configuration parameters may further comprise: an indication that cross-carrier scheduling is enabled for the first search space; and an indication that self-carrier scheduling is enabled for the third search space. The monitoring the second search space may be based on cross-carrier scheduling being enabled for the first search space. The wireless device may monitor, based on self-carrier scheduling being enabled for the third search space, the third search space of the primary cell for second DCI. The wireless device may receive a command indicating activation of cross-carrier scheduling for the primary cell. The monitoring the second search space may be based on the activation of cross-carrier scheduling for the primary cell. The parameters associated with the first search space may comprise an indication of a quantity of control channel candidates for the first search space. The parameters associated with the second search space may comprise an indication of monitoring occasions for the second search space. The determining the second search space may comprises determining a search space indicator of the second search space that is associated with a search space indicator of the first search space. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more messages comprising configuration parameters for a primary cell. The configuration parameters may comprise: a first indication indicating that a first search space of the primary cell is enabled with cross-carrier scheduling; and a second indication, of a secondary cell, for cross-carrier scheduling the primary cell. The wireless device may determine, based on the first search space of the primary cell, a second search space of the secondary cell. The wireless device may receive, via the second search space of the secondary cell, at least one resource assignment for the primary cell. The wireless device may also perform one or more additional operations. The wireless device may receive a command indicating activation of cross-carrier scheduling for the primary cell. The receiving, via the second search space of the secondary cell, the at least one resource assignment for the primary cell may be based on the activation of cross-carrier scheduling for the primary cell. The wireless device may receive, via the primary cell and based on the at least one resource assignment, downlink data. The determining the second search space may comprise determining a search space indicator of the second search space that is the same as a search space indicator of the first search space. The determining the second search space may comprise determining the second search space based on an association with the first search space. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive configuration parameters indicating: a cell index of a secondary cell cross-carrier scheduling a primary cell; one or more wireless device-specific search spaces of a downlink bandwidth part (DL BWP) of the primary cell; and one or more control resource sets (CORESETs) of the DL BWP of the primary cell. The wireless device may activate the DL BWP as an active DL BWP of the primary cell. The wireless device may determine self-carrier scheduling of the DL BWP based on a wireless device-specific search space of the one or more wireless device-specific search spaces being associated with a CORESET of the one or more CORESETs. The wireless device may monitor, based on the determining self-carrier scheduling of the DL BWP, the DL BWP for downlink control information (DCI) indicating resources for the primary cell. The wireless device may also perform one or more additional operations. The DL BWP may be an initial DL BWP. The DL BWP may be a default DL BWP. The wireless device may receive one or more messages indicating second configuration parameters The second configuration parameters may indicate: one or more second wireless device-specific search spaces of a second DL BWP of the primary cell; and one or more second CORESETs of the second DL BWP of the primary cell. The wireless device may receive a command indicating switching from the DL BWP to the second DL BWP of the primary cell. The wireless device may activate, based on the receiving the command, the second DL BWP as the active DL BWP of the primary cell. The command may be DCI comprising a BWP index of the second DL BWP. The wireless device may determine cross-carrier scheduling of the second DL BWP based on none of CORESET indexes of the one or more second wireless device-specific search spaces being the same as a CORESET index of a CORESET of the one or more second CORESETs. The wireless device may monitor, based on the determining cross-carrier scheduling of the second DL BWP, the secondary cell for second DCI indicating resources for the primary cell. The second DL BWP may or may not be an initial DL BWP or a default DL BWP. The wireless device may activate the DL BWP as an active DL BWP of the primary cell based on triggering a random access procedure. The wireless device may activate the DL BWP as an active DL BWP of the primary cell based on an expiry of a BWP inactivity timer of the primary cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

A wireless device may perform a method comprising multiple operations. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive configuration parameters indicating: a cell index of a secondary cell cross-carrier scheduling a primary cell; one or more wireless device-specific search spaces of a downlink bandwidth part (DL BWP) of the primary cell; and one or more control resource sets (CORESETs) of the DL BWP of the primary cell. The wireless device may activate the DL BWP as an active DL BWP of the primary cell. The wireless device may determine cross-carrier scheduling of the DL BWP based none of CORESET indexes of the one or more wireless device-specific search spaces being the same as a CORESET index of a CORESET of the one or more CORESETs. The wireless device may monitor, based on the determining cross-carrier scheduling of the DL BWP, the secondary cell for downlink control information (DCI) indicating resources for the primary cell. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

A wireless device may perform a method comprising multiple operations. The wireless device may receive one or more messages comprising configuration parameters for a first cell. The configuration parameters may comprise: a scheduling cell index of a second cell cross-carrier scheduling the first cell; an initial downlink bandwidth part (DL BWP) index of an initial DL BWP; and a first DL BWP index of a first DL BWP different from the initial DL BWP. The wireless device may activate the initial DL BWP of the first cell as an active DL BWP of the first cell. The wireless device may, based on the activating the initial DL BWP: determining self-carrier scheduling for the first cell; and monitor, one or more first search spaces of the initial DL BWP of the first cell, for first downlink control information (DCI) indicating resources for the first cell. The wireless device may switch to the first DL BWP as the active DL BWP of the first cell. The wireless device may, based on the switching: enable cross-carrier scheduling for the first cell; and monitor, one or more second search spaces of the second cell, for second DCI indicating resources for the first cell. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more messages comprising configuration parameters for a primary cell. The configuration parameters may indicate: a common search space of the primary cell;

A first wireless device-specific search space of the primary cell; and a second wireless device-specific search space, of a secondary cell, for cross-carrier scheduling of the primary cell. The wireless device may monitor, for first downlink control information (DCI) indicating resources of the primary cell, the common search space of the primary cell. The wireless device may monitor, for second DCI indicating resources of the primary cell, the first wireless device-specific search space of the primary cell. The wireless device may, based on cross-carrier scheduling of the primary cell: continue monitoring, for the first DCI, the common search space of the primary cell; stop monitoring, for the second DCI, the first wireless device-specific search space of the primary cell; and start monitoring, for third DCI indicating resources of the primary cell, the second wireless device-specific search space of the secondary cell. The wireless device may also perform one or more additional operations. The wireless device may receive, via the second wireless device specific search space of the secondary cell, DCI indicating first resources of the primary cell. The wireless device may communicate, based on receiving the DCI indicating first resources of the primary cell, via the first resources of the primary cell. The wireless device may receive, via the common search space of the primary cell, DCI indicating first resources of the primary cell. The wireless device may communicate, based on receiving the DCI indicating first resources of the primary cell, via the first resources of the primary cell. The primary cell and the secondary cell may belong to a physical uplink control channel (PUCCH) group. The wireless device may transmit a hybrid automatic repeat request (HARQ) feedback via the primary cell. The first DCIs may be based on one or more first DCI formats. The one or more first DCI formats may comprise a DCI format 1_0 and a DCI format 0_0. The second DCIs may be based on one or more second DCI formats. The third DCIs may be based on the one or more second DCI formats. The one or more second DCI formats may comprise a DCI format 1_1 and a DCI format 0_1. The one or more second DCI formats may comprise a DCI format 1_2 and a DCI format 0_2. The one or more second DCI formats may comprise a DCI format 3_0 and a DCI format 3_1. The first DCI may comprise cyclic redundancy check (CRC) bits scrambled with one of one or more first radio network temporary identifier (RNTIs). The second DCI may comprises CRC bits scrambled with one of one or more second RNTIs. The third DCI may comprise CRC bits scrambled with the one of one or more second RNTIs. The one or more first RNTIs may comprise a cell-RNTI (C-RNTI), a system information-RNTI (SI-RNTI), and a random access-RNTI (RA-RNTI). The one or more second RNTIs may comprise a cell-RNTI (C-RNTI) and configured scheduling-RNTI (CS-RNTI). The wireless device may receive one or more radio resource control (RRC) messages indicating a cell indicator of the secondary cell. The wireless device may enable the cross-carrier scheduling of the primary cell based on receiving at least one of: a radio resource control (RRC) message; a medium access control control element (MAC CE); or DCI. The wireless device may start monitoring the second wireless device specific search space of the secondary cell based on enabling cross-carrier scheduling of the primary cell. The monitoring, for the first DCI, the common search space may comprise monitoring, for the first DCI, based on a DCI format 1_0 with a system information-radio network temporary identifier (SI-RNTI). The monitoring, for the first DCIs, the common search space may comprise monitoring, for the first DCI, based on a DCI format 1_0 with a random access-radio network temporary identifier (RA-RNTI). The monitoring, for the first DCI, the common search space may comprise monitoring, for the first DCI, based on a DCI format 1_0 with cell-radio network temporary identifier (C-RNTI). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more first messages comprising first configuration parameters for a primary cell The configuration parameters may indicate: a common search space of the primary cell; and a first wireless device-specific search space of the primary cell. The wireless device may, based on the receiving the one or more first messages: monitor, for first downlink control information (DCI) indicating resources of the primary cell, the common search space of the primary cell; and monitor, for second DCI indicating resources of the primary cell, the first wireless device-specific search space of the primary cell. The wireless device may receive one or more second messages indicating a second wireless device-specific search space, of a secondary cell, for cross-carrier scheduling of the primary cell. The wireless device may, based on the receiving the one or more second messages: continue monitoring, for the first DCI, the common search space of the primary cell; and start monitoring, for third DCI indicating resources of the primary cell, the second wireless device-specific search space of the secondary cell. The wireless device may also perform one or more additional operations. The wireless device may, based on receiving the one or more second messages, stop monitoring, for the second DCI, the first wireless device-specific search space of the primary cell. The wireless device may receive, via the second wireless device-specific search space of the secondary cell, DCI indicating first resources of the primary cell. The wireless device may communicate, based on the receiving the DCI indicating first resources of the primary cell, via the first resources of the primary cell. The wireless device may receive, via the common search space of the primary cell, DCI indicating first resources of the primary cell. The wireless device may communicate, based on the receiving the DCI indicating first resources of the primary cell, via the first resources of the primary cell. The wireless device may enable cross-carrier scheduling of the primary cell based on receiving at least one of: the one or more second messages; a radio resource control (RRC) message; a medium access control control element (MAC CE); or DCI. The one or more second messages may indicate a cell indicator of the secondary cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more first messages. A computer-readable medium may store instructions that, when executed, cause performance of the described method, additional operations and/or include the additional elements.

A wireless device may perform a method comprising multiple operations. The wireless device may receive one or more messages comprising configuration parameters for a primary cell. The configuration parameters may indicate: a common search space of the primary cell; and a wireless device-specific search space, of a secondary cell, for cross-carrier scheduling of the primary cell. The wireless device may, based on the receiving the one or more messages: monitor, based on a first DCI format and for first downlink control information (DCI) indicating resources of the primary cell, the common search space of the primary cell; and monitor, based on a second DCI format and for second DCI indicating resources of the primary cell, the wireless device-specific search space of the secondary cell. The second DCI format may be different from the first DCI format. The wireless device may also perform one or more additional operations. The configuration parameters may further indicate a second wireless device-specific search space of the primary cell. The wireless device may receive a command indicating deactivation of cross-carrier scheduling of the primary cell. The wireless device may, based on the receiving the command: stop monitoring, for the second DCI, the wireless device-specific search space of the secondary cell; and start monitoring, for third DCI based on the second DCI format, the second wireless device-specific search space of the primary cell. The wireless device may receive, via the wireless device-specific search space of the secondary cell, DCI indicating first resources of the primary cell. The wireless device may communicate, based on the receiving the DCI indicating first resources of the primary cell, via the first resources of the primary cell. The wireless device may receive, via the common search space of the primary cell, DCI indicating first resources of the primary cell. The wireless device may communicate, based on the receiving the DCI indicating first resources of the primary cell, via the first resources of the primary cell. The wireless device may enable cross-carrier scheduling based on the receiving the one or more first messages. The wireless device may monitor the wireless device-specific search space of the secondary cell based on the enabling cross-carrier scheduling of the primary cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

A base station may perform a method comprising multiple operations. The base station may determine configuration parameters for a first cell. The configuration parameters may indicate: that the first cell is a physical uplink control channel (PUCCH) cell of a PUCCH cell group; one or more secondary cells of the PUCCH cell group; and one or more parameters for cross-carrier scheduling. The one or more parameters may indicate that a second cell of the one or more secondary cells is a scheduling cell of the first cell. The base station may transmit, to a wireless device, one or more radio resource control (RRC) messages indicating the configuration parameters. The base station may, based on the cross-carrier scheduling: transmit, via the first cell, first DCI indicating resource for the first cell; and transmit, via the second cell, second DCI indicating resource for the first cell. The base station may receive, via the first cell, a PUCCH transmission comprising an uplink signal corresponding to the first DCI and the second DCI. The base station may also perform one or more additional operations. The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to send the PUCCH transmission. A computer-readable medium may store instructions that, when executed, cause performance of the described method, additional operations and/or include the additional elements.

A wireless device may perform a method comprising multiple operations. The wireless device may receive one or more messages comprising configuration parameters for a first cell. The configuration parameters may indicate: a first search space of the first cell for monitoring, based on a first DCI format, for first downlink control information (DCI); a second search space of a second cell for monitoring, based on the first DCI format, for second DCI; and one or more parameters for cross-carrier scheduling, wherein the one or more parameters indicate that the second cell is a scheduling cell of the first cell. The wireless device may monitor, for the first DCI based on the first DCI format and comprising resource assignments for the first cell, the first cell. The wireless device may switch from self-carrier scheduling to cross-carrier scheduling. The wireless device may, based on the switching to cross-carrier scheduling: stop monitoring the first cell for the first DCI; and start monitoring, for the second DCI based on the first DCI format and comprising resource assignments for the first cell, the second cell. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more messages comprising configuration parameters for a primary cell. The configuration parameters may indicate a first search space of the primary cell and a second search space of a secondary cell. The wireless device may monitor the first search space of the primary cell for first downlink control information (DCI) comprising at least one first resource assignment for the primary cell. The wireless device may receive a command indicating activation of cross-carrier scheduling of the primary cell via the secondary cell. The wireless device may, based on the receiving the command, start monitoring the second search space of the secondary cell for second DCI comprising at least one second resource assignment for the primary cell. The wireless device may also perform one or more additional operations. The command may indicate activation of one or more secondary cells, wherein the one or more secondary cells may comprise the secondary cell. The configuration parameters may indicate that the secondary cell is a scheduling cell of the primary cell. The command may indicate the activation of cross-carrier scheduling by indicating an activation of the secondary cell. The wireless device may receive, via the second search space of the secondary cell, the second DCI comprising the at least one second resource assignment for the primary cell. The wireless device may receive, via the primary cell and based on the at least one second resource assignment, downlink data. The command may comprise at least one of DCI or a medium access control (MAC) control element (CE). The command may be a secondary cell activation and deactivation medium access control (MAC) control element (CE) command indicating activation of the secondary cell. The secondary cell activation and deactivation MAC CE command may comprise a bit, corresponding to a cell index of the secondary cell, indicating activation of the secondary cell. The command may comprise one or more bits for activating one or more secondary cells, comprising the secondary cell, and a bit indicating enabling cross-carrier scheduling of the primary cell. The configuration parameters may comprise one or more parameters for cross-carrier scheduling, wherein the one or more parameters may indicate that the secondary cell is a scheduling cell of the primary cell. The command may comprise one or more bits indicating an activation of the secondary cell and a bit indicating enabling cross-carrier scheduling of the primary cell. The command may comprise one or more bits for activating one or more secondary cells, comprising the secondary cell, and a field indicating a cell index of the secondary cell. The wireless device may receive a second command indicating an activation of a second secondary cell. The wireless device may monitor one or more search spaces of the second secondary cell for third DCI comprising at least one third resource assignment for the primary cell. The wireless device may determine, based on the second command, that the second secondary cell is a scheduling cell of the primary cell. The command may comprise one or more bits for activating one or more secondary cells, comprising the secondary cell, a first field indicating enabling cross-carrier scheduling of the primary cell, and a second field indicating a cell index of the secondary cell. The wireless device may, based on the receiving the command, stop monitoring the first search space of the primary cell for the first DCI. The wireless device may receive a third command indicating deactivation of cross-carrier scheduling of the primary cell via the secondary cell. The third command may indicate deactivation of cross-carrier scheduling of the primary cell via the secondary cell by indicating deactivation of the secondary cell. The wireless device may, based on the receiving the third command, stop monitoring the second search space of the secondary cell. The wireless device may, based on the third command: deactivate cross-carrier scheduling of the primary cell via the secondary cell;

activate self-carrier scheduling of the primary cell; and monitor the first search space of the primary cell for the first DCI. The wireless device may, based on receiving the command, determine a switching latency. The switching latency may comprise an activation latency of the secondary cell and a delay offset. The starting monitoring the second search space of the secondary cell for the second DCI may comprise starting monitoring the second search space of the secondary cell based on a switching latency following the receiving the command. The primary cell may be one of: a primary cell of a master cell group; a primary cell of a secondary cell group; or a physical uplink control channel (PUCCH) cell of a PUCCH group. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

A wireless device may perform a method comprising multiple operations. The wireless device may monitor, based on a first downlink control information (DCI) format, a first search space of a primary cell for first DCI comprising at least one first resource assignment for the primary cell. The wireless device may receive a command indicating activation of cross-carrier scheduling of the primary cell by a secondary cell. The wireless device may, based on the receiving the command, start monitoring, based on a second DCI format, a second search space of the secondary cell for second DCI comprising at least one second resource assignment for the primary cell. The wireless device may receive, via the second search space of the secondary cell, the second DCI comprising the at least one second resource assignment for the primary cell. The wireless device may also perform one or more additional operations. The wireless device may receive one or more messages comprising configuration parameters for the primary cell. The configuration parameters may indicate the first search space of the primary cell and the second search space of the secondary cell. The command may comprise an indication of activation of the secondary cell. The wireless device may monitor, based on the second DCI format, a third search space of the primary cell for third DCI comprising at least one third resource assignment for the primary cell. The wireless device may, based on receiving the command, stop monitoring the third search space of the primary cell for third DCI. The wireless device may receive, via the primary cell and based on the at least one first resource assignment, downlink data. The command may comprise at least one of DCI or a medium access control (MAC) control element (CE). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

A wireless device may perform a method comprising multiple operations. The wireless device may monitor, based on a first radio network traffic identifier (RNTI), a first search space of a primary cell for first downlink control information (DCI) comprising at least one first resource assignment for the primary cell. The wireless device may receive a command indicating activation of cross-carrier scheduling of the primary cell by a secondary cell. The wireless device may, based on the receiving the command, start monitoring, based on a second RNTI, a second search space of the secondary cell for second DCI comprising at least one second resource assignment for the primary cell. The wireless device may also perform one or more additional operations. The wireless device may receive one or more messages comprising configuration parameters for the primary cell. The configuration parameters may indicate the first search space of the primary cell and the second search space of the secondary cell. The command may comprise an indication of activation of the secondary cell. The monitoring the first search space of the primary cell may comprise monitoring the first search space of the primary cell based on a first DCI format. The monitoring the second search space of secondary cell may comprise monitoring the second search space of the secondary cell based on a second DCI format. The wireless device may receive, via the second search space of the secondary cell, the second DCI comprising the at least one second resource assignment for the primary cell. The wireless device may receive, via the primary cell and based on the at least one second resource assignment, downlink data. The command may comprise at least one of DCI or a medium access control (MAC) control element (CE). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

A wireless device may perform a method comprising multiple operations. The wireless device may receive one or more messages comprising configuration parameters for a first cell. The configuration parameters may indicate: a first search space of the first cell; a second search space of the first cell; a third search space of a second cell; and one or more parameters for cross-carrier scheduling. The one or more parameters may indicate that the second cell is a scheduling cell of the first cell. The wireless device may monitor the first search space for first downlink control information (DCI) based on a first DCI format. The wireless device may monitor the second search space for second DCI based on the second DCI format. The wireless device may receive a command indicating switching from self-carrier scheduling to cross-carrier scheduling for the first cell. The wireless device may, based on receiving the command: continue monitoring the first search space for the first DCI based on the first DCI format; stop monitoring the second search space for the second DCI based on the second DCI format; and start monitoring the third search space for third DCI based on the second DCI format. The wireless device may also perform one or more additional operations. The command may be at least one of: a radio resource control (RRC) command; a medium access control (MAC) control element (CE); or DCI. The command may indicate an activation of the second cell. The first cell may be a primary cell of a cell group or a primary cell of a physical uplink control channel (PUCCH) group. The second cell may be a secondary cell. The wireless device may receive a second command indicating switching from cross-carrier scheduling for the first cell to self-carrier scheduling for the first cell. The wireless device may, based on the receiving the second command, stop monitoring the third search space for the third DCI. The wireless device may, based on the receiving the second command, start monitoring the second search space for the second DCI. The wireless device may, based on the receiving the second command, continue monitoring the first search space for the first DCI. The first DCI may be scheduling DCI for downlink data or uplink data of the first cell. The first DCI may be group common DCI comprising one or more of: slot formation information (SFI); pre-emption indication; or transmission power control (TPC) command for one or more uplink channels. The one or more uplink channels may be one or more of: a physical uplink control channel (PUCCH); a physical uplink scheduled channel (PUSCH); or a sounding reference signal (SRS) channel. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

A wireless device may perform a method comprising multiple operations. The wireless device may receive one or more messages comprising configuration parameters for cross-carrier scheduling for a first cell. The wireless device may receive a command indicating that a second cell is a scheduling cell for the first cell. The wireless device may receive, via the second cell, downlink control information (DCI) comprising a resource assignment for the first cell. The wireless device may communicate, via the first cell and based on the resource assignment, with a base station. The wireless device may also perform one or more additional operations. The first cell may be a primary cell of a cell group or a physical uplink control channel (PUCCH) group. The second cell may be a secondary cell of the cell group or a physical uplink control channel (PUCCH) group. The command may comprise one or more fields indicating an identifier of the second cell. The configuration parameters may indicate the second cell. The command may be a secondary cell activation/deactivation medium access control (MAC) control element (CE). The MAC CE may indicate an activation of the second cell, wherein the second cell may be configured as the scheduling cell for the first cell via radio resource control (RRC) signaling. The MAC CE may comprise a bit field indicating activation of cross-carrier scheduling for the first cell. The wireless device may ignore the bit field indicating activation of cross-carrier scheduling based on the cross-carrier scheduling being already activated. The wireless device may determine the second cell, wherein the second cell may have a lowest cell index among one or more secondary cells activated via the secondary cell activation/deactivation MAC CE. The MAC CE may comprise a bit field indicating a cell index of the second cell for cross-carrier scheduling of the first cell. The wireless device may activate, based on receiving the command, the second cell. The wireless device may activate cross-carrier scheduling for the first cell based on the activation of the second cell. The wireless device may activate cross-carrier scheduling for the first cell via the second cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

A wireless device may perform a method comprising multiple operations. The wireless device may receive one or more messages comprising configuration parameters for a first cell. The configuration parameters may comprise: an indication of cross-carrier scheduling for the first cell; an indication of one or more first downlink control information (DCI) formats for self-carrier scheduling; an indication of one or more second DCI formats for cross-carrier scheduling; and an indication of one or more first search spaces for monitoring for first DCIs comprising resource assignments for the first cell. The wireless device may receive a command indicating that a second cell is a scheduling cell for the first cell. The wireless device may determine one or more second search spaces of the second cell based on the one or more second DCI formats for cross-carrier scheduling. The wireless device may monitor, based on the one or more first DCI formats and for the first DCIs comprising resource assignments for the first cell, the one or more first search spaces of the first cell. The wireless device may monitor, based on the one or more second DCI formats and for second DCIs comprising resource assignments for the first cell, the one or more second search spaces of the second cell. The wireless device may also perform one or more additional operations. The wireless device may monitor for the first DCIs based on a first radio network traffic identifier (RNTI). The wireless device may monitor for the second DCIs based on a second radio network traffic identifier (RNTI). The wireless device may determine a first DCI size of the one or more second DCI formats based on at least one of an active downlink bandwidth part (BWP) or an active uplink BWP of the second cell. The wireless device may align a second DCI size, based on an active downlink BWP or an active uplink BWP of the first cell, of the one or more second DCI formats to the first DCI size. The one or more first search spaces may be cell-specific search spaces and/or wireless device-specific search spaces. The one or more first DCI formats may be fallback DCI formats such as DCI format 1_0 and DCI format 0_0. The one or more second search spaces may be wireless device-specific search spaces. The one or more second DCI formats may be non-fallback DCI formats such as DCI format 1_1 and DCI format 0_1. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

A wireless device may perform a method comprising multiple operations. The wireless device may receive one or more radio resource control (RRC) messages comprising configuration parameters for a first cell. The configuration parameters may indicate: one or more monitoring occasions of a first search space of the first cell; and a second search space of a second cell for cross-carrier scheduling of the first cell. The second cell may be cross-carrier scheduling the first cell. The wireless device may receive group-common downlink control information (GC-DCI) comprising a slot format indication (SFI) of one or more slots for the first cell. The wireless device may, based on the GC-DCI, determine that a first monitoring occasion of the one or more monitoring occasions of the first search space fully overlaps with a downlink resource of a first slot of the first cell. The wireless device may, based on the first monitoring occasion being overlapped with the downlink resource, monitor, the first monitoring occasion, for first downlink control information (DCI) comprising resource assignment for the first cell. The wireless device may determine that a second monitoring occasion of the one or more monitoring occasions of the first search space does not fully overlap with a downlink resource of a second slot of the first cell. The wireless device may, based on the second monitoring occasion not being overlapped with the downlink resource, monitor, a monitoring occasion of the second search space during the second slot, for second DCI comprising resource assignments for the first cell. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the GC-DCI. A computer-readable medium may store instructions that, when executed, cause performance of the described method, additional operations and/or include the additional elements.

A wireless device may perform a method comprising multiple operations. The wireless device may receive one or more messages comprising configuration parameters for a first cell. The configuration parameters may comprise: a scheduling cell index of a scheduling cell; one or more first parameters for a first search space of the first cell for monitoring for first downlink control information (DCI) scheduling resource assignments of data for the first cell; and one or more second parameters for a second search space of the first cell for monitoring for second DCI scheduling resource assignments of data for the first cell. The one or more second parameters may comprise: a second search space index of the second search space; and an indication of cross-carrier scheduling. The wireless device may monitor the first search space of the first cell and the second search space of the first cell. The wireless device may receive a command indicating an activation of cross-carrier scheduling for the first cell. The wireless device may, based on the receiving the command: determine a third search space of the scheduling cell based on the one or more second parameters for the second search space of the first cell; continue monitoring the first search space of the first cell for the one or more first DCIs; stop monitoring the second search space of the first cell; and monitor the third search space of the scheduling cell for the one or more second DCIs. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the command. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, a radio resource control (RRC) message comprising configuration parameters for a primary cell of the wireless device, wherein the configuration parameters indicate that:
the primary cell of the wireless device is scheduled by the primary cell; and
the primary cell of the wireless device is additionally cross-carrier scheduled by a secondary cell; and
receiving downlink control information (DCI) configured to schedule the primary cell, wherein the receiving the DCI comprises at least one of:
receiving the DCI via the primary cell; or
receiving the DCI via the secondary cell.

2. The method of claim 1, wherein the DCI comprises at least one resource assignment for the primary cell.

3. The method of claim 1, further comprising receiving a command indicating activation of cross-carrier scheduling for the primary cell, wherein the receiving the DCI comprises receiving the DCI via the secondary cell based on the activation of cross-carrier scheduling for the primary cell.

4. The method of claim 1, wherein:
the configuration parameters further indicate that a first search space, of the primary cell, is enabled with cross-carrier scheduling, and
the method further comprises:
determining, based on the first search space of the primary cell, a second search space of the secondary cell,
wherein the receiving the DCI comprises receiving the DCI via the second search space of the secondary cell.

5. The method of claim 1, wherein:
the configuration parameters further indicate:
that a first search space, of the primary cell, is enabled with cross-carrier scheduling, and
a quantity of control channel candidates for the first search space; and
the method further comprises:
determining, based on the first search space of the primary cell, a second search space of the secondary cell,
wherein the receiving the DCI comprising monitoring the second search space based on the quantity of control channel candidates for the first search space.

6. The method of claim 1, further comprising receiving, via the primary cell and based on the DCI, downlink data.

7. The method of claim 1, wherein:
the primary cell of the wireless device being scheduled by the primary cell comprises the wireless device being scheduled, via the primary cell, for communication on the primary cell, and the primary cell of the wireless device being cross-carrier scheduled by the secondary cell comprises the wireless device being scheduled, via the secondary cell, for communication on the primary cell.

8. A wireless device comprising:
one or more processors; and
memory storing instructions that, when executed by the one or more processors, cause the wireless device to:
receive a radio resource control (RRC) message comprising configuration parameters for a primary cell of the wireless device, wherein the configuration parameters indicate that:
the primary cell of the wireless device is scheduled by the primary cell; and
the primary cell of the wireless device is additionally cross-carrier scheduled by a secondary cell; and
receive downlink control information (DCI) configured to schedule the primary cell,
wherein the instructions, when executed by the one or more processors, cause the wireless device to receive the DCI by causing at least one of:
receiving the DCI via the primary cell; or
receiving the DCI via the secondary cell.

9. The wireless device of claim 8, wherein the DCI comprises at least one resource assignment for the primary cell.

10. The wireless device of claim 8, wherein the instructions, when executed by the one or more processors, cause the wireless device to:
receive a command indicating activation of cross-carrier scheduling for the primary cell, and
receive the DCI by causing receiving the DCI via the secondary cell based on the activation of cross-carrier scheduling for the primary cell.

11. The wireless device of claim 8, wherein:
the configuration parameters further indicate that a first search space, of the primary cell, is enabled with cross-carrier scheduling, and
the instructions, when executed by the one or more processors, cause the wireless device to:
determine, based on the first search space of the primary cell, a second search space of the secondary cell, and
receive the DCI by causing receiving the DCI via the second search space of the secondary cell.

12. The wireless device of claim 8, wherein:
the configuration parameters further indicate:
that a first search space, of the primary cell, is enabled with cross-carrier scheduling, and
a quantity of control channel candidates for the first search space; and
the instructions, when executed by the one or more processors, cause the wireless device to:
determine, based on the first search space of the primary cell, a second search space of the secondary cell, and
receive the DCI by causing monitoring the second search space based on the quantity of control channel candidates for the first search space.

13. The wireless device of claim 8, wherein the instructions, when executed by the one or more processors, cause the wireless device to receive, via the primary cell and based on the DCI, downlink data.

14. The wireless device of claim 8, wherein:

the primary cell of the wireless device being scheduled by the primary cell comprises the wireless device being scheduled, via the primary cell, for communication on the primary cell, and the primary cell of the wireless device being cross-carrier scheduled by the secondary cell comprises the wireless device being scheduled, via the secondary cell, for communication on the primary cell.

15. A method comprising:

sending, by a base station to a wireless device, a radio resource control (RRC) message comprising configuration parameters for a primary cell of the wireless device, wherein the configuration parameters indicate that:

the primary cell of the wireless device is scheduled by the primary cell; and the primary cell of the wireless device is additionally cross-carrier scheduled by a secondary cell; and sending downlink control information (DCI) configured to schedule the primary cell, wherein the sending the DCI comprises at least one of:

sending the DCI via the primary cell; or sending the DCI via the secondary cell.

16. The method of claim 15, wherein the DCI comprises at least one resource assignment for the primary cell.

17. The method of claim 15, further comprising sending a command indicating activation of cross-carrier scheduling for the primary cell, wherein the sending the DCI comprises sending the DCI via the secondary cell based on the activation of cross-carrier scheduling for the primary cell.

18. The method of claim 15, wherein:

the configuration parameters further indicate that a first search space, of the primary cell, is enabled with cross-carrier scheduling, and the method further comprises:

determining, based on the first search space of the primary cell, a second search space of the secondary cell, wherein the sending the DCI comprising sending the DCI via the second search space of the secondary cell.

19. The method of claim 15, further comprising sending, via the primary cell and based on the DCI, downlink data.

20. The method of claim 15, wherein:

the primary cell of the wireless device being scheduled by the primary cell comprises the wireless device being scheduled, via the primary cell, for communication on the primary cell, and the primary cell of the wireless device being cross-carrier scheduled by the secondary cell comprises the wireless device being scheduled, via the secondary cell, for communication on the primary cell.

21. A base station comprising:

one or more processors; and memory storing instructions that, when executed by the one or more processors, cause the base station to:

send, to a wireless device, a radio resource control (RRC) message comprising configuration parameters for a primary cell of the wireless device, wherein the configuration parameters indicate that:

the primary cell of the wireless device is scheduled by the primary cell; and the primary cell of the wireless device is additionally cross-carrier scheduled by a secondary cell; and send downlink control information (DCI) configured to schedule the primary cell, wherein the instructions, when executed by the one or more processors, cause the base station to send the DCI by causing at least one of:

sending the DCI via the primary cell; or sending the DCI via the secondary cell.

22. The base station of claim 21, wherein the DCI comprises at least one resource assignment for the primary cell.

23. The base station of claim 21, wherein the instructions, when executed by the one or more processors, cause the base station to:

send a command indicating activation of cross-carrier scheduling for the primary cell, and send the DCI by causing sending the DCI via the secondary cell based on the activation of cross-carrier scheduling for the primary cell.

24. The base station of claim 21, wherein:

the configuration parameters further indicate that a first search space, of the primary cell, is enabled with cross-carrier scheduling, and the instructions, when executed by the one or more processors, cause the base station to:

determine, based on the first search space of the primary cell, a second search space of the secondary cell, and send the DCI by causing sending the DCI via the second search space of the secondary cell.

25. The base station of claim 21, wherein the instructions, when executed by the one or more processors, cause the base station to send, via the primary cell and based on the DCI, downlink data.

26. The base station of claim 21, wherein:

the primary cell of the wireless device being scheduled by the primary cell comprises the wireless device being scheduled, via the primary cell, for communication on the primary cell, and the primary cell of the wireless device being cross-carrier scheduled by the secondary cell comprises the wireless device being scheduled, via the secondary cell, for communication on the primary cell.

* * * * *